(12) United States Patent
Wada et al.

(10) Patent No.: US 7,981,581 B2
(45) Date of Patent: Jul. 19, 2011

(54) PHTHALOCYANINE COMPOSITION AND PHOTOCONDUCTIVE MATERIAL, ELECTROPHOTOGRAPHIC PHOTORECEPTOR CARTRIDGE, AND IMAGE-FORMING APPARATUS EACH EMPLOYING THE COMPOSITION

(75) Inventors: Mitsuo Wada, Yokohama (JP); Kazutaka Ida, Yokohama (JP); Akiteru Fujii, Odawara (JP)

(73) Assignee: Mitsubishi Chemical Corporation, Tokyo (JP)

( * ) Notice: Subject to any disclaimer, the term of this patent is extended or adjusted under 35 U.S.C. 154(b) by 962 days.

(21) Appl. No.: 10/591,767

(22) PCT Filed: Mar. 4, 2005

(86) PCT No.: PCT/JP2005/003800
§ 371 (c)(1),
(2), (4) Date: Mar. 23, 2007

(87) PCT Pub. No.: WO2005/085365
PCT Pub. Date: Sep. 15, 2005

(65) Prior Publication Data
US 2008/0268357 A1    Oct. 30, 2008

(30) Foreign Application Priority Data

Mar. 4, 2004 (JP) ................. 2004-060851
Mar. 9, 2004 (JP) ................. 2004-066071

(51) Int. Cl.
*G03G 5/047* (2006.01)
(52) U.S. Cl. ....... 430/59.4; 399/159; 540/122; 540/136; 540/140; 540/141
(58) Field of Classification Search ............. 430/59.4; 399/159; 540/122, 136, 140, 141
See application file for complete search history.

(56) References Cited

U.S. PATENT DOCUMENTS

| | | | |
|---|---|---|---|
| 3,357,989 A | 12/1967 | Byrne | |
| 4,971,877 A | 11/1990 | Miyamoto et al. | |
| 5,106,536 A | 4/1992 | Miyamoto et al. | |
| 5,153,313 A | 10/1992 | Kazmaier et al. | |
| 5,183,886 A | 2/1993 | Takagishi | |
| 5,272,264 A | 12/1993 | Takagishi | |
| 5,443,935 A | 8/1995 | Kojima et al. | |
| 5,463,044 A | 10/1995 | Nukada et al. | |
| 5,523,189 A | 6/1996 | Molaire | |
| 5,879,847 A | 3/1999 | Yoshinaga et al. | |
| 5,888,690 A | 3/1999 | Yoshinaga et al. | |
| 2002/0081508 A1 | 6/2002 | Horiuchi et al. | |
| 2002/0102108 A1* | 8/2002 | Adachi et al. ............ | 399/50 |
| 2004/0224245 A1* | 11/2004 | Shigezaki et al. ........ | 430/66 |

FOREIGN PATENT DOCUMENTS

| | | |
|---|---|---|
| DE | 101 52 122 A1 | 5/2002 |
| EP | 0 314 100 A2 | 5/1989 |
| EP | 0 569 943 A1 | 11/1993 |
| EP | 0 710 891 A1 | 5/1996 |
| GB | 1 116 553 | 6/1968 |
| JP | 61 239248 | 10/1986 |
| JP | 62 67094 | 3/1987 |
| JP | 62-178266 | 8/1987 |
| JP | 1 207755 | 8/1989 |
| JP | 1 221459 | 9/1989 |
| JP | 2 8256 | 1/1990 |
| JP | 2 289658 | 11/1990 |
| JP | 2-308863 | 12/1990 |
| JP | 3 9962 | 1/1991 |
| JP | 3 128973 | 5/1991 |
| JP | 4 323270 | 11/1992 |
| JP | 4 351673 | 12/1992 |
| JP | 4 372663 | 12/1992 |
| JP | 5 45914 | 2/1993 |
| JP | 5 98181 | 4/1993 |
| JP | 5 186702 | 7/1993 |
| JP | 5 263007 | 10/1993 |
| JP | 6-73303 | 3/1994 |
| JP | 6 145550 | 5/1994 |
| JP | 6 175382 | 6/1994 |
| JP | 6 212089 | 8/1994 |
| JP | 06-212089 | * 8/1994 |
| JP | 6 234937 | 8/1994 |
| JP | 6 279698 | 10/1994 |
| JP | 6 287189 | 10/1994 |
| JP | 7 271073 | 10/1995 |
| JP | 8 41373 | 2/1996 |
| JP | 61 217050 | 9/1996 |

| | | |
|---|---|---|
| JP | 9 120171 | 5/1997 |
| JP | 9-190004 | 7/1997 |
| JP | 09-258466 | * 10/1997 |
| JP | 9 258466 | 10/1997 |
| JP | 10 48859 | 2/1998 |
| JP | 10 67946 | 3/1998 |
| JP | 10 88023 | 4/1998 |
| JP | 11 172142 | 6/1999 |
| JP | 2000 219817 | 8/2000 |
| JP | 2000 313819 | 11/2000 |
| JP | 2000 336283 | 12/2000 |
| JP | 2002-80432 | 3/2002 |
| JP | 2002 235014 | 8/2002 |
| JP | 2002 244321 | 8/2002 |
| JP | 2002-244321 | * 8/2002 |
| JP | 2002 251026 | 9/2002 |

OTHER PUBLICATIONS

Translation of JP 06-212089, published Aug. 1994.*
Translation of JP 09-258466, published Oct. 1997.*
Translation of JP 2002-244321 published Aug. 2002.*
Yasuhiro Oda, et al., "Near-Infrared Sensitive Photoreceptors Incorporating a New Polymorph of Oxotitanium Phthalocyanine", Electrophotography: the society Journal, vol. 29, No. 3, Apr. 6, 1990, pp. 250-258 (with English Abstract).
Atsushi Kakuta, et al., "New Organic Photoconductor for Diode Laser Use", Electrophotography: the society Journal, vol. 24, No. 2, Jan. 21, 1985, pp. 102-107 (with English Abstract).
Toshio Enokida, et al., "Characteristics of τ-Form Metal-free Phthalocyanine and Its Improvement for Organic Photoreceptor Use" Journal of Imaging Science, vol. 35, No. 4, 1991, pp. 235-239.
Atsushi Kakuta, et al., "A New Phthalocyanine Photoreceptor for Diode Laser Printers", Journal of Imaging Technology, vol. 11, 1985, pp. 7-11.
"Electrophotographic Characteristic Evaluation Device: 'The Sequel to Bases and Applications of Electrophotographic Technology'" Institution of Electrophotography Editing, pp. 404-405 (with Partial English Translation).

* cited by examiner

*Primary Examiner* — Mark F Huff
*Assistant Examiner* — Peter L Vajda
(74) *Attorney, Agent, or Firm* — Oblon, Spivak, McClelland, Maier & Neustadt, L.L.P.

(57) ABSTRACT

A phthalocyanine composite with high sensitivity and low environmental dependence is provided.
It comprises both at least one phthalocyanine compound expressed by general formula (1) and at least one phthalocyanine compound expressed by general formula (2):

[Chemical Formula 1]

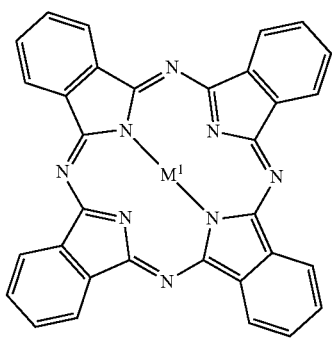

(1)

[Chemical Formula 2]

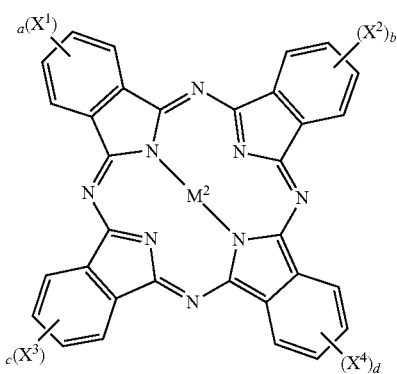

(2)

where, in the general formulae (1) and (2),
$M^1$ represents at least one arbitrary atom or atomic group that is capable of binding to a phthalocyanine,
$M^2$ represents an atom, or an atomic group containing an atom, selected from the second and subsequent periods of the periodic table and capable of binding to a phthalocyanine, $M^1$ and $M^2$ being different in kind from each other,
$X^1$-$X^4$ represent, independently of each other, a halogen atom, and
a, b, c, and d represent, independently of each other, an integer between 0 and 4 and satisfy $a+b+c+d \geq 1$.

10 Claims, 73 Drawing Sheets

PHTHALOCYANINE COMPOSITION AND PHOTOCONDUCTIVE MATERIAL, ELECTROPHOTOGRAPHIC PHOTORECEPTOR CARTRIDGE, AND IMAGE-FORMING APPARATUS EACH EMPLOYING THE COMPOSITION

TECHNICAL FIELD

The present invention relates to a phthalocyanine composite that can be suitably used as a photoconductive material, and a photoconductive material, an electrophotographic photoreceptor, an electrophotographic photoreceptor cartridge, and an image forming apparatus using the phthalocyanine composite. Specifically, the present invention relates to a photoconductive material which is highly sensitive to LED light and semiconductor laser light and has low dependence on environmental conditions such as temperature and humidity, and a photoconductive material, an electrophotographic photoreceptor, an electrophotographic photoreceptor cartridge, and an image forming apparatus using the phthalocyanine composite, and also to a electrophotographic photoreceptor, an electrophotographic photoreceptor cartridge and an image forming apparatus of new kinds that have a photosensitive layer containing a fluorinated gallium-phthalocyanine compound and exhibit high performances, with various uses in a laser printer, a copying machine, a Fax, etc.

BACKGROUND ART

In recent years, electrophotography technology has been widely used and applied not only in the area of copying machines but also in the area of various printers and printing machines especially because it can produce high-quality images with immediacy.

The core of the electrophotography technology are electrophotographic photoreceptors, whose conventionally used photoconductive materials are inorganic photoconductors such as selenium, arsenic-selenium alloy, cadmium sulfide, and zinc oxide; the recent mainstream is the electrophotographic photoreceptors using organic photoconductive materials, which have the advantages of entailing no pollution, ensuring easy film-forming, being readily manufacturable, etc.

The sensitivities of the electrophotographic photoreceptors using organic photoconductive materials vary depending on the kinds of their charge generation materials. As charge generation materials that have sensitivity to long wavelengths of, for example, 600 nm-800 nm, phthalocyanine compounds have been attracting attention and studied energetically. Especially eager study has been conducted on metal-containing phthalocyanines such as chloroaluminium phthalocyanine, chloroindium phthalocyanine, oxyvanadyl phthalocyanine, hydroxygallium phthalocyanine, chlorogallium phthalocyanine, magnesium phthalocyanine, oxytitanyl phthalocyanine, etc., as well as metal-free phthalocyanines and the likes.

Non-Patent Document 1 discloses that even if the structure of the individual molecule is identical, a phthalocyanine compound may exhibit various charge generation efficiencies in the state of crystal, which is the aggregation of molecules, according to the regularity in arrangement of molecules (crystal form).

Patent Documents 1-4 disclose studies on a crystalline phthalocyanine compound that contains effective components having a single structure. In addition, studies have been conducted also on a composite that contains a nonsubstituted phthalocyanine and a substituted phthalocyanine as effective components (see, e.g., Patent Documents 5-7) and a composite that contains nonsubstituted phthalocyanines having different central metals in combination (see, e.g., Patent Documents 8-11).

As regards the photosensitive layers of the electrophotographic photoreceptors, inorganic photoconductive substances such as selenium, cadmium sulfide, zinc oxide, amorphous silicon, etc. have been widely used. In recent years, various organic photoconductive substances have been examined for their application to the electrophotographic photoreceptor's photosensitive layers, some of which substances have already been put to practical use. Compared with inorganic compounds, the organic photoconductive substances have the advantages of being lightweight, ensuring easy film-forming, facilitating photoreceptor manufacturing, enabling transparent photoreceptors according to their kinds, containing no pollution-causing materials, etc.

As structures of the photosensitive layers, there are known the single-layer type photosensitive layer, in which a charge generation substance and a charge transport substance are contained in the same layer and dispersed in binder resin, and the so-called functionally-separated type photosensitive layer, in which the function of generating charge carriers and the function of transporting charge carriers are separately served by different compounds. Above all, the multilayer type photosensitive layer having a charge generation layer, which contains a charge generation substance dispersed in binder resin, and a charge transport layer, which contains a charge transport substance dispersed in binder resin, has become the mainstream of development because of its effectiveness in improving the sensitivity, and organic photoreceptors of this type have been put to practical use.

Organic photoconductive substances known to serve as charge generation substances are: phthalocyanine materials such as metal-free phthalocyanines and metal-containing phthalocyanines; various kinds of organic pigments such as perynone pigments, indigos, thioindigos, quinacridones, perylene pigments, anthraquinone pigments, azo pigments, bisazo pigments, trisazo pigments, tetrakisazo pigments, cyanine pigments, polycyclic quinones, pyrylium salts, thiopyrylium salts, anthanthrones, and pyranthrones; and dyes.

Phthalocyanine materials, in particular, show high sensitivity in the long wavelength region and are known in variety of kinds, among which the titanyl phthalocyanine compounds having particular crystal forms are known to show especially excellent sensitivity (e.g., Patent Document 12).

[Patent Document 1] Japanese Patent Laid-Open Publication No. Sho 62-67094

[Patent Document 2] Japanese Patent Laid-Open Publication No. Hei 5-98181

[Patent Document 3] Japanese Patent Laid-Open Publication No. Hei 5-263007

[Patent Document 4] Japanese Patent Laid-Open Publication No. Hei 10-67946

[Patent Document 5] Japanese Patent Laid-Open Publication No. Hei 9-120171

[Patent Document 6] Japanese Patent Laid-Open Publication No. 2002-251026

[Patent Document 7] Japanese Patent Laid-Open Publication No. Hei 10-48859

[Patent Document 8] Japanese Patent Laid-Open Publication No. 2000-336283

[Patent Document 9] Japanese Patent Laid-Open Publication No. Hei 4-372663

[Patent Document 10] Japanese Patent Laid-Open Publication No. Hei 6-175382

[Patent Document 11] Japanese Patent Laid-Open Publication No. Hei 5-45914

[Patent Document 12] Japanese Patent Laid-Open Publication No. Hei 2-008256

[Non-Patent Document 1] Electrophotography: the society journal, 1990, Vol. 29, No. 3, pp. 250-258.

DISCLOSURE OF THE INVENTION

Problem to Be Solved by the Invention

In recent years, as the demand for improvement in speed, resolution, and image-quality of copying machines, printers, and Faxes increases, the demand for electrophotographic photoreceptors also increases.

Specifically, with requirements for minimization and energy saving of apparatus, it is desired to improve the sensitivity of photosensitive materials further; on the other hand, in order to form favorable images even in various usage environments with different temperatures or humidities, photoreceptors are desired to show little fluctuation in characteristics such as sensitivity, responsivity, residual potential, etc., being well-balanced irrespective of changes in usage environment. In summary, an ideal electrophotographic photoreceptor that satisfies the demand for improvement in speed, resolution and image-quality of the machine is required to show high sensitivity as well as to keep its photoconductive characteristics invariant independently of changes in usage environment, i.e., to have low environmental dependence.

As opposed to such a requirement, the conventionally-known oxytitanium phthalocyanines having particular crystal forms, although being excellent in sensitivity, tend to show considerable fluctuations in characteristics depending on changes in usage environment and lack characteristic balance, being inadequate in terms of electrophotographic characteristics.

Specifically, as for type D(Y) oxytitanyl phthalocyanine crystals, which are known as charge generation materials with high sensitivity, water molecules in the crystals function as sensitizers, so that under conditions with low humidity, the water molecules may come off from the crystals and bring about decline in the sensitivity of the electrophotographic photoreceptor. In short, the type D(Y) oxytitanyl phthalocyanine crystals have high environmental dependence. Consequently, in the case where they are used in printers, copying machines, Faxes, etc., if the humidity in usage environment has changed while the photoreceptor has been kept exposed with a constant strength throughout the period straddling the change in humidity, there arises a difference between the densities of the images obtained before and after the humidity change.

Also, type V hydroxygallium phthalocyanine crystals, which are known as other charge generation materials with high sensitivity, are favorable in terms of their independence of sensitivity on humidity, as contrasted with the type D(Y) oxytitanyl phthalocyanines. However, the type V hydroxygallium phthalocyanine crystals are apt to incur the cleavage of their phthalocyanine nuclei caused by concentrated sulfuric acid, which is used in the manufacturing stage, or to retain residual impurities originating from the concentrated sulfuric acid, so that degradation in sensitivity or deterioration in charging property may occur, and that stable production is not secured.

As explained above, the conventional phthalocyanine compounds and phthalocyanine composites, typified by the art described in Patent Documents 1-12, are not satisfactory from the viewpoint of ideal charge generation material because of their low sensitivity or large fluctuations in sensitivity owing to environmental changes.

With the above problems in view, an objective of the present invention is to provide a phthalocyanine composite that has high sensitivity and low environmental dependence and is suitable as charge generation substance, and a photoconductive material, an electrophotographic photoreceptor, an electrophotographic photoreceptor cartridge, and an image forming apparatus using the same, which show only small fluctuations in characteristics, such as sensitivity, responsivity, and residual potential, owing to changes in usage environment (i.e., have small environmental dependence), and are well-balanced even when used in various usage environments with different temperatures or humidities.

Means for Solving The Problem

As the result of eager study to solve the above problems and satisfy the demand, the present inventors have found that a phthalocyanine composite that contains a phthalocyanine compound having a specific structure exhibits high sensitivity and has small environmental dependence when used as a charge generation substance, and achieved the present invention.

According to an aspect of the present invention (claim 1), there is provided a phthalocyanine composite comprising both at least one phthalocyanine compound expressed by general formula (1) and at least one phthalocyanine compound expressed by general formula (2):

[Chemical Formula 1]

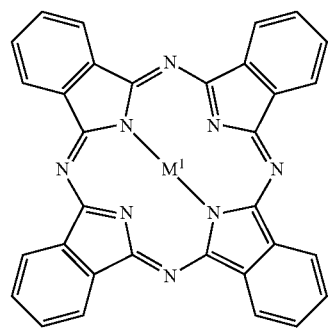

(1)

[Chemical Formula 2]

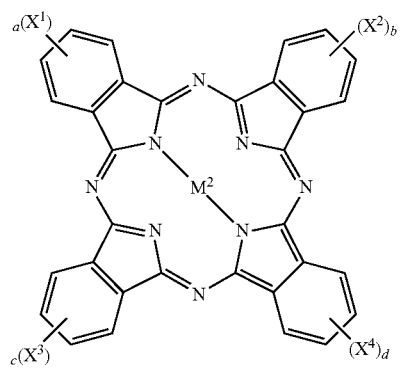

(2)

where, in the general formulae (1) and (2), $M^1$ represents at least one arbitrary atom or atomic group that is capable of binding to a phthalocyanine, $M^2$ represents an atom, or an atomic group containing an atom, selected from the second and subsequent periods of the periodic table and capable of binding to a phthalocyanine, $M^1$ and $M^2$ being different in kind from each other, $X^1$-$X^4$ represent, independently of each other, a halogen atom, and a, b, c, and d each signify the number of the halogen atoms and represent, independently of each other, an integer between 0 and 4 and satisfy $$a+b+c+d \geq 1.$$

According to another aspect of the present invention (claim 2), there is provided a phthalocyanine composite comprising both at least one phthalocyanine compound expressed by general formula (3) and at least one phthalocyanine compound expressed by general formula (4):

[Chemical Formula 3]

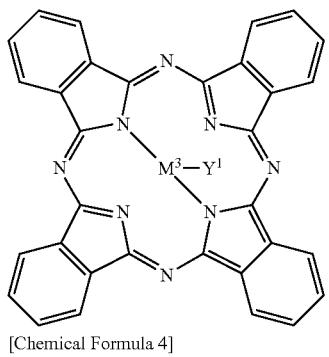

(3)

[Chemical Formula 4]

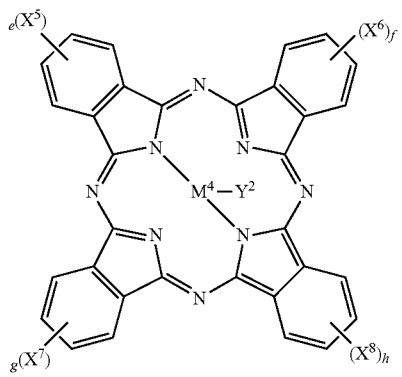

(4)

where, in the general formulae (3) and (4), $M^3$ and $M^4$ each represent an atom selected from the 13th group of the long-form periodic table, $M^3$ and $M^4$ being atoms of the same kind, $X^5$-$X^8$ represent, independently of each other, a halogen atom, $Y^1$ represents a monovalent bonding group capable of binding to $M^3$, $Y^2$ represents a monovalent bonding group capable of binding to $M^4$, at least either $Y^1$ or $Y^2$ being a halogen atom, and e, f, g, and h each signify the number of the halogen atoms represented by $X^5$-$X^8$ and represent, independently of each other, an integer between 0 and 4 and satisfy $$e+f+g+h \geq 1.$$

As a preferable feature (claims 3, 5), the phthalocyanine composites may have a eutectic-crystalline structure.

As another preferable feature (claims 4, 6), the phthalocyanine composites may be produced through a mechanical process for making amorphous state.

According to still another aspect of the present invention (claim 7), there is provided a photoconductive material comprising one of the phthalocyanine composite defined above.

According to still another aspect of the present invention (claim 8), there is provided an electrophotographic photoreceptor comprising an electroconductive substrate and a photosensitive layer formed on said substrate, wherein the photosensitive layer contains one of the phthalocyanine composite defined above.

According to still another aspect of the present invention (claim 9), there is provided an electrophotographic photoreceptor comprising an electroconductive substrate and a photosensitive layer formed on said substrate, wherein said photosensitive layer contains a at least one fluorinated gallium-phthalocyanine compound expressed by general formula (5):

[Chemical Formula 5]

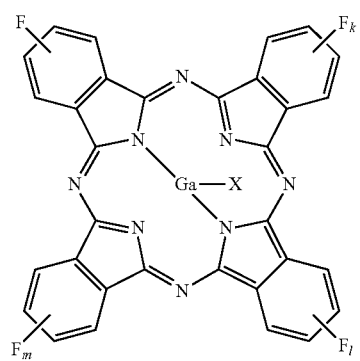

(5)

where, in the formula (5),

X represents a halogen atom, and k, l, and m each signify the number of substituent fluorine atoms and represent, independently of each other, an integer between 0 and 4.

According to still another aspect of the present invention (claims 10, 11), there is provided an electrophotographic photoreceptor cartridge comprising:

one of the electrophotographic photoreceptors defined above; and at least one of a charge unit for charging the electrophotographic photoreceptor, an exposure unit for exposing the charged electrophotographic photoreceptor to form an electrostatic latent image thereon, and a development unit for developing the electrostatic latent image formed on the electrophotographic photoreceptor.

According to still another aspect of the present invention (claims 12, 13), there is provided an image forming apparatus comprising:

one of the electrophotographic photoreceptors defined above;

a charge unit for charging the electrophotographic photoreceptor;

an exposure unit for exposing the charged electrophotographic photoreceptor to form an electrostatic latent image thereon; and a development unit for developing the electrostatic latent image formed on the electrophotographic photoreceptor.

ADVANTAGEOUS EFFECTS OF THE INVENTION

According to the present invention, it is possible to provide a phthalocyanine composite that exhibits high sensitivity and has small environmental dependence when used as a charge generation substance.

Using the phthalocyanine composite, it is also possible to provide a photoconductive material, an electrophotographic photoreceptor, an electrophotographic photoreceptor cartridge and an image forming apparatus that show high sensitivity and have small environmental dependence.

In addition, an electrophotographic photoreceptor according to the present invention has the advantages that its surface potential after exposure can hardly be influenced by changes in usage environment, that its electric properties are well-balanced, and that it shows only small fluctuations in its characteristics when the usage environment varies during repeated use. With these advantages, it is possible to provide an electrophotographic photoreceptor whose image characteristics are stable even with long-term use in various environments.

BEST MODES FOR CARRYING OUT THE INVENTION

Figure 1:
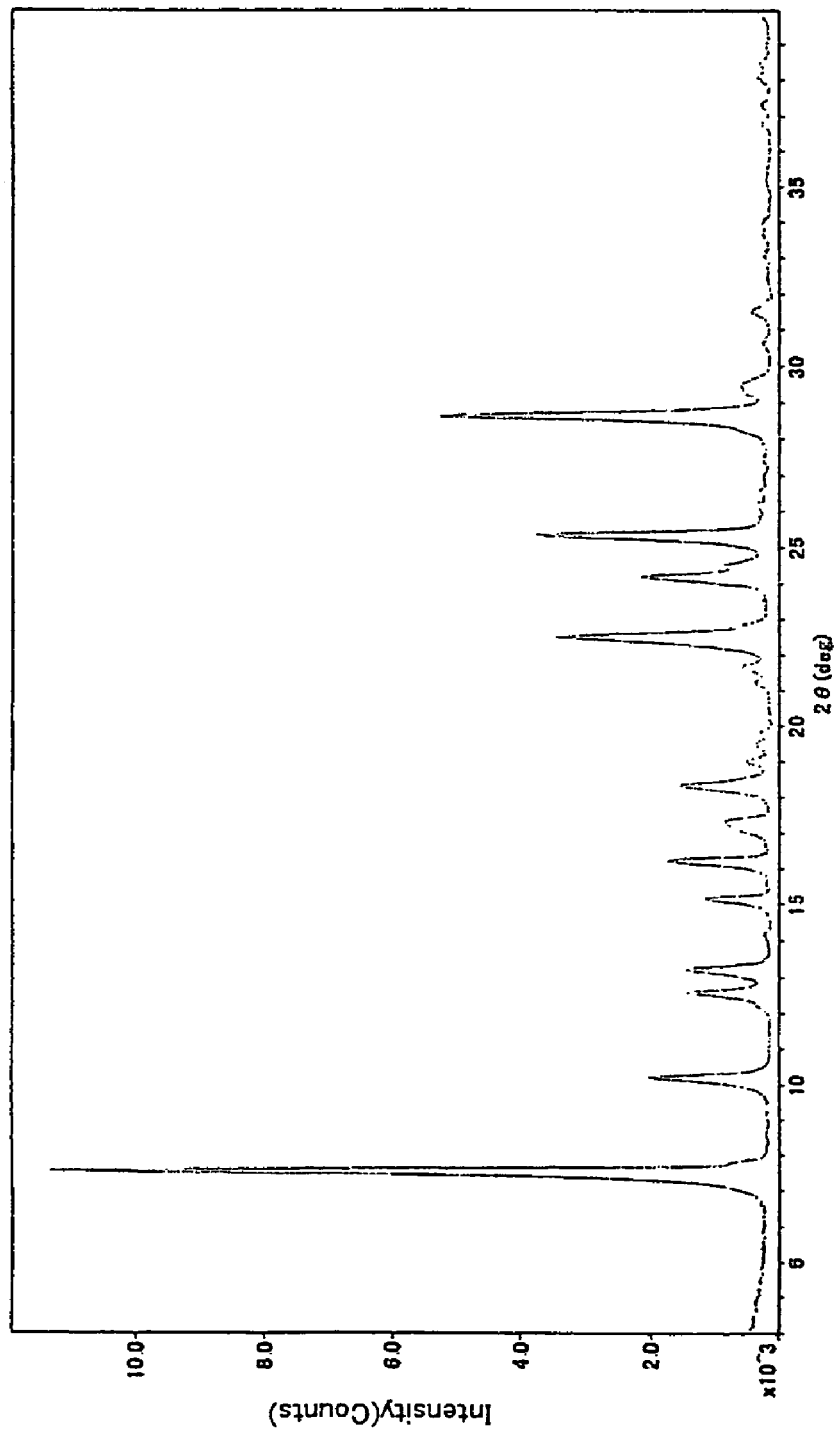
FIG. 1 is a powder X-ray diffraction pattern of the α-form oxytitanyl phthalocyanine crystal produced in Preparation Example 1.

The present invention will be explained in detail hereinafter, although the particulars mentioned in the following explanation are no more than examples; the present invention should by no means be limited to these particulars and can be implemented with any modifications.

[1. Phthalocyanine Composite]

[1-1. Structure of Phthalocyanine Compound]

The first phthalocyanine composite of the present invention (hereinafter also called "the first phthalocyanine composite") is characterized in that it contains both at least one phthalocyanine compound expressed by the following general formula (1) and at least one phthalocyanine compound expressed by the following general formula (2). In the following general formulae (1) and (2), $M^1$ and $M^2$ are different in their kinds.

[Chemical Formula 6]

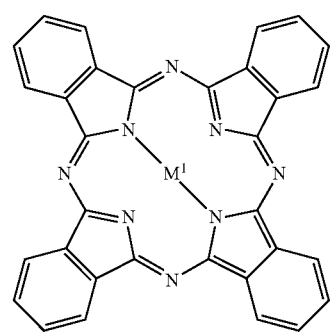

(1)

[Chemical Formula 7]

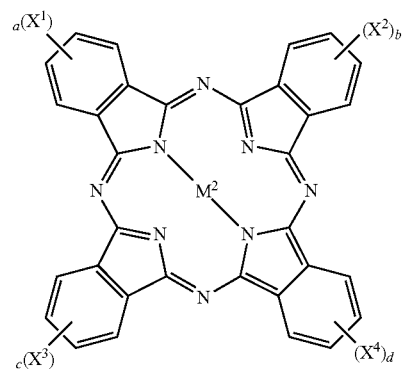

(2)

Hereinafter an explanation of the general formula (1) and the general formula (2) will be given in detail.

In the above general formula (1), $M^1$ represents at least one arbitrary atom (hereinafter also called "central atom") or atomic group (hereinafter also called "central atomic group") that is capable of binding to a phthalocyanine; $M^1$ may be either a central atom as a single element or a central atomic group in which a central atom binds to one or more other substances.

There may be either a single central atom or plural central atoms. An example of the compounds having plural central atoms is a metal-free phthalocyanine as shown below. In the metal-free phthalocyanine, the two hydrogens each binding to a nitrogen correspond to the central atoms.

[Chemical Formula 8]

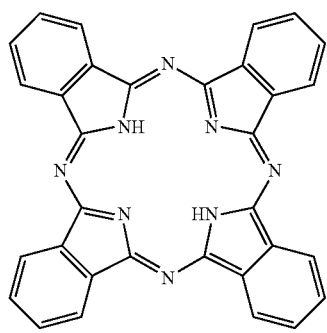

Metal-free Phthalocyanine

Also, the other substances that bind to the central atom to form the central atomic group as defined above can be arbitrarily selected; the central atomic group $M^1$ formed by the other substances may be, for example, an oxide, a hydroxide, a halide, or the like.

Considering the versatility of a compound used for introducing $M^1$ in production of phthalocyanine compounds, the central atom of $M^1$ would belong to any of the specific groups of the long-form periodic table: usually, group 1, group 2, group 4, group 5, group 8, and groups 10-14. Among others, group 1, group 4, group 5, group 13, and group 14 are preferred in consideration of the photoconductive characteristics of the resultant first phthalocyanine composite. Especially preferable are group 4, group 5, and group 13 on the grounds that when the molecular structure of the individual phthalocyanine compound is a so-called shuttlecock structure, the resultant first phthalocyanine composite would exhibit desired photoconductivity.

Except when being hydrogen atoms, $M^1$ is usually a main-group metal element, a metalloid element, or a transition metal element.

Except when being hydrogen atoms, the central atom of $M^1$ would belong to any of the specific periods of the periodic table: usually the second and subsequent periods, i.e., the second period, the third period, and so on; preferably the third and subsequent periods, i.e., the third period, the fourth period, the fifth period, and so on; and more preferably the fourth and subsequent periods. The reason is that the phthalocyanine compound of general formula (1), which is a non-substituted phthalocyanine, is desired to have excellent photoconductivity on the grounds that the photoconductive characteristics of the first phthalocyanine composite are largely affected by the photoconductive characteristics of the nonsubstituted phthalocyanine.

On the other hand, the specific periods of the periodic table, to which the central atom of $M^1$ belongs, are preferably the sixth or above periods, more preferably the fifth or above periods. The reason is that if $M^1$, which is a central atom or a central atomic group (hereinafter the central atom and the central atomic group are collectively called "central substance" unless distinction is required), occupies too large a volume, the molecule is likely to take the form of a so-called double-decker type or triple-decker type, in which the central substance is nipped into the phthalocyanine nucleus, and that phthalocyanine compounds with such a form tend to be inferior in photoconductivity. Incidentally, in the present description, the term "above" in relation to the periodic table means both a specific period and the periods above the specific period in the periodic table.

Examples of $M^1$ are the following: when $M^1$ is one or more atoms of the single element, examples of the central atom of $M^1$ are hydrogen, copper, zinc, magnesium, etc.

When $M^1$ is an atomic group in which the central atom binds to other substances, examples of the central atomic group $M^1$ include: halides such as chloroaluminium, chlorogallium, chloroindium, dichloro tin, dichloro silicon, and dichloro germanium; hydroxides such as hydroxy aluminum, hydroxy gallium, hydroxy indium, dihydroxy tin, dihydroxy silicon, and dihydroxy germanium; oxides such as oxytitanium and oxyvanadium; metal alkoxide such as methoxy gallium, ethoxy gallium, methoxy indium, (R,R)-dimethylethylene glycoxide titanium, (R,S)-dimethylethylene glycoxide titanium, (S,S)-dimethylethylene glycoxide titanium, and dimethoxytitanium; etc.

On the other hand, in the general formula (2), $M^2$ represents an arbitrary atom (central atom) or atomic group (central atomic group) that is capable of binding to a phthalocyanine; as is the case of $M^1$, $M^2$ may be either a central atom as a single element or a central atomic group (compound) in which a central atom binds to one or more other substances. This other substances can be arbitrarily selected; the central atomic group $M^2$ formed by the other substances may be, for example, an oxide, a hydroxide, a halide, or the like. However, as mentioned above, the central atom of $M^2$ must be an atom of a different kind from the central atom of $M^1$.

Considering the production efficiency (i.e., the yield in the production) of the phthalocyanine compound of general formula (2), which is a substituted phthalocyanine according to the present invention, the central atom of $M^2$ would belong to any of the specific groups of the long-form periodic table: namely, group 2, group 4, group 5, group 8, and groups 10-14. Among others, group 4, group 5, group 13, and group 14 are preferred in consideration of the photoconductive characteristics of the resultant first phthalocyanine composite. Especially preferable are group 4, group 5, and group 13 on the grounds that when the molecular structure of the individual phthalocyanine compound is a so-called shuttlecock structure, the resultant first phthalocyanine composite would exhibit desired photoconductivity.

The central atom of $M^2$ is usually a main-group metal element, a metalloid element, or a transition metal element.

The central atom of $M^2$ would belong to any of the specific periods of the periodic table: usually the second and subsequent periods, i.e., the second period, the third period, the fourth period, the fifth period, and so on; preferably the third and subsequent periods; and more preferably the fourth and subsequent periods. The reason is the following: the production of a substituted phthalocyanine according to the present invention, such as the compound of general formula (2) is desired to give a high yield of product because it usually requires expensive compounds as its raw materials. In order to increase the product yield of the phthalocyanine compound of general formula (2), it is preferred to use an element that produces a significant template effect in the formation of a phthalocyanine nucleus.

On the other hand, the specific periods of the periodic table to which the central atom of $M^2$ belongs are preferably the sixth or above periods, more preferably the fifth or above periods. The reason is the same as that for the case of $M^1$: if $M^2$, which is a central substance, occupies too large a volume, the molecule is likely to take the form of a so-called double-decker type or triple-decker type, in which the central substance is nipped into the phthalocyanine nucleus, and that phthalocyanine compounds with such a form tend to be inferior in photoconductivity.

The above-mentioned examples of $M^1$ other than a hydrogen atom can be similarly mentioned also as examples of $M^2$.

In the general formula (2), $X^1$-$X^4$ represents, independently of each other, a halogen atom, namely, a fluorine atom, a chlorine atom, a bromine atom, or an iodine atom. Among them, on the grounds that substitutional halogen groups, $X^1$-$X^4$, are desirable to be of small sizes in respect of the crystallinity of the phthalocyanine compound of general formula (2), it is preferable that each of $X^1$-$X^4$ is a fluorine atom or a chlorine atom. Especially preferable is a fluorine atom in consideration of the photoconductive characteristics of the first phthalocyanine composite.

In the general formula (2), a, b, c, and d each signify the number of halogen atoms $X^1$-$X^4$ and represent an integer that is from 0 to 4 inclusive and meets $a+b+c+d \geq 1$.

On the grounds that if the value of $a+b+c+d$ is too small, a phthalocyanine composite with required photoconductivity cannot be obtained, the value of $a+b+c+d$ is preferably 2 or greater, more preferably 3 or greater. In contrast, if the value of $a+b+c+d$ is too great, the charging property of the resultant phthalocyanine composite becomes deteriorated, so that the value is preferably 7 or smaller, more preferably 6 or smaller.

In consideration of the versatility of its raw materials, each of a, b, c, and d is preferably 2 or smaller, more preferably 1 or smaller.

In respect of the easiness of production, it is preferable that a=b=c=d. Considering the crystallinity of the phthalocyanine compound of general formula (2), it is especially preferable that a=b=c=d=1.

On the other hand, the second phthalocyanine composite of the present invention (hereinafter called "the second phthalocyanine composite") is characterized in that it contains both at least one phthalocyanine compound expressed by the following general formula (3) and at least one phthalocyanine compound expressed by the following general formula (4). In the general formulae (3) and (4), $M^3$ and $M^4$ represent atoms of the same kind, and at least either $Y^1$ or $Y^2$ represents a halogen atom.

[Chemical Formula 9]

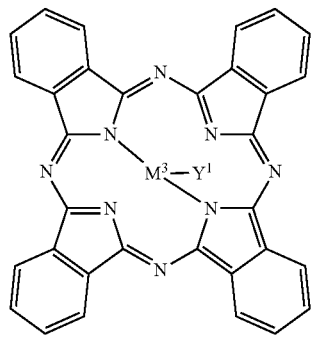

(3)

[Chemical Formula 10]

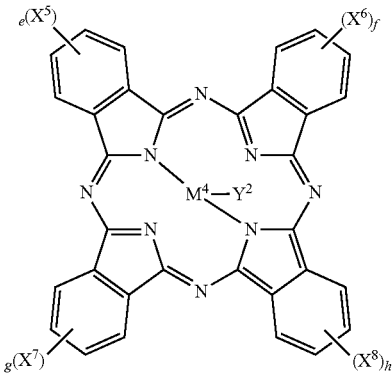

(4)

Hereinafter an explanation of the general formula (3) and the general formula (4) will be given in detail.

In the general formula (3), $M^3$ represents an atom of group 13 of the periodic table. The phthalocyanine compound of general formula (3), which is a nonsubstituted phthalocyanine, is desired to have excellent photoconductivity on the grounds that, as mentioned in the explanation of general formula (1), the photoconductive characteristics of the second phthalocyanine composite are largely affected by the photoconductive characteristics of the nonsubstituted phthalocyanine. It is therefore preferable that $M^3$ is selected form Al, Ga, and In.

Especially preferable is Ga and In in consideration of the crystal stability of the phthalocyanine compound of general formula (3).

$Y^1$ represents a monovalent bonding group that is capable of binding to $M^3$. The examples include halogen atoms, hydroxyl group, alkoxy groups, aryloxy groups, and alkyl thio groups. Among others, halogen atoms, hydroxyl group, and alkoxy groups are preferable in respect of the ease of production. More preferable are halogen atoms and hydroxyl group, and far more preferable are halogen atoms, in consideration of the photoconductivity of the phthalocyanine composite.

In the general formula (4), $M^4$ represents an atom of group 13 of the periodic table. It is particularly preferred that, as will be described later, the phthalocyanine composite of the present invention exhibits eutectic-crystallinity.

$Y^2$ represents a monovalent bonding group that is capable of binding to $M^4$. The examples include, as in the case of $Y^1$, halogen atoms, hydroxyl group, alkoxy groups, aryloxy groups, and alkyl thio groups. Among others, in respect of the ease of production, halogen atoms, hydroxyl group, and alkoxy groups are preferable. More preferable are halogen atoms and hydroxyl group, and far more preferable are halogen atoms, in consideration of the photoconductivity of the phthalocyanine composite.

In the general formula (4), $X^5$-$X^8$ represent, independently of each other, a halogen atom, namely, a fluorine atom, a chlorine atom, a bromine atom, or an iodine atom. Among them, on the grounds that substitutional halogen groups, $X^5$-$X^8$, are desirable to be of small sizes in respect of the crystallinity of the phthalocyanine compound of general formula (4), it is preferable that each of $X^5$-$X^8$ is a fluorine atom or a chlorine atom. Especially preferable is a fluorine atom in consideration of the photoconductive characteristics of the second phthalocyanine composite.

In the general formula (4), e, f, g, and h each signify the number of halogen atoms $X^5$-$X^8$ and represent an integer that is from 0 to 4 inclusive and meets e+f+g+h≧1.

On the grounds that if the value of e+f+g+h is too small, a phthalocyanine composite with required photoconductivity cannot be obtained, the value of e+f+g+h is preferably 2 or greater, more preferably 3 or greater. In contrast, if the value of e+f+g+h is too great, the charging property of the resultant phthalocyanine composite becomes deteriorated, so that the value is preferably 7 or smaller, more preferably 6 or smaller.

In consideration of the versatility of its raw materials, each of e, f, g, and h is preferably 2 or smaller, more preferably 1 or smaller.

In respect of the easiness of production, it is preferable that e=f=g=h. Considering the crystallinity of the phthalocyanine compound of general formula (4), it is especially preferable that e=f=g=h=1.

In the phthalocyanine compound of general formula (2) and the phthalocyanine compound of general formula (4), the individual six-membered ring of the phthalocyanine nucleus has four positions to which each of the halogen atoms $X^1$-$X^8$ may bind, as represented by (a)-(d) in the following formula (6) (where formula (6) expresses a partial structure corresponding to a six-membered ring part of general formula (2) or the general formula (4)). Each halogen atom is not particularly limited in its binding position but may bind at any position selected from (a)-(d), provided that any two halogen atoms $X^1$-$X^8$ do not bind at the same position.

[Chemical Formula 11]

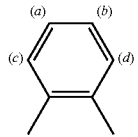

(6)

In cases such as when a=b=c=d=1 in the general formula (2) or when e=f=g=h=1 in the general formula (4), by selecting the kinds of raw materials used in the production method described below, it is possible to produce the phthalocyanine compound of general formula (2) or the phthalocyanine compound of general formula (4) so that the produced compound selectively has a desired one of two structures: the structure in which a halogen atom binds to either position (a) or position (b) of a six-membered ring; and the structure in which a halogen atom binds to either position (c) or position (d) of a six-membered ring.

Take, as an example, the synthesis of the phthalocyanine compound of general formula (2). Among the isomers of substituted phthalonitrile having halogen atoms $X^1$-$X^4$ being raw material, if a substituted phthalonitrile of the following formula (7) is used alone, the resultant phthalocyanine compound has a structure in which every halogen atom $X^1$-$X^4$ binds to either position (a) or position (b), while if a substituted phthalonitrile of the following formula (8) is used alone, the resultant phthalocyanine compound has a structure in which every halogen atom $X^1$-$X^4$ binds to either position (c) or position (d). As another example, take the synthesis of the phthalocyanine compound of general formula (4). Among the isomers of substituted phthalonitrile having halogen atoms $X^5$-$X^8$ being raw material, if a substituted phthalonitrile of the following formula (7) is used alone, the resultant phthalocyanine compound has a structure in which every halogen atom $X^5$-$X^8$ binds to either position (a) or position (b), while if a substituted phthalonitrile of the following formula (8) is used alone, the resultant phthalocyanine compound has a structure in which every halogen atom $X^5$-$X^8$ binds to either position (c) or position (d). In the formula (7) and the formula (8), every halogen atom $X^1$-$X^8$ is represented by symbol $X^x$.

[Chemical Formula 12]

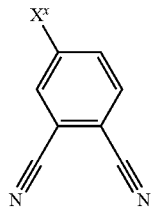

(7)

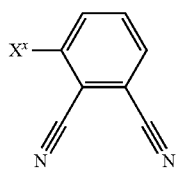

(8)

Naturally, by using two or more of these substituted phthalonitrile isomers in combination as raw material, it is possible to obtain the phthalocyanine compound of general formula (2) or the phthalocyanine compound of general formula (4) that contains different binding positions (a), (b), (c), (d). In consideration of production costs, however, it is preferred to use the substituted phthalonitrile of the formula (7) alone as raw material. On this ground, as the structure of the phthalocyanine compound of general formula (2) where a=b=c=d=1 or the phthalocyanine compound of general formula (4) where e=f=g=h=1, preferred is a structure in which every halogen atom binds to either position (a) or position (b).

In addition, when the total number of halogen atoms $X^1$-$X^4$ is equal to or more than 2 or when the total number of halogen atoms $X^5$-$X^8$ is equal to or more than 2, the phthalocyanine compound of general formula (2) or the phthalocyanine compound of general formula (4) has structural isomers. As an example, the phthalocyanine compound of general formula (2) where a=b=c=d=1 and every halogen atom $X^1$-$X^4$ binds to either position (a) or position (b) has six different structural isomers with varying combinations of the binding positions of halogen atoms $X^1$-$X^4$. As another example, the phthalocyanine compound of general formula (4) where e=f=g=h=1 and every halogen atom $X^5$-$X^8$ binds to either position (a) or position (b) has six different structural isomers with varying combinations of the binding positions of halogen atoms $X^5$-$X^8$. For the sake of convenience, these structural isomers are represented by references (I)-(VI) hereinafter.

Combinations of the binding positions of halogen atoms $X^1$-$X^4$, $X^5$-$X^8$ in structural isomers (I)-(VI) are shown in the following Table 1. Although plural combinations are possible for each of structural isomers (III)-(VI), one of the combinations is shown in Table 1 as an example.

Each of ring A, ring B, ring C, and ring D shown in Table 1 represents, among the six-membered rings of the phthalocyanine compound of general formula (2) or the phthalocyanine compound of general formula (4), a ring at a position expressed by the following formula (9a) or (9b).

TABLE 1

[Chemical Formula 13]

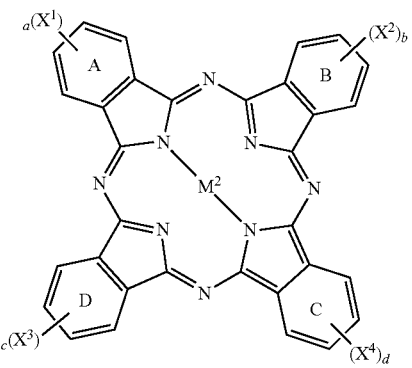

(9a)

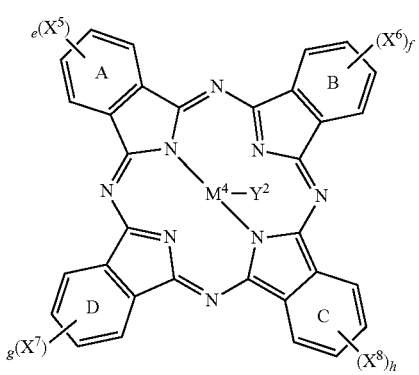

(9b)

| Type of Isomer | Combinations of the Binding positions to Six-Membered Rings (Examples) | | | |
|---|---|---|---|---|
| | ring A | ring B | ring C | ring D |
| (I) | (a) | (a) | (a) | (a) |
| (II) | (b) | (b) | (b) | (b) |
| (III) | (a) | (a) | (a) | (b) |
| (IV) | (b) | (b) | (b) | (a) |
| (V) | (a) | (b) | (a) | (b) |
| (VI) | (a) | (a) | (b) | (b) |

Each of the phthalocyanine compound of general formula (2) and the phthalocyanine compound of general formula (4) is not limited to one of the above structural isomers (I)-(VI) but may be either a pure substance of any one isomer or a mixture of two or more isomers. It is normally obtained, however, as a mixture of all the six structural isomers (I)-(VI). In this case, the composition ratios of the individual structural isomers (I)-(VI) are also not particularly limited.

Also, the phthalocyanine compound of general formula (2) and the phthalocyanine compound of general formula (4) may be obtained as a composite of plural kinds of phthalocyanine compounds which each have a different number of substituent groups (halogen atoms) from each other.

Each of the phthalocyanine compounds of general formula (2) and general formula (4) may be either crystalline or amorphous (non-crystalline), although it is preferable in respect of their uses as photoconductive materials that the phthalocyanine compounds of general formula (2) and general formula (4) each have one of the following particular properties of crystal forms and amorphous form.

Specifically, in terms of Bragg angle ($2\theta\pm0.2°$) according to X-ray diffraction spectrum, the preferred modes of the above compounds are:

i) those having strong peaks at least at 7.0°, 16.6°, 25.4°, and 27.0°;
ii) those having strong peaks at least at 6.9°, 13.0°, 16.2°, 25.7°, and 28.0°;
iii) those having peaks at 7.0°, 16.5°, and 27.2°;
iv) those having peaks at 6.9°, 16.0°, and 26.4°; and
v) those not having any distinct peaks within the range of from 3° to 40° (hereinafter also called "amorphous material").

[1-2. Composition of Phthalocyanine Composite]

In the first and second phthalocyanine composites of the present invention (hereinafter, the first phthalocyanine composite and the second phthalocyanine composite are collectively called simply "the phthalocyanine composite of the present invention" unless distinction is required.), the composition ratio of the individual phthalocyanine compounds is not limited; the specific composition ratio can be arbitrarily selected.

However, when the whole weight of the phthalocyanine composite of the present invention is 100 weight parts, the composition ratio of the substituted phthalocyanine according to the present invention contained in the composite {namely, the phthalocyanine compound of general formula (2) for the first phthalocyanine composite, the phthalocyanine compound of general formula (4) for the second phthalocyanine composite} is usually 0.1 weight part or more. If the substituted phthalocyanine according to the present invention is in an excessively low composition ratio, desired sensitivity cannot be obtained when the composite is used as a charge generation substance, so that the composition ratio of the substituted phthalocyanine according to the present invention is preferably 1 weight part or higher. On the other hand, in consideration of the balance properties, such as environmental dependency, of the resultant electrophotographic photoreceptor, the composition ratio of the substituted phthalocyanine according to the present invention is preferably 5 weight parts or higher, more preferably 10 weight parts or higher.

Also, production of the substituted phthalocyanine according to the present invention requires raw materials that are generally expensive, such as substituted or nonsubstituted phthalonitrile, 1,3-diiminoisoindoline, phthalic acid, etc., so that in respect of production cost, the composition ratio of the substituted phthalocyanine according to the present invention is usually 80 weight parts or lower. On the other hand, considering the photoconductive characteristics of the phthalocyanine composite of the present invention, the ratio is preferably 50 weight parts or lower and, in respect of the handleability during manufacturing, more preferably 40 weight parts or lower.

Incidentally, a substituted phthalocyanine according to the present invention that has at least one halogen atom $X^1$-$X^8$ may be called a halogen-substituted phthalocyanine.

[1-3. Physical State of Phthalocyanine Composite]

The physical state of the phthalocyanine composite of the present invention is not limited as long as it contains both the nonsubstituted phthalocyanine according to the present invention {namely, the phthalocyanine compound of general formula (1) in the first phthalocyanine composite, the phthalocyanine composite of general formula (3) in the second phthalocyanine composite} and the substituted phthalocyanine according to the present invention, and may be an arbitrary physical state. Examples of the physical state are: a mixture state of particles of different kinds; an amorphous state in which the composite is mixed at the molecular level and the arrangement of molecules does not have any regularity; a eutectic-crystalline state in which the composite is mixed at the molecular level and the arrangement of molecules has regularity; etc. However, it is generally preferable that the composite is in an amorphous state or a eutectic-crystalline state. Especially preferable is a eutectic-crystalline state on the grounds that an amorphous state in general may be partially lacking in stability. The phthalocyanine composite of the present invention may have either a single physical state alone or plural physical states in arbitrary combination and ratio.

Also, a powder X-ray spectrum pattern exhibited by the phthalocyanine composite of the present invention is not limited but may be any spectrum pattern.

For example, when the phthalocyanine composite of the present invention is in the form of a mixture of different powders, it exhibits a powder X-ray spectrum pattern generally obtained by superposing the individual spectrum patterns of the phthalocyanine compound particles before being mixed, namely, the spectrum patterns of the phthalocyanine compound of general formula (1) and the phthalocyanine compound of general formula (2), or the spectrum patterns of the phthalocyanine compound of general formula (3) and the phthalocyanine compound of general formula (4).

When the phthalocyanine composite of the present invention is in an amorphous state, its powder X-ray spectrum pattern does not have any distinctive peak.

When the phthalocyanine composite of the present invention is in a eutectic-crystalline state, it mainly exhibits the crystalline structure of any one of the phthalocyanine crystals contained in the phthalocyanine composite of the present invention, although it occasionally takes a novel crystal form that does not belong to any one of the crystal forms of the contained phthalocyanine crystals.

Also, when the phthalocyanine composite of the present invention involves two or more kinds of physical states, its powder X-ray spectrum pattern is identical to a superposition of the spectrum patterns exhibited by the individual physical states.

Meanwhile, the powder X-ray spectrum pattern exhibited by the phthalocyanine composite of the present invention in a eutectic-crystalline state can be a spectrum pattern of any known crystal form. However, the phthalocyanine composite of the present invention having a eutectic-crystalline state tends to exhibit excellent photoconductivity when having a crystal form similar to those of the nonsubstituted phthalocyanines superior in photoconductivity among the known nonsubstituted phthalocyanines, or when having a crystal form similar to those of the phthalocyanine composites superior in photoconductivity among the phthalocyanine composites composed of known nonsubstituted phthalocyanines. Consequently, the phthalocyanine composite of the present invention having a eutectic-crystalline state is preferred to have a crystal form similar to those of the above-mentioned materials superior in photoconductivity. Examples of known documents that disclose the preferable crystal forms are mentioned below, although the crystal form of the phthalocyanine composite of the present invention is not limited to the following crystal forms unless it runs counter to the gist of the present invention.

Regarding A-, B-, C-, and D-form TiOPc (where Pc represents phthalocyanine), the following documents are mentioned.

Japanese Patent Laid-Open Publication No. Sho 62-67094;
Japanese Patent Laid-Open Publication No. Sho 61-217050;
Japanese Patent Laid-Open Publication No. Sho 61-239248;
Japanese Patent Laid-Open Publication No. Hei 1-207755;
Japanese Patent Laid-Open Publication No. Hei 4-323270;
Japanese Patent Laid-Open Publication No. Hei 6-287189;
Japanese Patent Laid-Open Publication No. Hei 2-008256;
Japanese Patent Laid-Open Publication No. Hei 2-289658;
Japanese Patent Laid-Open Publication No. Hei 7-271073; and
Japanese Patent Laid-Open Publication No. Hei 3-128973.

Regarding other type I and type II GaClPc, the following documents are mentioned.

Japanese Patent Laid-Open Publication No. Hei 1-221459;
Japanese Patent Laid-Open Publication No. Hei 5-98181; and
Japanese Patent Laid-Open Publication No. Hei 11-172142.

Regarding type V GaOHPc, the following documents are mentioned.

Japanese Patent Laid-Open Publication No. Hei 5-263007;
Japanese Patent Laid-Open Publication No. Hei 6-279698;
Japanese Patent Laid-Open Publication No. Hei 10-67946; and
Japanese Patent Laid-Open Publication No. 2002-235014.

Regarding PcGaOGaPc, the following documents are mentioned.

Japanese Patent Laid-Open Publication No. Hei 10-88023; and
Japanese Patent Laid-Open Publication No. 2000-219817.

Regarding X-form and τ-form metal-free phthalocyanines, the following documents are mentioned.

Journal of Imaging Science, Vol. 35, No. 4, pp. 235-239 (1991);
Electrophotography: the society journal, Vol. 24, No. 2, 1985, pp. 102-107;
Journal of Imaging Technology 11:7-11 (1985); and
the description of U.S. Pat. No. 3,357,989.

Regarding composites of phthalocyanine compounds, the following documents are mentioned.

Japanese Patent Laid-Open Publication No. Hei 4-351673;
Japanese Patent Laid-Open Publication No. Hei 4-372663;
Japanese Patent Laid-Open Publication No. Hei 5-45914;
Japanese Patent Laid-Open Publication No. Hei 5-186702;
Japanese Patent Laid-Open Publication No. Hei 6-234937;
Japanese Patent Laid-Open Publication No. Hei 8-41373;
Japanese Patent Laid-Open Publication No. Hei 6-175382;
Japanese Patent Laid-Open Publication No. Hei 6-145550;
Japanese Patent Laid-Open Publication No. Hei 3-9962;
Japanese Patent Laid-Open Publication No. 2000-313819;
Japanese Patent Laid-Open Publication No. 2000-336283; and
Japanese Patent Laid-Open Publication No. 2002-244321.

The phthalocyanine composite of the present invention, although not limited thereto, usually takes the form of particles. The diameter of the particles is not particularly limited but, from the viewpoint of making full use of the properties as photoconductive material, is desirable to take a value within the range of usually 10 nm or larger, preferably 50 nm or larger, and usually 1.0 μm or smaller, preferably 500 nm or smaller, more preferably 300 nm or smaller.

[1-4. Production Method of the Phthalocyanine Compound]

Next, the production method of the phthalocyanine compounds of the general formulae (1)-(4) will be explained below. The production method of the phthalocyanine compounds of the general formulae (1)-(4) is not particularly limited, and any production method can be adopted as long as it can produce the phthalocyanine compounds of the general formulae (1)-(4). As examples, there can be mentioned: the phthalonitrile method, in which a substituted or nonsubstituted phthalonitrile and a metallic salt such as a metal halide are heat-fused or heated in the presence of an organic solvent; a method in which an indoline compound such as a substituted or nonsubstituted 1,3-diiminoisoindoline and a metallic salt such as a metal halide are heat-fused or heated in the presence of an organic solvent; Weiler method, in which a substituted or nonsubstituted phthalic anhydride urea and a metallic salt such as a metal halide are heat-fused or heated in the presence of an organic solvent; a method in which a substituted or nonsubstituted cyanobenzamide is caused to react with a metallic salt; a method in which a substituted or nonsubstituted dilithium phthalocyanine is caused to react with a metallic salt; etc.

It is preferable that the synthesis of the phthalocyanine compounds of the general formulae (1)-(4) is carried out in the presence of an organic solvent. If the synthesis is carried out under a nonsolvent condition in the production of, for example, a fluorinated chlorogallium phthalocyanine (i.e., a compound of general formula (4) where $M^4$ is a gallium, $Y^2$ is a chlorine atom, and each of $X^5$-$X^8$ is a fluorine atom), there is a possibility that a phthalocyanine nucleus is also chlorinated and that a phthalocyanine compound of the desired structure hence cannot be obtained. Besides, if any organic solvent is not used, substances such as impurities existing in the reaction, unreacted raw materials, and by-products originating from the reaction may be contained in the phthalocyanine solid and cause adverse effects on the photoconductive characteristics of the resultant phthalocyanine compound.

As an organic solvent used for synthesis, it is preferable to use a solvent that is inert to the reaction and has a high boiling point. The following can be mentioned as examples: halogenated aromatic solvents such as α-chloronaphthalene, β-chloronaphthalene, o-dichlorobenzene, and dichlorotoluene; alkylated aromatic solvents such as α-methylnaphthalene, β-methylnaphthalene, and (tetraphosphorated)tetrahydronaphthalene; diarylated aliphatic solvent such as diphenylmethane and diphenylethane; alkoxylated aromatic solvents such as methoxy naphthalene; polyhydric alcohol solvents such as ethyleneglycol; ether solvents such as diphenyl ether, diethyleneglycol dimethylether, and butyl Cellosolve®; heterocyclic aromatic solvents such as quinoline; aprotic polar solvents such as sulfolane, dimethylsulfoxide, N-methyl formamide, and 1,3-dimethyl-2-imidazolinone; etc. Among these, preferred are halogenated aromatic solvents, alkylated aromatic solvents, and aprotic polar solvents. These solvents can be used either one singly or in combination as a mixed solvent of two or more solvents.

According to the phthalonitrile method, the phthalocyanine compound of general formula (1)-(4) can be produced by agitating, or heating with agitation, a substituted or nonsubstituted phthalonitrile and a metallic salt in the organic solvent at 25-300° C. The reaction may also be carried out, if necessary, in the presence of a catalyst such as a quaternary ammonium salt, urea, and 1,8-diazabicyclo-[5.4.0]-7-undecene (DBU).

In synthesizing the phthalocyanine compound of general formula (2) or the phthalocyanine compound of general formula (4), if a single kind of substituted phthalonitrile is used for synthesis reaction, it is possible to obtain a phthalocyanine compound in which the four phenyl rings (i.e., the rings A-D) of the phthalocyanine skeleton have a uniform number of substituent groups (halogen atoms). On the other hand, if phthalonitriles each having a different number of substituent groups (including a nonsubstituted phthalonitrile) are used for synthesis reaction, it is possible to obtain a mixture of phthalocyanine compounds in each of which the four phenyl rings of the phthalocyanine skeleton have a different number of substituent groups. Both the compound and the mixture are acceptable in the present invention.

As equivalents for substituted phthalonitriles, it is also possible to use substituted diiminoisoindolines, substituted phthalic acids, substituted phthalic anhydrides, substituted cyanobenzamides, etc.

[1-5. Production Method of Phthalocyanine Composite of Present Invention]

Next, the production method of the phthalocyanine composite of the present invention will be explained. The production method of the phthalocyanine composite of the present invention is not particularly limited, and any production method can be adopted as long as it can produce the phthalocyanine composite of the present invention. However, a normal production process is to mix the nonsubstituted phthalocyanine according to the present invention {the phthalocyanine compound of general formula (1), (3)} and the substituted phthalocyanine according to the present invention {the phthalocyanine compound of general formula (2), (4)}.

Further, in order to produce the phthalocyanine composite of the present invention that has a eutectic-crystalline state in particular, after mixing the nonsubstituted phthalocyanine according to the present invention and the substituted phthalocyanine according to the present invention, it is desirable to carry out an amorphous-state making process, in which molecular arrangements in the crystals of the nonsubstituted phthalocyanine and the substituted phthalocyanine according to the present invention are irregularized and made into an amorphous state, and a eutectic-crystallizing process, in which the phthalocyanine composite made into an amorphous state through the amorphous-state making process is then led into a eutectic-crystalline state, which has regularity in molecular level, by solvent treatment or the like. It is also possible to carry out the amorphous-state making process and the eutectic-crystallizing process at a time.

The amorphous-state making process is a process in which the nonsubstituted phthalocyanine according to the present invention and the substituted phthalocyanine according to the present invention are made into an amorphous state.

Operations for implementing the amorphous-state making process are not particularly limited; any method can be adopted as long as it can make the nonsubstituted phthalocyanine according to the present invention and the substituted phthalocyanine according to the present invention into an amorphous state as described above. As examples, there can be mentioned various known treatment methods including: treatment methods of chemically making amorphous state (hereinafter called "chemical treatment methods") such as acid-paste method and acid-slurry method; and treatment methods of mechanically making amorphous state with mechanical or physical force (hereinafter called "mechanical treatment methods") such as triturating method. These methods may be carried out one at a time, or may be carried out two or more in combination.

When a chemical treatment method such as acid-paste method or acid-slurry method is used, the phthalocyanine compounds being raw materials are exposed to the possibilities that chemical reactions may occur, that the molecules are destroyed due to the cleavage of the phthalocyanine nuclei, and that the impurities originating from the used acid may reside. Such a method may therefore bring about adverse effects on the photoconductive characteristics the resultant phthalocyanine composite of the present invention. Besides, since it required a large amount of acid, a chemical treatment method involves heavy environmental loads in the process of disposing waste acid and others. On this account, it is preferred to adopt a mechanical treatment method for the amorphous-state making process. Namely, in producing the phthalocyanine composite of the present invention, it is preferred to undergo a mechanically amorphous-state making process, in which the nonsubstituted phthalocyanine according to the present invention and the substituted phthalocyanine according to the present invention are made into an amorphous state through a mechanical treatment.

In these processes, the nonsubstituted phthalocyanine and the substituted phthalocyanine according to the present invention may be separately subjected to the amorphous-state making process independently of each other or alternatively, the nonsubstituted phthalocyanine and the substituted phthalocyanine according to the present invention may be first mixed so that the resultant mixture is then subjected to the amorphous-state making process. In order to obtain a more homogenized eutectic-crystalline composite, it is preferable that the nonsubstituted phthalocyanine and the substituted phthalocyanine according to the present invention are first mixed and the resultant mixture is then subjected to the amorphous-state making treatment.

There is no restraint on the apparatus to be used for implementing the mechanical treatment method; it is possible to use any known apparatus, examples of which include automatic mortar, planetary mill, vibration ball mill, CF mill, roller mill, sand mill, kneader, ball mill, attritor, roll mill, homo mixer, etc.

When trituration treatment is carried out as the mechanical treatment, the trituration medium to be used may be any known trituration medium, such as glass beads, steel beads, alumina beads, zirconia beads, silicon carbide beads, silicon nitride beads, boron nitride beads, etc. Also, in carrying out the trituration treatment, it is also possible to use, in addition to the trituration medium, a trituration assistant such as a common salts or mirabilite as long as it can be easily removed after trituration.

The mechanical treatment may be carried out by either dry process or wet process.

When the mechanical treatment is carried out by dry process, treatment temperature is usually 0° C. or higher, preferably 10° C. or higher, and usually 150° C. or lower, preferably 100° C. or lower.

When the mechanical treatment is carried out by wet process, any known solvents can be used. Examples of the known solvents include: saturated chain and ring aliphatic solvents such as pentane, hexane, octane, nonane, methylcyclohexane, and ethyl cyclohexane; aromatic solvents such as toluene, xylene, naphthalene, tetrahydronaphthalene, methylnaphthalene, diphenylmethane, and anisole; halogenated aromatic solvents such as chlorobenzene, dichlorobenzene, and chloronaphthalene; alcohol solvents such as methanol, ethanol, isopropanol, n-butanol, and benzil alcohol; aliphatic polyhydric alcohols such as ethyleneglycol, glycerin, and polyethyleneglycol; chain and ring ketone solvents such as acetone, cyclohexanone, and methyl ethyl ketone; ester solvents such as methyl formate, ethyl acetate, and n-butyl acetate; halogenated hydrocarbon solvents such as methylene chloride, chloroform, and 1,2-dichloroethane; chain and ring ether solvents such as diethylether, dimethoxyethane, tetrahydrofuran, 1,4-dioxane, 1,3-dioxaline, methyl Cellosolve®, ethyl Cellosolve®, and butyl Cellosolve®; aprotic polar solvents such as dimethyl formamide, N-methyl-2-pyrrolidone, dimethylsulfoxide, sulfolane, 1,3-dimethyl-2-imidazolinone, 2-butyrolactone, and hexamethylphosphorous triamide; nitrogen-containing compounds such as n-butylamine, isopropanolamine, diethylamine, triethanolamine, ethylenediamine, triethylenediamine, and triethylamine; mineral oils such as ligroin; and water. Among others, in consideration of handleability during the wet mechanical treatment, it is preferred to use chain and ring saturated aliphatic solvents, aromatic solvents, alcohol solvents, chain and ring ketone solvents, ester solvents, chain and ring ether solvents, aprotic polar solvents, and water. These solvents may be used singly or, alternatively, may be used two or more at a time in arbitrary combination and ratio.

The amount of the solvent to be used with respect to 1 weight part of phthalocyanine composite during the wet mechanical treatment is, as the lower limit, usually 0.01 weight part or larger, preferably 0.1 weight part or larger from in view of productivity. The upper limit is usually 200 weight parts or smaller, preferably 100 weight parts or smaller from the viewpoint of productivity.

With regard to the treatment temperature during the wet mechanical treatment, the lower limit is usually equal to or higher than the freezing point of the solvent, preferably 10° C. or higher from the viewpoint of safety. The upper limit is usually equal to or lower than the boiling point of the solvent, preferably 200° C. or lower, more preferably 150° C. or lower in view of safety.

After the amorphous-state making process, the nonsubstituted phthalocyanine according to the present invention and the substituted phthalocyanine according to the present invention made in an amorphous state are then subjected to the eutectic-crystallizing process. The eutectic-crystallizing process is a process in which the nonsubstituted phthalocyanine according to the present invention and the substituted phthalocyanine according to the present invention made in an amorphous state through the amorphous-state making process are then led into a eutectic-crystalline state having regularity in molecular level.

Operations for implementing the eutectic-crystallizing process are not particularly limited; any method can be adopted as long as it can make the nonsubstituted phthalocyanine according to the present invention and the substituted phthalocyanine according to the present invention into a eutectic-crystalline state having regularity in molecular level. It is normally carried out by subjecting the amorphous solid after the mechanical making amorphous state treatment to solvent treatment and transforming it into a desired crystal form. When trituration treatment is carried out as the mechanical making amorphous state treatment, the amorphous solid may be first separated from the trituration medium and then subjected to the solvent treatment or alternatively, may be subject to the solvent treatment together with the trituration medium. Specifically, the solvent treatment may be implemented either by a method in which the amorphous solid is dispersed in a solvent with agitation or by a method in which the amorphous solid is exposed to the vapor of the solvent. Further, it is also possible to carry out the amorphous-state making process and the eutectic-crystallizing process at a time.

As examples of the solvent used for the solvent treatment, there can be mentioned: saturated chain and ring aliphatic solvents such as pentane, hexane, octane, nonane, methylcyclohexane, and ethyl cyclohexane; aromatic solvents such as toluene, xylene, naphthalene, tetrahydronaphthalene, methylnaphthalene, diphenylmethane, and anisole; halogenated aromatic solvents such as chlorobenzene, dichlorobenzene, and chloronaphthalene; alcohol solvents such as methanol, ethanol, isopropanol, n-butanol, and benzil alcohol; aliphatic polyhydric alcohols such as ethyleneglycol, glycerin, and polyethyleneglycol; chain and ring ketone solvents such as acetone, cyclohexanone, and methyl ethyl ketone; ester solvents such as methyl formate, ethyl acetate, and n-butyl acetate; halogenated hydrocarbon solvents such as methylene chloride, chloroform, and 1,2-dichloroethane; chain and ring ether solvents such as diethylether, dimethoxyethane, tetrahydrofuran, 1,4-dioxane, 1,3-dioxaline, methyl Cellosolve®, ethyl Cellosolve®, and butyl Cellosolve®; aprotic polar solvents such as dimethyl formamide, N-methyl-2-pyrrolidone, dimethylsulfoxide, sulfolane, 1,3-dimethyl-2-imidazolinone, 2-butyrolactone, and hexamethylphosphorous triamide; nitrogen-containing compounds such as n-butylamine, isopropanolamine, diethylamine, triethanolamine, ethylenediamine, triethylenediamine, and triethylamine; mineral oils such as ligroin; and water. Among them, considering the handleability in transforming the crystal form, preferred are saturated chain and ring aliphatic solvents, aromatic solvents, alcohol solvents, chain and ring ketone solvents, ester solvents, chain and ring ether solvents, aprotic polar solvents, and water. These may be used singly or alternatively, may be used two or more at a time in arbitrary combination and ratio.

With regard to the treatment temperature during the solvent treatment, the lower limit is usually equal to or higher than the freezing point of the solvent or mixed solvent to be used, preferably 10° C. or higher from the viewpoint of safety. The upper limit usually equal to or lower than the boiling point of the solvent or mixed solvent to be used, preferably 200° C. or lower in terms of safety.

The amount of solvent with respect to 1 weight part of the phthalocyanine composite is usually 0.01 weight part or larger, preferably 0.1 weight part or larger in consideration of productivity, and is usually 500 weight parts or smaller, preferably 250 weight parts or smaller in view of productivity.

When the wet trituration treatment is carried out in the micrifying process, it is also possible to carry out, if necessary, a milling treatment during the solvent treatment with a known trituration medium such as glass beads, alumina beads, steel beads, zirconia beads, silicon carbide beads, silicon nitride beads, boron nitride beads, etc.

In the eutectic-crystallizing process, after the solvent treatment, the solvent used for the solvent treatment is usually removed from the obtained phthalocyanine composite of the present invention by drying. The method for drying is not limited but may be any methods including normal-temperature drying, reduced-pressure drying, hot-air drying, and freeze-drying.

Explained below are the advantages offered by the production method of the phthalocyanine composite of the present invention. Conventionally, a large amount of concentrated sulfuric acid is used in producing a phthalocyanine compound, as in the prior art of, e.g., Patent Document 3. In such a case, a large amount of waste matter is produced to impose a heavy load on the environment through waste treatment. Besides, there are the disadvantages that the use of acid may bring about chemical reactions and that when the compound is used in electrophotography, electric properties such as sensitivity and charging property may be deteriorated due to impurities originating from acid. On the contrary, the phthalocyanine composite of the present invention offers the advantages that it does not require concentrated sulfuric acid nor the like in the process of its production and therefore has scarcely any adverse effects on the natural environment, that it does not have any adverse effects on electric properties such as sensitivity and charging property, and that it allows high productivity.

[2. Fluorinated Gallium Phthalocyanine Compound]
[2-1. Structure of Fluorinated Gallium Phthalocyanine Compound]

The fluorinated gallium-phthalocyanine compound used in the present invention is a compound having a phthalocyanine nucleus whose aromatic rings have substituent fluorine atoms thereon and which coordinates to gallium metal, i.e., the compound expressed by the following general formula (5).

[Chemical Formula 14]

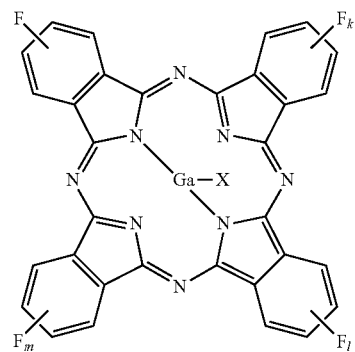

(5)

In the general formula (5), X represents a halogen atom, k, l, and m each represent the number of substituent fluorine atoms, and k, l, and m represent, independently of each other, an integer of between 0-4.

Although k, l, and m may be, independently of each other, any integer selected from 0-4, it is preferred to satisfy $1 \leq k+l+m$, more preferably $3 \leq k+l+m$ on the grounds that if there are too few fluorine atoms, desired charging property or residual potential cannot be obtained. On the other hand, if there are too many fluorine atoms, desired charging property or residual potential also cannot be obtained, so that it is preferred to satisfy the formula $k+l+m \leq 6$. Additionally, there is a tendency that a raw material compound such as phthalonitrile, phthalic anhydride, or 1,3-diiminoisoindoline will cost more per unit as the number of its substituent groups increases, so that it is preferred to meet $k+l+m \leq 5$ in consideration of production cost. On the grounds of photoconductivity of the resultant fluorinated gallium-phthalocyanine compound, it is more preferable to satisfy $k+l+m=3$ and, in view of versatility of the raw materials for production, meeting $k=l=m=1$ is especially preferable.

The individual six-membered ring of the phthalocyanine nucleus has four positions to which a fluorine atom may bind, as represented by (a)-(d) in the following formula (6) (where formula (6) expresses a partial structure corresponding to a six-membered ring part of general formula (5)). Each fluorine atom is not particularly limited in its binding position but may bind at any position selected from (a)-(d), provided that any two fluorine atoms do not bind at the same position.

[Chemical Formula 15]

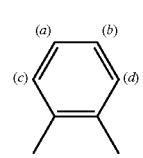

(6)

In cases such as when $k=l=m=1$, by selecting the kinds of raw materials used in the production method described below, it is possible to selectively produce a structure in which each fluorine atom binds to position (a) or position (b) of the individual six-membered ring and a structure in which each fluorine atom binds to position (c) or position (d) of the individual six-membered ring to some extent. Specifically, among the isomers of monofluoro phthalonitrile being a raw material, if 4-fluorophthalonitrile is used alone, the resultant fluorinated gallium-phthalocyanine compound has a structure in which every fluorine atom binds to position (a) or position (b). On the other hand, if only 3-fluorophthalonitrile is used, the resultant fluorinated gallium-phthalocyanine compound has a structure in which every fluorine atom binds to position (c) or position (d).

Naturally, by using these isomers of fluorophthalonitrile in combination as appropriate, it is possible to obtain the fluorinated gallium-phthalocyanine compound having different binding positions (a), (b), (c), (d). In consideration of production costs, however, it is preferred to use 4-fluorophthalonitrile alone as raw material. On this ground, as the structure of the fluorinated gallium-phthalocyanine compound where k=l=m=1, preferred is a structure in which every fluorine atom binds to either position (a) or position (b).

In addition, when the total number of substituent fluorines is equal to or more than 2, the fluorinated gallium-phthalocyanine compound has structural isomers. To take, as an example, the fluorinated gallium-phthalocyanine compound in which every fluorine atom binds to either position (a) or position (b), 6 different structural isomers exist depending on combinations of the binding positions of fluorines (for the sake of convenience, these structural isomers are represented by references (I)-(VI) hereinafter.). Combinations of the binding positions of fluorine atoms in structural isomers (I)-(VI) are shown in the following Table 2. Although plural combinations are possible for each of structural isomers (III)-(VI), one of the combinations is shown in Table 2 as an example.

Each of ring A, ring B, ring C, and ring D shown in Table 2 represents, among the six-membered rings of the fluorinated gallium-phthalocyanine compound according to the present invention, a ring at a position expressed by the following formula (10).

TABLE 2

[Chemical Formula 16]

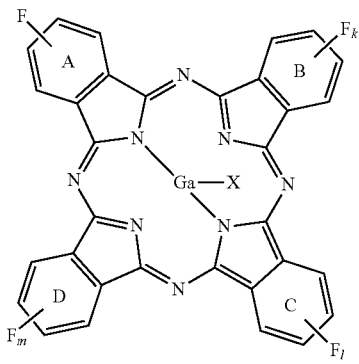

(10)

| Type of Isomer | Combinations of the Binding Positions to Six-Membered Rings (Examples) | | | |
|---|---|---|---|---|
| | ring A | ring B | ring C | ring D |
| (I) | (a) | (a) | (a) | (a) |
| (II) | (b) | (b) | (b) | (b) |
| (III) | (a) | (a) | (a) | (b) |
| (IV) | (b) | (b) | (b) | (a) |
| (V) | (a) | (b) | (a) | (b) |
| (VI) | (a) | (a) | (b) | (b) |

The fluorinated gallium-phthalocyanine compound of the present invention is not limited to one of the above structural isomers (I)-(VI) but may be either a pure substance of any one isomer or a mixture of two or more isomers. However, it is normally obtained as a mixture of all the six structural isomers (I)-(VI). In this case, the composition ratios of the individual structural isomers (I)-(VI) are also not particularly limited.

Also, the fluorinated gallium-phthalocyanine compound of the present invention may be obtained as a composite of plural kinds of compounds which each have a different number of substituent fluorines from each other.

The fluorinated gallium-phthalocyanine compound of the present invention may be either crystalline or amorphous (non-crystalline), although it is preferable in respect of their uses as photoconductive materials that it has one of the following particular properties of crystal forms and amorphous form.

Among others, in terms of Bragg angle $2\theta(\pm 0.2°)$ according to X-ray diffraction spectrum, the preferred compounds are: (1) those having peaks at 7.0°, 16.5°, and 27.2°; (2) those having peaks at 6.9°, 16.0°, and 26.4°; and (3) those not having any distinct peaks within the range of from 3° to 40° (amorphous material). Especially preferable are the fluorinated chlorogallium phthalocyanine whose number of fluorinated groups is 4.

Further, the fluorinated gallium-phthalocyanine compound of the present invention is not limited in its form but usually takes the form of particles. The diameter of the particles is not particularly limited but, from the viewpoint of making full use of the properties as photoconductive material, is desired to be within the range of usually 0.01 μm or larger, preferably 0.03 μm or larger, and usually 0.5 μm or smaller, preferably 0.3 μm or smaller, more preferably 0.15 μm or smaller.

[2-2. Production Method of Fluorinated Gallium Phthalocyanine Compound]

The fluorinated gallium-phthalocyanine compound of the present invention can be produced according to a known method for producing phthalocyanines. Examples of the production method are: the phthalonitrile method, in which a fluorinated phthalonitrile and a metallic salt such as a metal halide are heat-fused or heated in the presence of an organic solvent; a method in which an indoline compound such as a fluorinated 1,3-diiminoisoindoline and a metallic salt such as a metal halide are heat-fused or heated in the presence of an organic solvent; Weiler method, in which a fluorinated phthalic anhydride, together with urea and a metallic salt such as a metal halide, is heat-fused or heated in the presence of an organic solvent; a method in which a fluorinated cyanobenzamide is caused to react with a metallic salt; a method in which a fluorinated dilithium phthalocyanine is caused to react with a metallic salt; etc.

It is preferable that the synthesis of the fluorinated gallium-phthalocyanine compound of the present invention is carried out in the presence of an organic solvent. If the synthesis is carried out under a nonsolvent condition in the production of, for example, a fluorinated chlorogallium phthalocyanine (i.e., a compound of general formula (5) where X is a chlorine atom), there is a possibility that a phthalocyanine nucleus is also chlorinated and that a fluorinated chlorogallium phthalocyanine of the desired structure hence cannot be obtained. Besides, if any organic solvent is not used, substances such as impurities existing in the reaction, unreacted raw materials, and by-products originating from the reaction may be contained in the phthalocyanine solid and cause adverse effects on the photoconductive characteristics of the resultant fluorinated gallium-phthalocyanine compound.

As an organic solvent used for synthesis, it is preferable to use a solvent that is inert to the reaction and has a high boiling point. The examples include: halogenated aromatic solvents such as α-chloronaphthalene, β-chloronaphthalene, o-dichlorobenzene, and dichlorotoluene; alkylated aromatic solvents such as α-methylnaphthalene, β-methylnaphthalene, and tetrahydronaphthalene (tetralin); diarylated aliphatic solvents such as diphenylmethane and diphenylethane; alkoxylated aromatic solvents such as methoxy naphthalene; polyhydric alcohol solvents such as ethyleneglycol; ether solvents such as diphenyl ether, diethyleneglycol dimethylether, and butyl Cellosolve®; heterocyclic aromatic solvents such as quinoline; aprotic polar solvents such as sulfolane, dimethylsulfoxide, N-methyl formamide, and 1,3-dimethyl-2-imidazolinone; etc. Among these, it is preferable to use halogenated aromatic solvents, alkylated aromatic solvents, and aprotic polar solvents. These solvents can be used either singly or in combination as a mixed solvent of two or more solvents.

According to the phthalonitrile method, the fluorinated gallium-phthalocyanine compound of the present invention can be produced by agitating, or heating with agitation, a fluorinated phthalonitrile and a halogenated gallium compound in the organic solvent at 25-300° C. The reaction may also be carried out, if necessary, in the presence of a catalyst such as a quaternary ammonium salt, urea, and 1,8-diazabicyclo-[5.4.0]-7-undecene (DBU).

As a more specific example, the compound where X is a chlorine atom can be produced by mixing a fluorinated phthalonitrile with $GaCl_3$ being gallium source and causing reaction in α-chloronaphthalene being a solvent at 200° C. over a period of about 12 hours.

In synthesizing the compound expressed by formula (5), if a single kind of fluorinated phthalonitrile is used as the raw material for synthesis reaction, it is possible to obtain a fluorinated gallium-phthalocyanine compound in which the four phenyl rings of the phthalocyanine skeleton have a uniform number of fluorine atoms. On the other hand, if phthalonitriles each having a different number of fluorine groups are used as the raw material, it is possible to obtain a mixture of phthalocyanine compounds in which the four phenyl rings of the phthalocyanine skeleton each have a different number of fluorine atoms. Both the compound and the mixture are acceptable in the present invention. As equivalents for fluorinated phthalonitrile being raw material, it is also possible to use fluorinated diiminoisoindolines, fluorinated phthalic acids, fluorinated phthalic anhydrides, fluorinated cyanobenzamides, etc.

In the fluorinated gallium-phthalocyanine compound thus obtained, the number of fluorine groups depends on the selection of raw materials: in principle, it is possible to synthesize a fluorinated gallium-phthalocyanine compound in which the number of fluorine groups is from 1 to 13. For example, if a nonsubstituted phthalonitrile and a monofluoro phthalonitrile are used, the number of fluorine groups in the resultant fluorinated gallium-phthalocyanine compound is 0, 1, 2, 3, or 4. On the other hand, if a monofluoro phthalonitrile and a tetrafluorophthalonitrile are used, the number of fluorine groups in the resultant fluorinated gallium-phthalocyanine compound is 4, 7, 10, or 13. Also, by adjusting the mixing rate of the individual phthalonitriles used for synthesis, it is possible to control the amount of a particular fluorinated gallium-phthalocyanine compound, which has a particular number of fluorine groups, in such a manner as to increase its ratio or to reduce the ratio to the extent that the particular compound is not contained substantially. Here, the phrase "not contained substantially" means that the particular fluorinated gallium-phthalocyanine compound is assumed to be not contained, even if it is contained in a very small quantity, as long as its effect is not identifiable.

As a fluorinated phthalonitrile or its equivalent being a raw material, in terms of availability of its raw materials and cost, it is preferable to use the compound having a small number of fluorine atoms, specifically, a monofluoro phthalonitrile or its equivalent.

The obtained fluorinated gallium-phthalocyanine compound may be used as it is for a photosensitive layer of an electrophotographic photoreceptor, or alternatively, may be subjected to an additional treatment so as to be made into a particular crystal form. If the fluorinated gallium-phthalocyanine compound contains gallium phthalocyanines each having a different number of fluorine groups, the crystal form may varies depending on variation in the composition distribution obtained by synthesis. Especially when a fluorinated phthalonitrile or its equivalent having two or more fluorine groups is used as a raw material in the synthesis of a fluorinated gallium-phthalocyanine compound, the resultant fluorinated gallium-phthalocyanine compound is likely to exhibit variation in its crystal form, probably due to the sizes of the fluorine groups. On this account, the raw materials are used in combination in such a manner that in the obtained fluorinated gallium-phthalocyanine mixture, the fluorinated gallium-phthalocyanine compound having the largest number of fluorine groups is contained in an amount of usually 1% or lower, preferably 0.1% or lower. In addition, when the fluorinated gallium-phthalocyanine compound contains gallium phthalocyanines each having a different number of fluorine groups, it is preferred to limit the largest number of fluorine groups of the individual fluorinated gallium-phthalocyanines to seven or fewer.

Besides, when the fluorinated gallium-phthalocyanine compound contains fluorinated gallium-phthalocyanine composites each having a different number of fluorine groups, it is likely to exhibit variations in its crystal form and, as a result, the electrophotographic photoreceptor using the fluorinated gallium-phthalocyanine composite becomes difficult to stabilize its various characteristics. On this ground, it is preferable to use fluorinated gallium-phthalocyanine compounds having the same number of fluorine groups. In this case, from the viewpoint of electric properties and availability of raw materials, it is preferable to use a compound having four fluorine groups in total.

The fluorinated gallium-phthalocyanine compound used in the present invention may be an amorphous material, which does not show any distinctive peak according to an X-ray diffraction spectrum using CuKα characteristic X-ray, i.e., which does not have so-called crystallinity (hereinafter also called "fluorinated gallium-phthalocyanine amorphous material" or simply "amorphous material") or alternatively, may be a crystalline material having crystallinity. However, it is preferable to select a compound from, according to an X-ray diffraction spectrum using CuKα characteristic X-ray, in terms of Bragg angle 2θ(±0.2°), (1) the ones having peaks at 7.0°, 16.5°, and 27.2° and (2) the ones having peaks at 6.9°, 16.0°, and 26.4°, and (3) the ones not having any distinctive peak within the range of 3°-40° (amorphous material). Especially preferable is a fluorinated chlorogallium phthalocyanine that has four fluorine groups.

In order to obtain, according to an X-ray diffraction spectrum using CuKα characteristic X-ray, in terms of Bragg angle 2θ(±0.2°), (1) the compounds having peaks at 7.0°, 16.5°, and 27.2° and (2) the compounds having peaks at 6.9°, 16.0°, and 26.4°, it is necessary, after dry triturating or chemical treatment, to subject the obtained amorphous material to additional treatment as explained below (hereinafter, the treatment is also called "crystal-form transforming treatment"), in order to transform it into a desired crystal form.

The crystal-form transforming treatment is carried out by bringing the amorphous material into contact with a solvent. The contact with a solvent may be carried out either by making the particles into the form of slurry in a solvent or by any known contact method such as exposing the particles to a solvent vapor. Examples of a solvent to be used are: saturated aliphatic solvents such as pentane, hexane, octane, and nonane; aromatic solvents such as toluene, xylene, and anisole; halogenated aromatic solvents such as chlorobenzene, dichlorobenzene, and chloronaphthalene; alcohol solvents such as methanol, ethanol, isopropanol, n-butanol, and benzil alcohol; aliphatic polyhydric alcohols such as glycerin and polyethyleneglycol; chain and ring ketone solvents such as acetone, cyclohexanone, and methyl ethyl ketone; ester solvents such as methyl formate, ethyl acetate, and n-butyl acetate; halogenated hydrocarbon solvents such as methylene chloride, chloroform, and 1,2-dichloroethane; chain and ring ether solvents such as diethylether, dimethoxyethane, tetrahydrofuran, 1,4-dioxane, 1,3-dioxolane, methyl Cellosolve®, and ethyl Cellosolve®; aprotic polar solvents such as dimethyl formamide, N-methyl-2-pyrrolidone, dimethylsulfoxide, sulfolane, and hexamethylphosphorous triamide; nitrogen-containing compounds such as n-butylamine, isopropanolamine, diethylamine, triethanolamine, ethylenediamine, triethylenediamine, and triethylamine; mineral oils such as ligroin; and water. Among these, in consideration of handleability, it is preferable to use saturated aliphatic solvent, aromatic solvents, alcohol solvents, chain and ring ketone solvents, ester solvents, chain and ring ether solvents, aprotic polar solvents, and water. These solvents may be used any one singly or alternatively, may be used as a mixed solvent of two or more solvents. The treatment temperature can be selected from the range between the freezing point and the boiling point of the solvent (or the mixed solvent), both inclusive, although it is usually within the range of 10° C. or higher and 200° C. or lower in respect of safety. From the viewpoint of productivity, the amount of the solvent to be used with respect to 1 weight part of the amorphous material for the fluorinated gallium-phthalocyanine compound is within the range of usually 0.1 weight part or larger, preferably 1 weight part or larger, and usually 500 weight parts or smaller, preferably 250 weight parts or smaller.

During the contact process of the amorphous material of the fluorinated gallium-phthalocyanine compound with the solvent, it is possible to carry out, if necessary, an operation such as agitation so as to improve contact efficiency. During the agitation, it is possible to use a known agitation medium such as wet process glass beads, alumina beads, steel beads, zirconia beads, silicon carbide beads, silicon nitride beads, and boron nitride beads.

Further, when carrying out wet trituration treatment, by selecting, for the wet trituration treatment, the same solvent as the solvent for the crystal-form transforming treatment, it is possible to carry out the wet trituration treatment and the crystal-form transforming treatment at a time.

Through the crystal-form transforming treatment, the amorphous material of the fluorinated gallium-phthalocyanine can be transformed into the above crystal forms.

If the wet trituration treatment and/or the crystal-form transforming treatment are carried out, the resultant amorphous or crystal material of the fluorinated gallium-phthalocyanine compound is in the state of wet cake, being dispersed in the above solvent and/or solvent. By removing the solvent and/or solvent from the wet cake using a known method such as normal-temperature drying, reduced-pressure drying, hot-air drying, and freeze-drying, it is possible to obtain the desired the amorphous material of the fluorinated gallium-phthalocyanine compound or crystal.

The fluorinated gallium-phthalocyanine compound of the present invention, for use as a charge generation substance of an electrophotographic photoreceptor, may be used either singly or in combination with one or more other phthalocyanine compounds, although preferably it is used together with one or more other phthalocyanine compounds. As examples of the cases where the fluorinated gallium-phthalocyanine compound of the present invention is used in combination with at least one additional phthalocyanine compound other than the fluorinated gallium-phthalocyanine compound of the present invention, the following can be mentioned.

1) The case where during the synthesis reaction of the fluorinated gallium-phthalocyanine compound, the additional compound is also synthesized in the same reaction system, and the obtained composite is used for a photosensitive layer.

2) The case where the fluorinated gallium-phthalocyanine compound and the additional phthalocyanine compound are separately synthesized and then mixed in the subsequent process of synthesis or purification, and the resultant composite is used for a photosensitive layer.

3) The case where the fluorinated gallium-phthalocyanine compound and the additional phthalocyanine compound are mixed and used when a coating solution for photosensitive layer is prepared according to the preparation method of a coating solution for photosensitive layer described below.

4) The case where in the preparation of a coating solution for photosensitive layer, a coating solution of the fluorinated gallium-phthalocyanine compound and a coating solution of the additional phthalocyanine compound are separately prepared and, in the formation of a photosensitive layer by coating, the coating solutions are mixed and used for the formation of the photosensitive layer.

Among these, the case corresponding to the above example 2) is preferred. Especially preferable is the case where a phthalocyanine composite contains the fluorinated gallium-phthalocyanine compound and the additional phthalocyanine compound, separately synthesized, and is used in the state of the mixed-crystalline composite described below.

[2-3. Phthalocyanine Composite and Mixed-Crystalline Composite Using Fluorinated Gallium Phthalocyanine Compound]

When using, as a charge generation substance for the electrophotographic photoreceptor of the present invention, the phthalocyanine composite of the foregoing paragraph, which contains the fluorinated gallium-phthalocyanine compound of the present invention, it is required to select a composite that contains a fluorinated gallium-phthalocyanine compound expressed by general formula (5), which has fluorine atoms on the phthalocyanine nucleus.

It is preferred that the above composite contains, in addition to the fluorinated gallium-phthalocyanine compound, one or more phthalocyanine analogue compounds having a phthalocyanine skeleton, a porphyrin skeleton, or a tetraazaporphyrin skeleton. Especially preferred is a phthalocyanine compound in view of material cost. As the phthalocyanine compound in combination, it is possible to select either a metal-free phthalocyanine or a metal phthalocyanine, although it is preferable to select a metal-free phthalocyanine, an oxytitanium phthalocyanine, a chlorogallium phthalocyanine, and/or a hydroxygallium phthalocyanine for use as an electrophotographic photoreceptor.

The fluorinated gallium-phthalocyanine compound of the present invention and the phthalocyanine analogue compounds may be used in an arbitrary composition ratio, although the fluorinated gallium-phthalocyanine compound is contained in the phthalocyanine composite with a ratio of usually 80 weight % or lower. From a cost viewpoint, the content ratio is preferably 60 weight % or lower, more preferably 50 weight % or lower.

On the other hand, if the content is too low, the effects of the present invention may not be fully manifested, so that the fluorinated gallium-phthalocyanine compound is preferably used in an amount within the range of usually 0.1 weight % or higher and 1 weight % or higher with respective to the composite.

The phthalocyanine composite may be in a mixed state where the particles of constituents exist separately, or may have a structure with regularity at the molecular level, although it is preferably a composite having a crystalline structure. Especially preferred is a composite that shows a new crystal form different from crystal forms of the original phthalocyanine compounds and analogues being mixed, and a mixed-crystalline composite that mainly shows a crystalline structure of one of the compounds contained in the composite.

It is possible to impart a structure with regularity at the molecular level to the phthalocyanine composite usually using a method in which the phthalocyanine composite is made into an amorphous state through micrifying and then subjected to solvent treatment or the like so as to obtain a structure with regularity.

The micrifying method for making amorphous state can be carried out by arbitrarily selecting a method from treatment methods using mechanical force, such as triturating process, as well as chemical treatment methods, such as acid-paste method and acid-slurry method. The above methods can be carried out also two or more in combination. However, the acid-slurry method and the acid-paste method involve considerably large problems. Specifically, since a large amount of acid must be used, it is necessary carry out neutralization using a large amount of base in order to treat waste acid after production, so that the waste treatment requires considerable cost and produces a large amount of waste matter. In addition, the impurities usually originating from anions of the used acid may deteriorate electric properties, especially charging performance. The phthalocyanine nucleus or ligands of the central metal may react with the acid, so that the structure of the phthalocyanine molecule may be transformed into a different structure, and that the structure of the phthalocyanine nucleus may suffer from decomposition or the like due to the acid. On that account, it is preferable to use a treatment method using mechanical force, such as triturating method.

In carrying out the trituration treatment using mechanical force, there is no particular restraint on the apparatus used for trituration, examples of which include automatic mortar, planetary mill, ball mill, CF mill, roller mill, sand mill, kneader, attritor, etc. When a trituration medium is used, there is no particular restraint on the type of a trituration medium, examples of which include glass beads, steel beads, alumina beads, zirconia beads, silicon carbide beads, silicon nitride beads, and boron nitride beads. Trituration can be carried out also using, in addition to a trituration medium, a trituration assistant that is easily removable after trituration. Examples of the trituration assistant are common salts and mirabilite.

The trituration may be carried out by dry process or alternatively, may be carried out by wet process in the presence of a solvent. When the trituration is carried out by wet process, there is no restraint on the solvent to be used, examples of which include: saturated aliphatic solvents such as pentane, hexane, octane, and nonane; aromatic solvents such as toluene, xylene, and anisole; halogenated aromatic solvents such as chlorobenzene, dichlorobenzene, and chloronaphthalene; alcohol solvents such as methanol, ethanol, isopropanol, n-butanol, and benzil alcohol; aliphatic polyhydric alcohols such as glycerin and polyethyleneglycol; chain and ring ketone solvents such as acetone, cyclohexanone, and methyl ethyl ketone; ester solvents such as methyl formate, ethyl acetate, and n-butyl acetate; halogenated hydrocarbon solvents such as methylene chloride, chloroform, and 1,2-dichloroethane; chain and ring ether solvents such as diethylether, dimethoxyethane, tetrahydrofuran, 1,4-dioxane, methyl Cellosolve®, and ethyl Cellosolve®; aprotic polar solvents such as dimethyl formamide, N-methyl-2-pyrrolidone, dimethylsulfoxide, sulfolane, and hexamethylphosphorous triamide; nitrogen-containing compounds such as n-butylamine, isopropanolamine, diethylamine, triethanolamine, ethylenediamine, triethylenediamine, and triethylamine; mineral oils such as ligroin; and water. Among others, considering handleability during the wet trituration process, it is preferable to use saturated aliphatic solvents, aromatic solvents, alcohol solvents, chain and ring ketone solvents, ester solvents, chain and ring ether solvents, aprotic polar solvents, and water. These solvents may be used singly, or may be used two or more in combination as a mixed solvent. From the viewpoint of productivity, the used amount of the solvent should be, with respect to 1 weight part of the fluorinated gallium-phthalocyanine composite being the object of trituration, within the range of usually 0.01 weight part or larger, preferably 0.1 weight part or larger, and usually 200 weight parts or smaller, preferably 100 weight parts or smaller. The treatment temperature can be selected from the range between the freezing point and the boiling point of the solvent (or mixed solvent), although usually it is within the range of 10° C. or higher and 200° C. or lower in view of safety. Examples of the apparatus for wet trituration process include kneader as well as the above examples of the apparatus for trituration.

The fine particles of fluorinated gallium-phthalocyanine composite obtained through the dry-trituration/chemical-treatment become an amorphous material that does not show any clear peak according to an X-ray diffraction spectrum with respect to CuKα characteristic X-ray, i.e., that does not have crystallinity.

In order to form a structure having regularity at the molecular level, the particles obtained from the amorphous-state making process are then brought into contact with a solvent. The contact process with a solvent may be implemented by making the particles into slurry in a solvent or alternatively, may be carried out using any known contact method such as exposure to a solvent vapor. Examples of the solvent include: saturated aliphatic solvents such as pentane, hexane, octane, and nonane; aromatic solvents such as toluene, xylene, and anisole; halogenated aromatic solvents such as chlorobenzene, dichlorobenzene, and chloronaphthalene; alcohol solvents such as methanol, ethanol, isopropanol, n-butanol, and benzil alcohol; aliphatic polyhydric alcohols such as glycerin and polyethyleneglycol; chain and ring ketone solvents such as acetone, cyclohexanone, and methyl ethyl ketone; ester solvents such as methyl formate, ethyl acetate, and n-butyl acetate; halogenated hydrocarbon solvents such as methylene chloride, chloroform, and 1,2-dichloroethane; chain and ring ether solvents such as diethylether, dimethoxyethane, tetrahydrofuran, 1,4-dioxane, 1,3-dioxolane, methyl Cellosolve®, and ethyl Cellosolve®; aprotic polar solvents such as dimethyl formamide, N-methyl-2-pyrrolidone, dimethylsulfoxide, sulfolane, and hexamethylphosphorous triamide; nitrogen-containing compounds such as n-butylamine, isopropanolamine, diethylamine, triethanolamine, ethylenediamine, triethylenediamine, and triethylamine; mineral oils such as ligroin; and water. Considering handleability, it is preferred to use saturated aliphatic solvents, aromatic solvents, alcohol solvents, chain and ring ketone solvents, ester solvents, chain and ring ether solvents, aprotic polar solvents, and water. These solvents may be used any one singly, or may be used two or more in combination as a mixture solvent. The treatment temperature can be selected between the freezing point and the boiling point of the solvent (or mixture solvent), although it is usually within the range of 10° C. or higher and 200° C. or lower in view of safety. From the viewpoint of productivity, the amount of solvent to be used is, with respect of 1 weight part of the amorphous material of the fluorinated gallium-phthalocyanine compound, within the range of usually 0.1 weight part or larger, preferably 1 weight part or larger, and usually 500 weight parts or smaller, preferably 250 weight parts or smaller.

When the amorphous material of the fluorinated gallium-phthalocyanine compound is brought into contact with a solvent, it is also possible to carry out agitation or like operations, as necessary, for improving contact efficiency. For agitation, it is also possible to use a known agitation medium such as wet process glass beads, alumina beads, steel beads, zirconia beads, silicon carbide beads, silicon nitride beads, boron nitride beads, etc.

Further, by selecting, for wet trituration treatment, the same solvent as that for the crystal-form transforming treatment, it becomes possible to carry out the wet trituration treatment and the crystal-form transforming treatment at a time.

Through the crystal-form transforming treatment, it is possible to transform the amorphous material of the fluorinated gallium-phthalocyanine into the crystals described above.

If the wet trituration treatment and/or the crystal-form transforming treatment are carried out, the resultant amorphous or crystal material of the fluorinated gallium-phthalocyanine compound is in the state of wet cake, being dispersed in the above solvent and/or solvent. By removing the solvent and/or solvent from the wet cake using a known method such as normal-temperature drying, reduced-pressure drying, hot-air drying, and freeze-drying, it is possible to obtain the desired the amorphous material of the fluorinated gallium-phthalocyanine compound or crystal.

[3. Photoconductive Material]

The phthalocyanine composite of the present invention can be used as materials for various image display devices, including paperlike displays, optical information storage media, and solar cells, and as photoconductive materials, although especially preferable use is materials for electrophotographic photoreceptors.

[4. Electrophotographic Photoreceptor]

The electrophotographic photoreceptor of the present invention is an electrophotographic photoreceptor having a photosensitive layer formed on an electroconductive substrate, and is characterized in that the photosensitive layer contains the phthalocyanine material of the present invention (namely, the phthalocyanine composite of the present invention or the fluorinated gallium-phthalocyanine of the present invention).

[4-1. Electroconductive Substrate]

Although there is no restraint on the electroconductive substrate, examples of its commonly used materials include: a metal material such as aluminum, aluminum alloy, stainless steel, copper, or nickel; or a resin material to which electroconductivity is imparted by being mixed with an electroconductive powder such as metal, carbon, or tin oxide; and a resin, glass, or paper material on whose surface an electroconductive material such as aluminum, nickel, or ITO (indium oxide tin oxide alloy) is vapor-deposited or applied. These may be used any one singly, or may be used any two or more in arbitrary combination and ratio. Its shape may be, for example, a drum shape, a sheet shape, a belt shape, etc. Besides, it is also possible to use an electroconductive substrate made of metal material whose surface is coated with electroconductive material having an appropriate resistance value for controlling properties such as electroconductivity and surface nature as well as for defect covering.

When metal material such as aluminum alloy is used for the electroconductive substrate, it may have been undergone anodic oxidation treatment in advance. In this case, it is desired that after the anodic oxidation treatment, sealing treatment is conducted by a known method.

The substrate surface may be smooth, or may be roughened using a special cutting method or a grinding treatment. Alternatively, it may also be roughened by mixing the principal material composing the substrate with particles having appropriate particle diameters. On the other hand, it is also possible to use a drawn tube as it is without conducting cutting treatment with a view to reducing cost.

[4-2. Undercoat Layer]

Between the electroconductive substrate and the aftermentioned photosensitive layer, an undercoat layer may be formed for the purpose of improving properties such as adhesive property and blocking property. The materials used for the undercoat layer include resins as well as materials obtained by dispersing particles of metal oxide or the like into resin. The undercoat layer may be either formed as a single layer or composed of plural layers.

Examples of metal oxide particles usable for the undercoat layer include: metal oxide particles including a single metal element, such as titanium oxide, aluminum oxide, silicon oxide, zirconium oxide, zinc oxide, iron oxide, etc.; and metal oxide particles including plural metal elements, such as calcium titanate, strontium titanate, barium titanate, etc. Among these, a single kind of particles may be used alone, or plural kinds of particles may be used as a mixture in arbitrary combination and ratio.

Among these metal oxide particles, titanium oxide and aluminum oxide are preferable, and titanium oxide is especially preferable.

It is also possible to subject the titanium oxide particles in advance to surface treatment using either inorganic substances, such as tin oxide, aluminum oxide, antimony oxide, zirconium oxide, and silicon oxide, or organic substances, such as stearic acid, polyol, or silicone. The titanium oxide particles may undergo a single kind of treatment alone, or may undergo any two or more kinds of treatments in combination each to a desired degree.

As the crystal form of the titanium oxide particles, any forms can be used such as rutile-, anatase-, brookite-, and amorphous-forms. The titanium oxide particles may have a single crystal form, or may contain two or more crystal forms in arbitrary combination and ratio.

The metal oxide particles can be arbitrarily selected from a wide variety of particle diameters, although their average primary particle diameter is desired to be within the range of usually 10 nm or larger, and usually 100 nm or smaller, preferably 50 nm or smaller, in view of the properties of the raw materials of the undercoat layer, such as binder resin, as well as the stability of the liquid.

It is desired to form the undercoat layer in such a manner that the metal oxide particles are dispersed in binder resin. Examples of binder resin used for the undercoat layer are: epoxy resin, polyethylene resin, polypropylene resin, acryl resin, methacrylic resin, polyamide resin, vinyl chloride resin, vinyl acetate resin, phenol resin, polycarbonate resin, polyurethane resin, polyimide resin, vinylidene chloride resin, polyvinyl acetal resin, vinyl chloride-vinyl acetate copolymer, polyvinyl alcohol resin, polyurethane resin, polyacrylic acid resin, polyacryl amide resin, polyvinyl pyrrolidone resin, polyvinyl pyridine resin, water-soluble polyester resin, cellulose ester resin such as nitrocellulose, cellulose ether resin, casein, gelatin, polyglutamic acid, starch, starch acetate, amino starch, organic zirconium compounds such as zirconium chelate compound and zirconium alkoxide compound, organic titanyl compounds such as titanyl chelate compound and titanyl alkoxide compound, silane coupling agents, etc. These may be used any one singly, or may be used two or more in arbitrary combination and ratio. They can be also used in the form of being hardened with a hardening agent. Among them, binders such as alcohol-soluble copolymerized polyamide and denatured polyamide exhibit superior dispersibility and coatability and are therefore preferable.

The mixing ratio of the metal oxide particles to the binder resin used for the undercoat layer can be arbitrarily selected, although the ratio is desired to be within the range of, with respect to 100 weight parts of the binder resin, usually 10 weight parts or larger and 500 weight parts or smaller in view of the stability and coatability of the coating solution.

Further, the thickness of the undercoat layer can be selected arbitrarily, although the thickness is desired to be within the range of usually 0.01 μm or larger, preferably 0.1 μm or larger, and usually 30 μm or smaller, preferably 20 μm or smaller from the viewpoint of improving the electric properties, intense-exposure properties, image properties, and repetitive properties of the resultant electrophotographic photoreceptor as well as the coatability during production.

The undercoat layer may contain other particles such as pigments particles and resin particles for the purpose of preventing image defects.

[4-3. Photosensitive Layer]

Next, an explanation will be made on a photosensitive layer, which is formed on the electroconductive substrate (when the aforementioned undercoat layer exists, on the undercoat layer).

The photosensitive layer is a layer that contains the above-mentioned phthalocyanine material of the present invention as charge generation substance. As the type of the photosensitive layer, there can be mentioned: a type having a single layer structure (hereinafter also called "single-layer type photosensitive layer") in which both the charge generation substance and charge transport substance are contained in the same layer and dispersed in binder resin; and a type having a layered structure (hereinafter also called "multilayer type photosensitive layer") of two or more layers including a charge generation layer, in which the charge generation substance is dispersed in binder resin, and a charge transport layer, in which the charge transport substance is dispersed in binder resin. Both of these types are acceptable. As the layered form of the multilayer type photosensitive layer, there can be mentioned: a normally-layered type photosensitive layer, in which the charge generation layer and the charge transport layer are layered in the named order from the side of the electroconductive substrate; and an inversely-layered type photosensitive layer, in which the charge transport layer and the charge generation layer are layered in the named order. Any known layered form can be adopted.

(Charge Generation Layer)

As for the multilayer type photosensitive layer, the charge generation layer is formed according to a method in which: a coating solution is prepared by dispersing the aforementioned charge generation substance, which contains at least one phthalocyanine material of the present invention, into a solution of binder resin in an organic solvent; and the coating solution is applied onto the electroconductive substrate so that the charge generation substance is bound in a various kinds of binder resin.

As the charge generation substance, the aforementioned phthalocyanine material of the present invention may be used either singly or in combination with any other known charge generation substance. When it is used in company with such a known charge generation substance, they may be used simply in a mixed and dispersed state. Alternatively, if the companion charge generation substance is capable of form a eutectic-crystalline state together with the phthalocyanine material of the present invention, they may also be used in a eutectic-crystalline state.

As the charge generation substances that can be used in company with the phthalocyanine material of the present invention, there can be mentioned phthalocyanine pigments, azo pigments, dithioketopyrrolopyrrole pigments, squalene (squalilium pigments), quinacridone pigments, indigo pigments, perylene pigments, polycyclic quinone pigments, anthanthrone pigments, benzimidazole pigments, etc. Among these, phthalocyanine pigments and azo pigments are preferred in terms of light sensitivity.

When the phthalocyanine material of the present invention is used in company with any other charge generation substance, the phthalocyanine material of the present invention and the companion charge generation substance may be mixed in the state of powder or dispersion liquid. Alternatively, they may also be mixed in any processes (including various treatment processes such as pigmentization and crystallization) in the production of either the phthalocyanine material of the present invention or the companion charge generation substance. As the method for thus mixing in any stage of the manufacturing process in the case where, for example, the companion charge generation substance is capable of forming a eutectic-crystalline state with the phthalocyanine material of the present invention, there can be mentioned acid paste treatment, trituration treatment, solvent treatment, etc. Specifically, in order to bring the charge generation substance into a eutectic-crystalline state, it is possible to mention a method described in Japanese Patent Laid-Open Publication No. Hei 10-48859, in which method two different crystals are mixed and then triturated in a mechanical manner so as to be brought into a non-crystalline state, subsequently being transformed into a particular crystalline state through solvent treatment.

The binder resin used for the charge generation layer of the multilayer type photosensitive layer is not particularly limited but may be any arbitrary resin. Examples of the binder resin are insulating resins such as polyvinyl butyral resins, polyvinyl formal resins, polyvinyl acetal resins such as partly-acetalized polyvinyl butyral resins (in which a part of the butyrals is denatured by formals, acetals, or the likes), polyarylate resins, polycarbonate resins, polyester resins, denatured ether polyester resins, phenoxy resins, polyvinyl chloride resins, poly(vinylidene chloride) resins, polyvinyl acetate resins, polystyrene resins, acryl resins, methacrylic resins, polyacryl amide resins, polyamide resins, polyvinyl pyridine resins, cellulose resins, polyurethane resins, epoxy resins, silicone resins, polyvinyl alcohol resins, polyvinyl pyrrolidone resins, casein, vinyl chloride/vinyl acetate copolymers (e.g., as vinyl chloride/vinyl acetate copolymer, hydroxyl-denatured vinyl chloride/vinyl acetate copolymer, carboxyl-denatured vinyl chloride/vinyl acetate copolymer, and vinyl chloride/vinyl acetate/maleic anhydride copolymer), styrene/butadiene copolymer, vinylidene chloride/acrylonitrile copolymer, styrene/alkyd resin, silicone/alkyd resin, phenol/formaldehyde resin, as well as organic photoconductivity polymers such as poly-N-vinyl carbazole, polyvinyl anthracene, and polyvinyl perylene. In addition, it is also possible to mention polymers and copolymers of vinyl compounds such as polyvinyl acetate, polyvinyl acetoacetal, polyvinyl propional, cellulose ester, cellulose ether, styrene, vinyl acetate, vinyl chloride, acrylic acid ester, methacrylic acid ester, vinyl alcohol, and ethyl vinyl ether, as well as polyamide, silicone resin, etc. These may be used any one singly, or may be used two or more in arbitrary combination and ratio.

There is no restraint on the solvent or dispersion medium in which binder resin is solved for preparing a coating solution: any solvent or dispersion medium can be used. Examples of the solvent or dispersion medium are: saturated chain and ring aliphatic solvents such as pentane, hexane, octane, nonane, methylcyclohexane, and ethyl cyclohexane; aromatic solvents such as toluene, xylene, and anisole; halogenated aromatic solvents such as chlorobenzene, dichlorobenzene, and chloronaphthalene; amide solvents such as N,N-dimethyl formamide, N,N-dimethyl acetoamide, and N-methyl-2-pyrrolidone; alcohol solvents such as methanol, ethanol, isopropanol, n-butanol, and benzil alcohol; aliphatic polyhydric alcohols such as ethyleneglycol, glycerin, and polyethyleneglycol; chain and ring ketone solvents such as acetone, cyclohexanone, and methyl ethyl ketone; ester solvents such as methyl formate, ethyl acetate, and n-butyl acetate; halogenated hydrocarbon solvents such as methylene chloride, chloroform, and 1,2-dichloroethane; chain and ring ether solvents such as diethylether, dimethoxyethane, tetrahydrofuran, 1,4-dioxane, methyl Cellosolve®, ethyl Cellosolve®, and ethyleneglycol monomethyl ether; aprotic polar solvents such as acetonitrile, N,N-dimethyl formamide, 1,3-dimethyl-2-imidazolinone, N-methyl-2-pyrrolidone, γ-butyrolactone, dimethylsulfoxide, sulfolane, and hexamethylphosphorous triamide; nitrogen-containing compounds such as n-butylamine, isopropanolamine, diethylamine, triethanolamine, ethylenediamine, triethylenediamine, and triethylamine; mineral oils such as ligroin; and water. Among them, preferred are the ones that do not dissolve the undercoat layer. These may be used any one singly, or may be used any two or more in arbitrary combination and ratio.

In the charge generation layer of the multilayer type photosensitive layer, the compounding ratio (by weight) of the charge generation substance to the binder resin is, with respect to 100 weight parts of binder resin, usually 1 weight part or larger, preferably 10 weight parts or larger, more preferably 30 weight parts or larger, and usually 2000 weight parts or smaller, preferably 1000 weight parts or smaller, more preferably 500 weight parts or smaller. If the ratio of the charge generation substance is too high, the stability of the coating solution may decline due to, e.g., the aggregation of the charge generation substance, while if the ratio is too low, the sensitivity of the photoreceptor may decrease. It is hence desired that the rate be within the above-mentioned range. When the phthalocyanine material of the present invention is used in company of other charge generation substance as the charge generation substances, it is required that the total compounding rate of the companion charge generation substance and the phthalocyanine material of the present invention is within the aforementioned range.

The charge generation layer may also contain an electron-attracting compound. Any electron-attracting compound can be used unless it remarkably impairs the advantageous effects of the present invention. Examples of the electron-attracting compound are: quinones such as chloranil, 2,3-dichloro-1,4-naphthoquinone, 1-nitroanthraquinone, 1-chloro-5-nitroanthraquinone, 2-chloroanthraquinone, and phenanthrene quinone; aldehydes such as 4-nitrobenzaldehyde; ketones such as 9-benzoylanthracene, indanediones, 3,5-dinitrobenzophenone, 2,4,7-trinitrofluorenone, 2,4,5,7-tetranitrofluorenone, and 3,3',5,5'-tetranitrobenzophenone; acid anhydrides such as phthalic anhydride and 4-chloronaphthalic anhydride; cyano compounds such as tetracyano ethylene, terephthalal malononitrile, 9-antholyl methylidene malononitrile, 4-nitrobenzalmalononitrile, and 4-(p-nitrobenzoyloxy)benzalmalononitrile; phthalides such as 3-benzalphthalide, 3-(α-cyano-p-nitrobenzal)phthalide, and 3-(α-cyano-p-nitrobenzal)-4,5,6,7-tetrachlorophthalide.

The thickness of the charge generation layer of the multilayer type photosensitive layer is usually 0.05 µm or larger, preferably 0.1 µm or larger, more preferably 0.15 µm or larger, and usually 10 µm or smaller, preferably 5 µm or smaller, more preferably 2 µm or smaller, still more preferably 0.8 µm or smaller.

The method for disperse the charge generation substance in the dispersion medium, it is possible to use any known dispersion methods such as ball-mill dispersion method, attritor dispersion method, sand-mill dispersion method, planetary-mill dispersion method, roll mill dispersion method, and ultrasonic dispersion method. For dispersion, it is effective to micrify the particles of the charge generation substance into particles sizes of usually 0.5 µm or smaller, preferably 0.3 µm or smaller, more preferably 0.15 µm or smaller.

(Charge Transport Layer)

The charge transport layer of the multilayer type photosensitive layer usually contains, in addition to the charge transport substance, binder resin and, if necessary, other components. Specifically, the charge transport layer is formed according to, e.g., a method in which: a coating solution is prepared by dissolving or dispersing the charge transport substance and other components into a solvent or dispersion medium together with binder resin; and the coating solution is applied, for the normally-layered type photosensitive layer, onto the charge generation layer or, for the inversely layered type photosensitive layer, onto the electroconductive substrate (when the undercoat layer exists, on the undercoat layer) and then dried.

The binder resin is used for securing the film strength of the charge transport layer. There is no restraint on the kind of binder resin, and any known resin may be arbitrarily used. Examples of the binder resin include polymers and copolymers of vinyl compounds such as butadiene resin, styrene resin, vinyl acetate resin, vinyl chloride resin, acrylic acid ester resin, methacrylic acid ester resin, vinyl alcohol resin, and ethyl vinyl ether, as well as polyvinyl butyral resin, polyvinyl formal resin, partly-denatured polyvinyl acetal, polycarbonate resin, polyester resin, polyarylate resin, polyamide resin, polyurethane resin, cellulose ester resin, phenoxy resin, silicone resin, silicone-alkyd resin, poly-N-vinyl carbazole resin, etc. Among them, polycarbonate resin and polyarylate resin are especially preferable. The binder resin can also undergo cross-linking treatment with an appropriate hardening agent by any means such as heat or light. These may be used singly or may be used two or more in arbitrary combination and ratio.

As especially preferred binder resin, it is possible to mention: a polycarbonate resin including a single kind of units, or plural kinds of units, selected from the units expressed by the following general formula (11); and a polyarylate resin including a single kind of units, or plural kinds of units, selected from the units expressed by the following general formula (12).

[Chemical Formula 17]

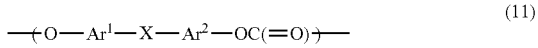

(11)

In the above formula, $Ar^1$ and $Ar^2$ represent, independently of each other, an arylene group that may have a substituent group. Also, in the general formula (11), X represents a cross-linking atom such as an oxygen atom or a sulfur atom, a single bond, or —$CR^1R^2$— where $R^1$ and $R^2$ represent, independently of each other, a hydrogen atom, an alkyl group, an aryl group, or an alicyclic structure formed by the linkage between $R^1$ and $R^2$.

[Chemical Formula 18]

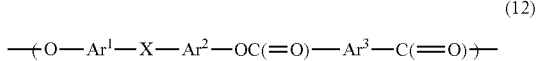

(12)

In the above formula, $Ar^1$ and $Ar^2$ represent, independently of each other, an arylene group that may have a substituent group. Also, in the general formula (12), X represents a cross-linking atom such as an oxygen atom or a sulfur atom, a single bond, or —$CR^1R^2$— where $R^1$ and $R^2$ represent, independently of each other, a hydrogen atom, an alkyl group, an aryl group, or an alicyclic structure formed by the linkage. $Ar^3$ represents an arylene group, which may have a substituent group, or a divalent group having plural aryl groups linked with each other by a cross-linking atom such as an oxygen atom or a sulfur atom.

In general formulae (11) and (12), a structural part expressed by O—$Ar^1$—X—$Ar^2$—O is preferably composed of partial structures of bisphenol components or biphenol components. Preferable examples of these bisphenol components and biphenol components are mentioned below.

Examples of biphenol compounds are 4,4'-biphenol, 3,3'-dimethyl-4,4'-dihydroxy-1,1'-biphenyl, 3,3'-di(t-butyl)-4,4'-dihydroxy-1,1'-biphenyl, 3,3',5,5'-tetramethyl-4,4'-dihydroxy-1,1'-biphenyl, 3,3',5,5'-tetra(t-butyl)-4,4'-dihydroxy-1,1'-biphenyl, 2,2',3,3',5,5'-hexamethyl-4,4'-dihydroxy-1,1'-biphenyl, 2,4'-biphenol, 3,3'-dimethyl-2,4'-dihydroxy-1,1'-biphenyl, 3,3'-di(t-butyl)-2,4'-dihydroxy-1,1'-biphenyl, 2,2'-biphenol, 3,3'-dimethyl-2,2'-dihydroxy-1,1'-biphenyl, and 3,3'-di(t-butyl)-2,2'-dihydroxy-1,1'-biphenyl.

Examples of bisphenol components are bis(4-hydroxyphenyl)methane, bis(4-hydroxy-3-methylphenyl)methane, bis(4-hydroxy-3,5-dimethylphenyl)methane, 1,1-bis(4-hydroxyphenyl)ethane, 1,1-bis(4-hydroxy-3-methylphenyl)ethane, 1,1-bis(4-hydroxyphenyl)-1-phenylethane, 1,1-bis-(4-hydroxyphenyl)propane, 2,2-bis(4-hydroxyphenyl)propane, 2,2-bis(4-hydroxy-3-methylphenyl)propane, 2,2-bis-(4-hydroxy-3-methylphenyl)propane, bis-(4-hydroxy-3,5-dimethylphenyl)methane, bis-(4-hydroxyphenyl)methane, bis-(4-hydroxy-3-methylphenyl)methane, 1,1-bis(4-hydroxyphenyl)cyclopentane, 1,1-bis(4-hydroxyphenyl)cyclohexane, 1,1-bis(4-hydroxyphenyl)-3-methylcyclohexane, and 9,9-bis(4-hydroxyphenyl)fluorene.

The charge transport substance is not limited particularly, and any substance can be used. Examples of known charge transport substances are: electron attracting materials including aromatic nitro compounds such as 2,4,7-trinitrofluorenone, cyano compounds such as tetracyanoquinodimethane, and quinone compounds such as diphenoquinone; electron donating materials including heterocyclic compounds such as carbazole derivatives, indole derivatives, imidazole derivatives, oxazole derivatives, pyrazole derivatives, thiadiazole derivatives, and benzofuran derivatives, as well as aniline derivatives, hydrazone derivatives, aromatic amine derivatives, stilbene derivatives, butadiene derivatives, and enamine derivatives, in addition to the compounds in which two or more of the aforementioned compounds are linked with each other and polymers whose main chain or side chain has one or more of the aforementioned compounds; etc. Among these, preferred are carbazole derivatives, aromatic amine derivatives, stilbene derivatives, butadiene derivatives, and enamine derivatives, as well as the compounds in which two or more of the aforementioned compounds are linked with each other. These charge transport substances may be any one singly or alternatively, may be used in arbitrarily combination of two or more.

Examples of preferable structures of the charge transport substances are listed below. However, these examples are mentioned for the sake of exemplification, and any known charge transport substance may be used unless it runs counter to the spirit of the present invention. In the following structural formulae, Me represents a methyl group and n-Bu represents a normal butyl group.

[Chemical Formula 19]

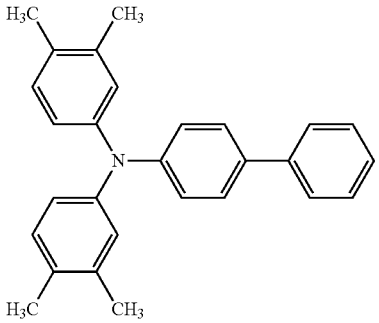

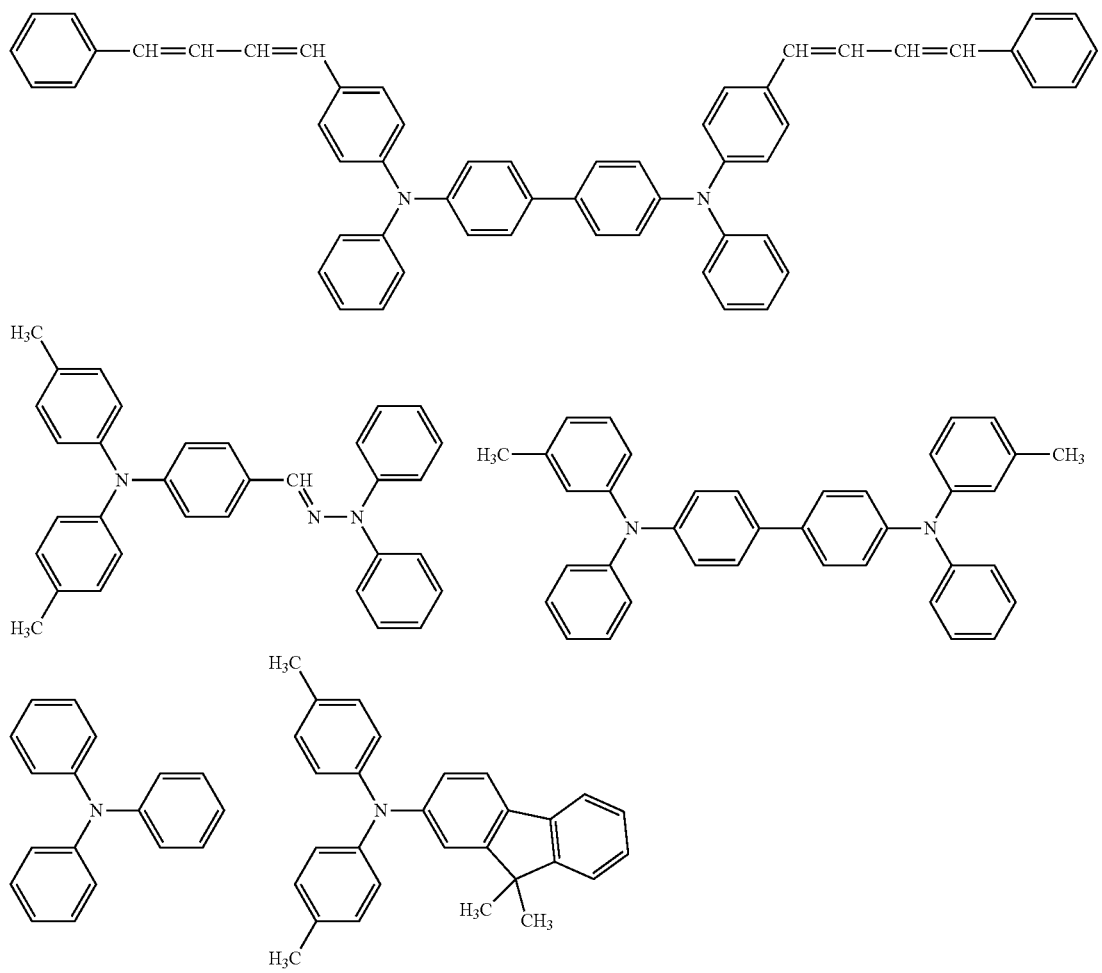
[Chemical Formula 20]
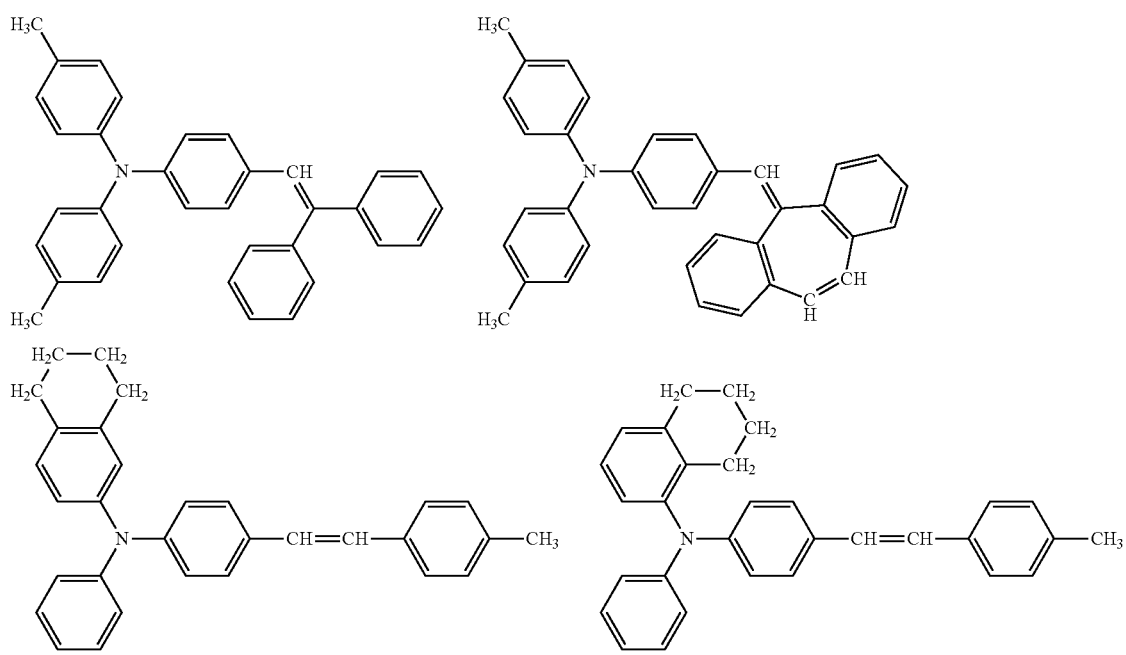

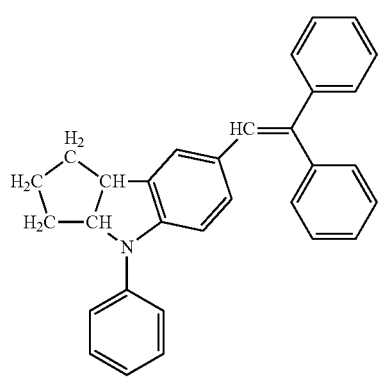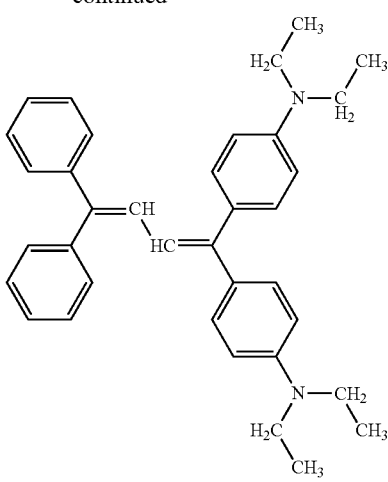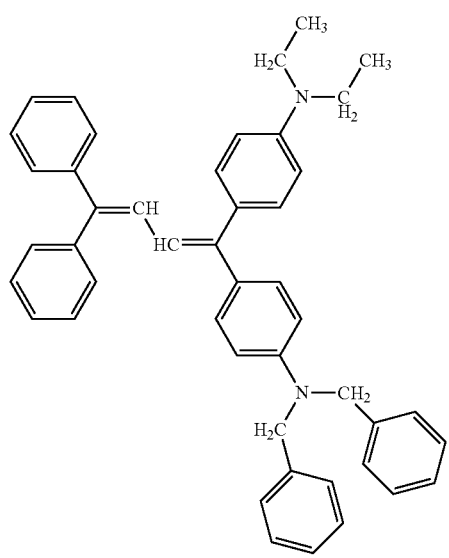
[Chemical Formula 21]
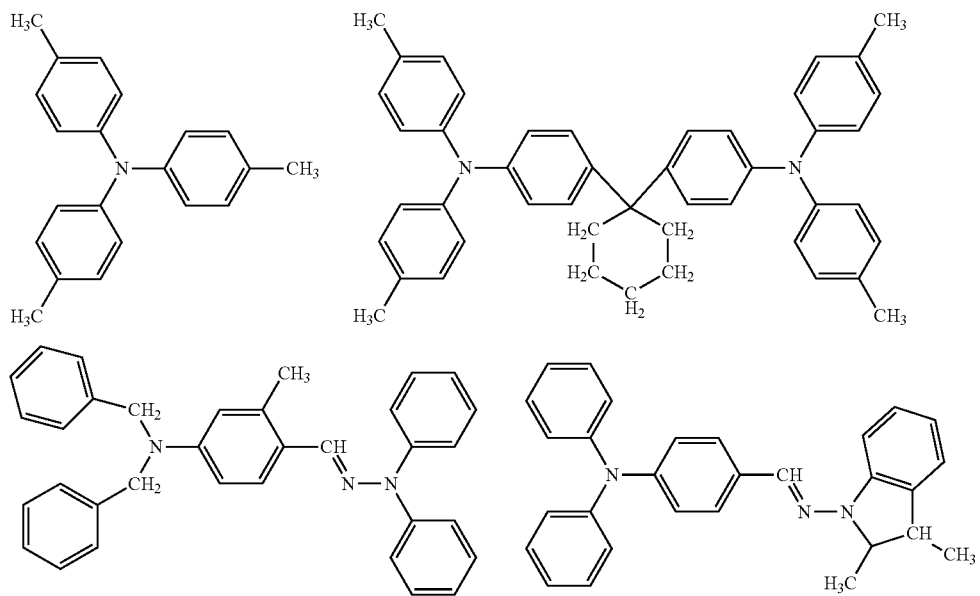

-continued
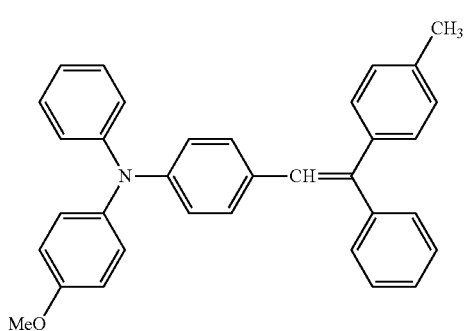
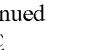
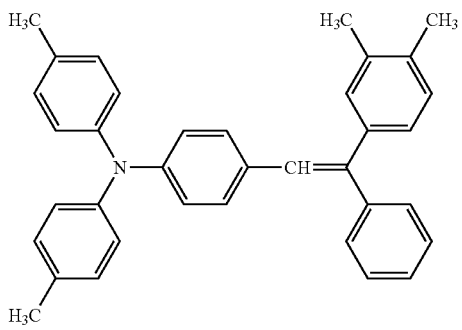
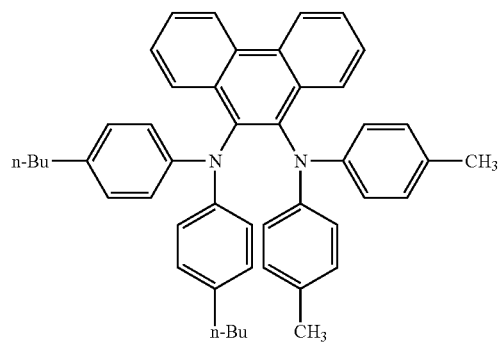
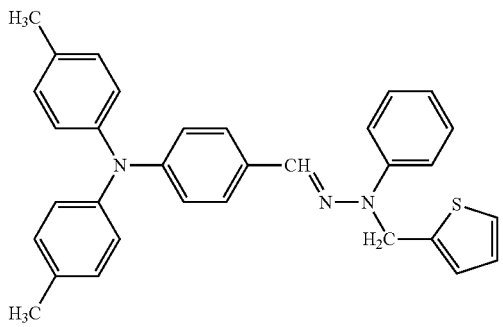
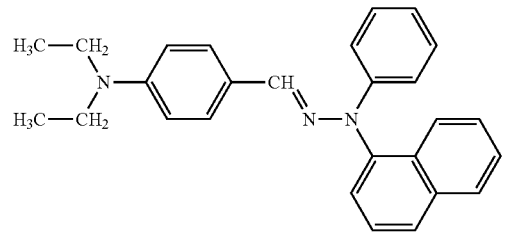
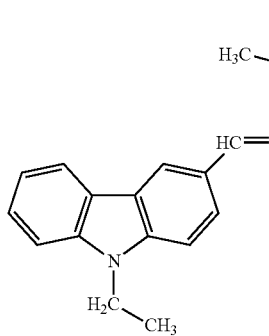
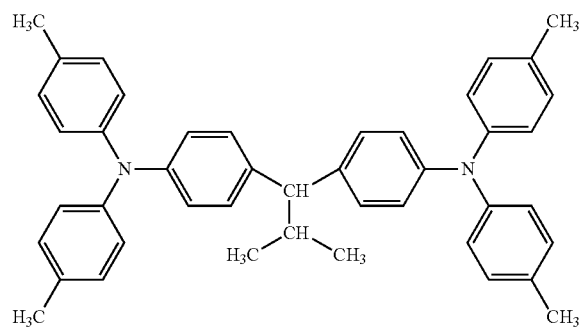

[Chemical Formula 22]

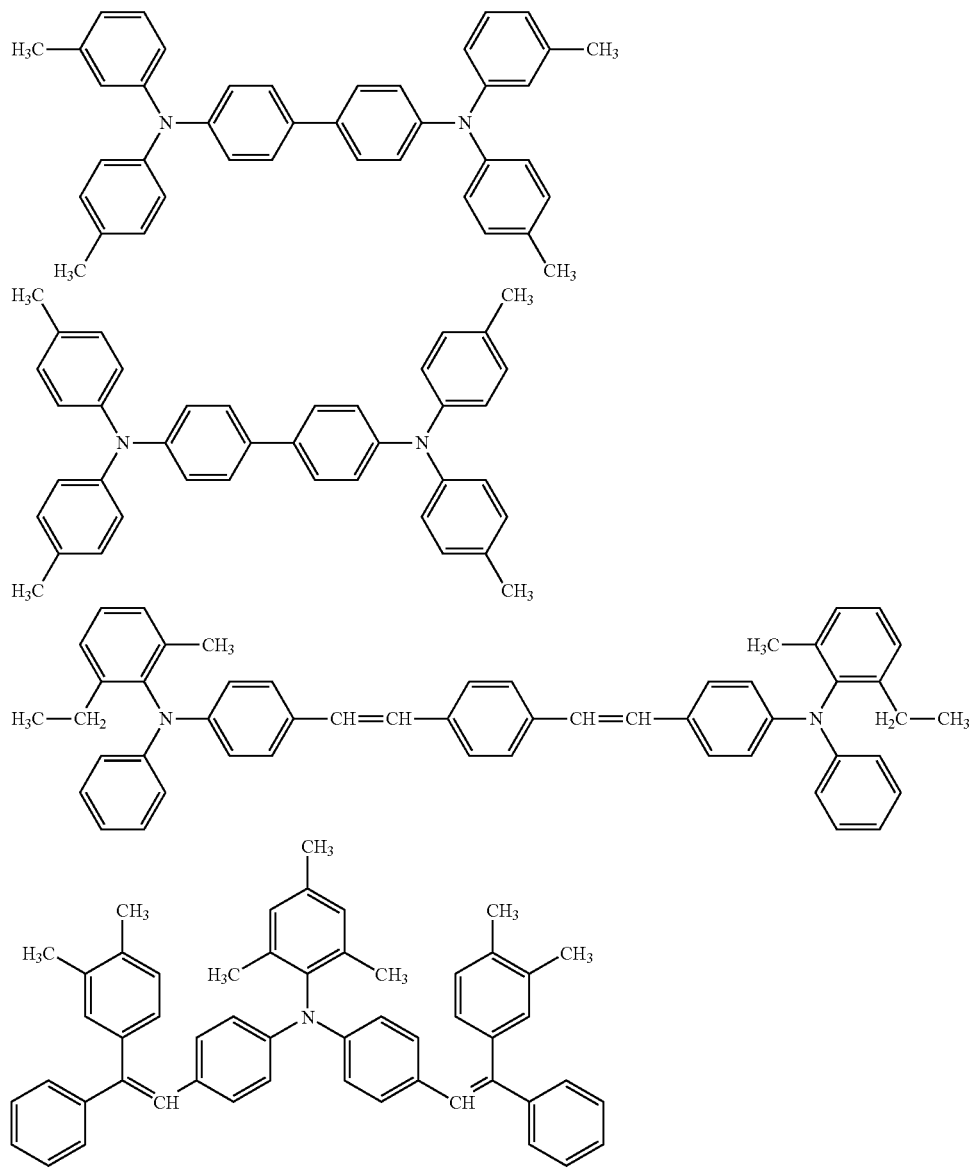

The rate between the binder resin and the charge transport substance can be selected arbitrarily, although the charge transport substance is used, with respect to 100 weight parts of binder resin, in a ratio of usually 20 weight parts or larger. The rate is preferably 30 weight parts or larger in the viewpoint of reducing residual potential, more preferably 40 weight parts or larger in view of stability during repetitive use and charge mobility. On the other hand, the charge transport substance is used in a ratio of usually 150 weight parts or smaller in the viewpoint of the thermal stability of photosensitive layer. The rate is preferably 120 weight parts or smaller in view of compatibility between the charge transport material and the binder resin, more preferably 100 weight parts or smaller in view of print resistance, especially preferably 80 weight parts or smaller in view of abrasion resistance.

The thickness of the charge transport layer is not particularly limited, although being within the range of usually 5 μm or larger, preferably 10 μm or larger, and usually 50 μm or smaller, preferably 45 μm or smaller, still preferably 30 μm or smaller in view of longevity and image stability as well as high resolution.

(Single-Layer Type Photosensitive Layer)

The single-layer type photosensitive layer is formed by using, in addition to the charge generation substance and the charge transport substance, binder resin for the sake of ensuring film strength, as is the charge transport layer of the multilayer type photosensitive layer. Specifically, the charge generation substance and the charge transport substance are dissolved or dispersed in a solvent with a various kinds of binder resin to be made into a coating solution, which is then applied onto the electroconductive substrate (when the undercoat layer exists, onto the undercoat layer) and subjected to drying.

The selections of the charge transport substance and the binder resin and the used ratio thereof are substantially the same as those explained above for the charge transport layer of the multilayer type photosensitive layer. The charge transport substance and the binder resin are made into a charge transport medium, in which the charge generation substance is also dispersed.

As the charge generation substance, those explained above for the charge generation layer of the multilayer type photosensitive layer can be also used, provided that the particle diameters of the charge generation substance need to be sufficiently small for the single-layer type photosensitive layer. Specifically, it is within the range of usually 1 µm or smaller, preferably 0.5 µm or smaller.

If the amount of the charge generation substance dispersed in the single-layer type photosensitive layer is too small, adequate sensitivity cannot be obtained while if the amount is too large, there arise disadvantages such as deterioration in charging property and decline in sensitivity. It is therefore used in an amount of within the range of usually 0.5 weight % or higher, preferably 1 weight % or higher, and usually 50 weight % or lower, preferably 20 weight % or lower with respect to the single-layer type photosensitive layer.

The thickness of the single-layer type photosensitive layer is usually 5 µm or larger, preferably 10 µm or larger, and usually 100 µm or smaller, preferably 50 µm or smaller.

In the single-layer type photosensitive layer, the binder resin and the charge generation substance are used in such a manner that the ratio of the charge generation substance with respect to 100 weight parts of binder resin is within the range of usually 0.1 weight part or larger, preferably 1 weight part or larger, and usually 30 weight parts or smaller, preferably 10 weight parts or smaller.

(Others)

Both for the multilayer type photosensitive layer and for the single-layer type photosensitive layer, it is possible to make the photosensitive layer or each of its component layers contain additives such as known antioxidants, plasticizers, ultraviolet absorbers, electron-attracting compounds, leveling agents, visible-light shielding agents, etc., for the purpose of improving film-formability, flexibility, coatability, stain resistance, gas resistance, light resistance, etc.

As examples of the additives used for, e.g., the charge transport layer, there can be mentioned additives such as various known plasticizers used for improving film-formability, flexibility, and mechanical strength, cross-linking agents, antioxidants, stabilizers, and sensitizers, as well as various leveling agents for improving coatability, dispersion assistants, etc. Examples of plasticizers are aromatic compounds such as phthalic acid esters, phosphate acid esters, epoxy compounds, chlorinated paraffins, chlorinated fatty acid esters, and methylnaphthalenes, while examples of leveling agents include silicone oils and fluorine oils.

Also, both in the multilayer type photosensitive layer and in the single-layer type photosensitive layer, the photosensitive layer formed according to the aforementioned procedure may be left as the uppermost layer, i.e., the surface layer. Alternatively, it is also acceptable to form an additional layer thereon as the surface layer.

For example, it is possible to form a protective layer for the purposes of protecting the photosensitive layer against attrition and preventing or lessening degradation of the photosensitive layer due to causes such as electric discharge products generating from the charging device.

The protective layer is formable by making the electroconductive material contain in appropriate binder resin. It is also possible to adopt copolymers using compounds with charge transport capacity, such as triphenylamine skeletons described in Japanese Patent Laid-Open Publication No. Hei 9-190004.

As the electroconductive material used for the protective layer, it is possible to use aromatic amino compounds such as TPD (N,N'-diphenyl-N,N'-bis-(m-tolyl)benzidine), and metal oxides such as antimony oxide, indium oxide, tin oxide, titanium oxide, tin oxide-antimony oxide, aluminum oxide, and zinc oxide, although the usable compounds are not limited to the above examples.

As the binder resin used for the protective layer, there can be mentioned various known resins such as polyamide resin, polyurethane resin, polyester resin, epoxy resin, polyketone resin, polycarbonate resin, polyvinyl ketone resin, polystyrene resin, polyacryl amide resin, siloxane resin, as well as copolymers containing skeletons with charge transport capacity, such as triphenylamine skeletons described in Japanese Patent Laid-Open Publication No. Hei 9-190004 and Japanese Patent Laid-Open Publication No. Hei 10-252377, together with the aforementioned resins.

The protective layer is desired to have an electric resistance value of within the range of usually $10^9$ Ω·cm or higher and $10^{14}$ Ω·cm or lower. If the electric resistance exceeds the aforesaid range, residual potential may rise to bring about a lot of fogging on images, while if the electric resistance falls short of the aforesaid range, blurring of images and reduction in resolution of images may occur. In addition, the protective layer must be formed in such a manner as not to substantially prevent incident light from passing therethrough during image exposure.

With a view to reducing friction resistance and preventing abrasion of the photoreceptor's surface as well as improving transfer efficiency of toner from the photoreceptor to a transfer belt or a paper form, the surface layer may contain one or more of resins such as fluorine resin, silicone resin, polyethylene resin, etc., as well as the particles of these resins and the particles of inorganic compounds. Alternatively, it is also possible to form an additional layer containing one or more of these resins and particles as a surface layer.

[4-4. Method of Forming the Layers]

It is possible to form the above-explained layers constituting the photoreceptor by carrying out, for each of the layers, the process in which the components of the individual layer are dissolved or dispersed in a solvent or dispersion medium to be made into a coating solution, which is then subjected to application and subsequent drying. The solvent or dispersion medium to be used for the process and the amount thereof are not particularly limited, although preferably being adjusted as appropriate with consideration given to the purpose of the individual layer and the characteristics of the selected solvent or dispersion medium, in such a manner that the properties of the coating solution, such as solid content and viscosity, settle within desired ranges.

In order to form the single-layer type photosensitive layer and the charge transport layer of the multilayer type photosensitive layer, for example, the solid content of the coating solution is adjusted to be within the range usually 5 weight % or higher, preferably 10 weight % or higher and usually 40 weight % or lower, preferably 35 weight % or lower. Also, the viscosity of the coating solution is adjusted to be within the range of usually 10 cps or higher, preferably 50 cps or higher, and usually 500 cps or lower, preferably 400 cps or lower.

On the other hand, in order to form the charge generation layer of the multilayer type photosensitive layer, the solid content of the coating solution is adjusted to be within the range of usually 0.1 weight % or higher, preferably 1 weight % or higher, and usually 15 weight % or lower, preferably 10 weight % or lower. Also, the viscosity of the coating solution is adjusted to be within the range of usually 0.01 cps or higher, preferably 0.1 cps or higher, and usually 20 cps or lower, preferably 10 cps or lower.

There is no particular restraint on the selection of the solvent or dispersion medium to be used for preparing the coating solution. Examples of the solvent or dispersion medium are: alcohols such as methanol, ethanol, propanol, and 2-methoxy ethanol; ethers such as tetrahydrofuran, 1,4-dioxane, and dimethoxyethane; esters such as methyl formate and ethyl acetate; ketones such as acetone, methyl ethyl ketone, cyclohexanone, and 4-methoxy-4-methyl-2-pentanol; aromatic hydrocarbons such as benzene, toluene, and xylene; chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichloroethylene; nitrogen-containing compounds such as n-butylamine, isopropanolamine, diethylamine, triethanolamine, ethylenediamine, and triethylenediamine; aprotic polar solvents such as acetonitrile, N-methylpyrrolidone, N,N-dimethyl formamide, and dimethylsulfoxide; etc. These may be used one singly, or may be used two or more in arbitrary combination in their kinds.

The application of the coating solution can be carried out by dip coating method, spray coating method, spinner coating method, bead coating method, wirebar coating method, blade coating method, roller coating method, air knife coating method, and curtain coating method, as well as any other known coating methods.

In the drying process, the coating solution is preferably first dried to touch at room temperature and then heat-dried at a temperature within the range of usually 30° C. or higher and 200° C. or lower for a minute through two hours under a still or ventilated condition. Heating temperature may be either kept constant or varied during the drying process.

[5. Image Forming Apparatus]

Next, explanation will be given of an embodiment of the image forming apparatus (the image forming apparatus of the present invention) using the electrophotographic photoreceptor of the present invention with reference to FIG. 73, which shows the constitution of the substantial part of the apparatus. However, the embodiments of the present invention are not limited to the following explanation, but can be implemented with arbitrary modification unless it runs counter to the gist of the present invention.

Figure 73:
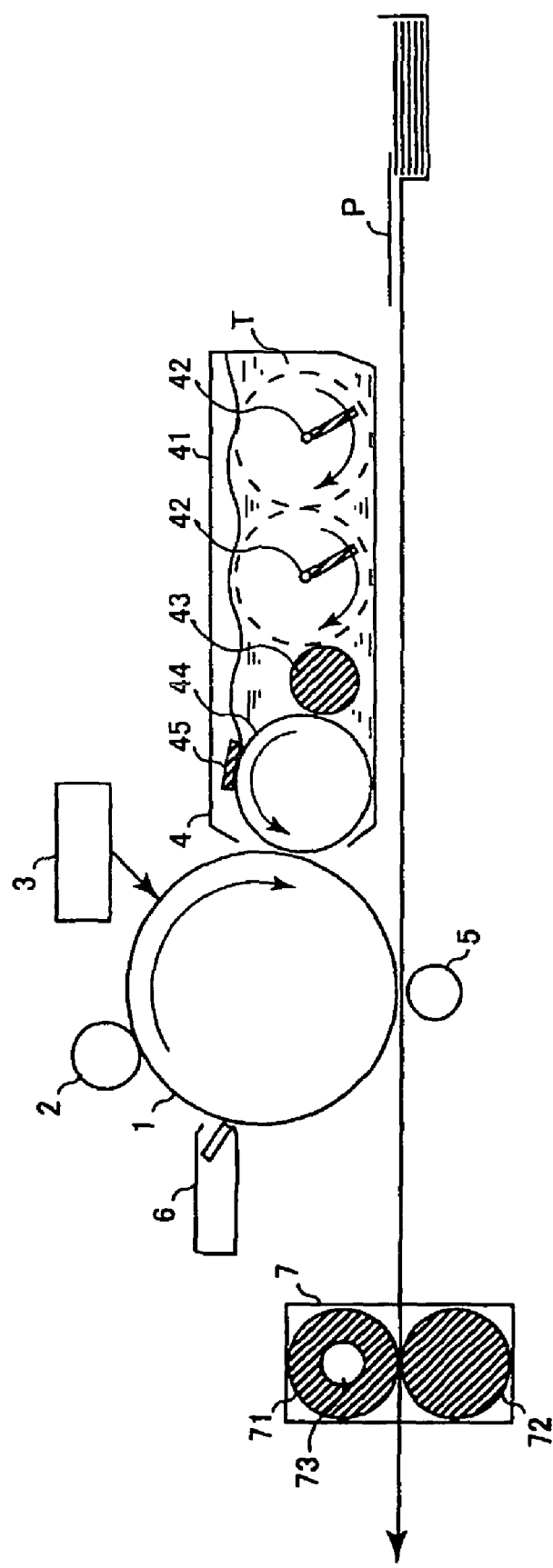
FIG. 73 is a schematic diagram showing the constitution of the principal part of an embodiment of the image forming apparatus according to the present invention.

As shown in FIG. 73, the image forming apparatus is constituted by components including an electrophotographic photoreceptor 1, an electrical charging apparatus 2, an exposing apparatus 3, and a developing apparatus 4, with optional components provided as necessary, including a transfer apparatus 5, a cleaning apparatus 6 and a fixing apparatus 7.

The electrophotographic photoreceptor 1 is not limited particularly as long as the aforementioned electrophotographic photoreceptor of the present invention is used, although FIG. 73 indicates, as an example, a drum-shaped photoreceptor in which the aforementioned photosensitive layer is formed on the cylindrical surface of the electroconductive substrate. Along the circumferential surface of the electrophotographic photoreceptor 1 is arranged each of the electrical charging apparatus 2, the exposing apparatus 3, the developing apparatus 4, the transfer apparatus 5, and the cleaning apparatus 6.

The electrical charging apparatus 2 is intended to electrically charge the electrophotographic photoreceptor 1 and capable of electrically charging the surface of the electrophotographic photoreceptor 1 uniformly to a desired electric potential. Examples of commonly used electrical charging apparatus are: corona electrical charging apparatuses such as corotrons or scorotrons; and direct electrical charging apparatuses, e.g., contact-type electrical charging apparatuses having a direct electrical charging member, such as charging brush, to which a voltage is applied and which is then brought into contact with the photoreceptor's surface so as to carry out electrical charging. Examples of the direct electrical charging means include contact charging devices such as charging rollers and charging brushes. As an example of the electrical charging apparatus 2, FIG. 73 indicates a roller-type charging apparatus (charging roller). The direct electrical charging means may carry out either charging that involves aerial electric discharge or injection charging that does not involve aerial electric discharge. The voltage may be applied to during charging either using a direct current alone or using a superimposed current in which an alternating current is superimposed on a direct current.

There is no particular restraint on the selection of the exposing apparatus 3 as long as it can carry out exposure of the electrophotographic photoreceptor 1 to thereby form an electrostatic latent image on the photosensitive surface of the electrophotographic photoreceptor 1. Examples are halogen lamps, fluorescent lamps, lasers such as semiconductor laser and He—Ne laser, LED, etc. It is also possible to carry out exposure of the photoreceptor using an exposing method from inside the photoreceptor. The light used for the exposure may be selected arbitrarily, examples of which include monochromatic light with a wavelength of about 780 nm, monochromatic light with slightly shorter wavelengths of about 600 nm to 700 nm, and monochromatic light with short wavelengths of about 380 nm to 500 nm.

The developing apparatus 4 is not limited particularly in its type, and may be any known apparatus using either dry development method, such as cascade development, monocomponent insulating toner development, monocomponent conductive toner development, and two-component magnetic brush development, or wet process development method. FIG. 73 shows a constitution in which the developing apparatus 4 which comprises a developing bath 41, agitators 42, a feeding roller 43, a developing roller 44, and a regulating member 45, and toner T is stored in the developing bath 41. In addition, the developing apparatus 4 may be provided, as necessary, with a supplying apparatus (not shown in the figure) for supplying the toner T. The supplying apparatus is constituted in such a manner as to be capable of supplying the toner T from a receptacle such as a bottle or a cartridge.

The feeding roller 43 is composed of an electroconductive sponge or the like. The developing roller 44 may be formed as: a metal roll made of iron, stainless steel, aluminum, nickel, etc.; a resin roll in which such a metal roll is coated with a resin such as silicone resin, urethane resin, fluorine resin, etc.; or the like. As necessary, the surface of the developing roller 44 may undergo smoothing processing or roughening processing beforehand.

The developing roller 44 is arranged between the electrophotographic photoreceptor 1 and the feeding roller 43 and is in direct contact with each of the electrophotographic photoreceptor 1 and the feeding roller 43. The feeding roller 43 and the developing roller 44 are each rotated by a rotation drive mechanism (not shown in the figure). The feeding roller 43 carries the stored toner T and provides it to the developing roller 44. The developing roller 44 carries the toner T provided by the feeding roller 43 and brings it into contact with the surface of the electrophotographic photoreceptor 1.

The regulating member 45 may be formed as: a resin blade made of silicone resin, urethane resin, etc.; a metal blade made of stainless steel, aluminum, copper, brass, phosphor bronze, etc.; a blade in which such a metal blade is resin-coated; etc. The regulating member 45 is in direct contact with the developing roller 44 and pressed onto the developing roller 44 under a predetermined force (normal blade linear load is 5-500 g/cm) by means of a spring or the like. As necessary, the regulating member 45 may also be equipped with the function of electrically charging the toner T by means of triboelectric charging with the toner T.

The agitators 42 are each rotated by a rotation drive mechanism so as to agitate the toner T and transfer the toner T toward the feeding roller 43. There may also be provided plural agitators 42 whose blades are different with each other in their shapes, sizes, etc.

As the toner, it is possible to use not only grinded toner but also chemical toner obtained by suspension granulation, suspension polymerization, emulsion polymerization agglomeration, or the like. When the chemical toner in particular is used, it is preferable to have a small particle diameter of about 4-8 μm, and may have any shape from a substantially spherical shape to a shape deviating from spherical such as a potato shape or a rugby ball. The polymerization toner in particular is superior in charging uniformity and transferability and therefore suitable for enhancing image quality.

The kind of the toner T is not limited: it is possible to use not only grinded toner but also chemical toner obtained by suspension granulation, suspension polymerization, emulsion polymerization agglomeration, or the like. When the chemical toner is used, it is preferable to have a small particle diameter of about 4-8 μm, and may have any shape ranging from a substantially spherical shape to a shape deviating from spherical such as a potato shape or a rugby ball. The polymerization toner in particular is superior in charging uniformity and transferability and therefore suitable for enhancing image quality.

There is no restraint on the selection of the transfer apparatus 5: it is possible to use various apparatuses employing any methods including: electrostatic transfer methods such as corona transfer, roller transfer, and belt transfer; pressure transfer method; and adhesive transfer method. In this embodiment, the transfer apparatus 5 is formed as a transfer charger, a transfer roller, a transfer belt, or the like, that is arranged facing the electrophotographic photoreceptor 1. The transfer apparatus 5 applies a predetermined voltage (transfer voltage) having a reverse polarity to the electric potential charged to the toner T to thereby transfer the toner image formed on the electrophotographic photoreceptor 1 onto paper (form, medium) P.

The cleaning apparatus 6 is not particularly limited; it is possible to use any cleaning apparatuses including brush cleaners, magnetic brush cleaners, electrostatic brush cleaners, magnetic roller cleaners, and blade cleaners. The cleaning apparatus 6 scrapes away residual toner adhered to the photoreceptor 1 by means of a cleaning member to collect the residual toner. The cleaning apparatus 6 may be omitted if only a small amount of, or almost no amount of, residual toner appears.

The fixing apparatus 7 comprises an upper fixing member (fixing roller) 71 and a lower fixing member (fixing roller) 72, and a heating apparatus 73 is disposed in either fixing member 71 or 72. FIG. 73 illustrates an example in which the heating apparatus 73 is provided in the upper fixing member 71. As each of the upper and lower fixing member 71, 72, it is possible to use various known heat fixing members including a fixing roll in which a metal tube such as stainless or aluminum is coated with silicone rubber, a fixing roll further coated with Teflon (registered trademark) resin, a fixing sheet, etc. In addition, the fixing members 71, 72 may be configured to provide a mold release agent such as silicone oil for improving mold releaseability, and also may be forced to exert pressure on each other by means of a spring or the like.

The toner transferred onto the paper P is passes through the upper fixing member 71 and the lower fixing member 72 heated at a predetermined temperature, during which passage the toner is heated and brought into a fused state. After the passage the toner is then cooled and fixed on the paper P.

There is no particular restraint on the selection of the fixing apparatus, which may employ any methods from the method illustrated above to heat-roller fixing, flash fixing, oven fixing, pressure fixing.

In the electrophotographic apparatus constituted above, image recording is carried out in the following manner. First, the surface of the photoreceptor 1 (photosensitive surface) is electrically charged to a predetermined electric potential (e.g., −600V) by the electrical charging apparatus 2. The charging may be carried out either using a direct current or using a current in which a direct current voltage is superimposed on an alternating current voltage.

Next, the electrically charged photosensitive surface of the photoreceptor 1 is then subjected to exposure by the exposing apparatus 3 in accordance with an image to be recorded, so that an electrostatic latent image is formed on the photosensitive surface. Subsequently, the electrostatic latent image formed on the photosensitive surface of the photoreceptor 1 undergoes development by the developing apparatus 4.

In the developing apparatus 4, the toner T provided by the feeding roller 43 is made into the form of a thin layer by the regulating member (developing blade) 45 while being charged with a predetermined polarity (in the embodiment, the same polarity as that of the electric potential charged to the photoreceptor 1, i.e., negative polar) through triboelectric charging. The toner is then carried and transferred by the developing roller 44, and brought into contact with the surface of the photoreceptor 1.

When the electrically charged toner T carried by the developing roller 44 is made into contact with the surface of the photoreceptor 1, a toner image corresponding to the electrostatic latent image is formed on the photosensitive surface of the photoreceptor 1. The toner image is then transferred onto the paper P by the transfer apparatus 5, after which the cleaning apparatus 6 removes the residual toner that stays on the photosensitive surface of the photoreceptor 1 without being transferred.

Subsequently to the transfer of the toner image onto the paper P, the toner image is passed through the fixing apparatus 7 and thermally fixed on the paper P, whereby the ultimate image is obtained.

The image forming apparatus may be configured to carry out neutralization process in addition to the aforementioned configuration. The neutralization process is a process of removing electrical charge of the electrophotographic photoreceptor through exposure of the electrophotographic photoreceptor. The apparatus used for neutralization may be a fluorescent lamp, LED, or the like. The light used for the neutralization process frequently has exposure energy whose strength is three-times as high as that of the exposure light or still higher.

Also, the image forming apparatus may be constituted with further modifications. For example, it may be configured to carry out an additional process such as pre-exposure process or auxiliary charging process, may be configured for offset printing, and may be configured as a full-color tandem type employing plural kinds of toner.

In the meantime, it is also possible to combine the electrophotographic photoreceptor 1 with any one or any two or more of the electrical charging apparatus 2, the exposing apparatus 3, the developing apparatus 4, the transfer apparatus 5, the cleaning apparatus 6, and the fixing apparatus 7 to form a integral-type cartridge (hereinafter also called "electrophotographic photoreceptor cartridge"), and to make the electrophotographic photoreceptor cartridge detachable from and attachable to the main body of the electrophotographic apparatus such as a copying machine or a laser-beam printer. According to the embodiment, even when the electrophotographic photoreceptor 1 or any other component becomes deteriorated, for example, it becomes possible to detach the electrophotographic photoreceptor cartridge from the main body of the image forming apparatus and attach a new electrophotographic photoreceptor cartridge to the main body of the image forming apparatus, so that the image forming apparatus becomes easy to carry out maintenance management.

Up to this point, the present invention has been explained in detail with reference to specific embodiments, although it is obvious for those skilled in the art that various modifications are possible without departing the aim and the scope of the present invention.

The present invention is based on the specification of Japanese Patent Application No. 2004-60851 filed Mar. 4, 2004, the specification of Japanese Patent Application No. 2004-66071 filed Mar. 9, 2004, and the specification of Japanese Patent Application No. 2005-60785 filed Mar. 4, 2005, and their entireties are incorporated herewith by reference.

EXAMPLES

The present invention will be explained in further detail with reference to Examples and Comparative Examples mentioned below. These Examples are mentioned for the sake of explaining the present invention in detail, and the present invention is not limited to the following Examples unless it runs counter to the spirit of the present invention. Incidentally, in the following Preparation Examples and Examples, the term "part" means "weight part".

Examples Corresponding to Phthalocyanine Composite of Present Invention

I. Synthesis of Phthalocyanine Compounds

Preparation Example 1

Synthesis of α-Form Oxytitanyl Phthalocyanine Crystal

α-form oxytitanyl phthalocyanine was prepared by carrying out the same procedure as the method described in "Example 1" of Japanese Patent Laid-Open Publication No. Hei 2-308863. A powder X-ray diffraction pattern of the obtained α-form oxytitanyl phthalocyanine is shown in FIG. 1.

Preparation Example 2

Synthesis of Chlorogallium Phthalocyanine Crystal

Figure 2:
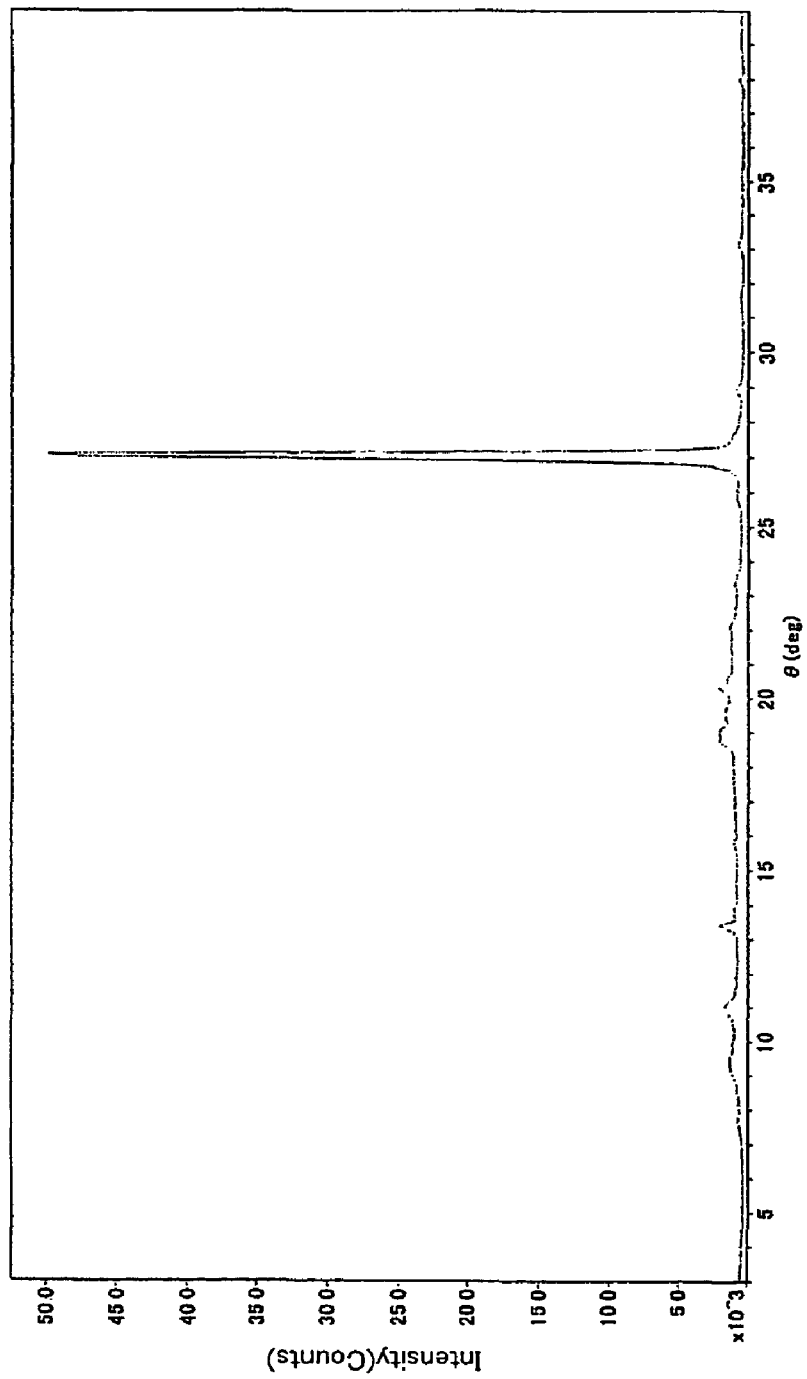
FIG. 2 is a powder X-ray diffraction pattern of the chlorogallium phthalocyanine crystal produced in Preparation Example 2.

Chlorogallium phthalocyanine was prepared by carrying out the same procedure as Example 1 of Japanese Patent Laid-Open Publication No. Hei 6-73303. A powder X-ray diffraction pattern of the obtained chlorogallium phthalocyanine is shown in FIG. 2.

Preparation Example 3

Figure 3:
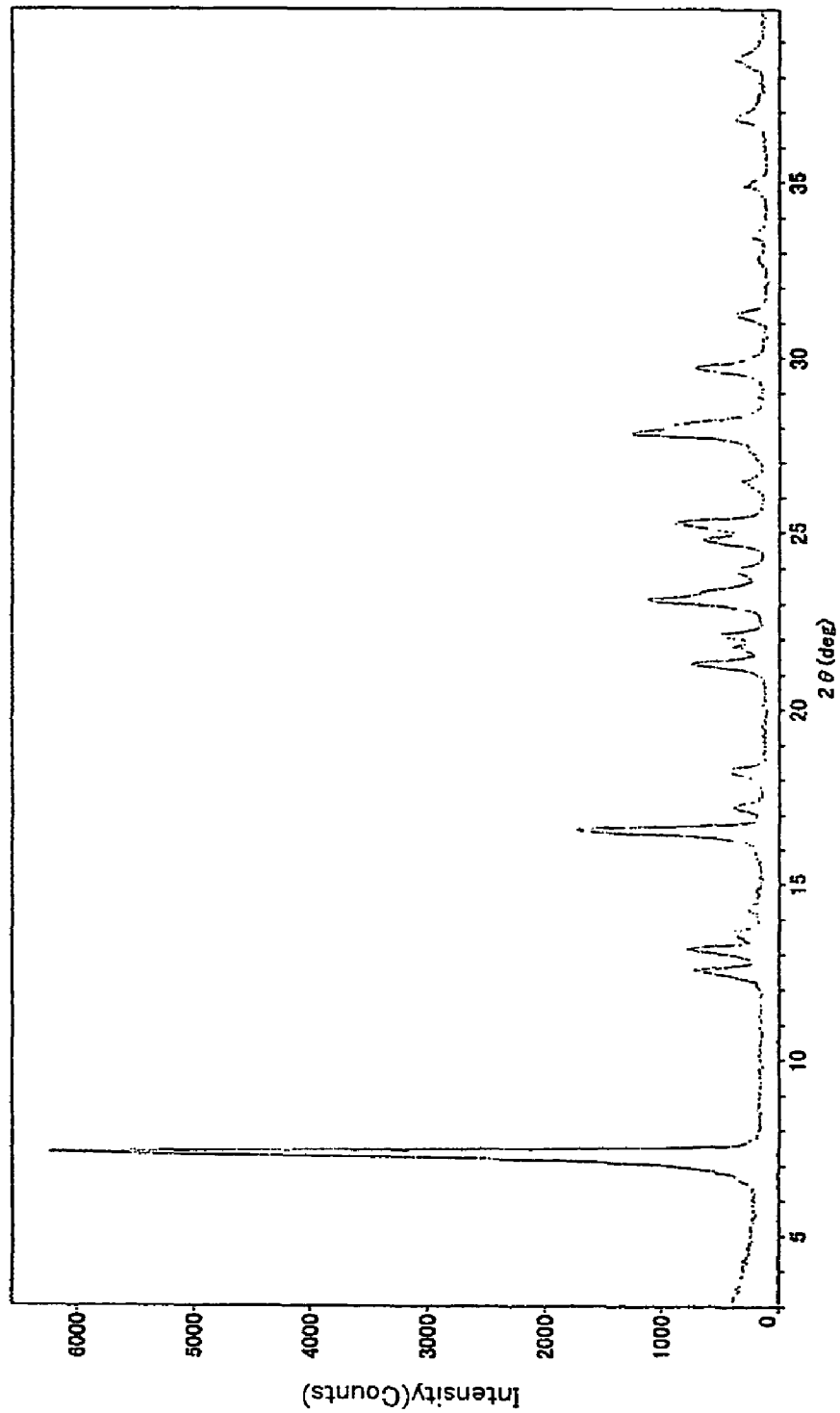
FIG. 3 is a powder X-ray diffraction pattern of the chloroindium phthalocyanine crystal produced in Preparation Example 3.

Synthesis of Chloroindium Phthalocyanine Crystal 50 parts of ortho-phthalonitrile and 23.7 parts of indium trichloride were added in 250 parts of α-chloronaphthalene and made reacted at 200° C. for 13 hours, after which the product was filtered during hot state and washed with N-methylpyrrolidone, methanol, toluene, and water. The obtained wet cake was then dried to produce 27 parts of chloroindium phthalocyanine (yield: 42%). A powder X-ray diffraction pattern of the obtained chloroindium phthalocyanine is shown in FIG. 3.

Preparation Example 4

Figure 4:
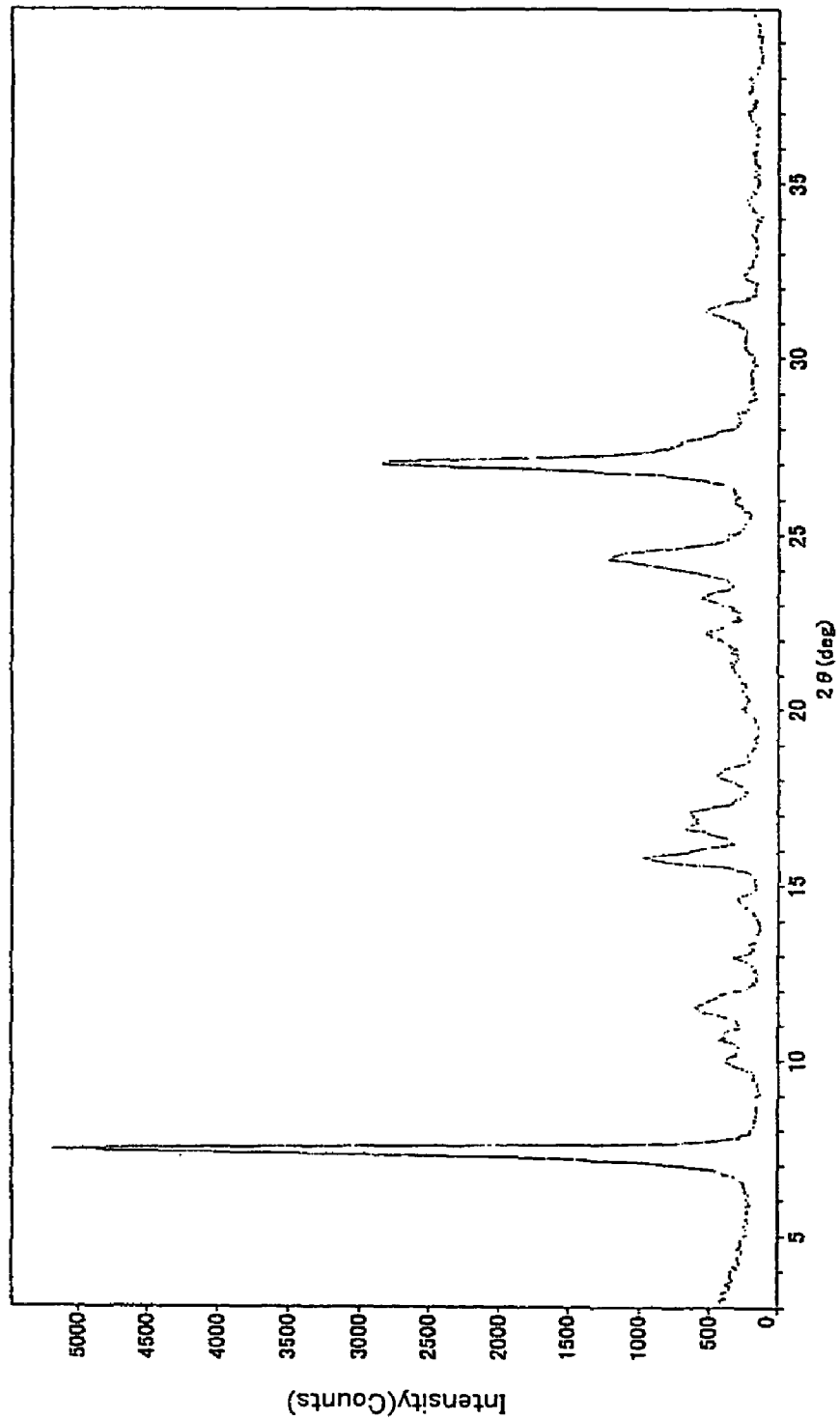
FIG. 4 is a powder X-ray diffraction pattern of the tetrafluorooxytitanyl phthalocyanine crystal produced in Preparation Example 4.

Synthesis of Tetrafluorooxytitanyl Phthalocyanine Crystal 17.5 parts of 4-fluorophthalonitrile and 6 parts of titanium tetrachloride were added in 130 parts of α-chloronaphthalene and made reacted at 200° C. for 4 hours, after which the product was filtered during hot state and washed with N-methylpyrrolidone, methanol, toluene, and water. The obtained wet cake was then dried to produce 8.0 parts of tetrafluorooxytitanyl phthalocyanine crystal (yield: 40%). A powder X-ray diffraction pattern of the obtained tetrafluorooxytitanyl phthalocyanine crystal is shown in FIG. 4.

Preparation Example 5

Figure 5:
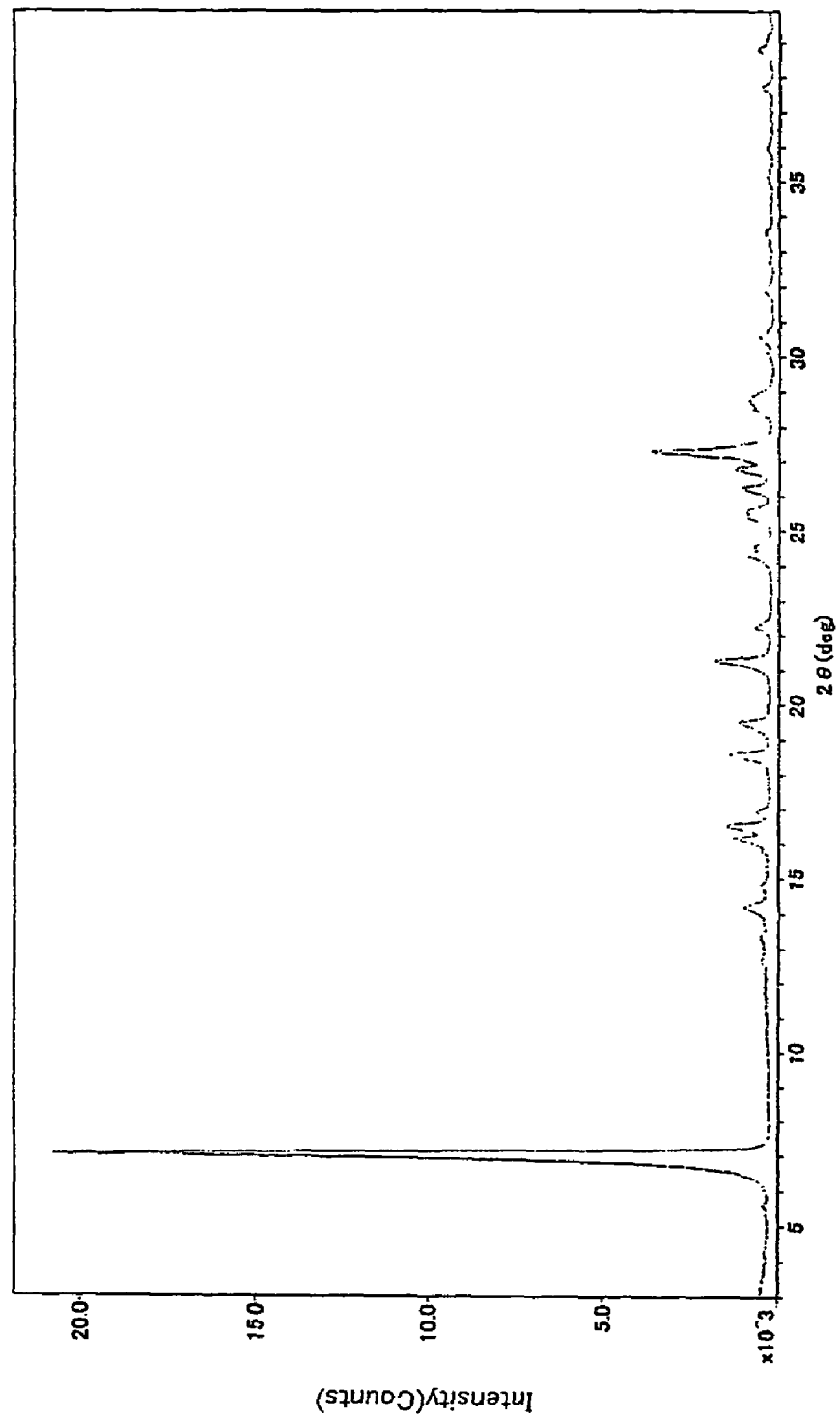
FIG. 5 is a powder X-ray diffraction pattern of the tetrafluorochlorogallium phthalocyanine crystal produced in Preparation Example 5.

Synthesis of a Tetrafluorochlorogallium Phthalocyanine Crystal 26.7 parts of 4-fluorophthalonitrile and 7.5 parts of gallium trichloride were added in 100 parts of α-chloronaphthalene and made reacted at 210° C. for 8.5 hours, after which the product was filtered during hot state and washed with N-methyl pyrrolidone, methanol, toluene, and water. The obtained wet cake was then dried to produce 19.2 parts of tetrafluorochlorogallium phthalocyanine crystal (yield: 61%). A powder X-ray diffraction pattern of the obtained tetrafluorochlorogallium phthalocyanine crystal is shown in FIG. 5.

Preparation Example 6

Figure 6:
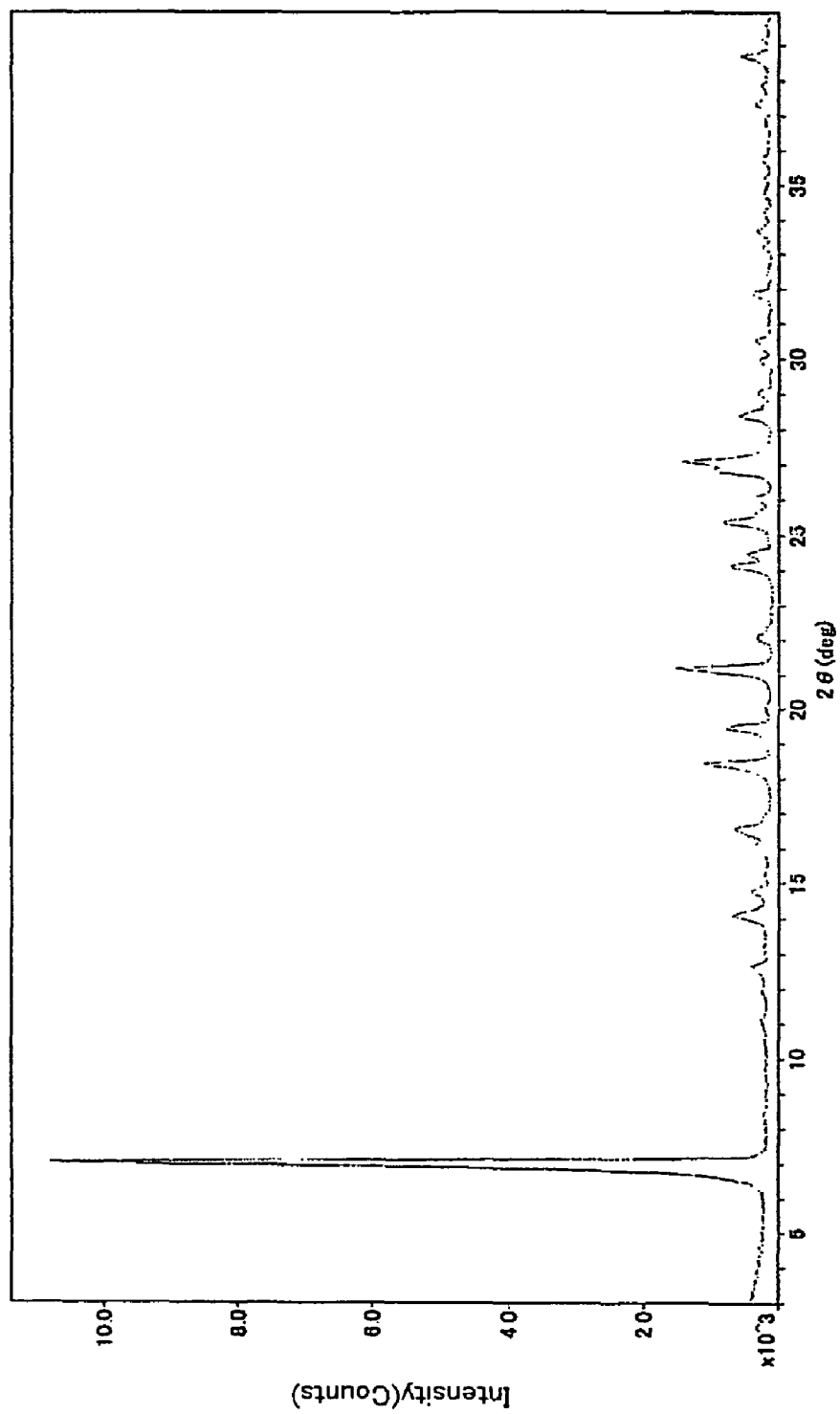
FIG. 6 is a powder X-ray diffraction pattern of the tetrafluorochloroindium phthalocyanine crystal produced in Preparation Example 6.

Synthesis of Tetrafluorochloroindium Phthalocyanine Crystal 22.6 parts of 4-fluorophthalonitrile and 8 parts of indium trichloride were added in 70 parts of α-chloronaphthalene and made reacted at 200° C. for 11 hours, after which the product was filtered during hot state and washed with N-methylpyrrolidone, methanol, toluene, and water. The obtained wet cake was then dried to produce 14.2 parts of tetrafluorochloroindium phthalocyanine crystal (yield: 59%). A powder X-ray diffraction pattern of the obtained tetrafluorochloroindium phthalocyanine crystal is shown in FIG. 6.

Preparation Example 7

Figure 7:
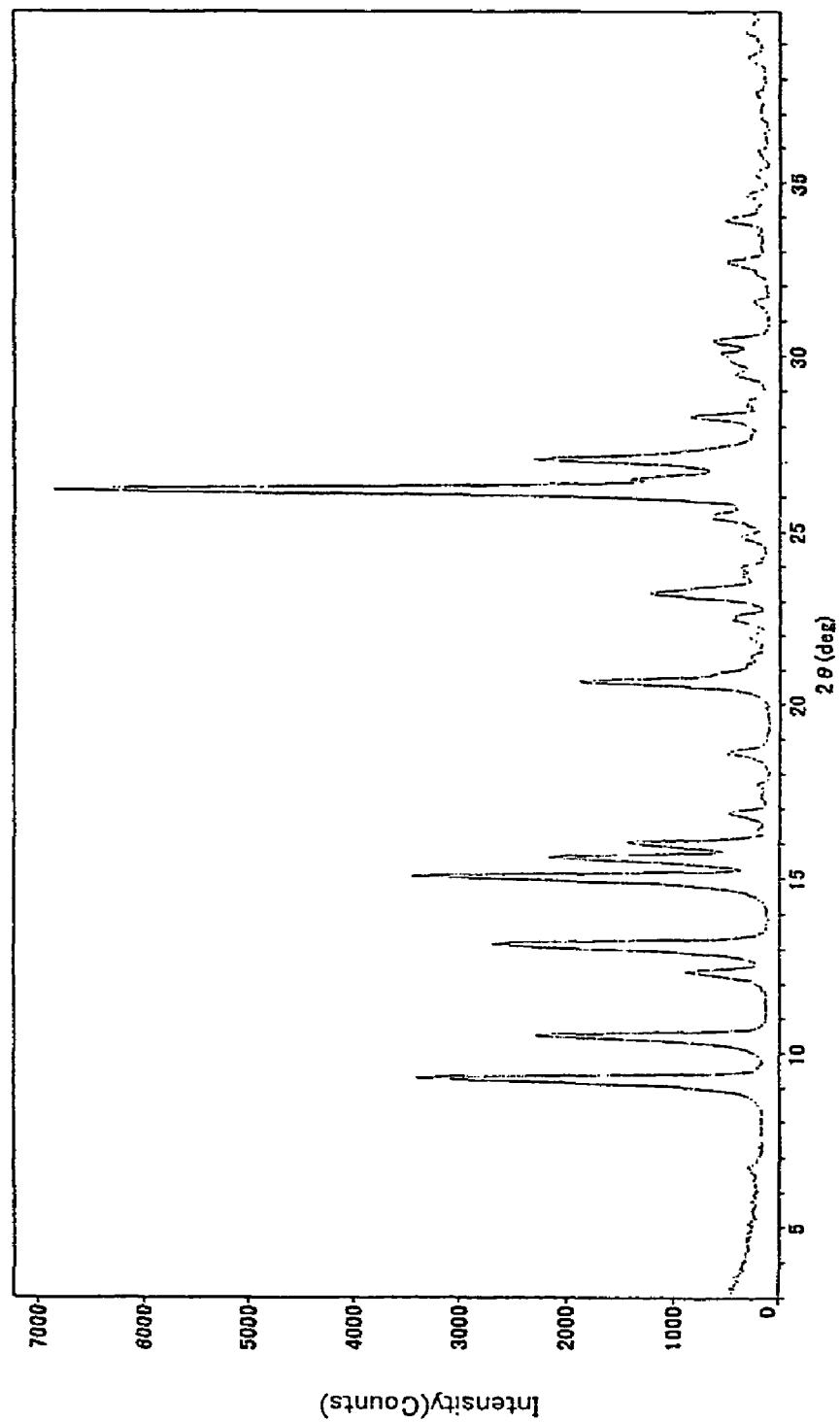
FIG. 7 is a powder X-ray diffraction pattern of the β-form oxytitanyl phthalocyanine crystal produced in Preparation Example 7.

Synthesis of β-Form Oxytitanyl Phthalocyanine Crystal

β-form oxytitanyl phthalocyanine was prepared by carrying out the same procedure as Production Example 1 of Japanese Patent Laid-Open Publication No. Sho 62-67094. A powder X-ray diffraction pattern of the obtained β-form oxytitanyl phthalocyanine is shown in FIG. 7.

Preparation Example 8

Figure 8:
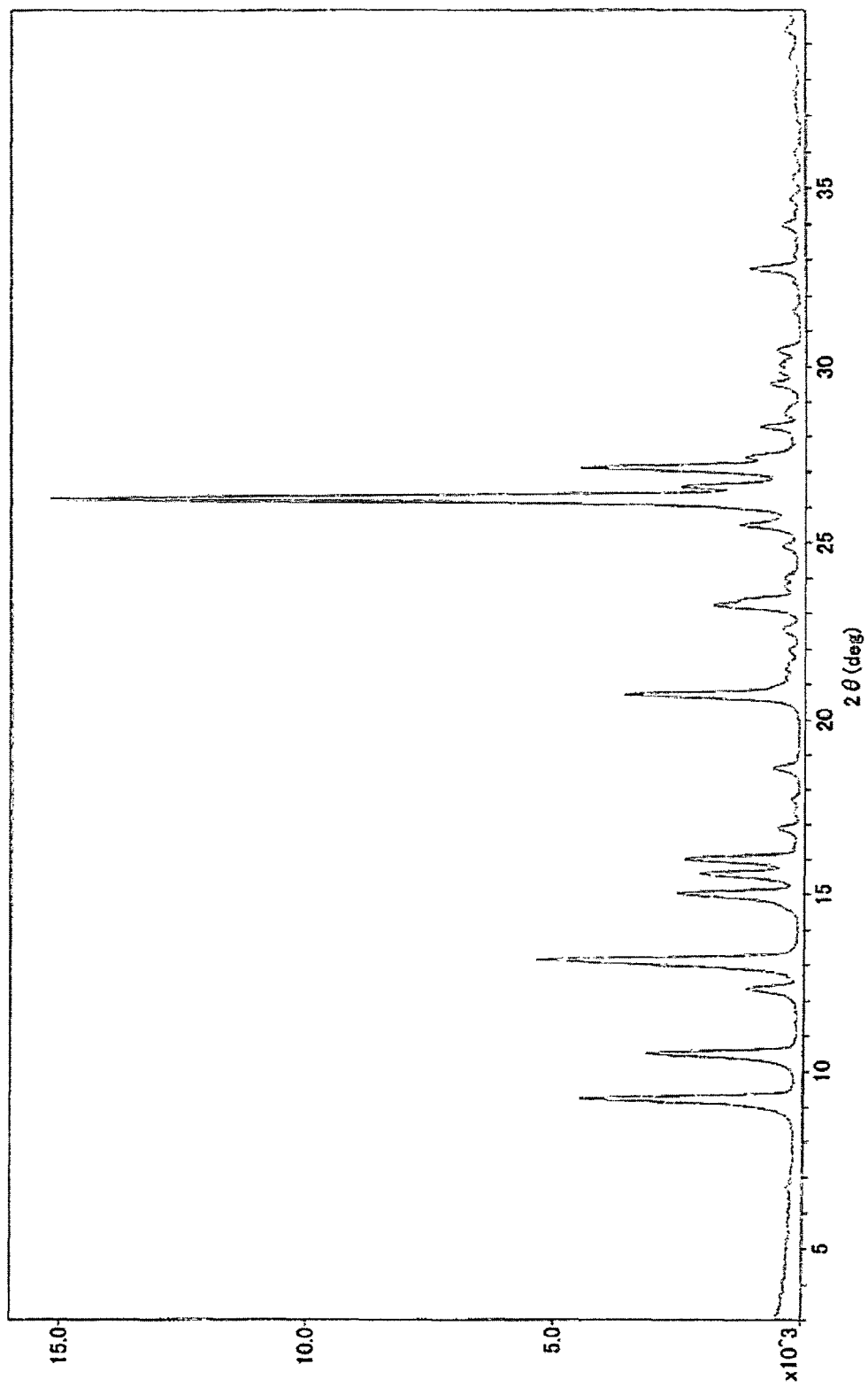
FIG. 8 is a powder X-ray diffraction pattern of the β-form oxytitanyl phthalocyanine crystal produced in Preparation Example 8.

Synthesis of β-Form Oxytitanyl Phthalocyanine Crystal Using Indoline and Ti(OBu)$_4$ as Raw Material 50.8 parts of 1,3-diiminoisoindoline and 35.8 parts of titanium tetrabutoxide were added in 455 parts of ortho-dichlorobenzene and made reacted at 140° C. for 4 hours, after which the product was filtered during hot state and washed with, in turn, N-methyl-2-pyrrolidone, methanol, toluene, and water. The obtained wet cake was then dried in a vacuum heat dryer. The dried product, crude oxytitanyl phthalocyanine, was subjected to dry milling treatment and made into amorphous oxytitanyl phthalocyanine, which was then washed again with, in turn, N-methyl-2-pyrrolidone, water, and methanol, whereby 37.8 parts of titanyl oxy phthalocyanine was obtained (yield: 76%). A powder X-ray diffraction pattern of the obtained oxytitanyl phthalocyanine is shown in FIG. 8.

<Measurement of Ratio of Cl-Substituted Product Oxytanyl Phthalocyanine>

For the oxytitanyl phthalocyanines synthesized in Preparation Examples 1, 7, and 8, the ratio of chlorinated oxytitanyl phthalocyanine in the oxytitanyl phthalocyanine obtained in each of the Preparation Examples was measured based on the spectrum strength ratio in the mass spectrum (also called mass spectrum) according to the following procedure.

1. Sample Preparation 0.50 parts of oxytitanyl phthalocyanine was put in a 50 mL glass receptacle together with 30 parts of glass beads (1.0-1.4 in diameter) and 10 parts of cyclohexanone, and subjected to dispersion treatment using a paint shaker for 3 hours, thereby made into dispersion liquid of oxytitanyl phthalocyanine. 1 μL of the obtained dispersion liquid was put in a 20 mL sample phial and mixed with 5 mL of chloroform. The product was then ultrasonically dispersed for 1 hour, whereby 10 ppm dispersion liquid for measurement was prepared.

2. Measurement

Mass Spectrometric Condition

Measurement apparatus: JMS-700/MStation manufactured by JEOL corp.

Measurement mode: DCI(−)

Reaction gas: isobutane (pressure in ionization chamber: 1×10$^{-5}$ Torr)

Filament rate: 0→0.90 A (1 A/min)

Acceleration voltage: 8.0 KV

Mass spectrometric ability: 2000

Scanning method: MF-Linear

Scanning range: 500 to 680

Time for scanning the whole mass range: 0.8 second

Cycle time: 0.5 second (0.05 second of scan time, 0.45 second of waiting time)

1 μl of the dispersion liquid for measurement prepared in "1. Sample Preparation" was applied onto the filament of the DCI probe and subjected to mass spectrum measurement under the aforementioned conditions. Based on the obtained mass spectrum, the ion chromatographs of m/z: 610, which corresponds to molecular ions of the chlorinated oxytitanyl phthalocyanine, and m/z: 576, which corresponds to molecular ions of the nonsubstituted oxytitanyl phthalocyanine, were used to calculate the ratio of peak areas ("610" peak area/ "576" peak area) as the spectrum strength ratio.

3. Results of Measurement

The procedures explained in "1. Sample Preparation" and "2. Measurement" were carried out for each of the oxytitanyl phthalocyanines obtained in Preparation Examples 1, 7, 8, the results of which are as follows:

Preparation Example 1: spectrum strength ratio=0.058

Preparation Example 7: spectrum strength ratio=0.054

Preparation Example 8: spectrum strength ratio=0.001 (below the minimum limit of detection)

As to the oxytitanyl phthalocyanine synthesized in Preparation Example 8, the result of measurement (spectrum strength ratio=0.001) is below the minimum limit of detection by the measurement apparatus. Since any chlorine source necessary for generation of the Cl-substituted product was not used as raw material in Preparation Example 8, it is conceivable that no Cl-substituted product is present.

II. Production of Phthalocyanine Composite

The production method explained below was used for obtain 46 kinds of phthalocyanine composites as Examples of the present invention (Production Examples 1-46) and 11 kinds of phthalocyanine composites as Comparative Examples (Comparative Production Examples 1-11). In the following explanation of production method, Preparation Examples will be indicated by characters A, B, processing times by L, M, N, weight parts by W, X, Y, capacity by Z, and the powder X-ray diffraction patterns obtained from the production by numbers: these characters and numbers are shown in Table 3 and Table 4 for Production Examples and in Table 5 for Comparative Production Examples. In Tables 3-5, THF represents tetrahydrofuran, NMP represents N-methyl pyrrolidone, MEK represents methyl ethyl ketone, and DMF represents dimethyl formamide.

Figure 9:
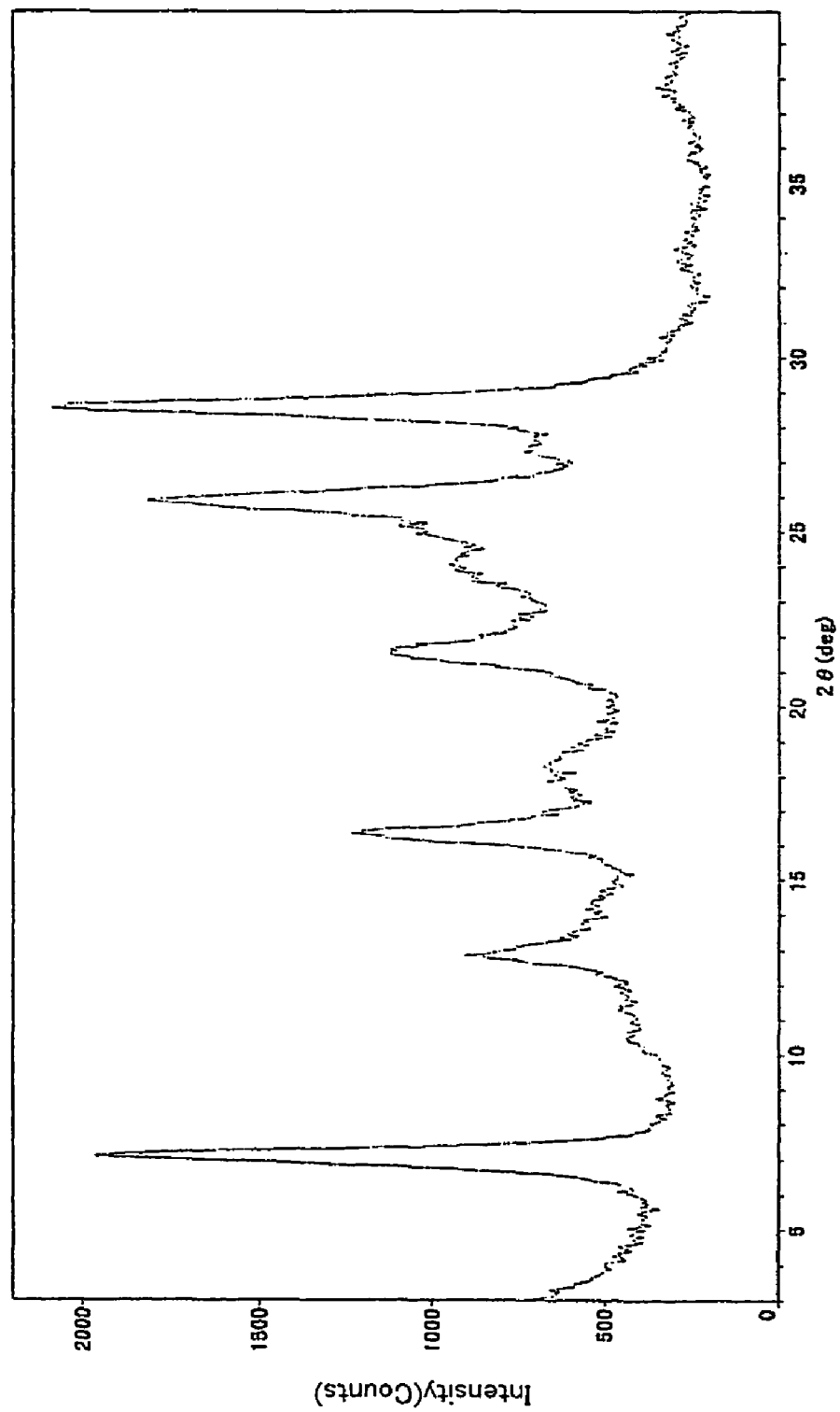
FIG. 9 is a powder X-ray diffraction pattern of the phthalocyanine composite produced in Example 1.
Figure 10:
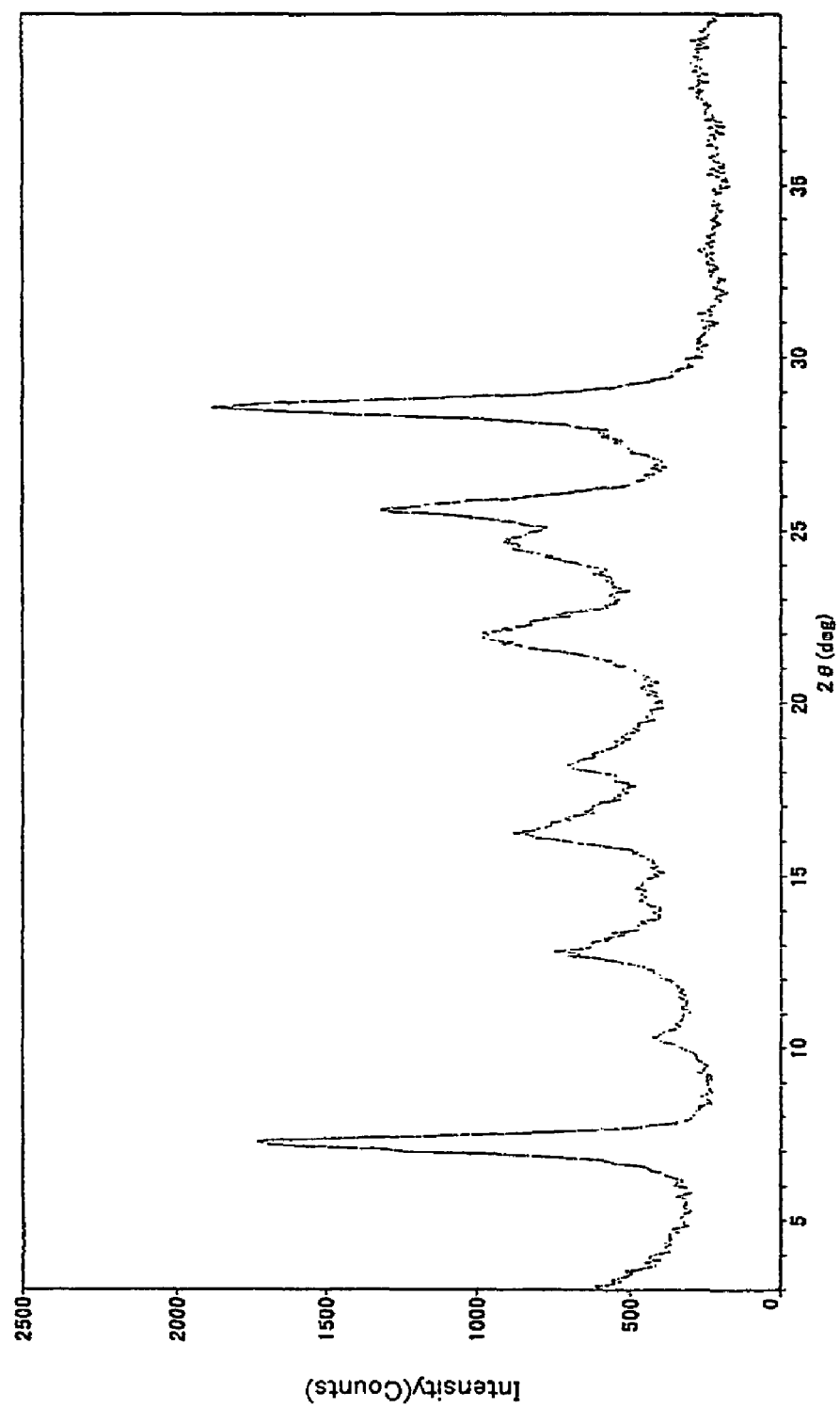
FIG. 10 is a powder X-ray diffraction pattern of the phthalocyanine composite produced in Example 2.
Figure 11:
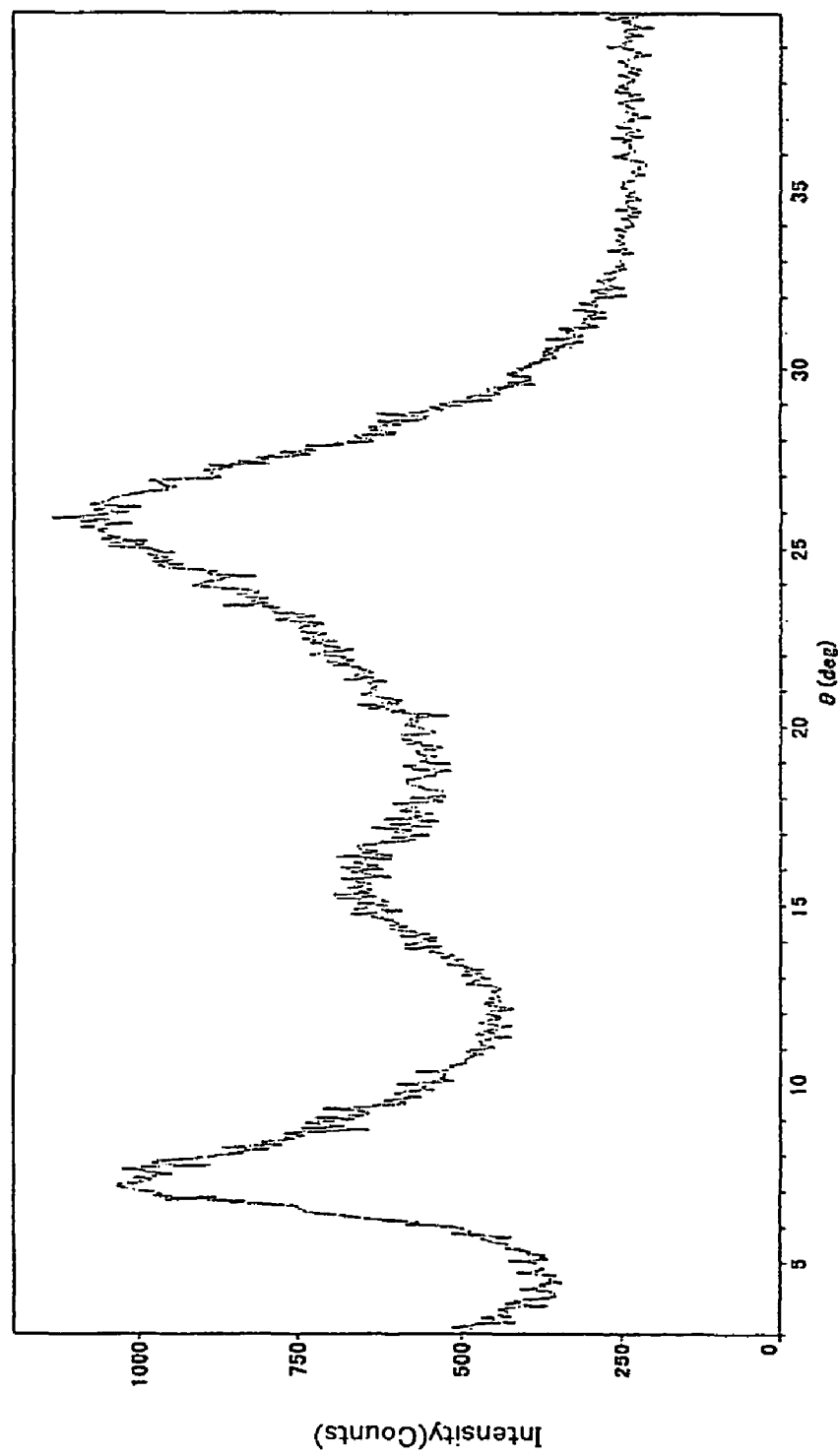
FIG. 11 is a powder X-ray diffraction pattern of the phthalocyanine composite produced in Example 3.
Figure 12:
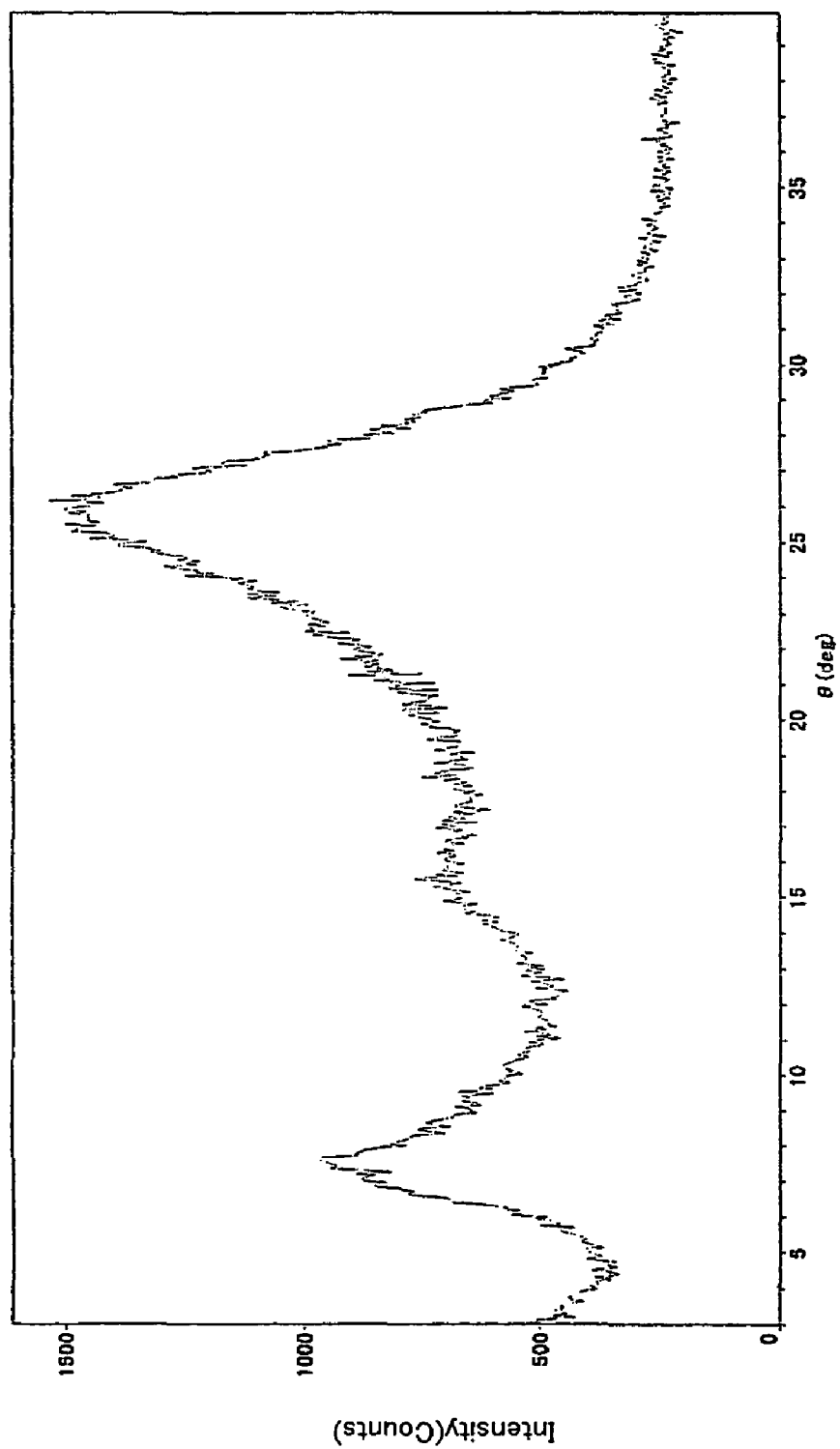
FIG. 12 is a powder X-ray diffraction pattern of the phthalocyanine composite produced in Example 4.
Figure 13:
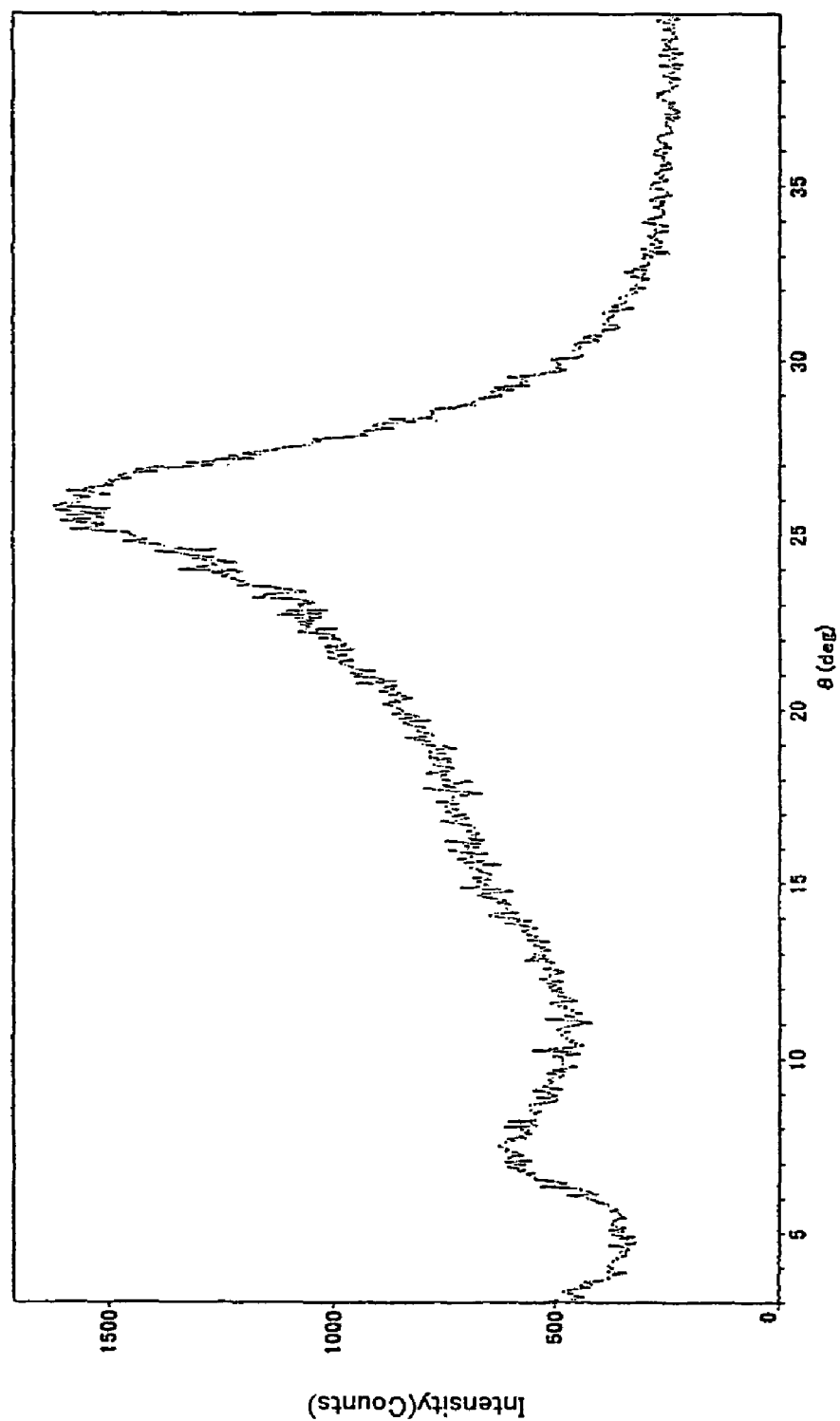
FIG. 13 is a powder X-ray diffraction pattern of the phthalocyanine composite produced in Example 5.
Figure 14:
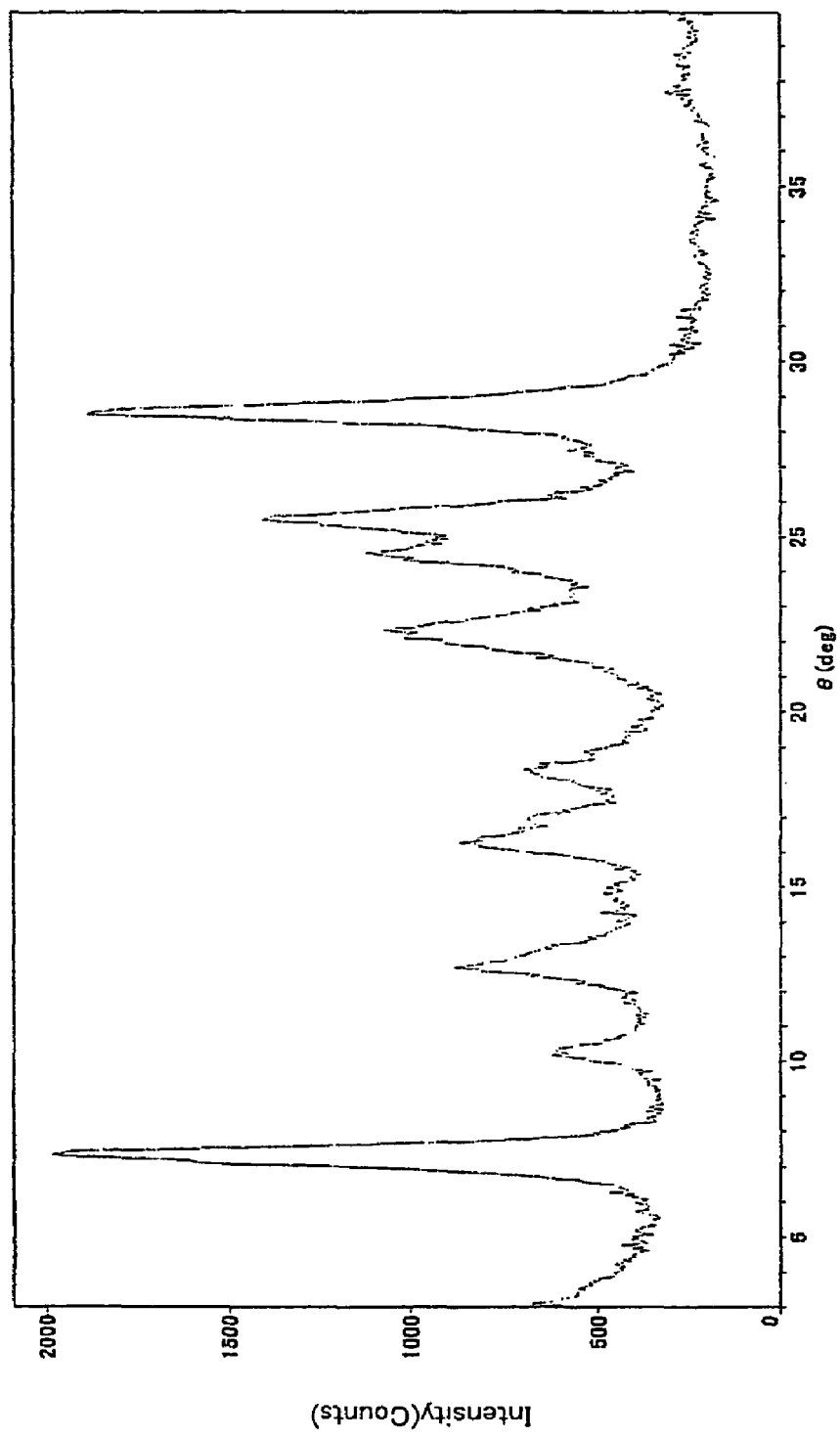
FIG. 14 is a powder X-ray diffraction pattern of the phthalocyanine composite produced in Example 6.
Figure 15:
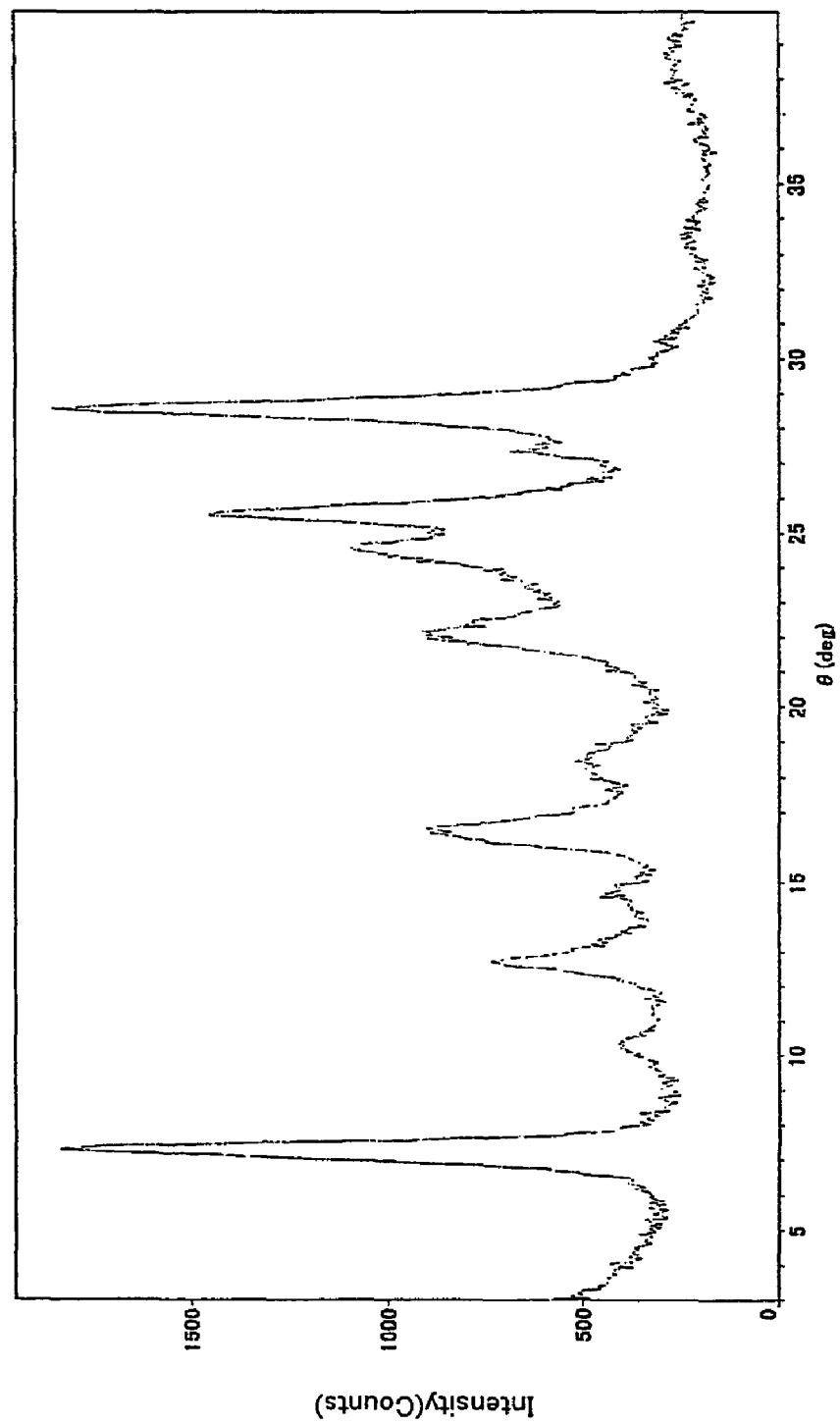
FIG. 15 is a powder X-ray diffraction pattern of the phthalocyanine composite produced in Example 7.
Figure 16:
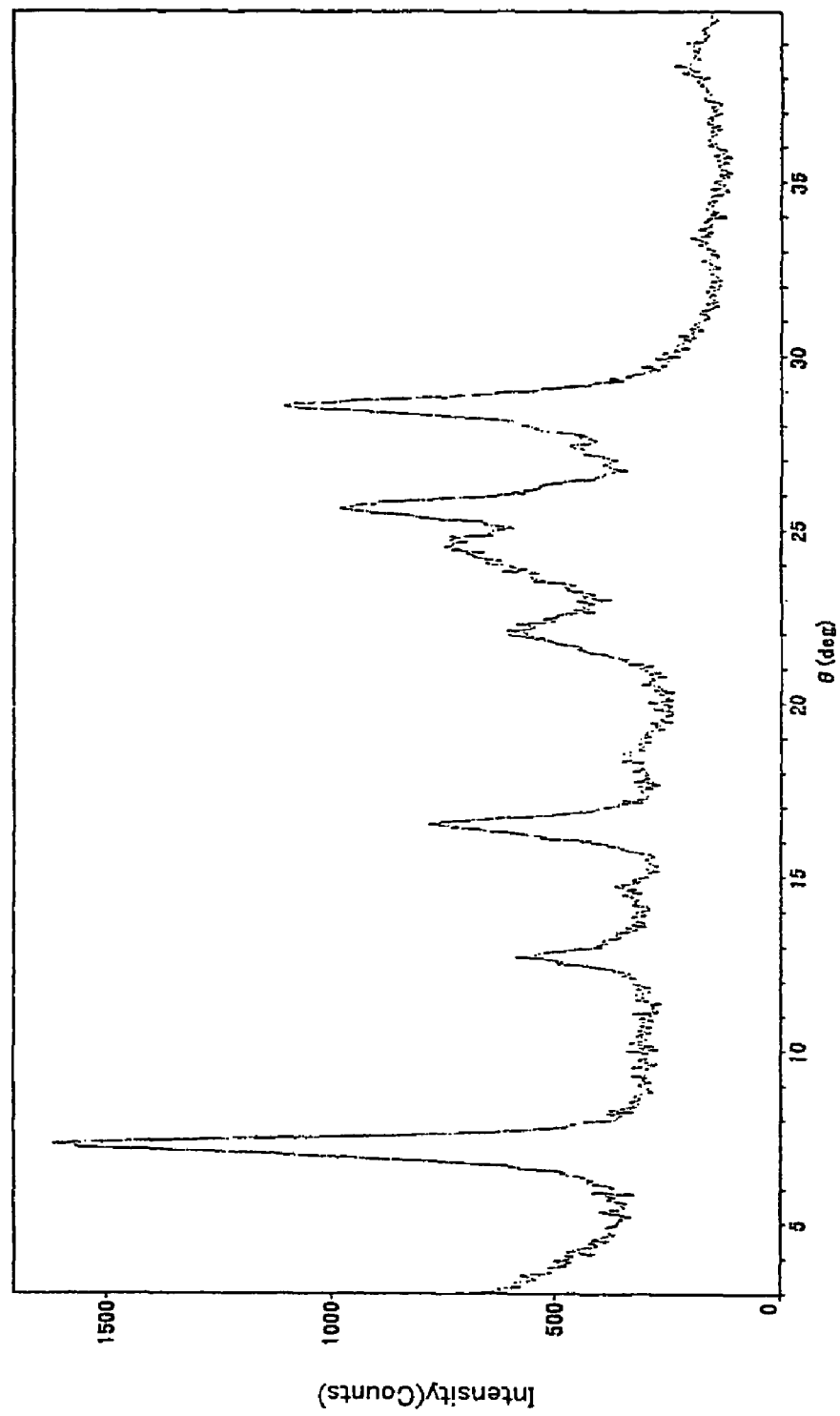
FIG. 16 is a powder X-ray diffraction pattern of the phthalocyanine composite produced in Example 8.
Figure 17:
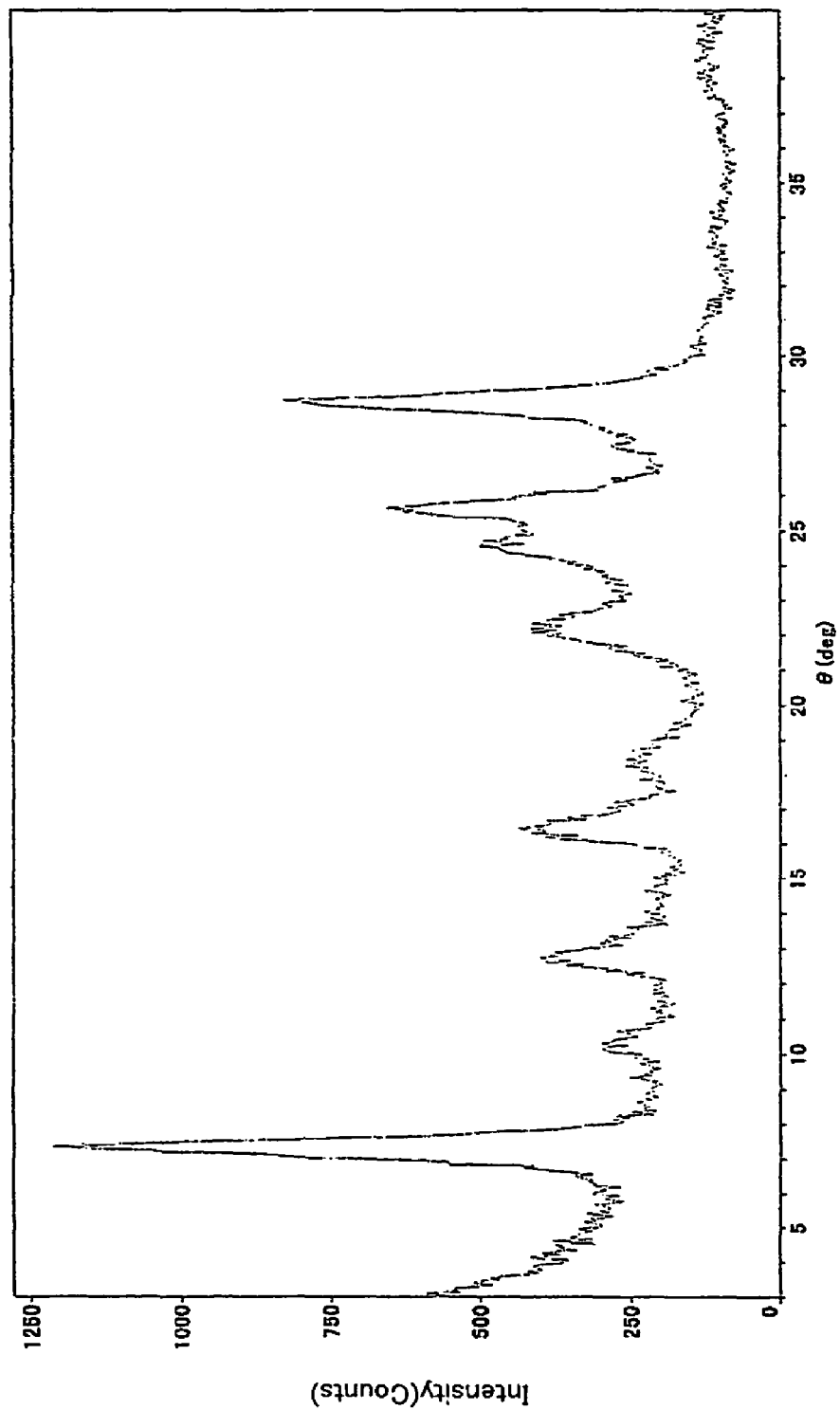
FIG. 17 is a powder X-ray diffraction pattern of the phthalocyanine composite produced in Example 9.
Figure 18:
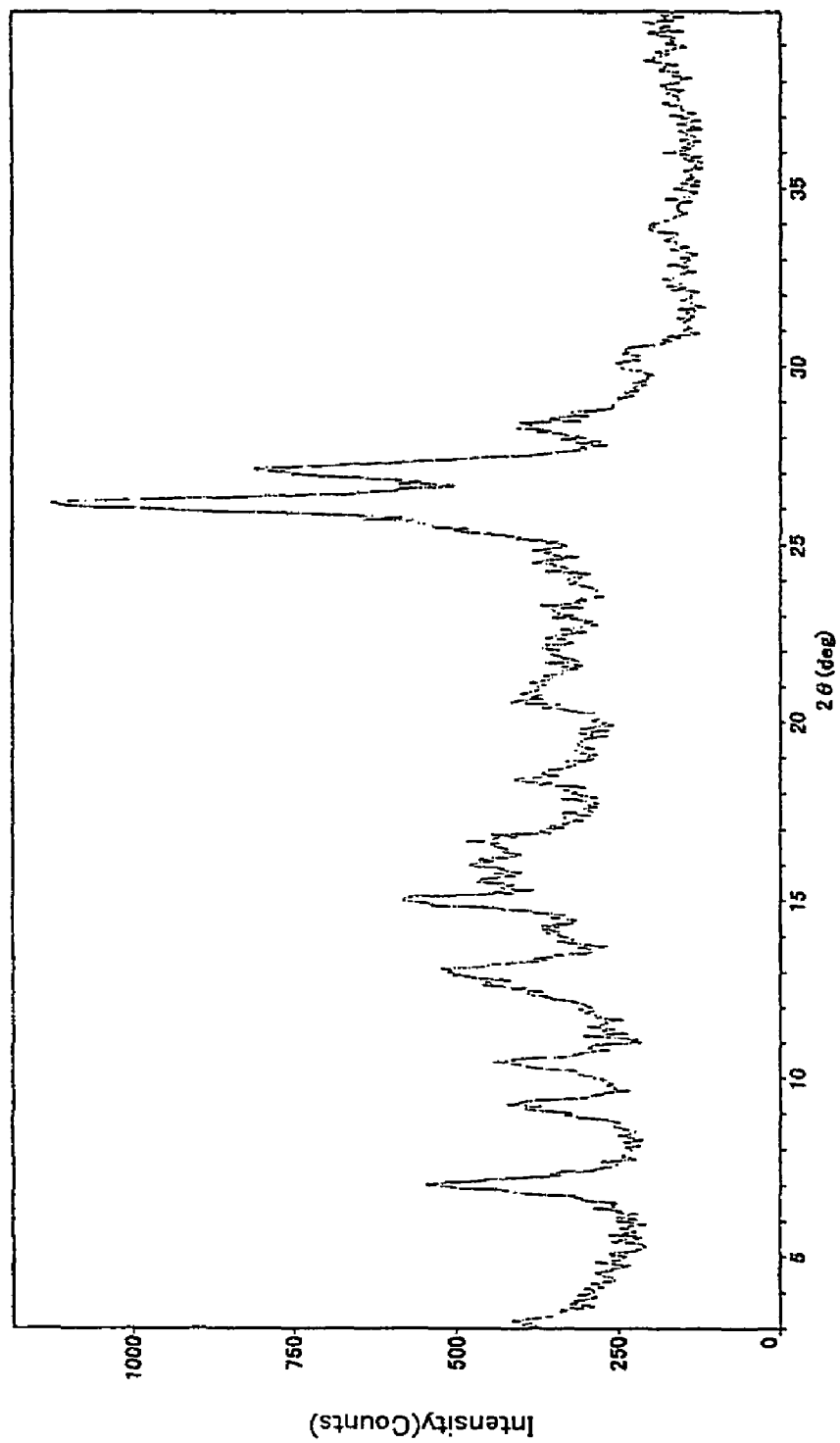
FIG. 18 is a powder X-ray diffraction pattern of the phthalocyanine composite produced in Example 10.
Figure 19:
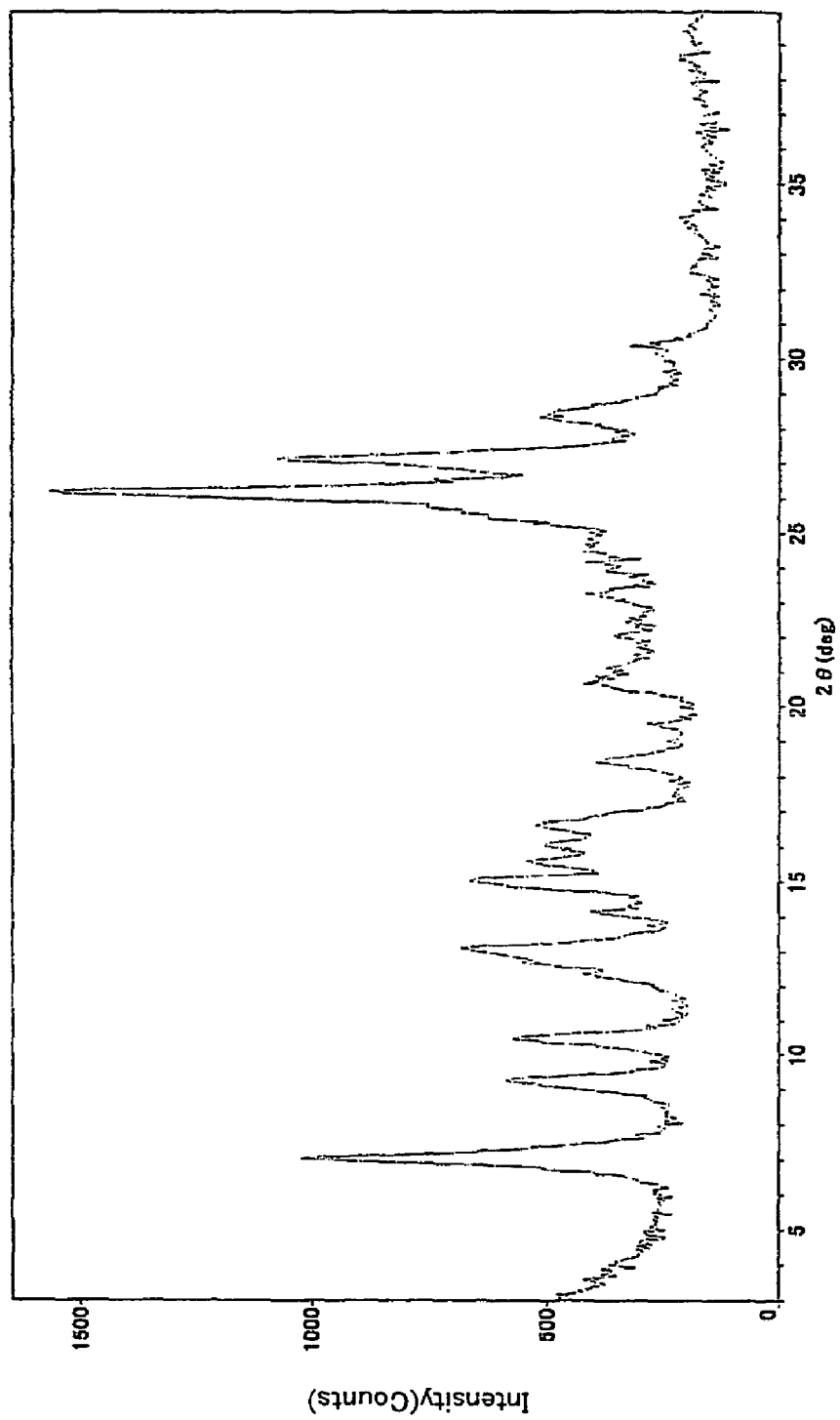
FIG. 19 is a powder X-ray diffraction pattern of the phthalocyanine composite produced in Example 11.
Figure 20:
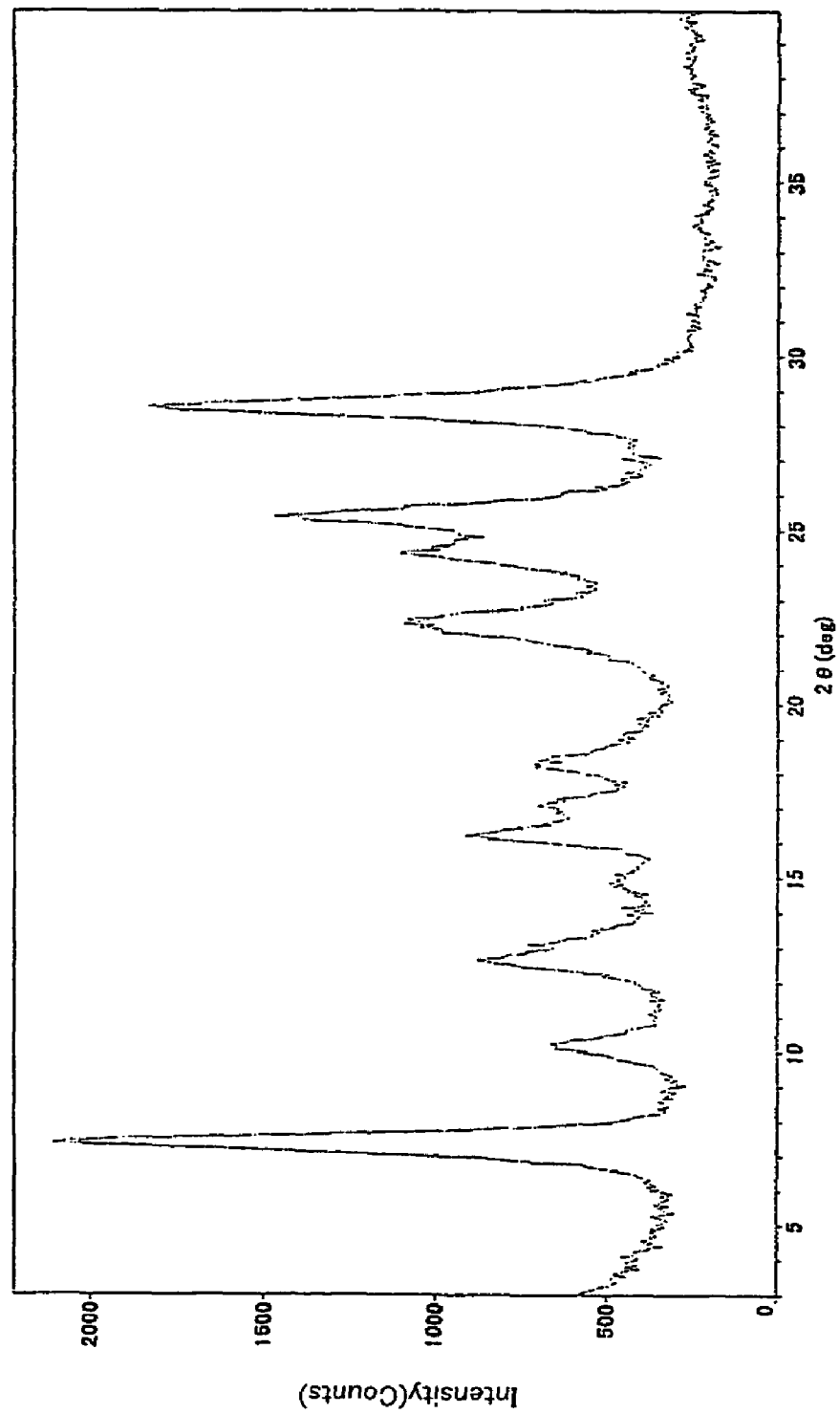
FIG. 20 is a powder X-ray diffraction pattern of the phthalocyanine composite produced in Example 12.
Figure 21:
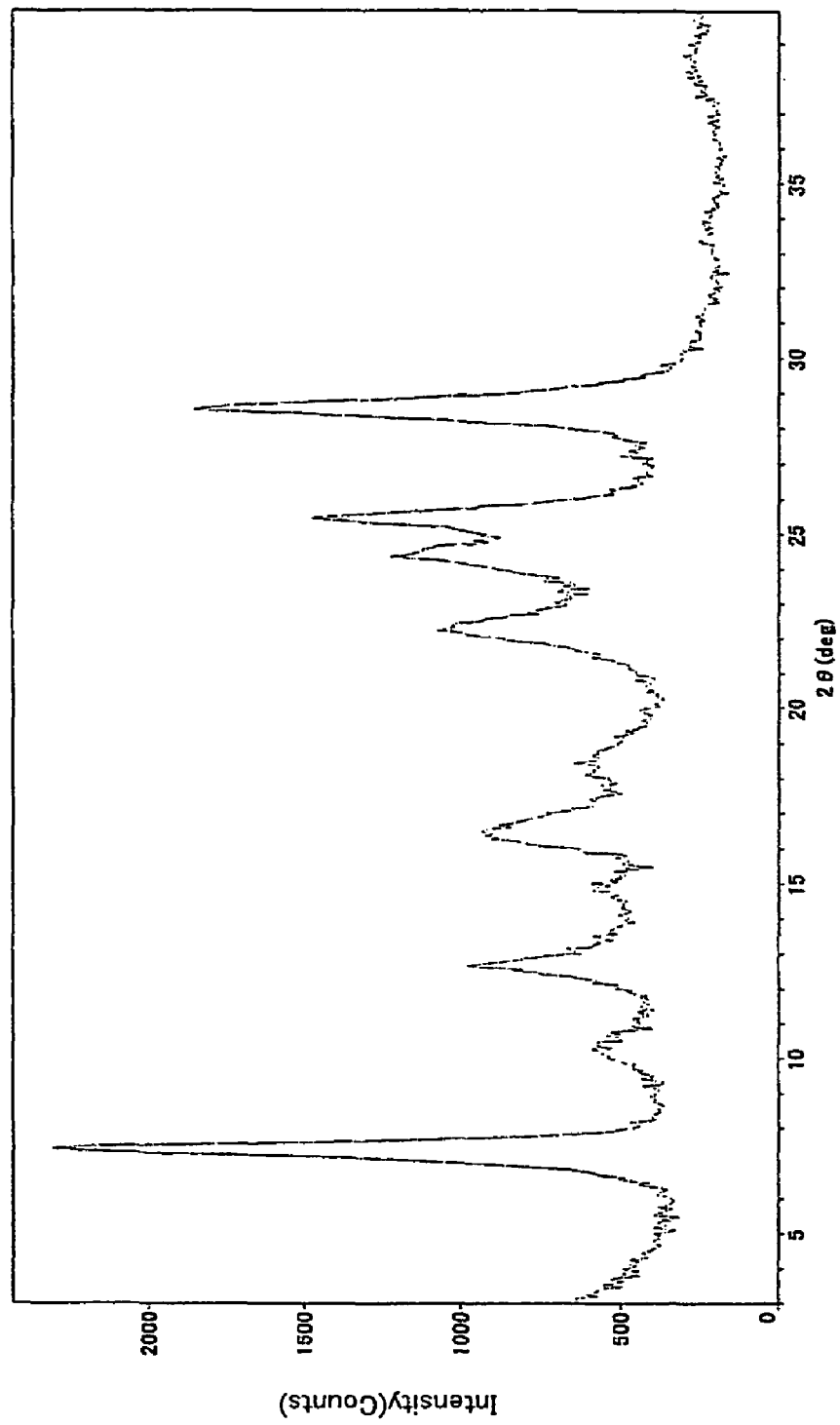
FIG. 21 is a powder X-ray diffraction pattern of the phthalocyanine composite produced in Example 13.
Figure 22:
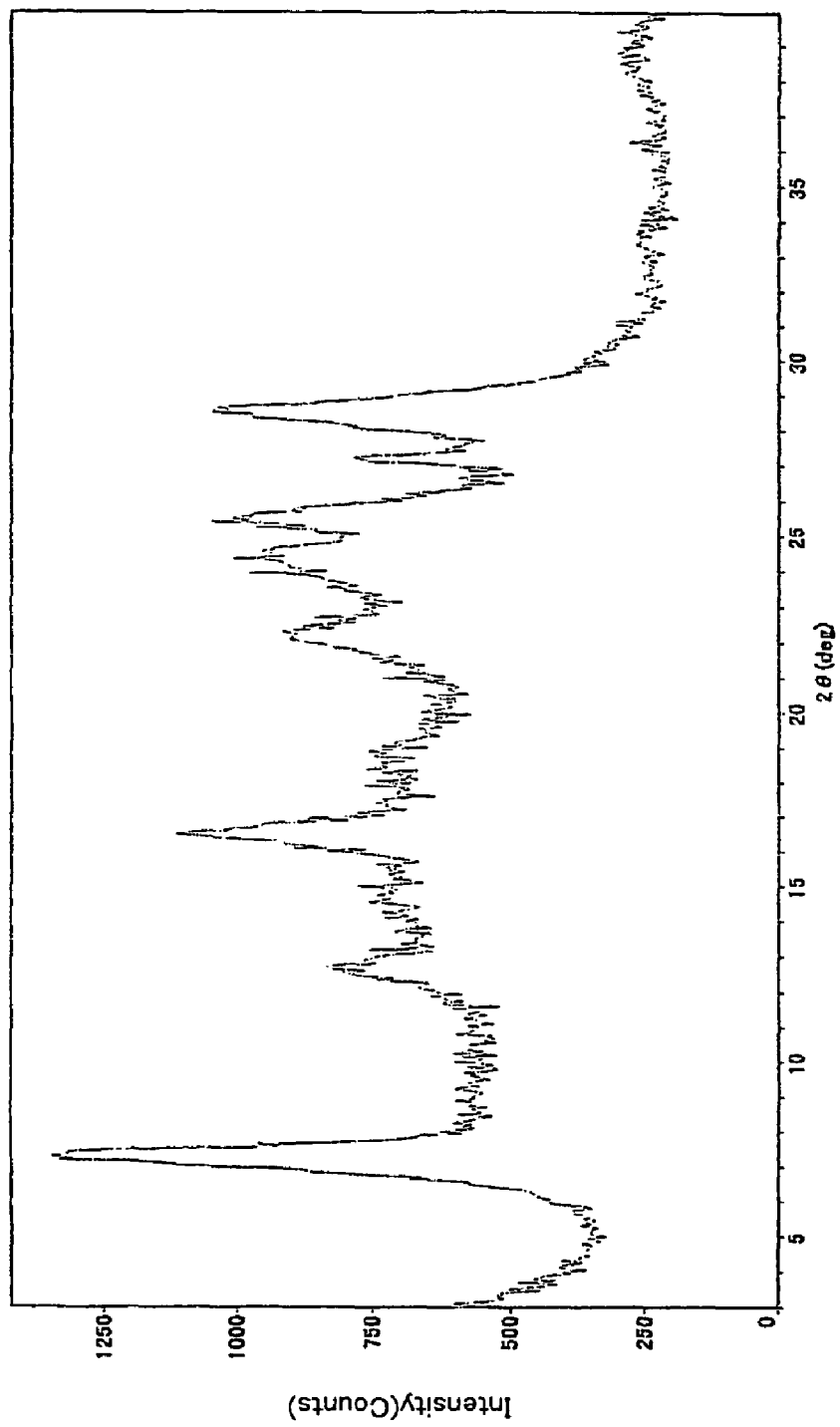
FIG. 22 is a powder X-ray diffraction pattern of the phthalocyanine composite produced in Example 14.
Figure 23:
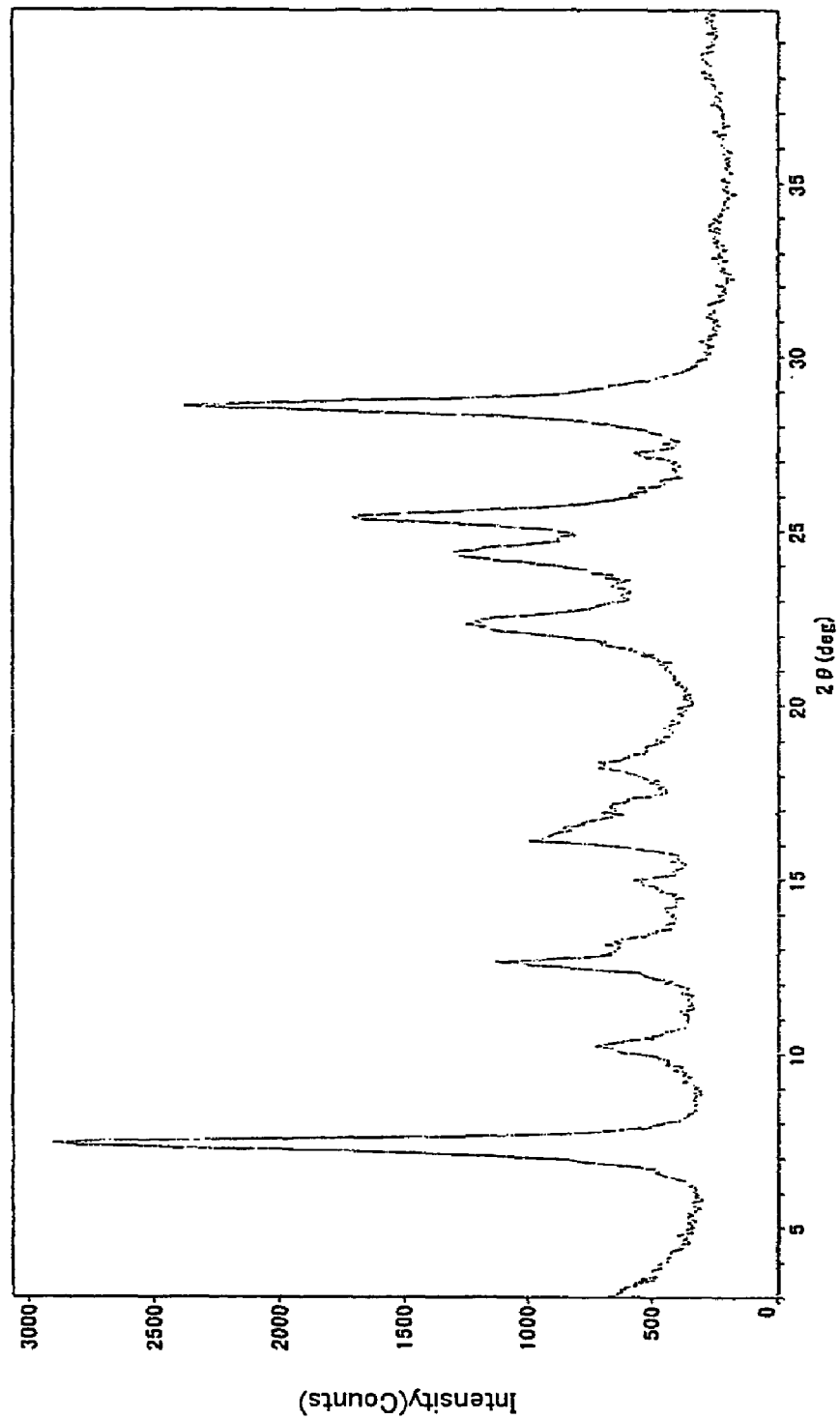
FIG. 23 is a powder X-ray diffraction pattern of the phthalocyanine composite produced in Example 15.
Figure 24:
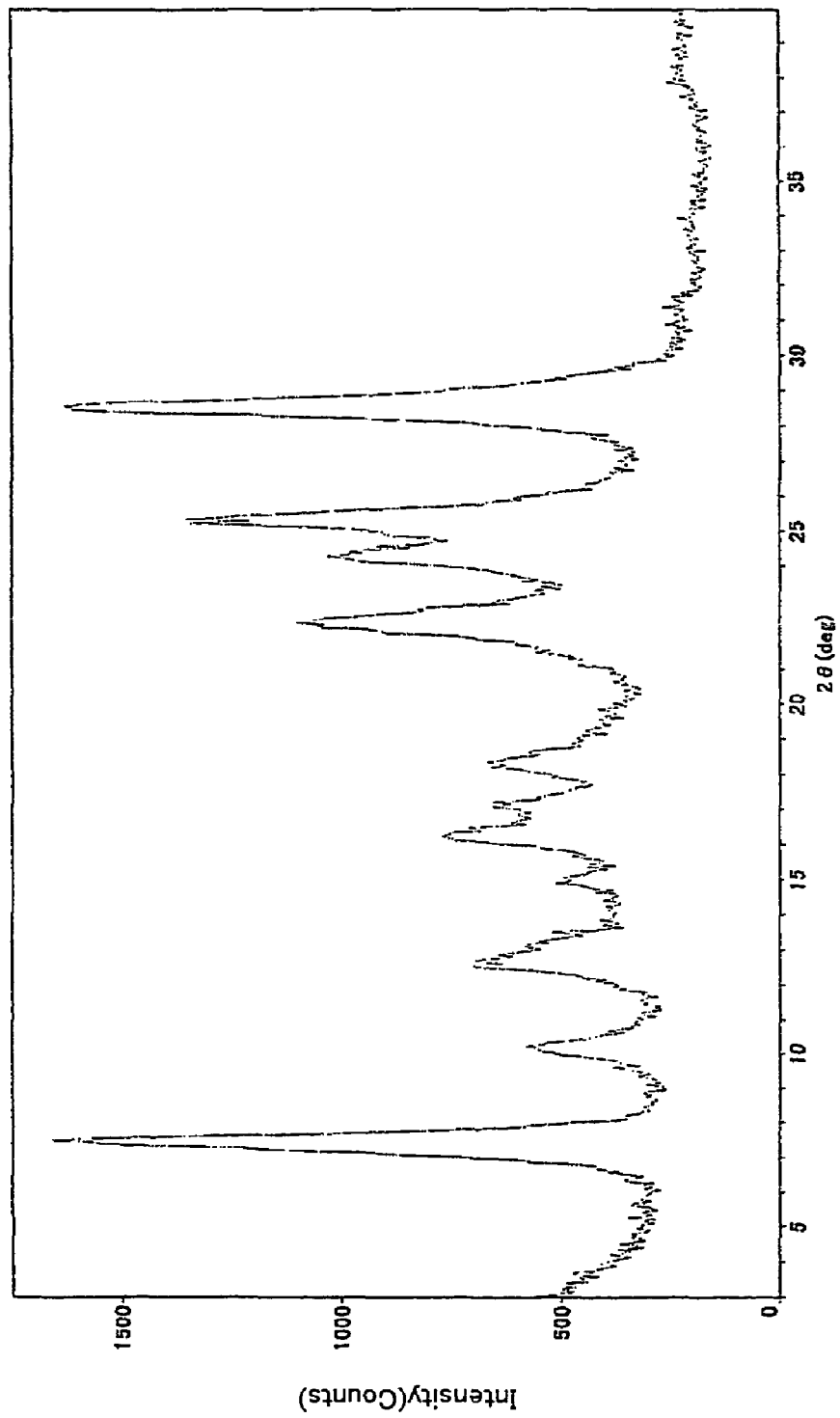
FIG. 24 is a powder X-ray diffraction pattern of the phthalocyanine composite produced in Example 16.
Figure 25:
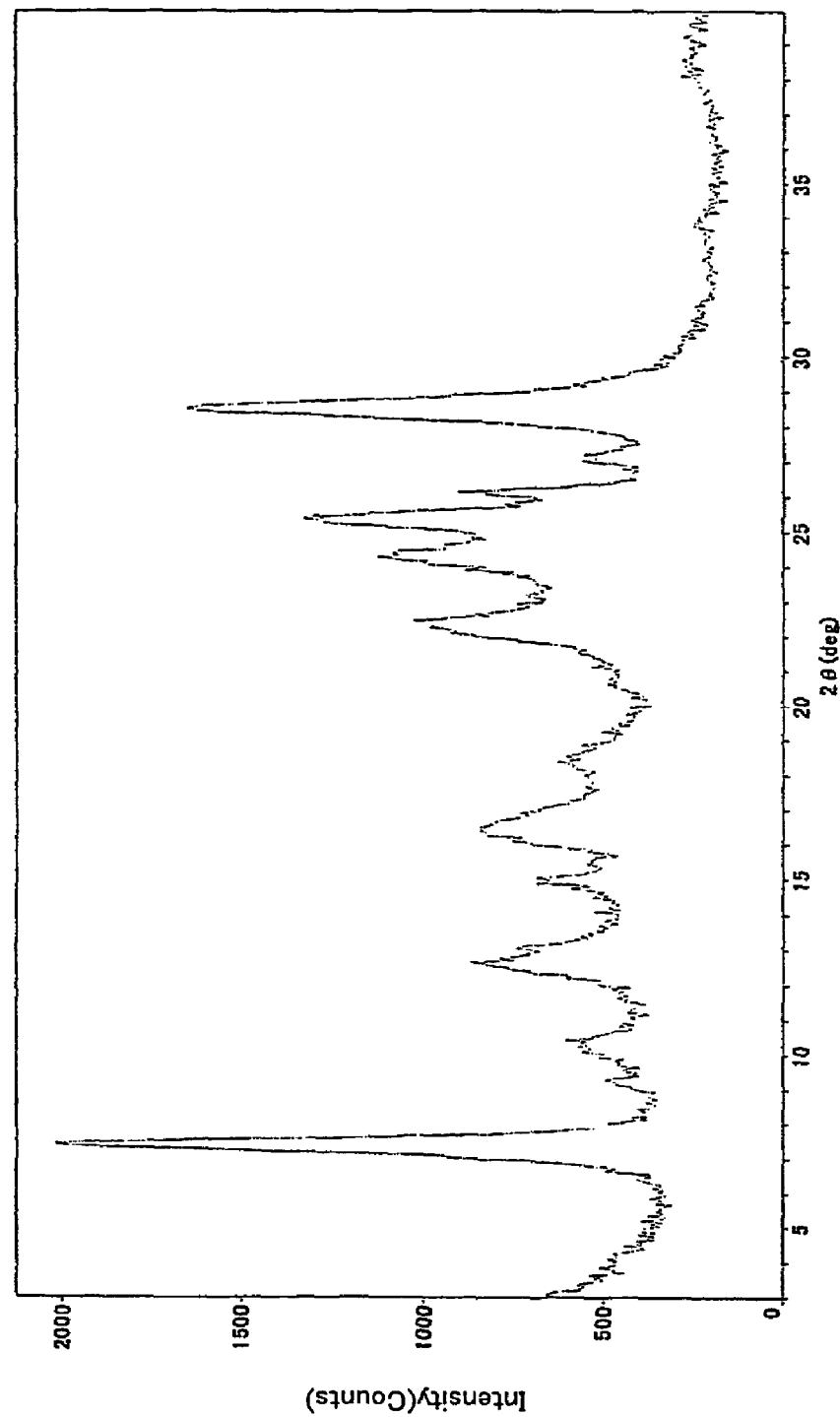
FIG. 25 is a powder X-ray diffraction pattern of the phthalocyanine composite produced in Example 17.
Figure 26:
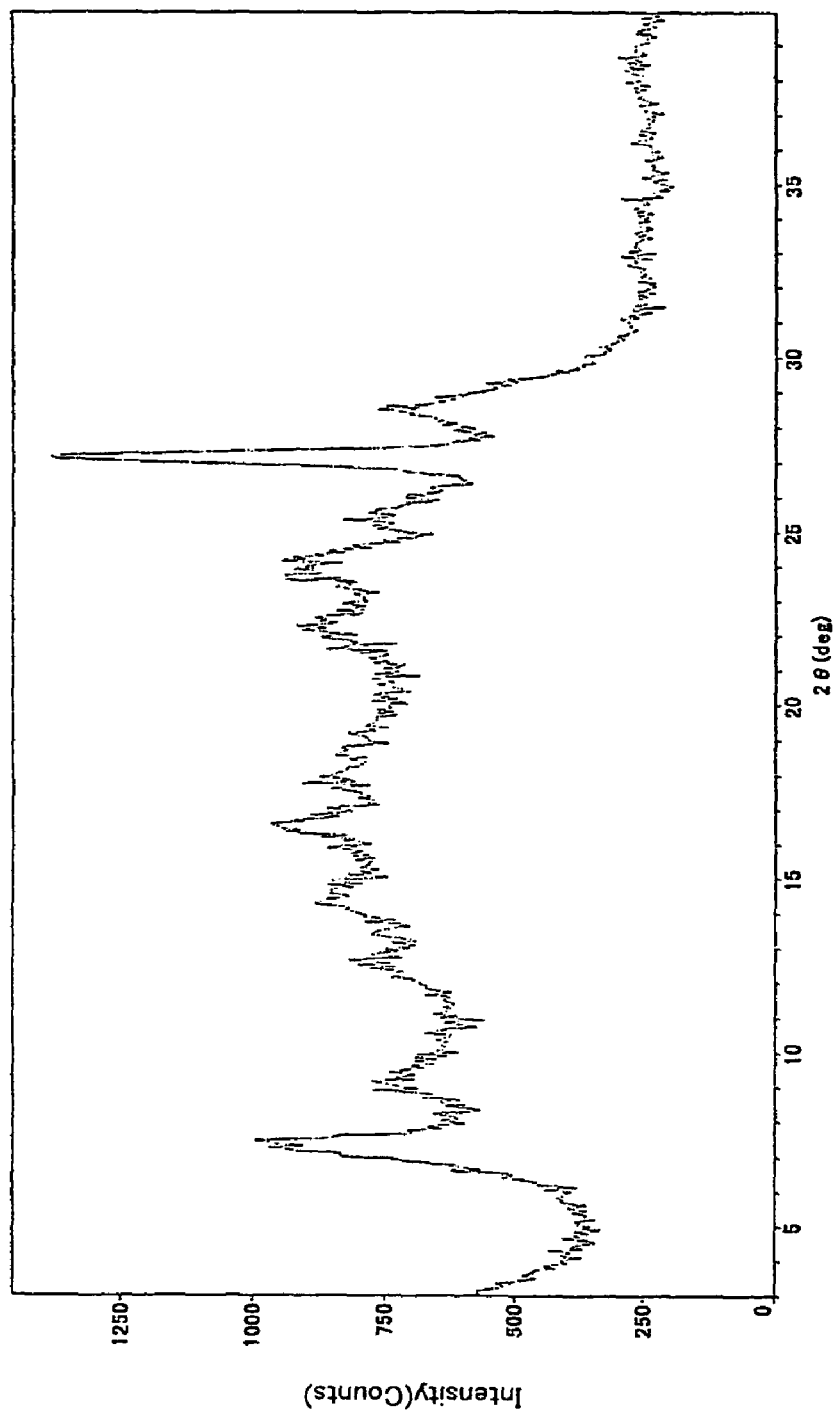
FIG. 26 is a powder X-ray diffraction pattern of the phthalocyanine composite produced in Example 18.
Figure 27:
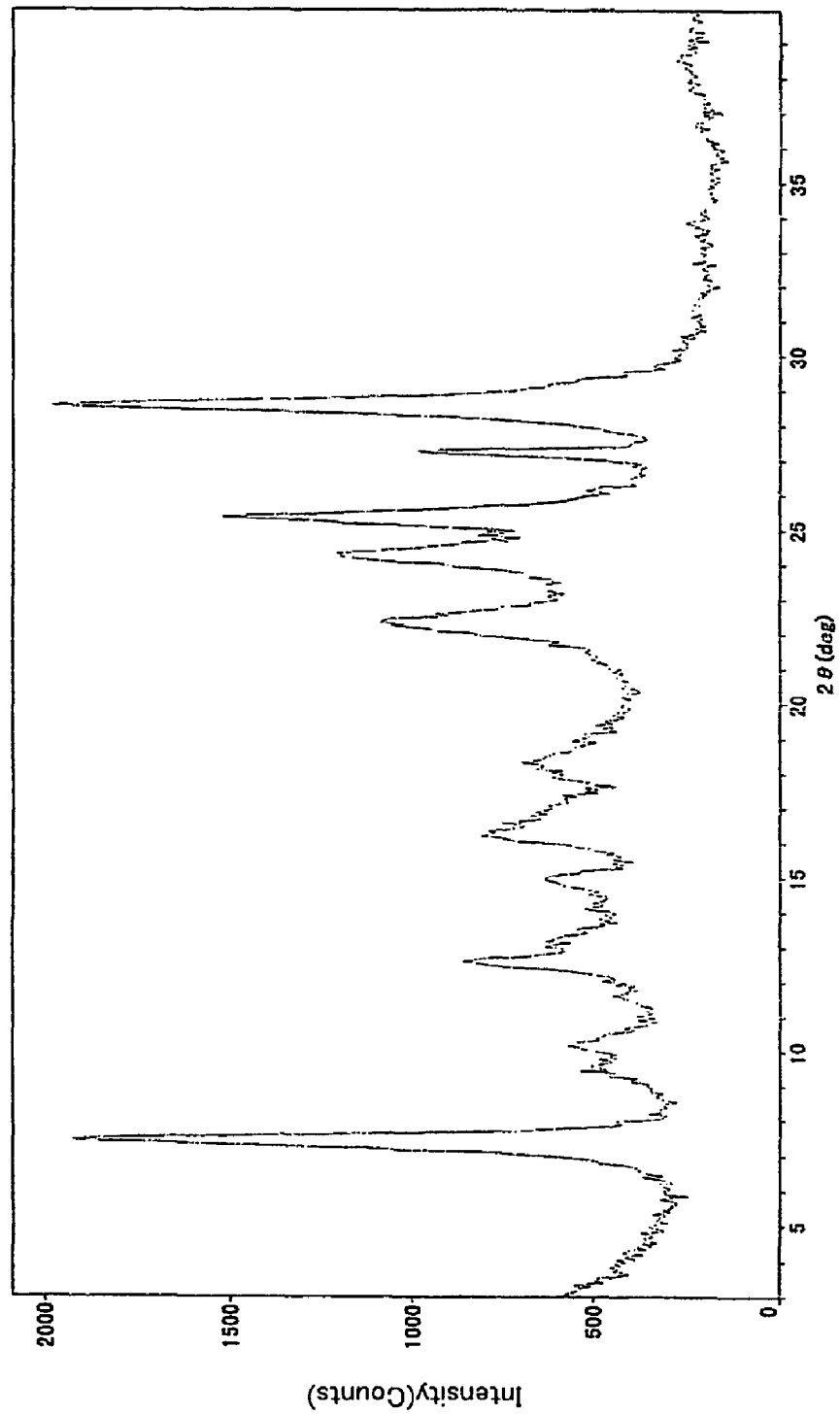
FIG. 27 is a powder X-ray diffraction pattern of the phthalocyanine composite produced in Example 19.
Figure 28:
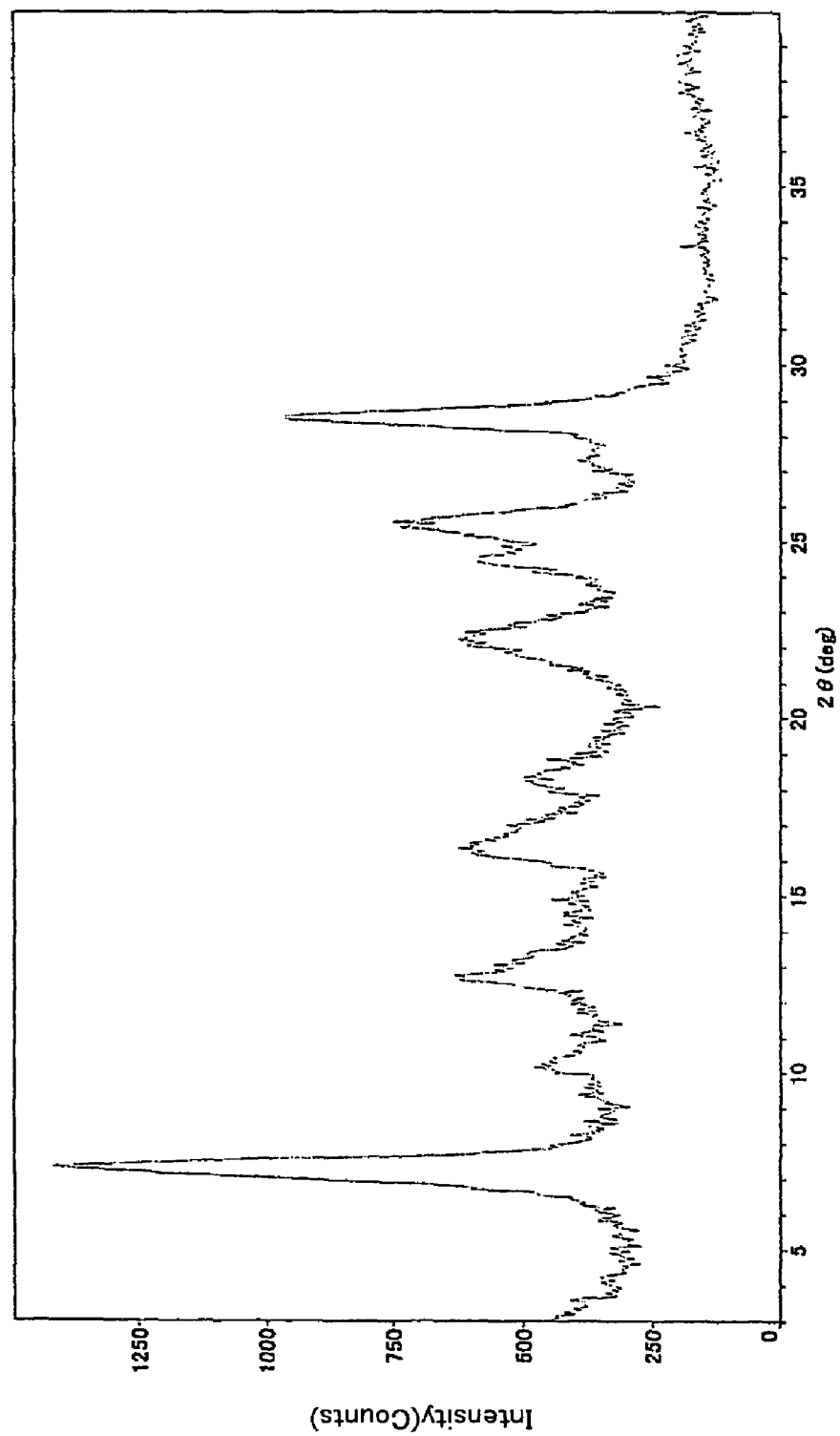
FIG. 28 is a powder X-ray diffraction pattern of the phthalocyanine composite produced in Example 20.
Figure 29:
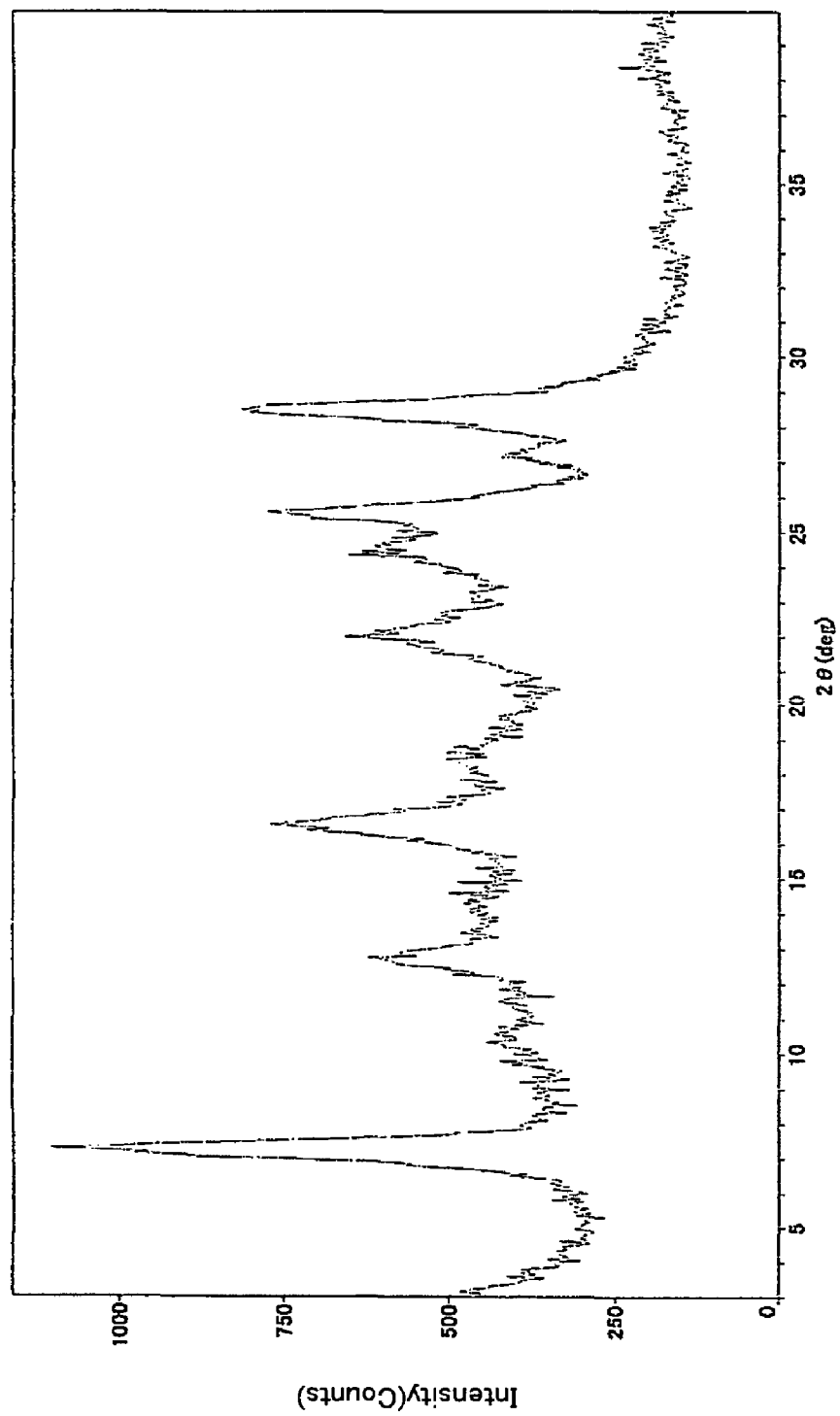
FIG. 29 is a powder X-ray diffraction pattern of the phthalocyanine composite produced in Example 21.
Figure 30:
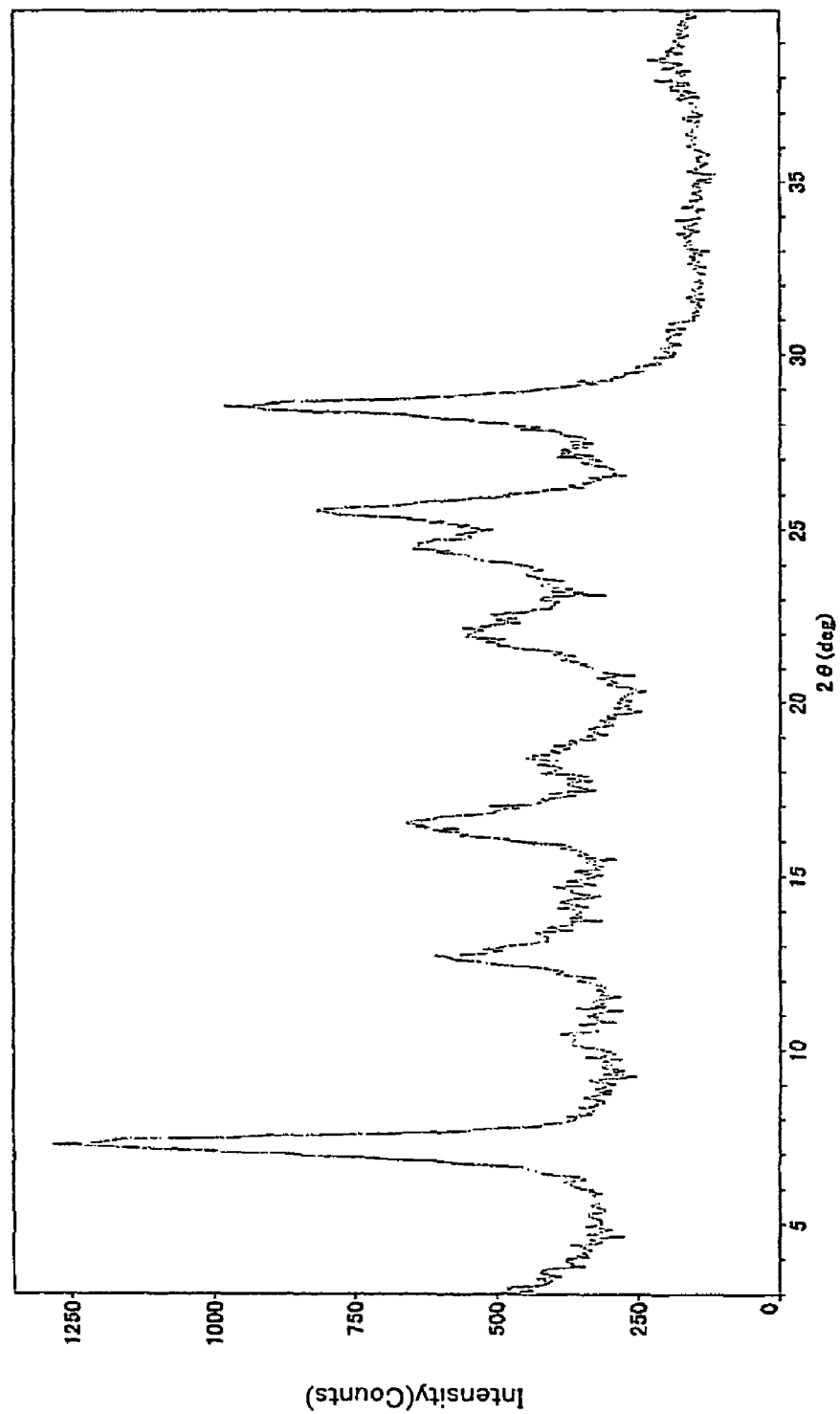
FIG. 30 is a powder X-ray diffraction pattern of the phthalocyanine composite produced in Example 22.
Figure 31:
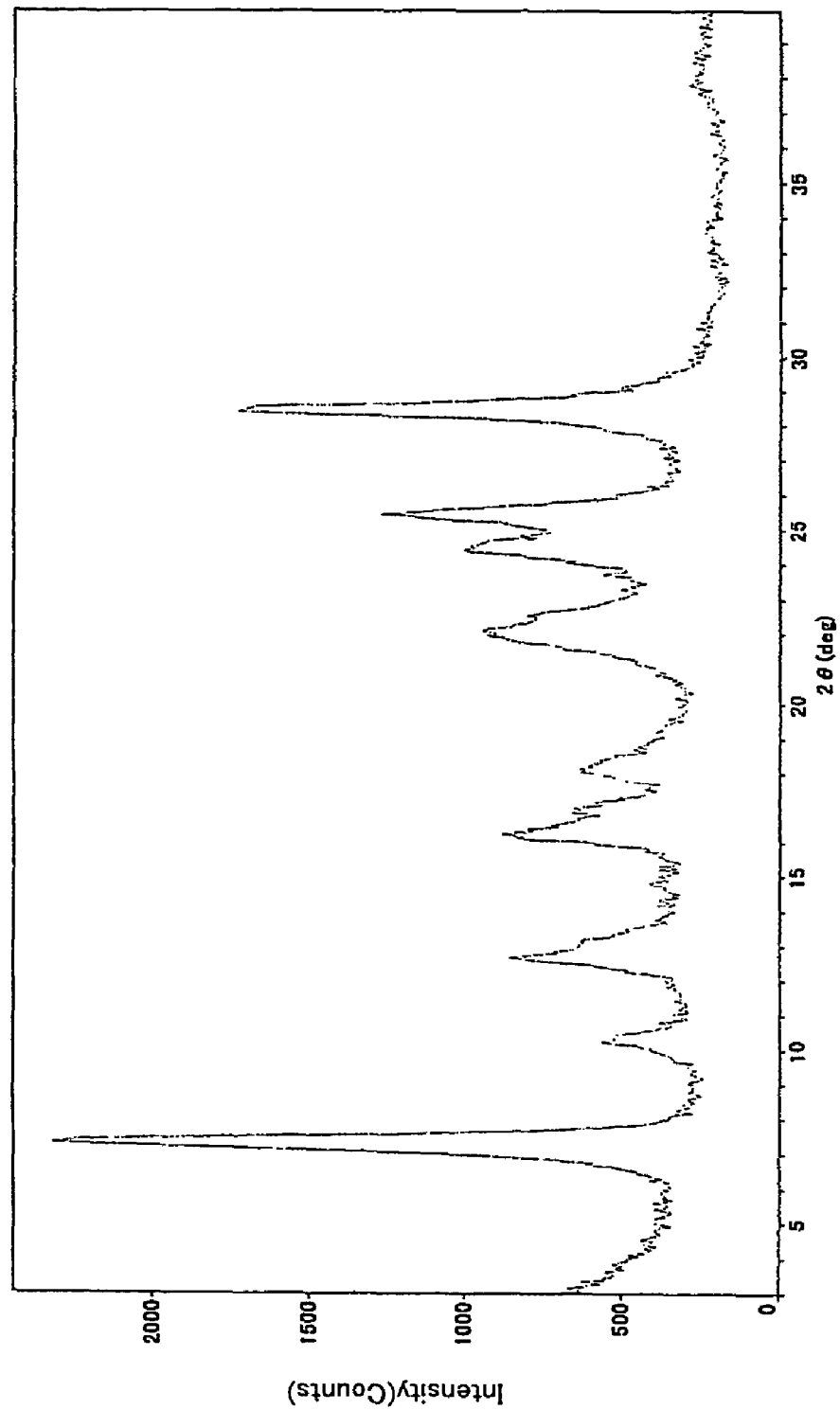
FIG. 31 is a powder X-ray diffraction pattern of the phthalocyanine composite produced in Example 23.
Figure 32:
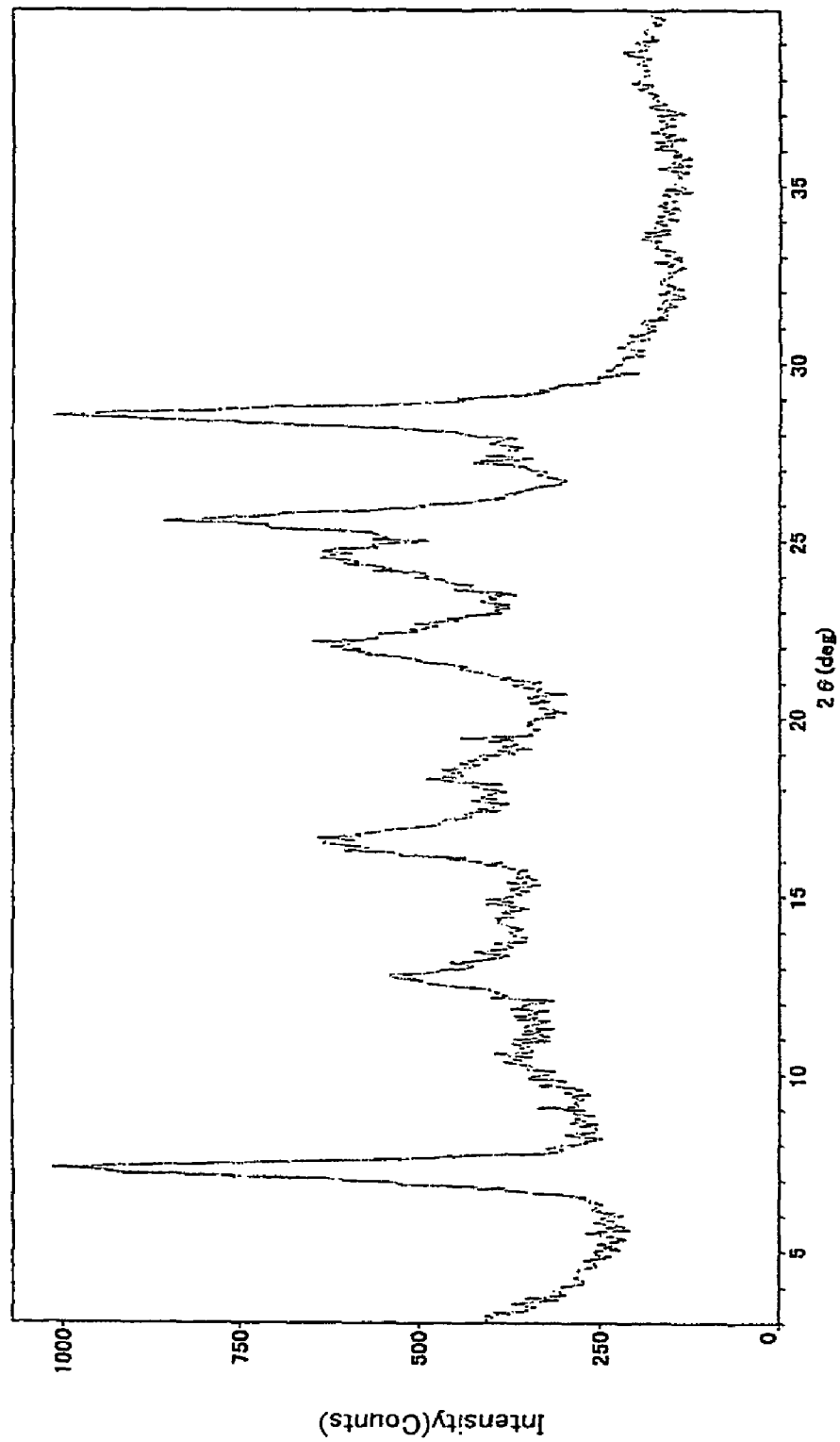
FIG. 32 is a powder X-ray diffraction pattern of the phthalocyanine composite produced in Example 24.
Figure 33:
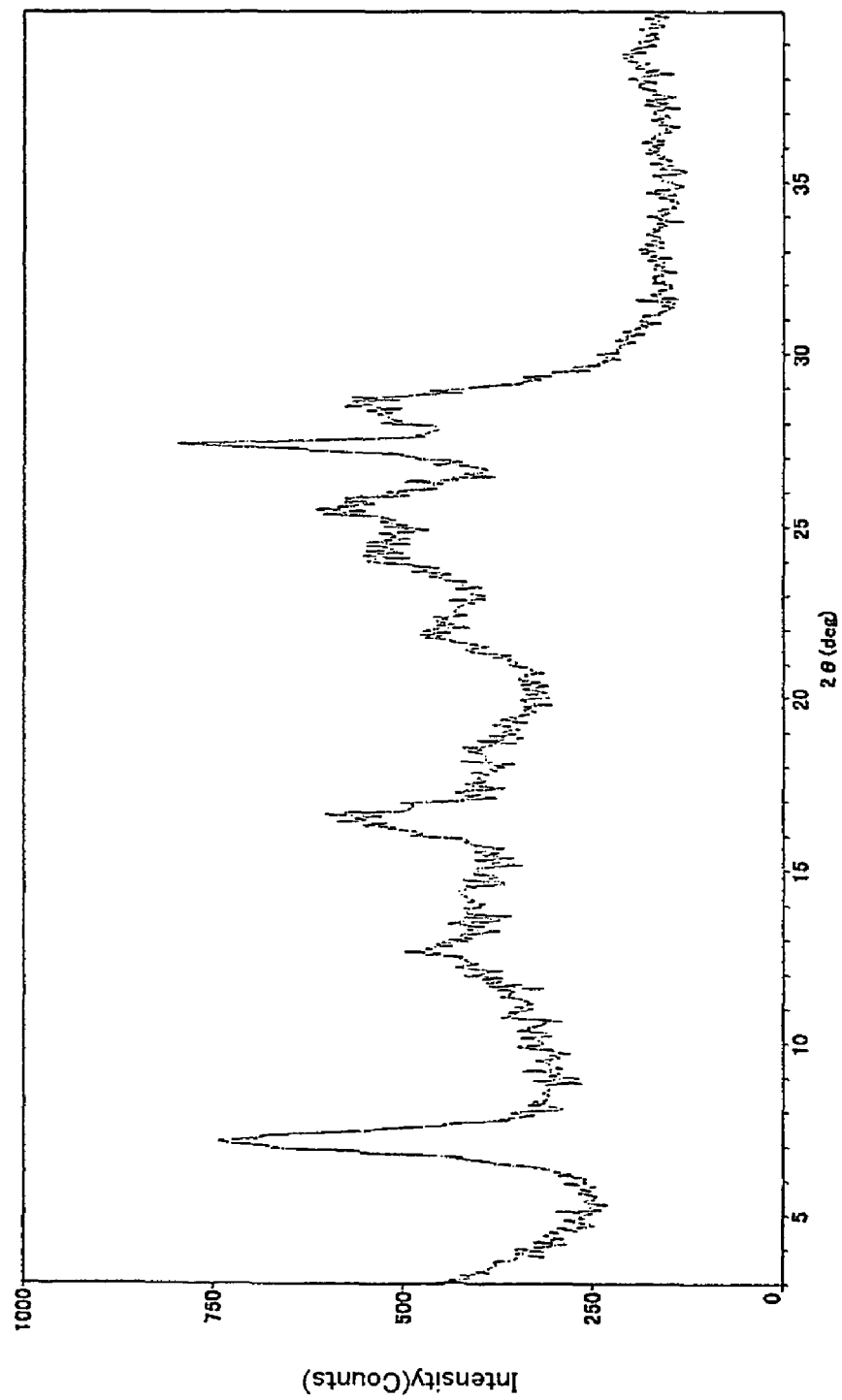
FIG. 33 is a powder X-ray diffraction pattern of the phthalocyanine composite produced in Example 25.
Figure 34:
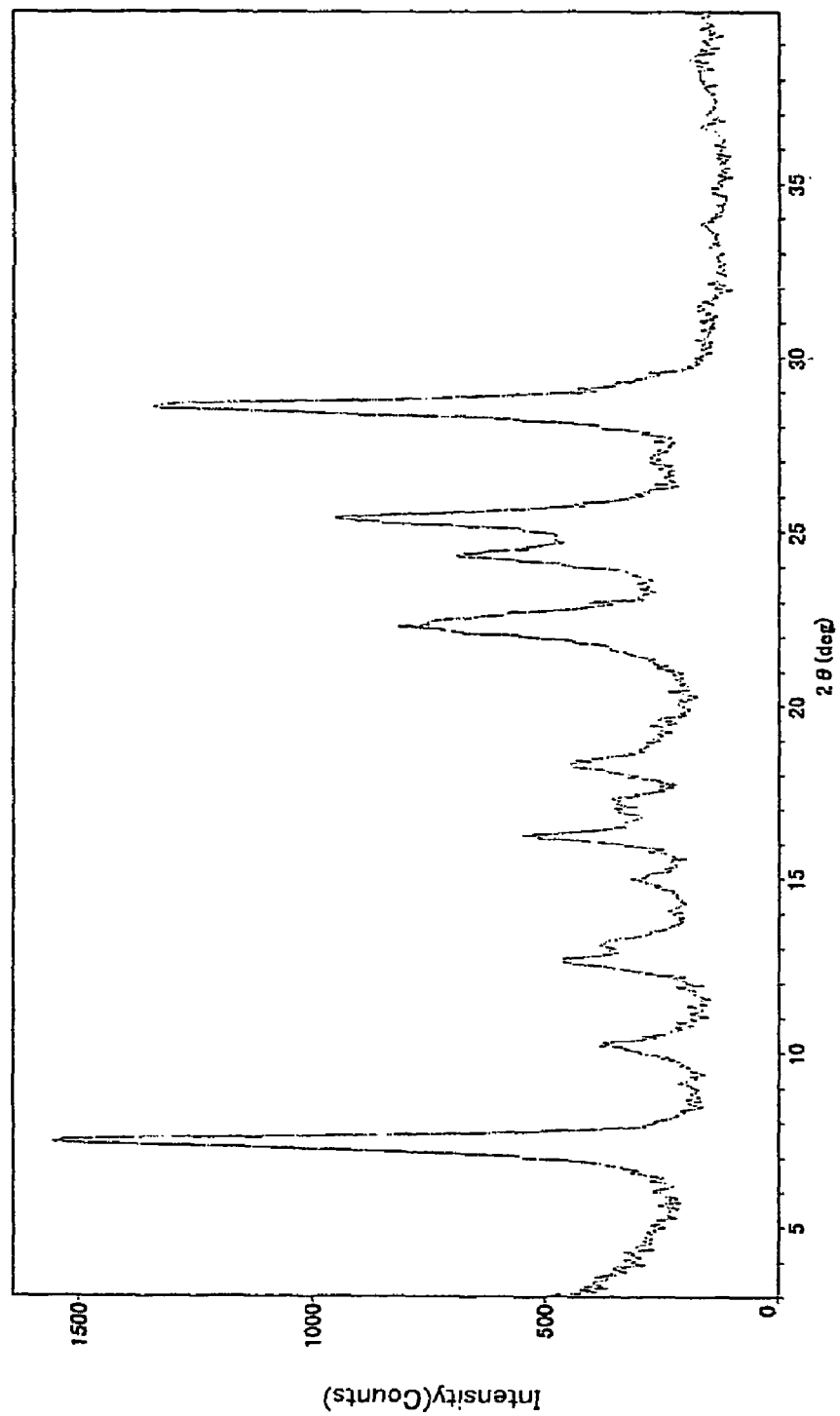
FIG. 34 is a powder X-ray diffraction pattern of the phthalocyanine composite produced in Example 26.
Figure 35:
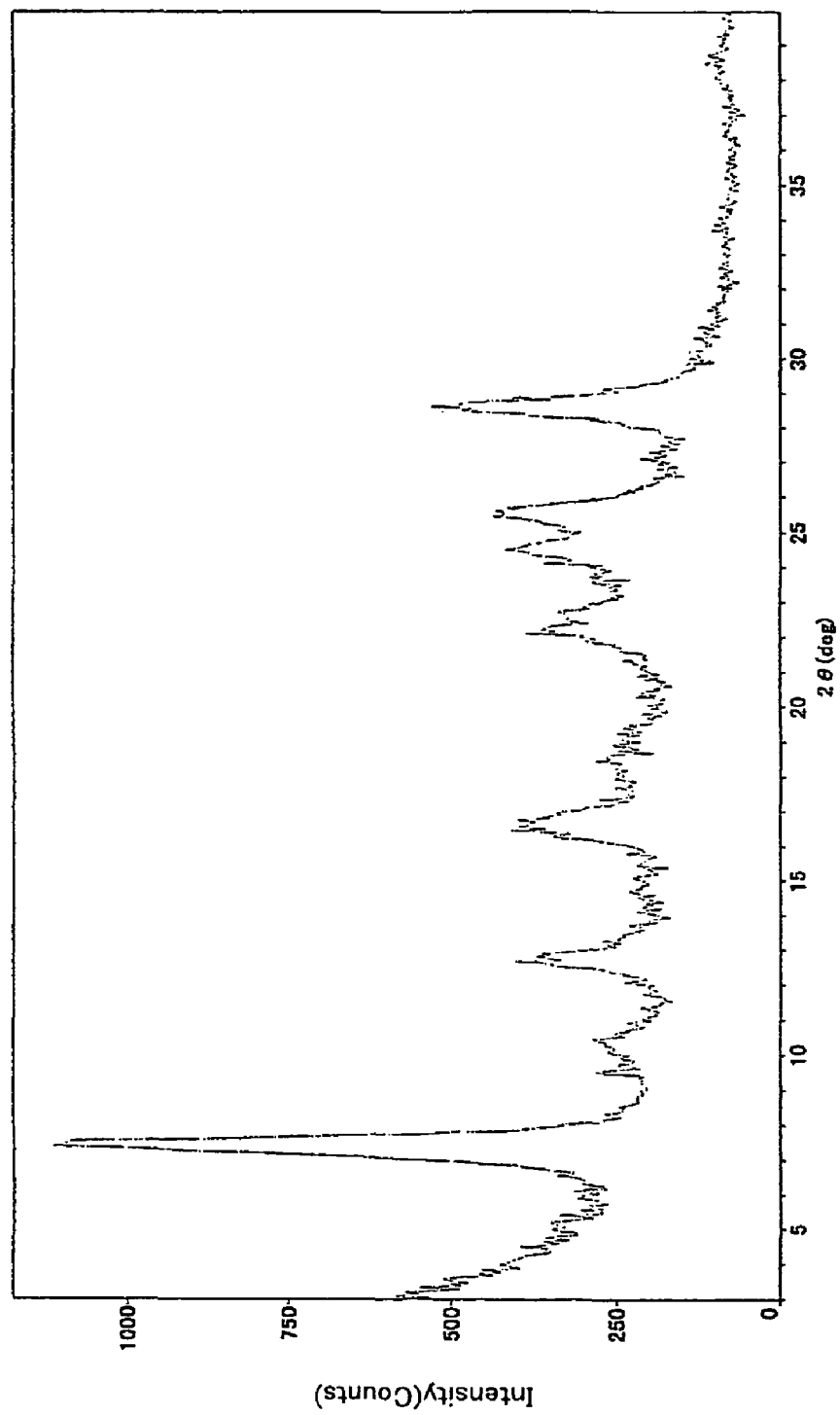
FIG. 35 is a powder X-ray diffraction pattern of the phthalocyanine composite produced in Example 27.
Figure 36:
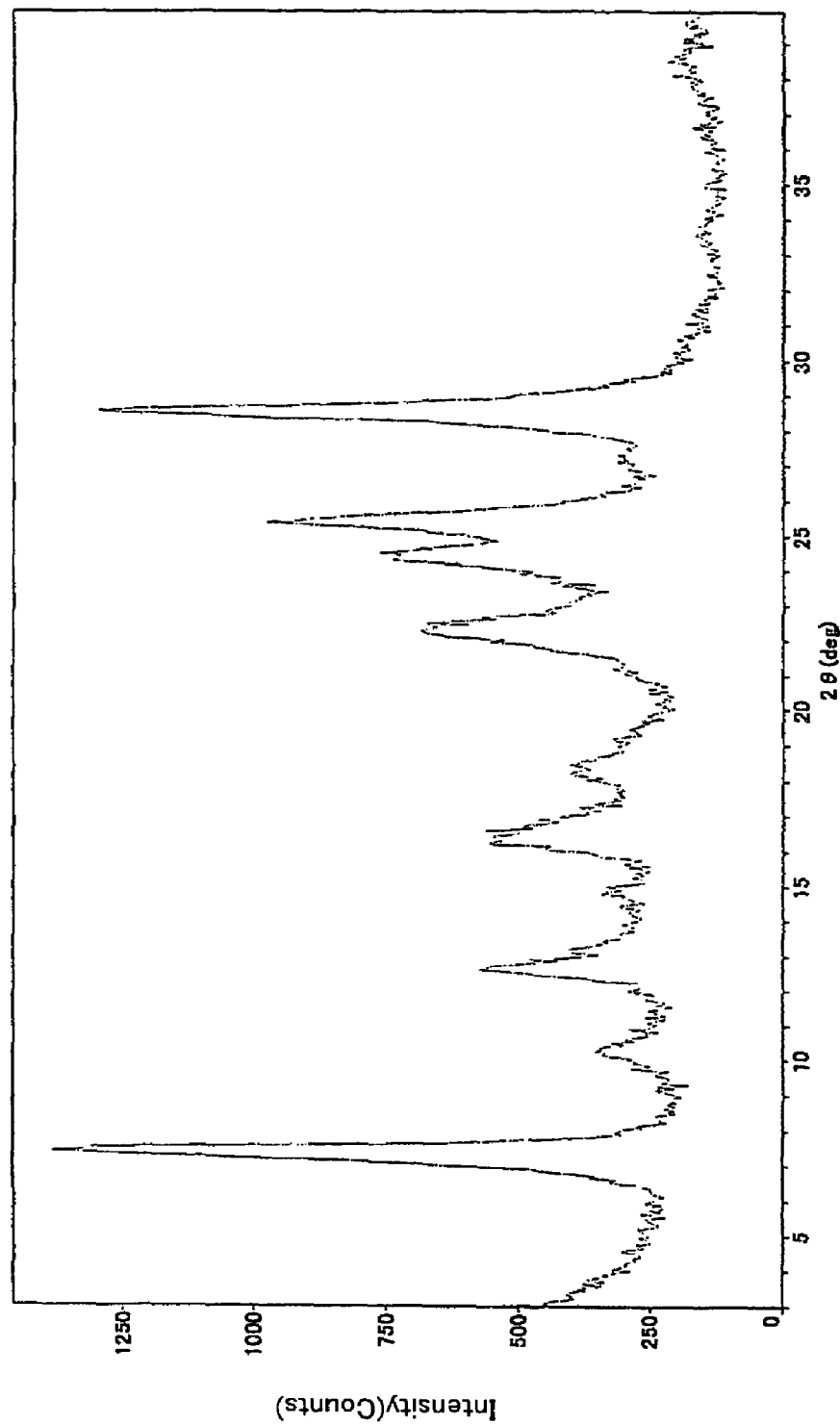
FIG. 36 is a powder X-ray diffraction pattern of the phthalocyanine composite produced in Example 28.
Figure 37:
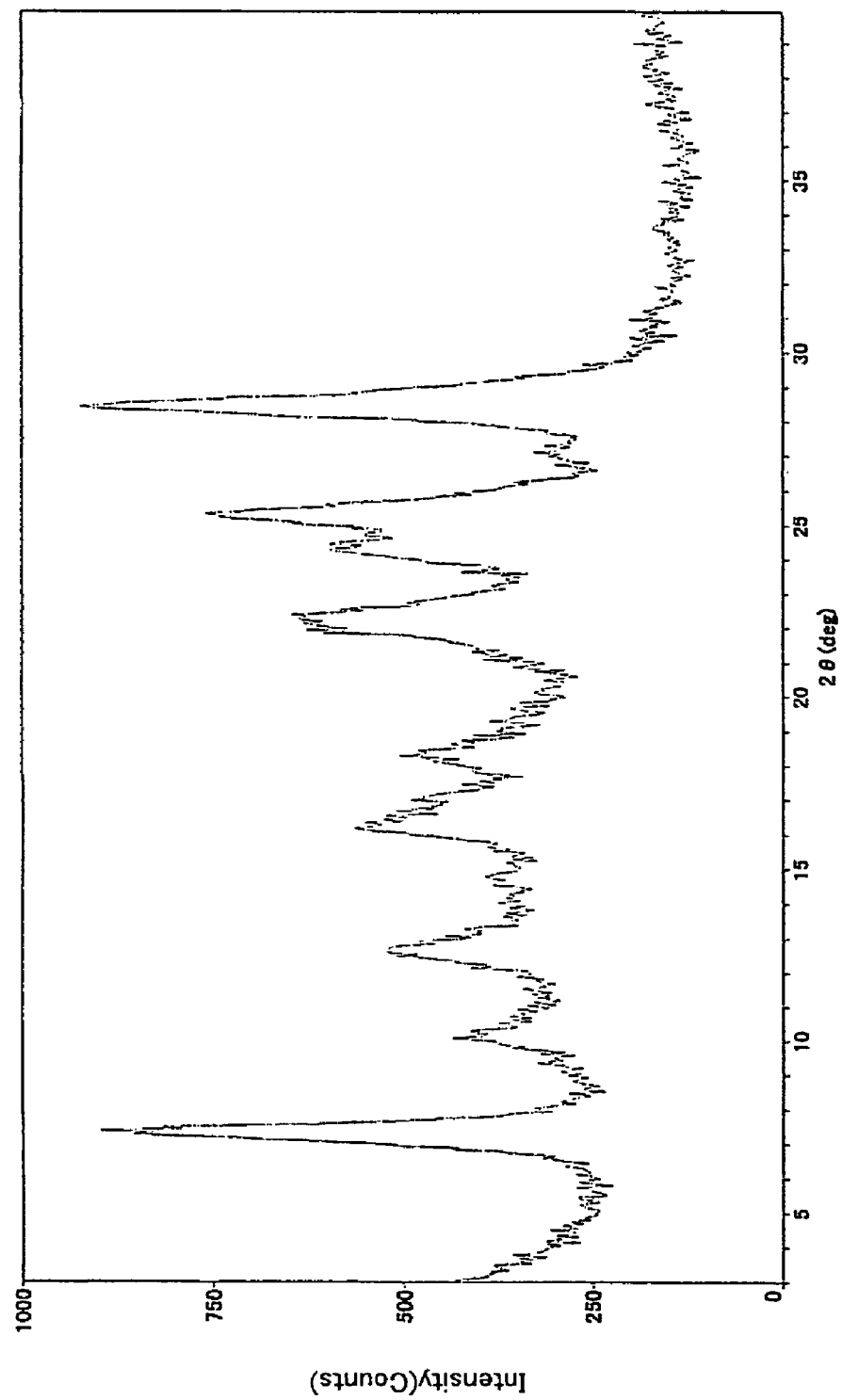
FIG. 37 is a powder X-ray diffraction pattern of the phthalocyanine composite produced in Example 29.
Figure 38:
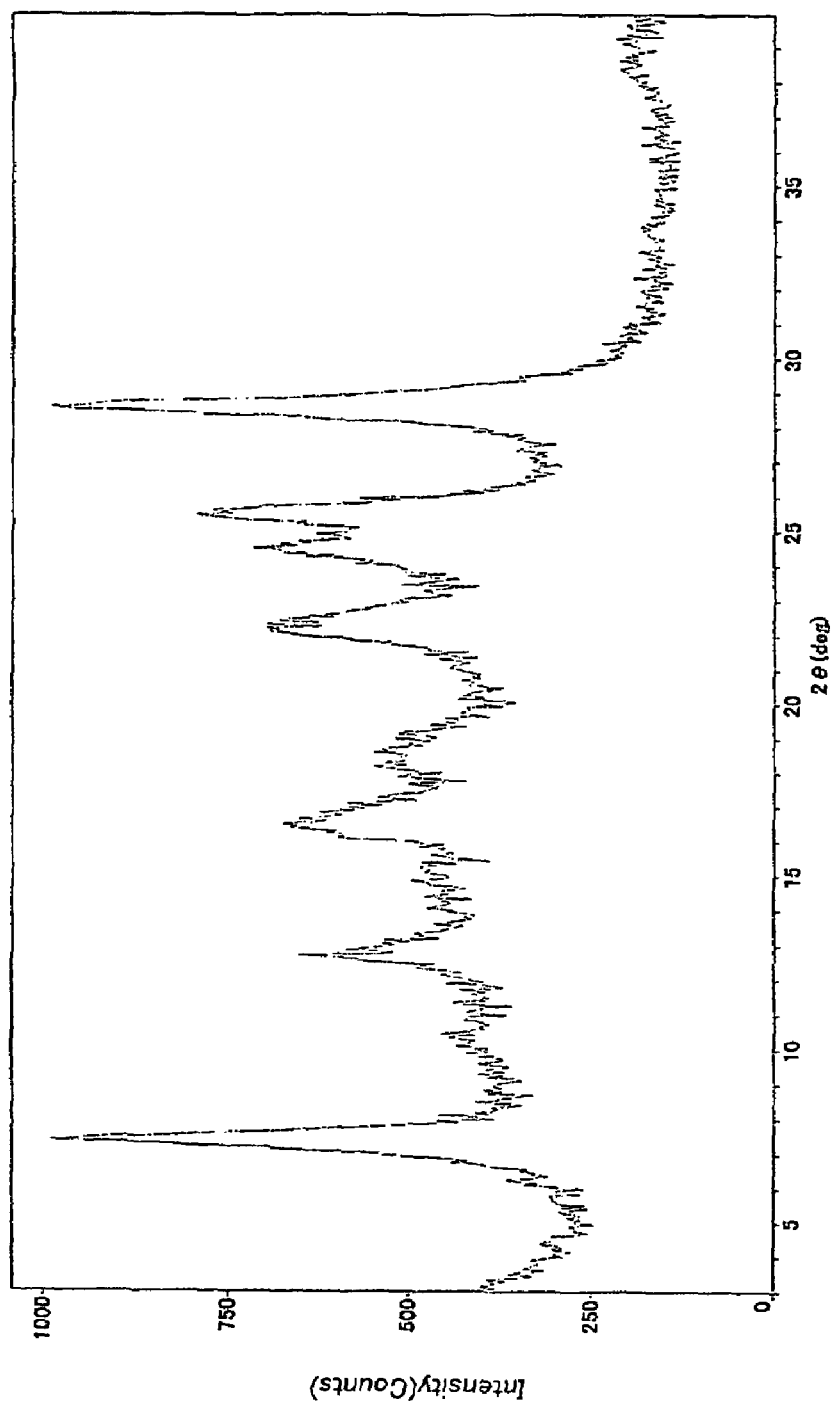
FIG. 38 is a powder X-ray diffraction pattern of the phthalocyanine composite produced in Example 30.
Figure 39:
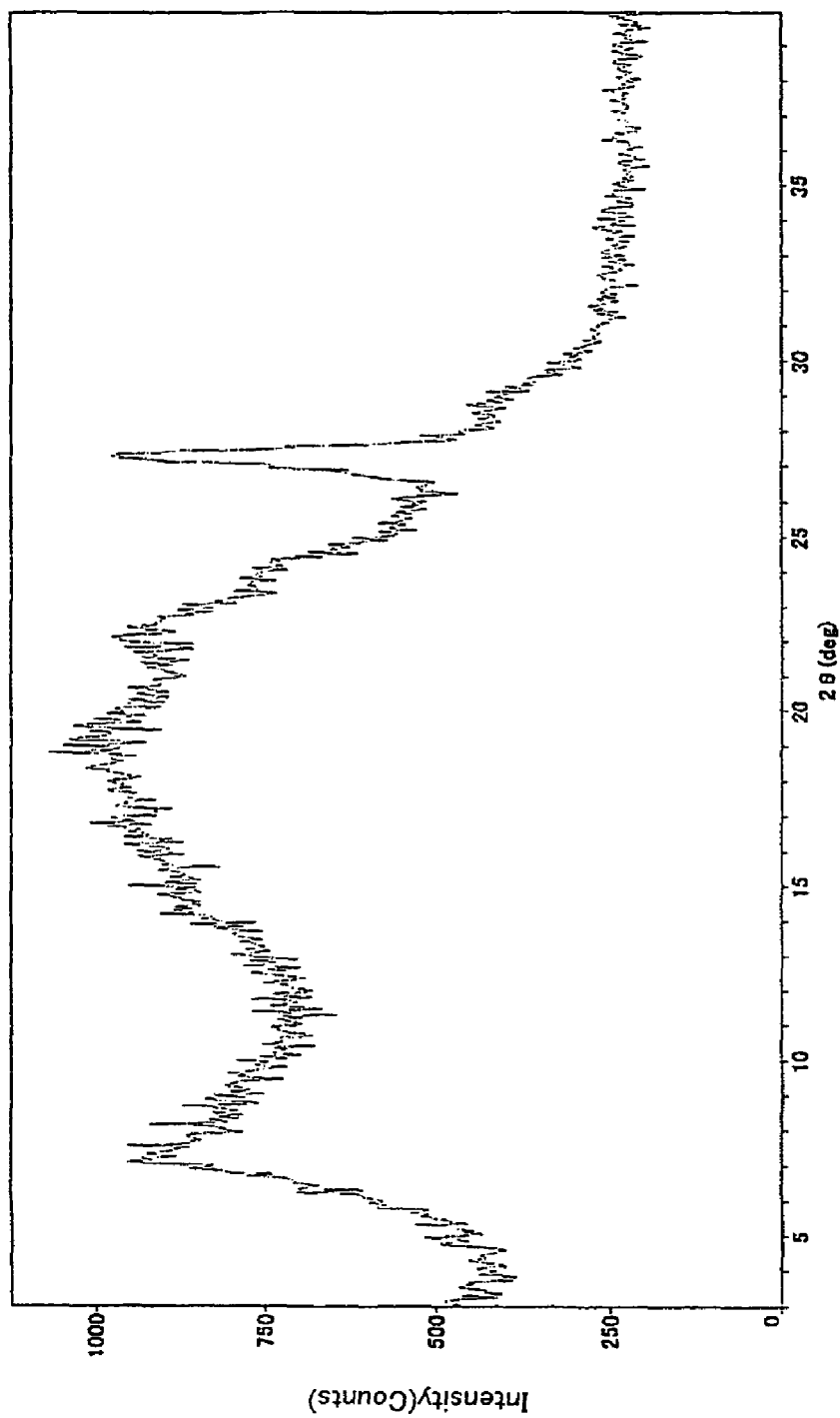
FIG. 39 is a powder X-ray diffraction pattern of the phthalocyanine composite produced in Example 31.
Figure 40:
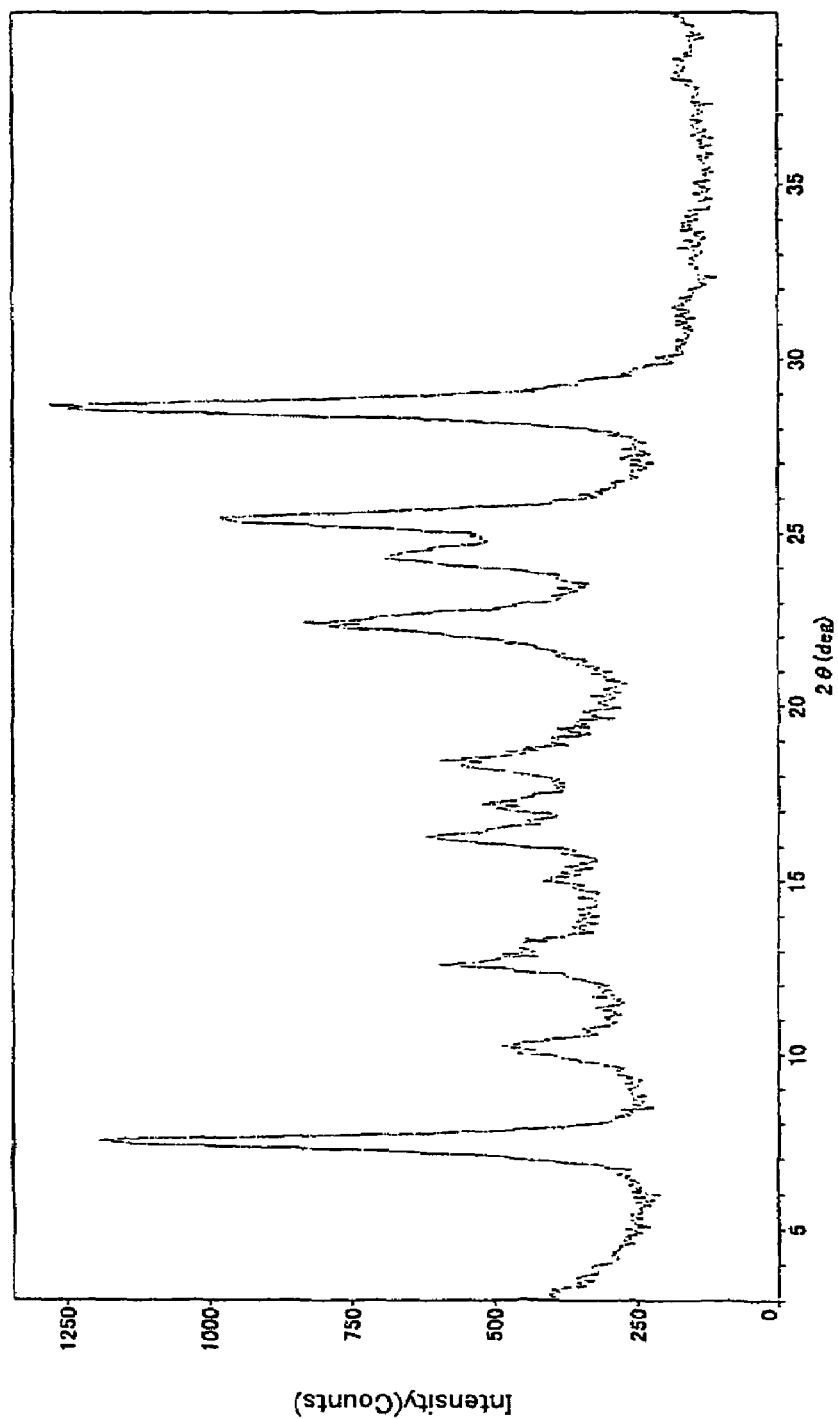
FIG. 40 is a powder X-ray diffraction pattern of the phthalocyanine composite produced in Example 32.
Figure 41:
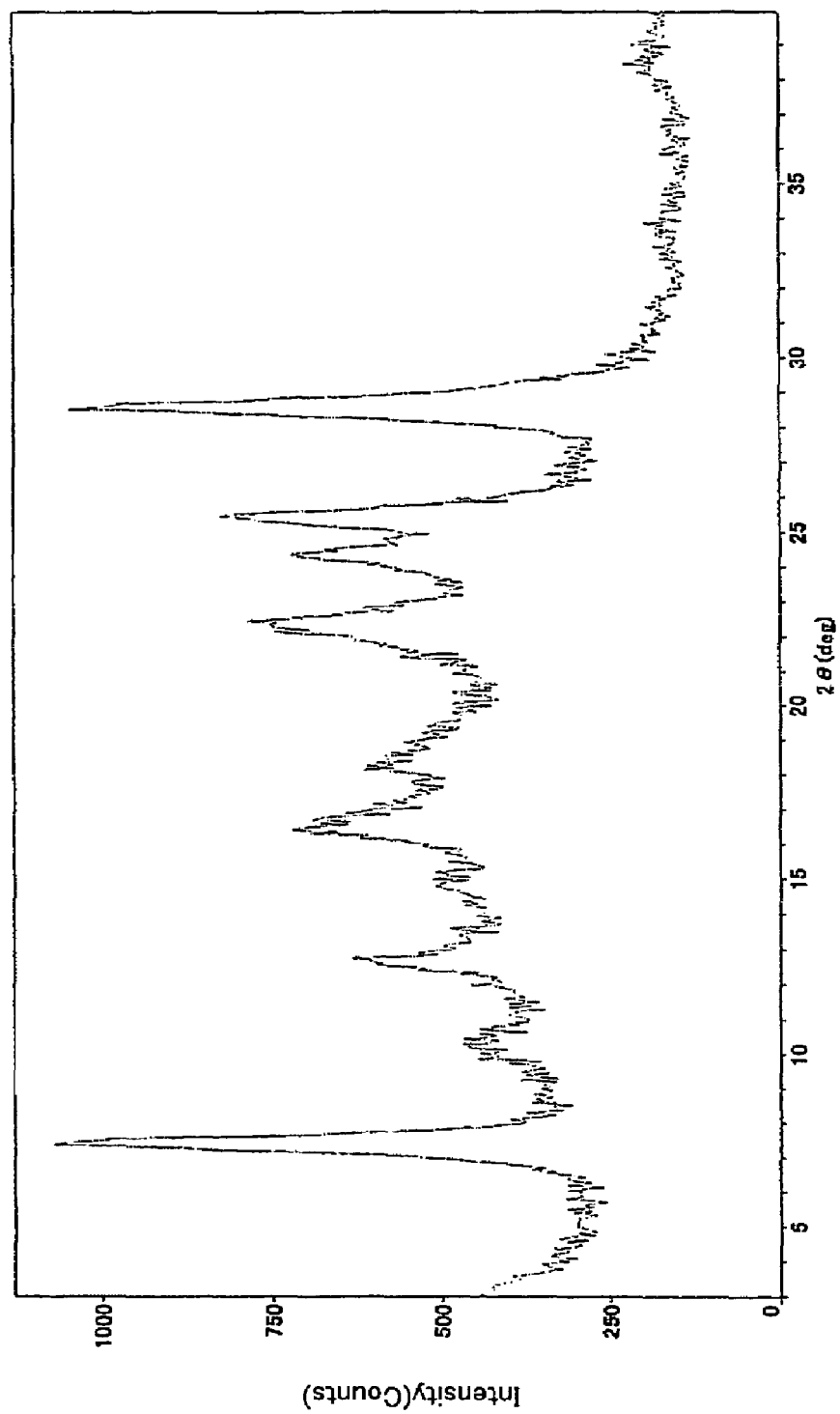
FIG. 41 is a powder X-ray diffraction pattern of the phthalocyanine composite produced in Example 33.
Figure 42:
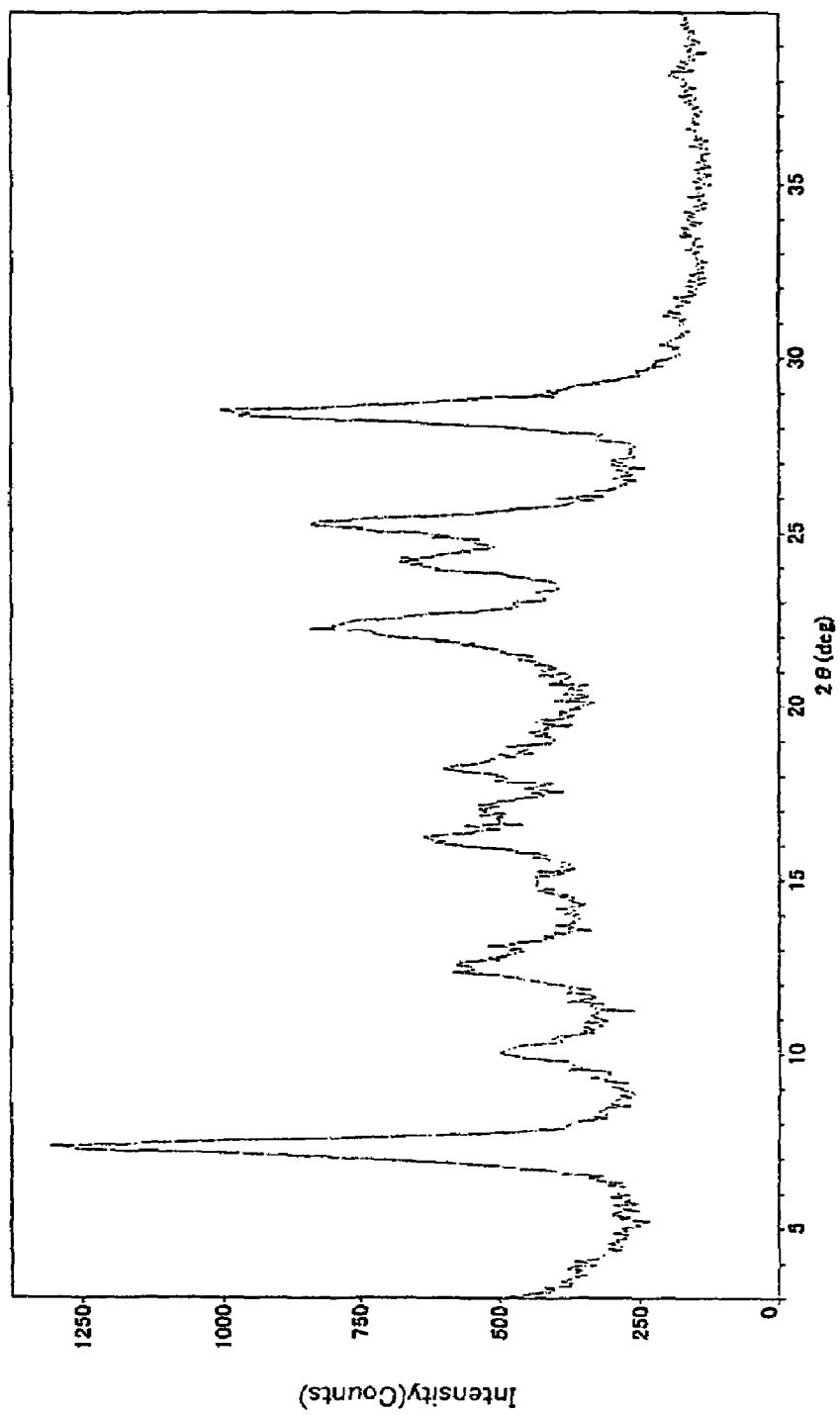
FIG. 42 is a powder X-ray diffraction pattern of the phthalocyanine composite produced in Example 34.
Figure 43:
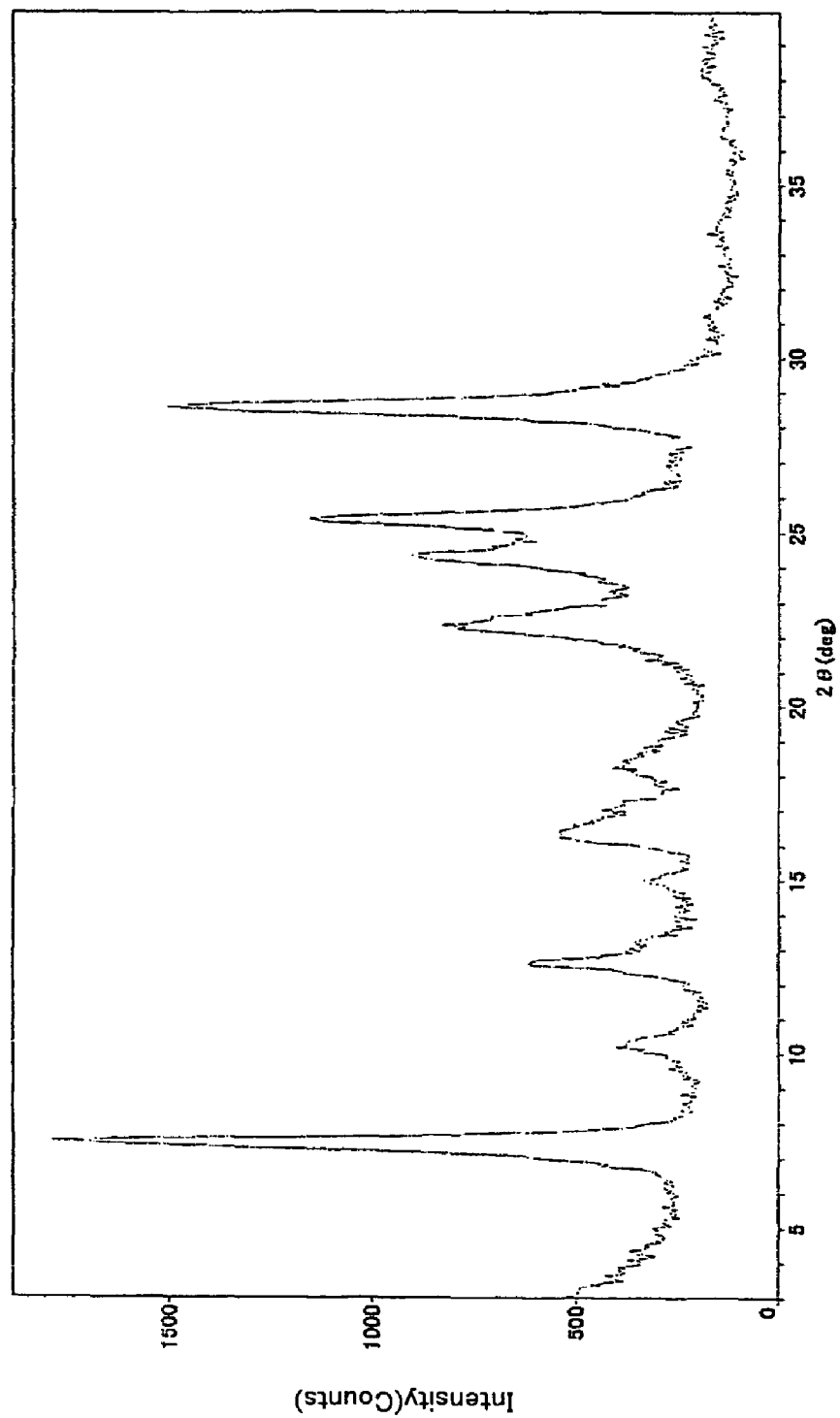
FIG. 43 is a powder X-ray diffraction pattern of the phthalocyanine composite produced in Example 35.
Figure 44:
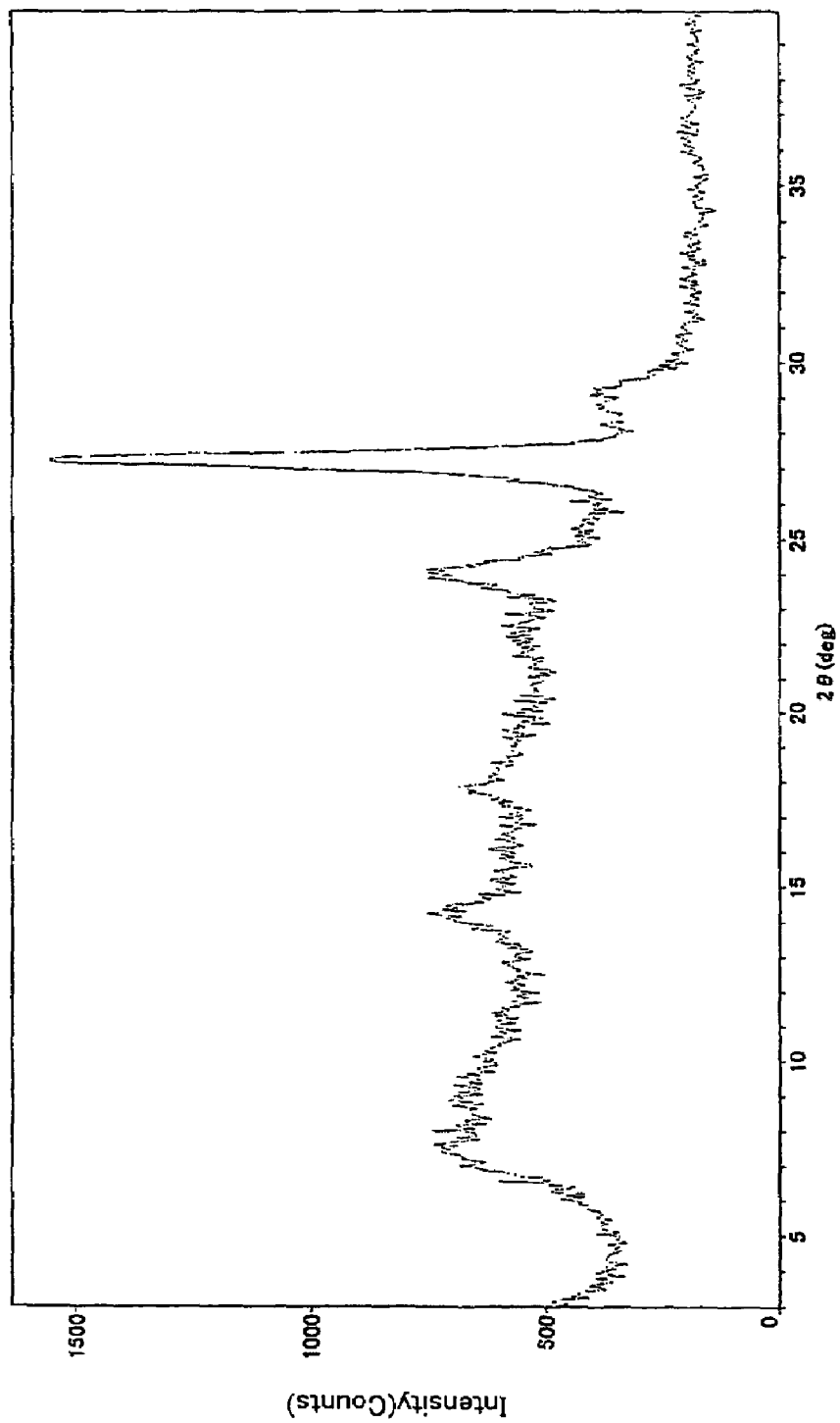
FIG. 44 is a powder X-ray diffraction pattern of the phthalocyanine composite produced in Example 36.
Figure 45:
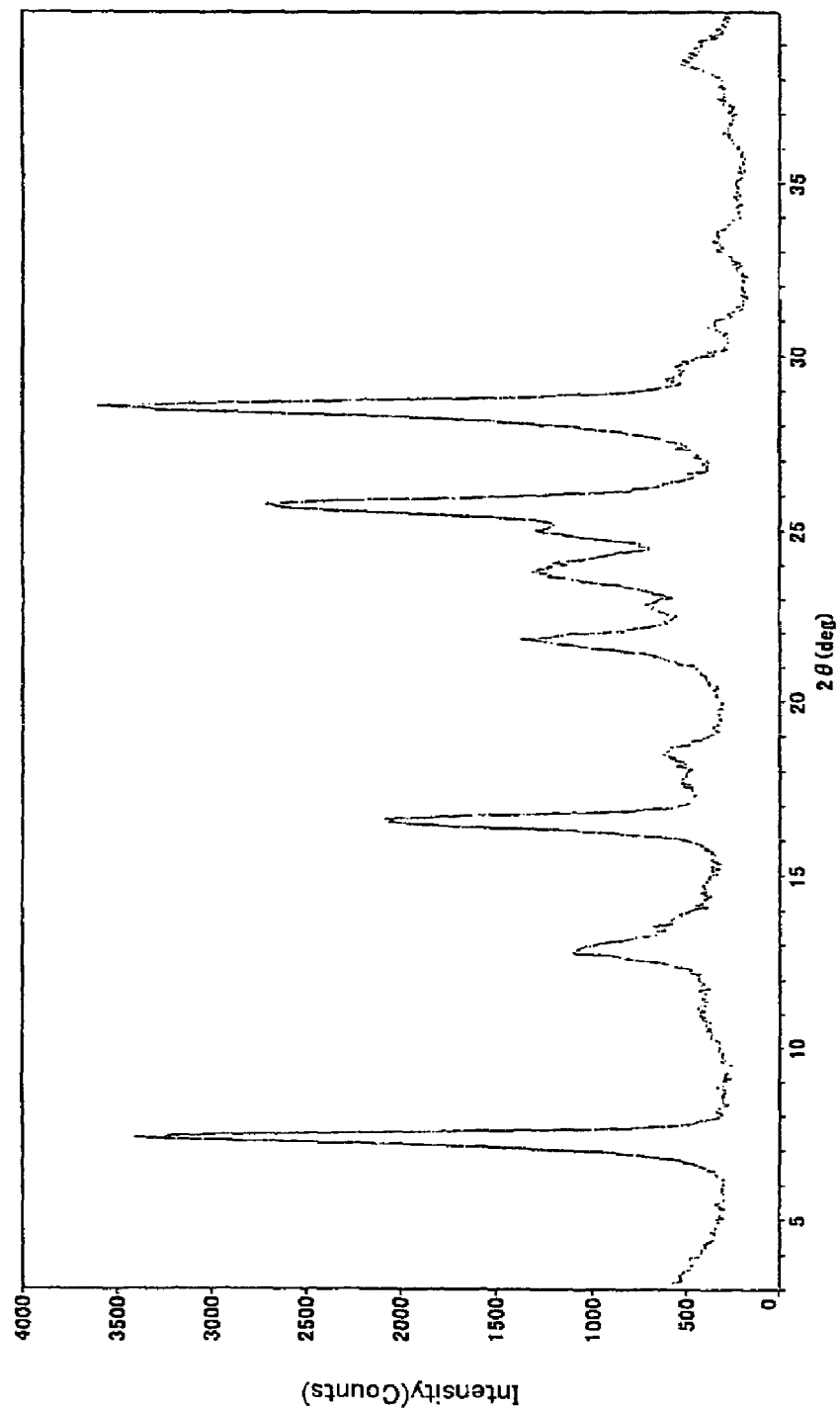
FIG. 45 is a powder X-ray diffraction pattern of the phthalocyanine composite produced in Example 37.
Figure 46:
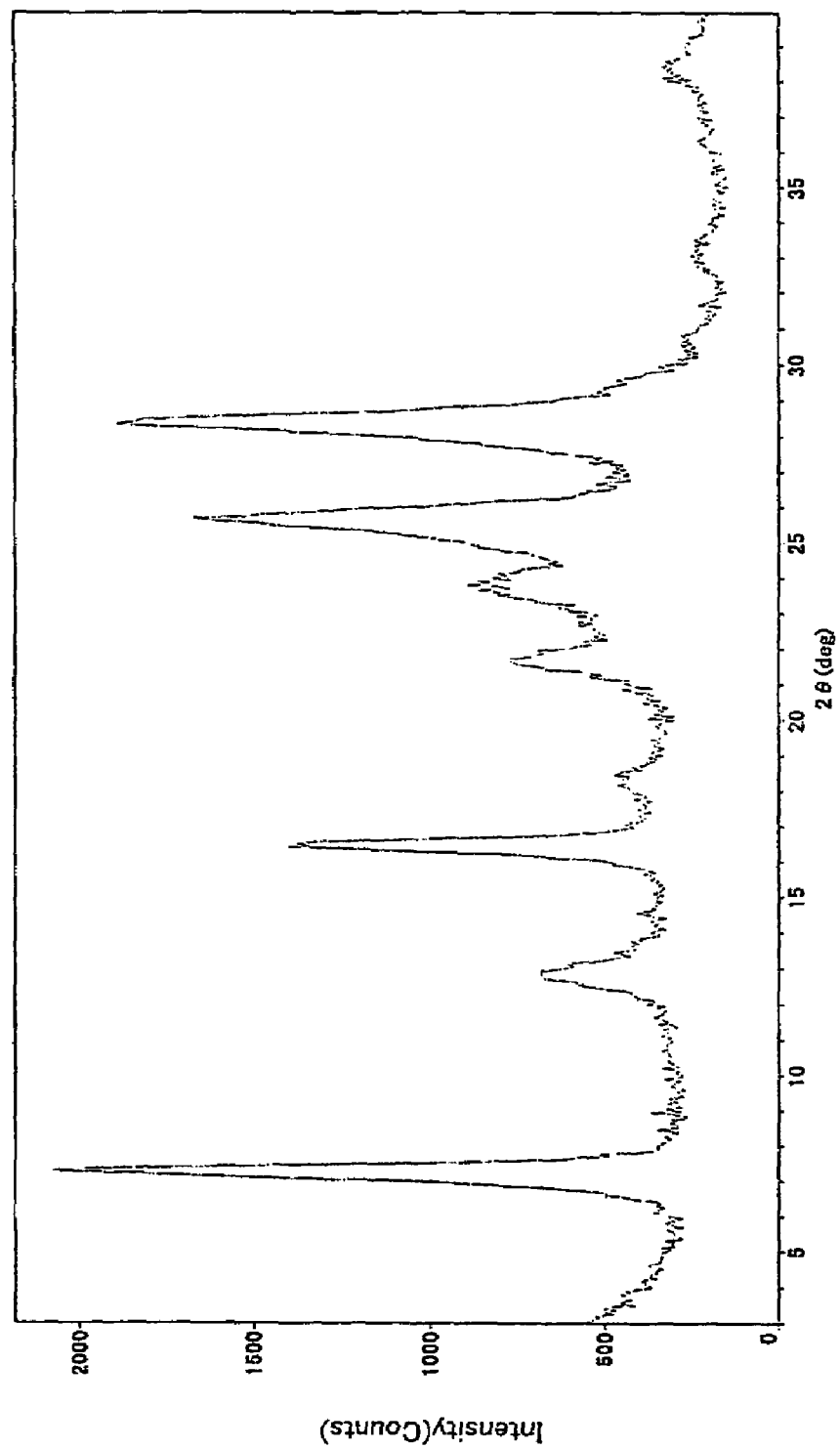
FIG. 46 is a powder X-ray diffraction pattern of the phthalocyanine composite produced in Example 38.
Figure 47:
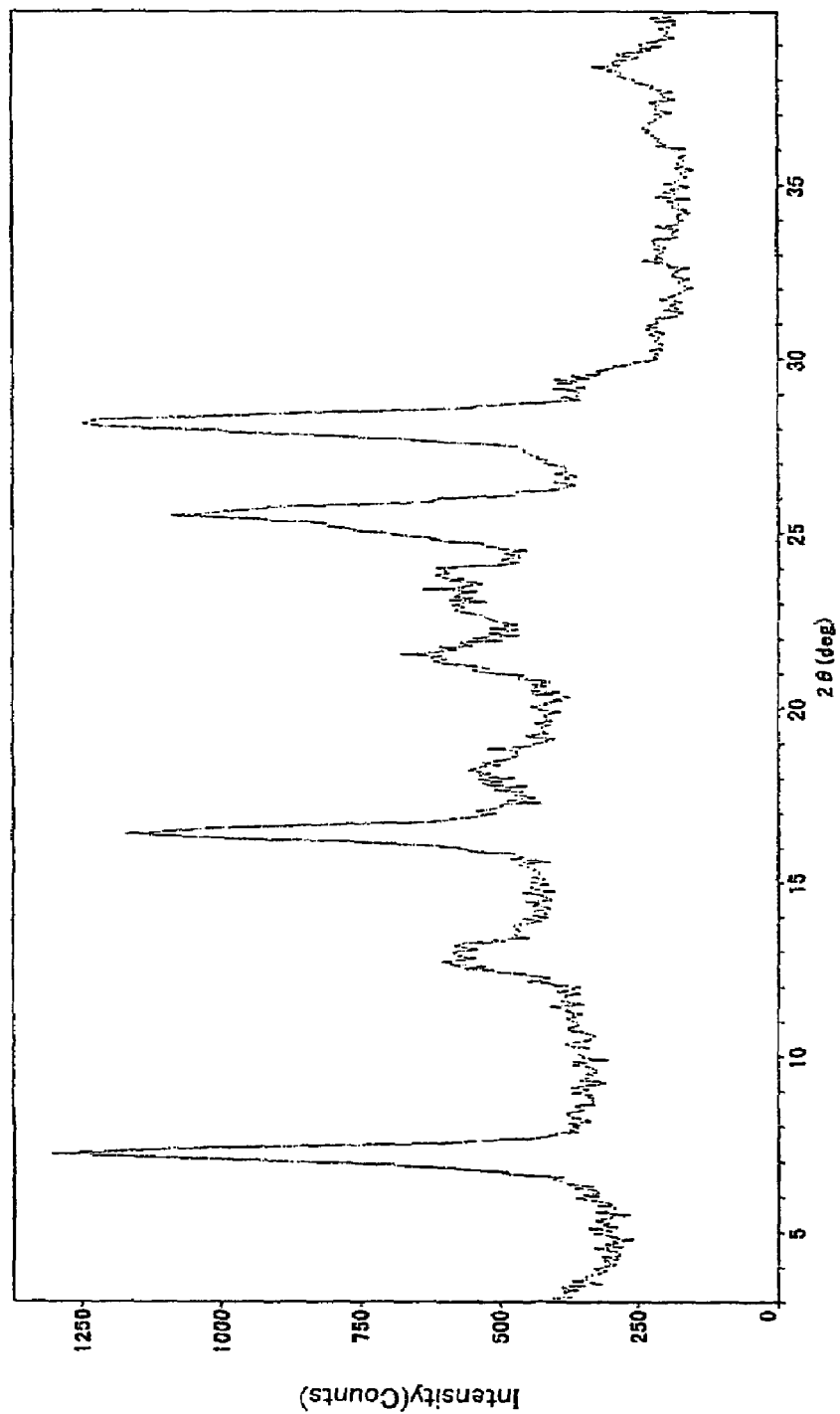
FIG. 47 is a powder X-ray diffraction pattern of the phthalocyanine composite produced in Example 39.
Figure 48:
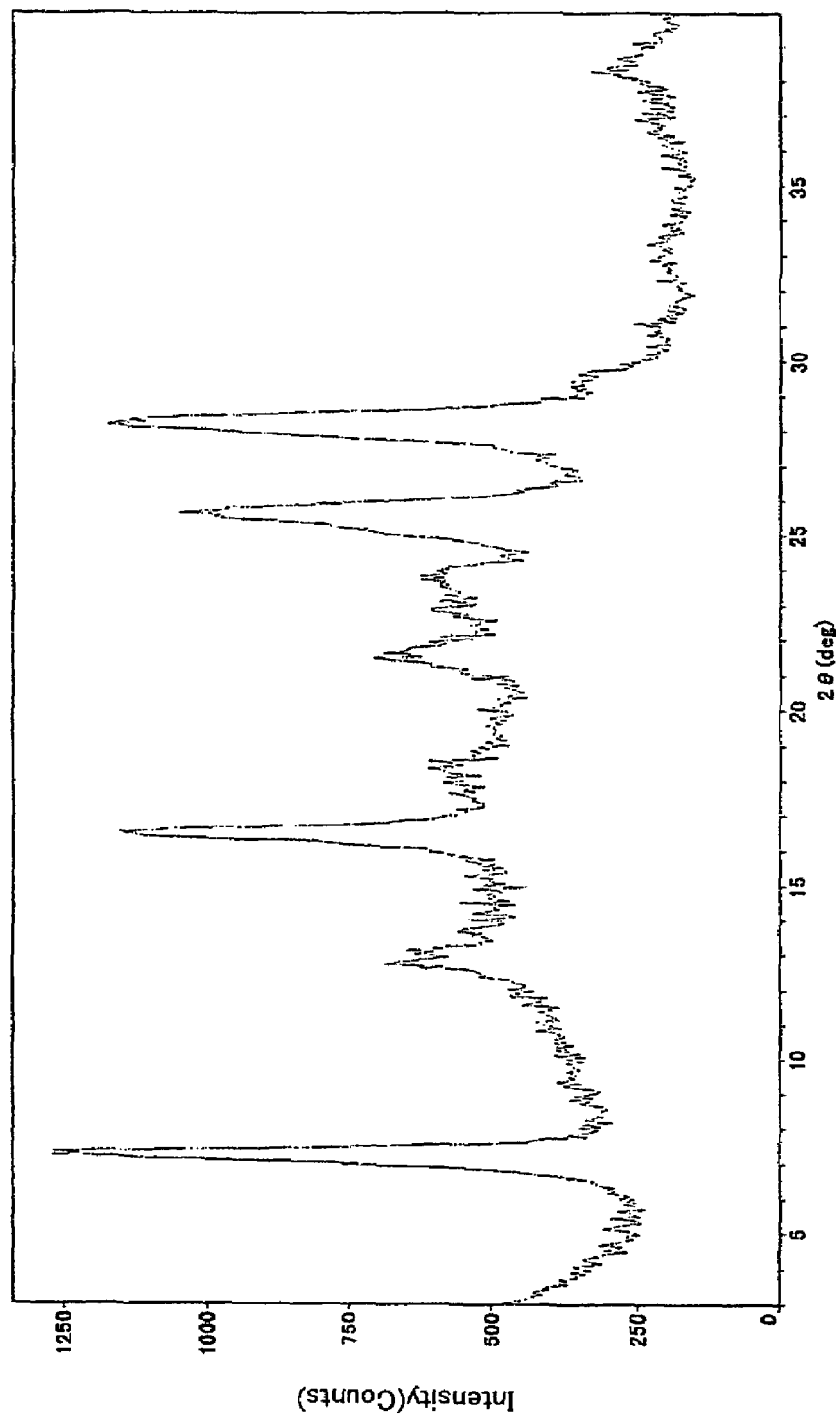
FIG. 48 is a powder X-ray diffraction pattern of the phthalocyanine composite produced in Example 40.
Figure 49:
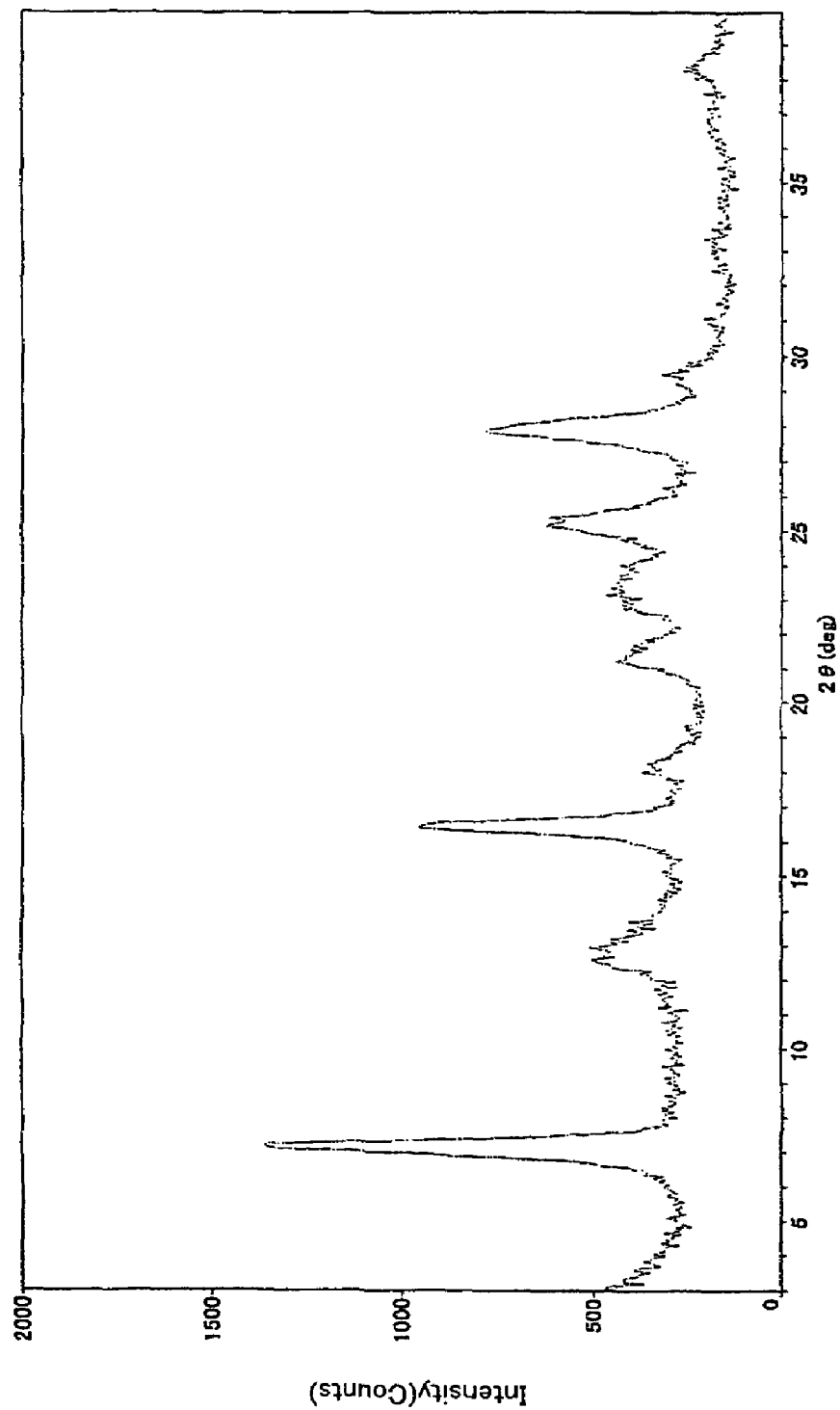
FIG. 49 is a powder X-ray diffraction pattern of the phthalocyanine composite produced in Example 41.
Figure 50:
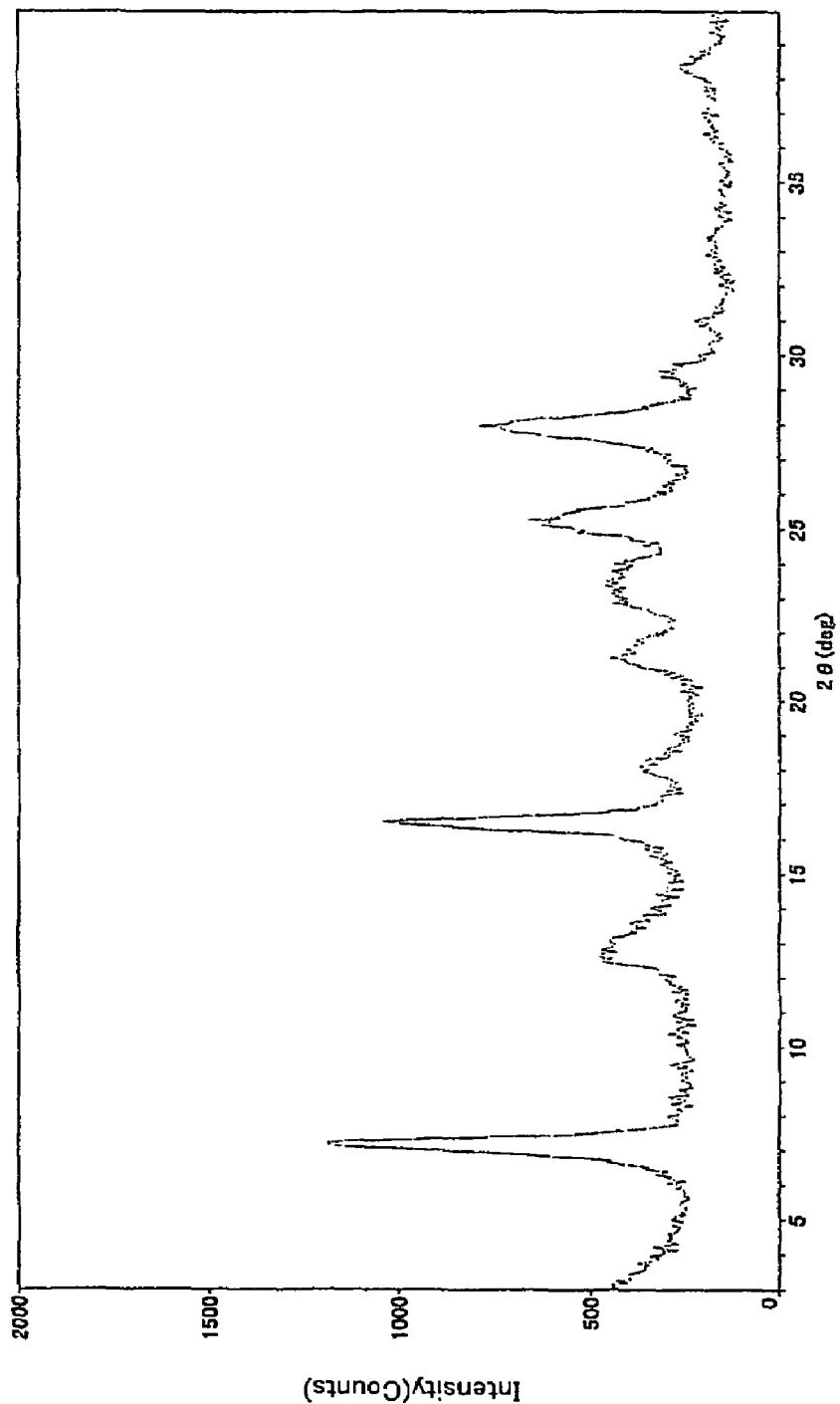
FIG. 50 is a powder X-ray diffraction pattern of the phthalocyanine composite produced in Example 42.
Figure 51:
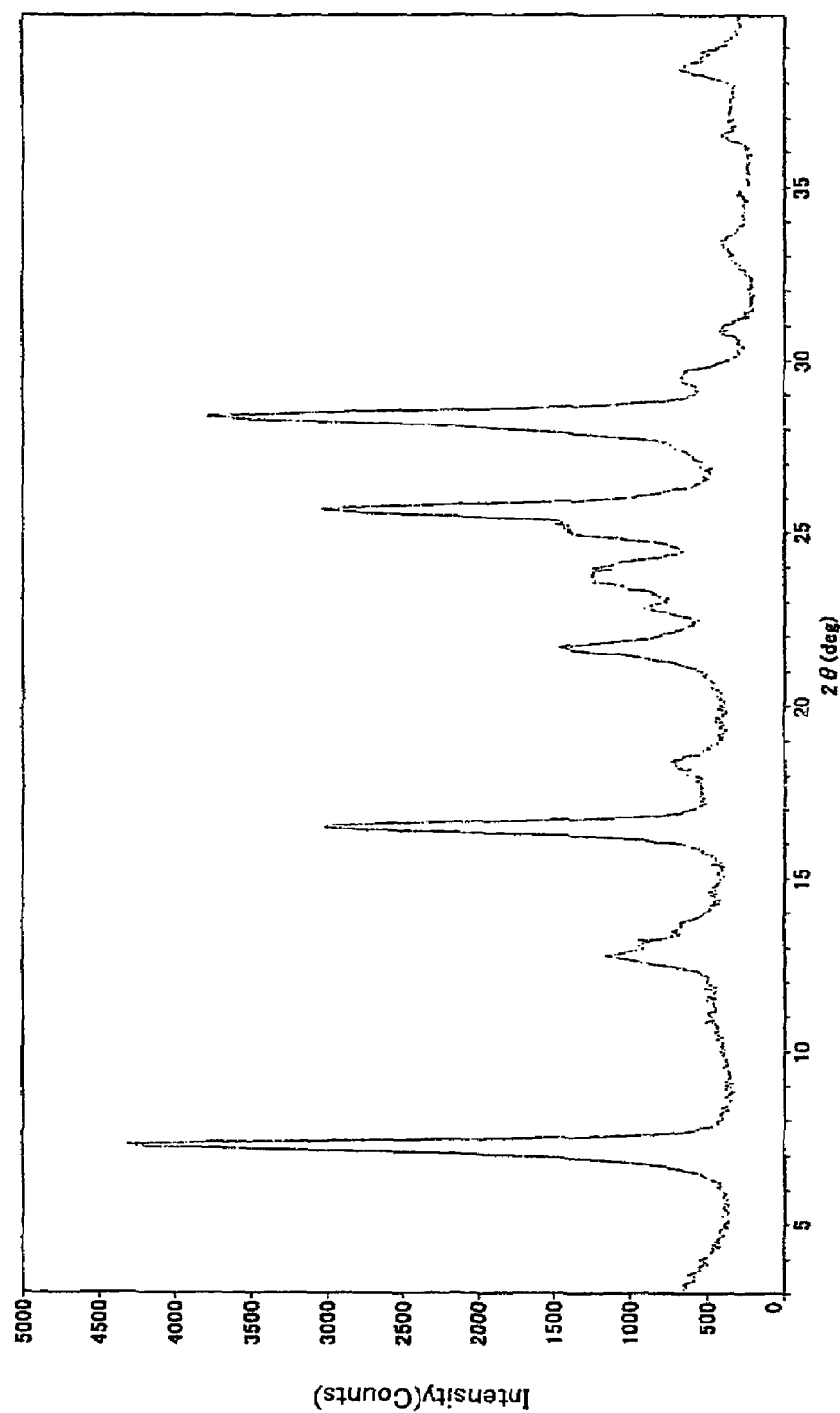
FIG. 51 is a powder X-ray diffraction pattern of the phthalocyanine composite produced in Example 43.
Figure 52:
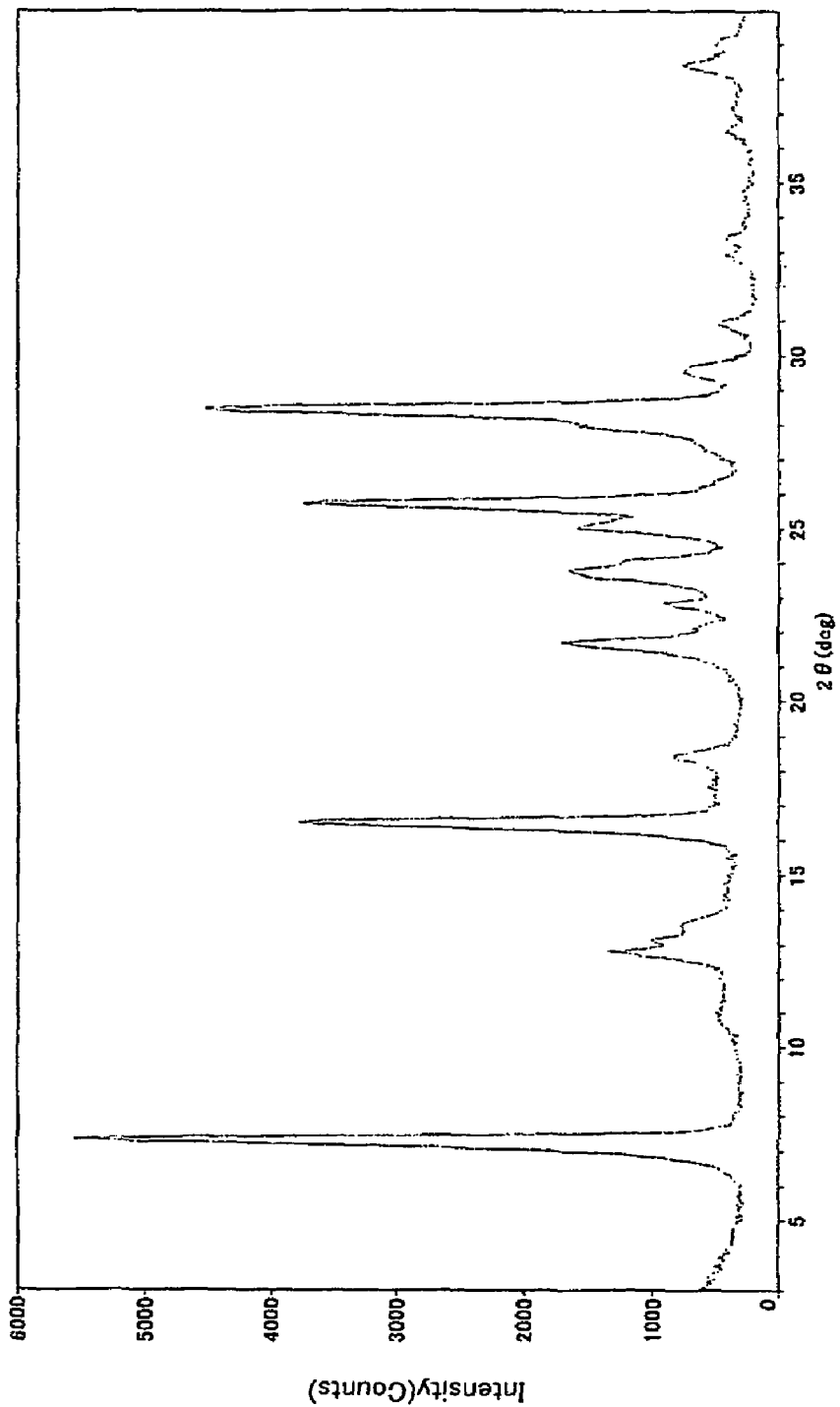
FIG. 52 is a powder X-ray diffraction pattern of the phthalocyanine composite produced in Example 44.
Figure 53:
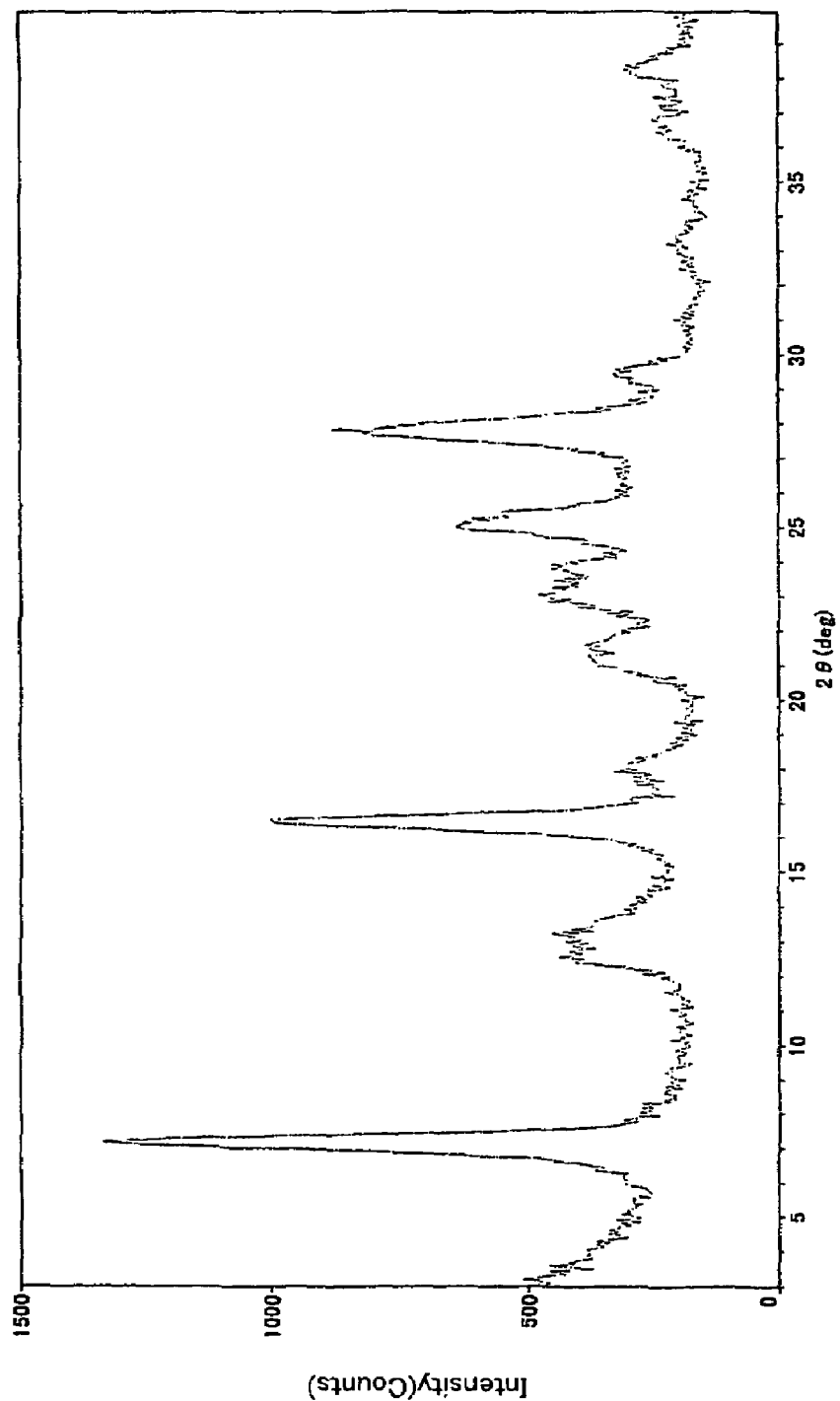
FIG. 53 is a powder X-ray diffraction pattern of the phthalocyanine composite produced in Example 45.
Figure 54:
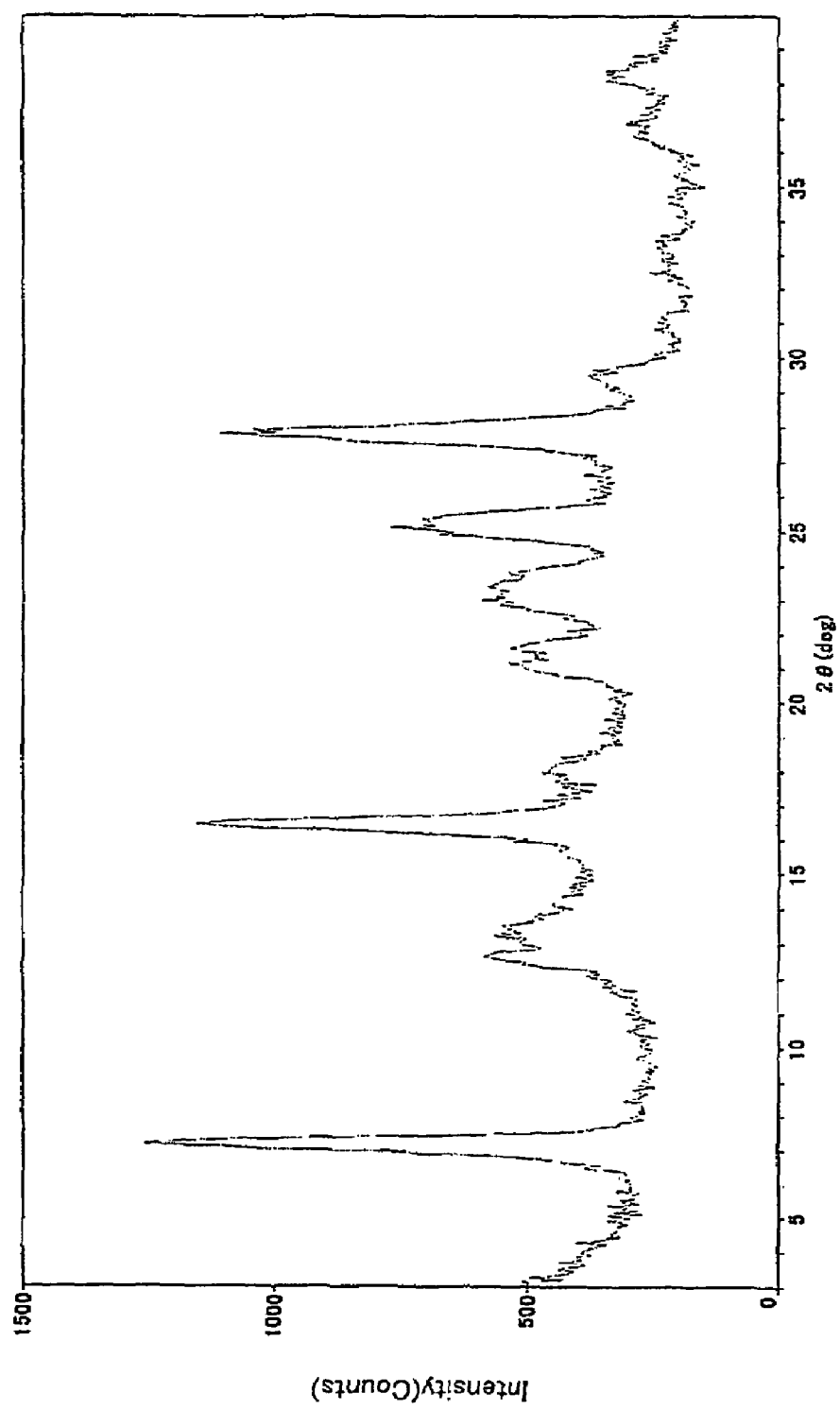
FIG. 54 is a powder X-ray diffraction pattern of the phthalocyanine composite produced in Example 46.
Figure 55:
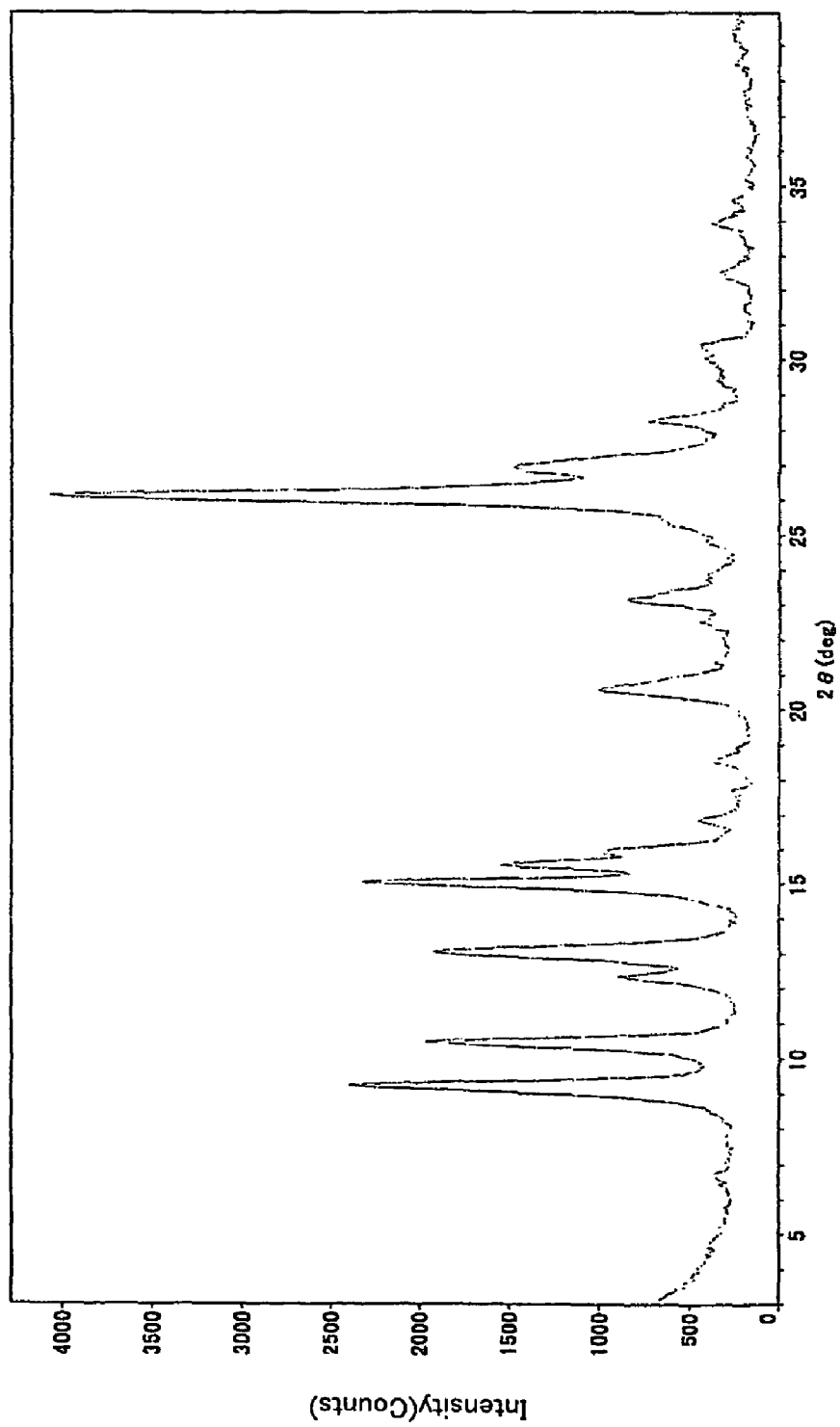
FIG. 55 is a powder X-ray diffraction pattern of the phthalocyanine composite produced in Comparative Example 1.
Figure 56:
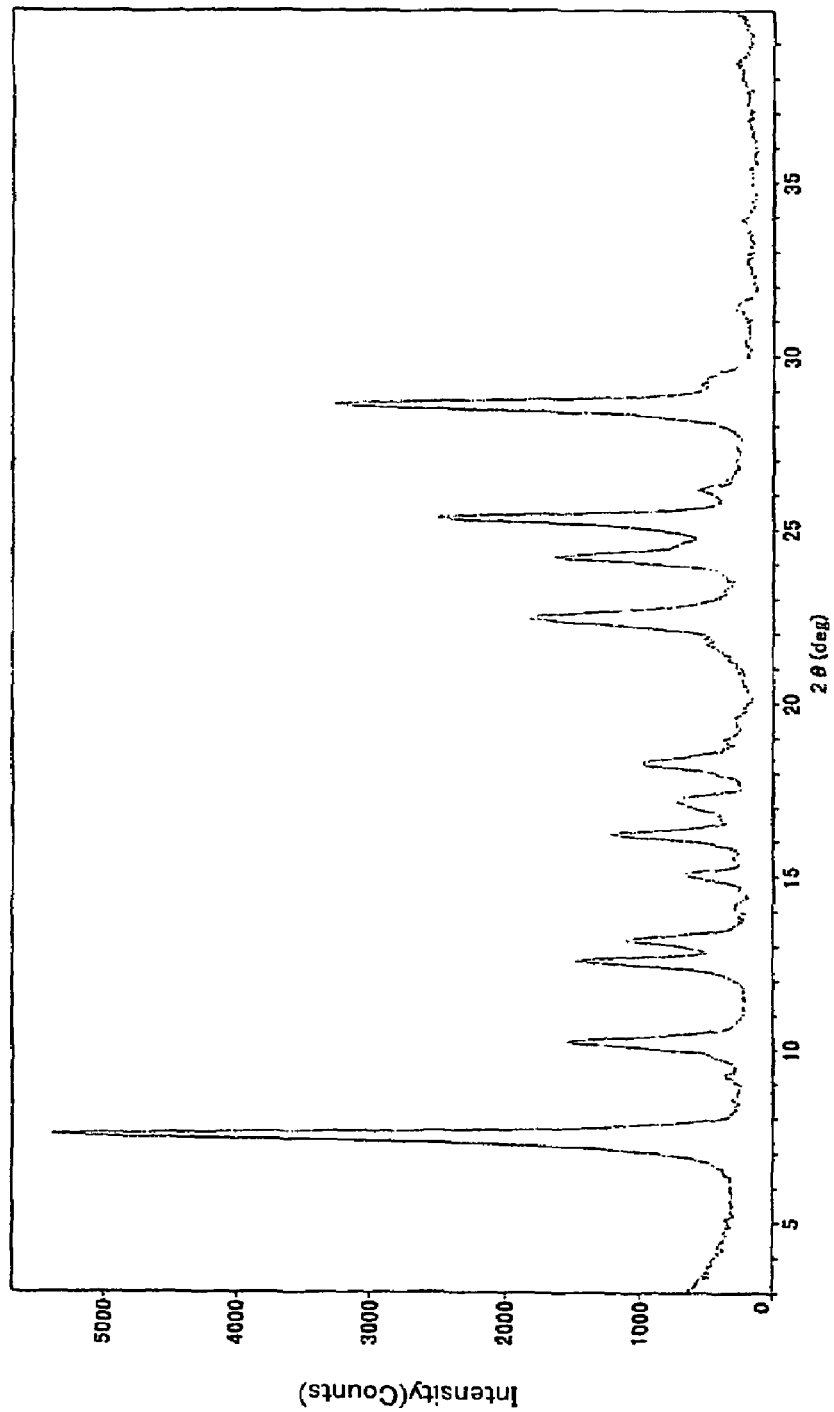
FIG. 56 is a powder X-ray diffraction pattern of the phthalocyanine composite produced in Comparative Example 2.
Figure 57:
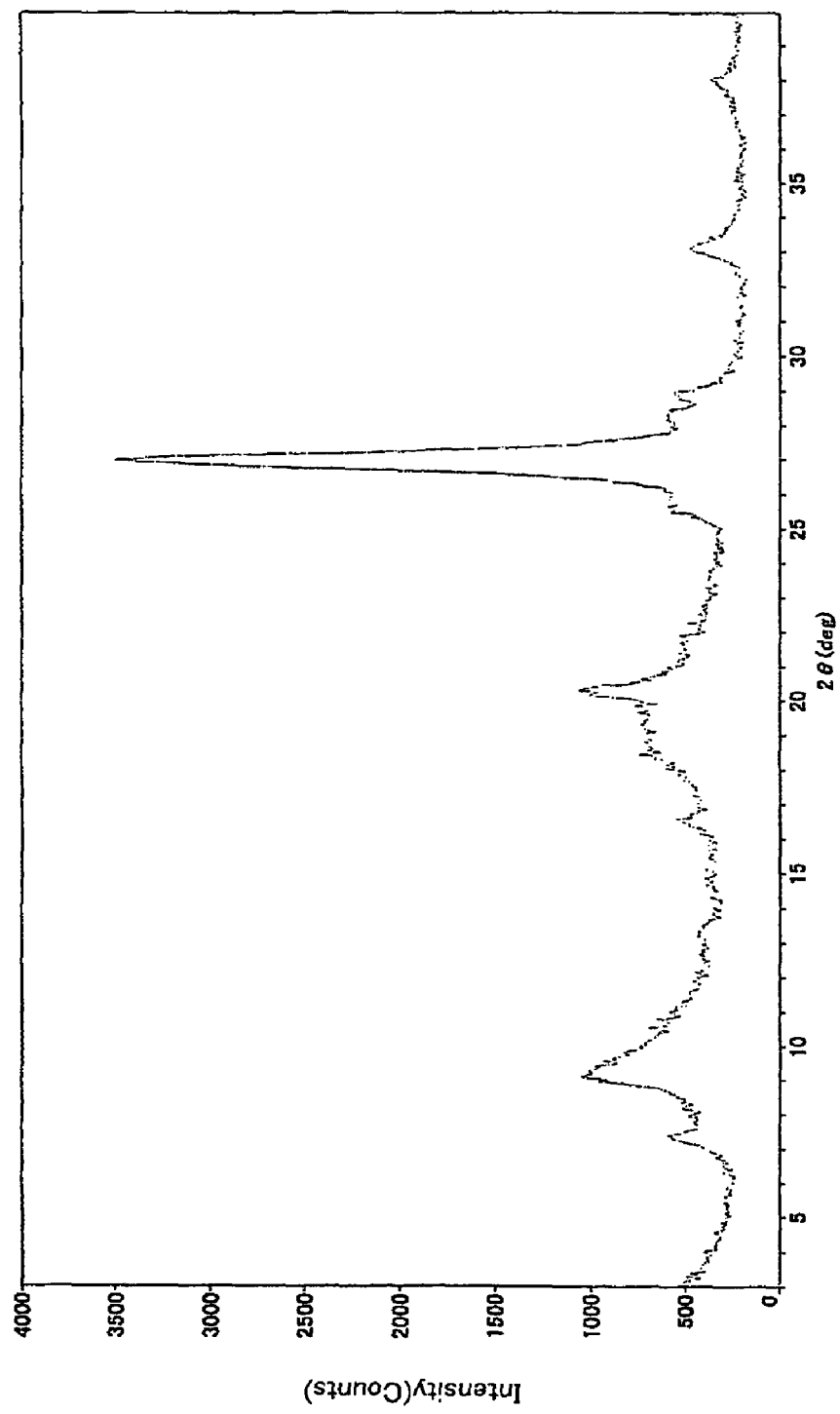
FIG. 57 is a powder X-ray diffraction pattern of the phthalocyanine composite produced in Comparative Example 3.
Figure 58:
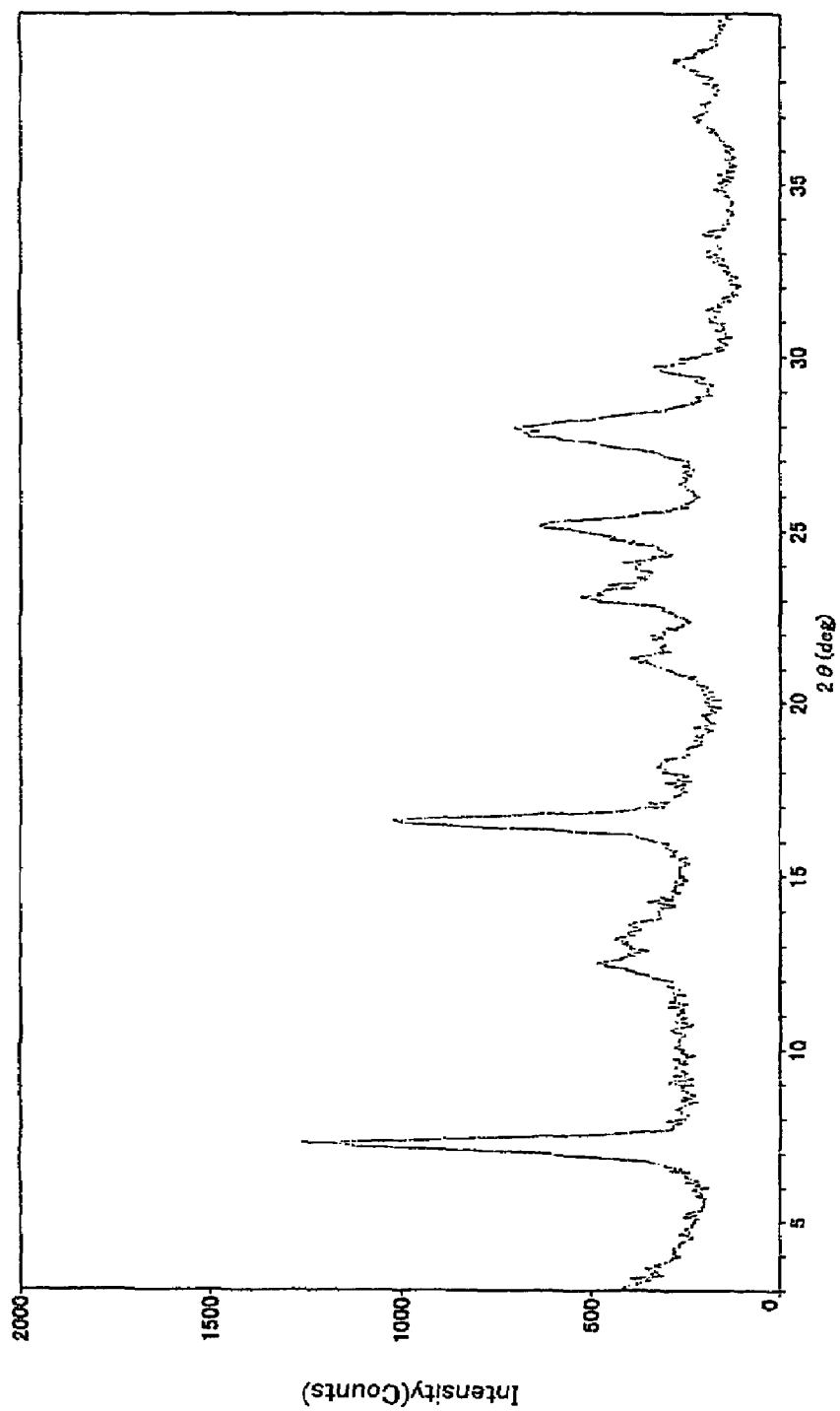
FIG. 58 is a powder X-ray diffraction pattern of the phthalocyanine composite produced in Comparative Example 4.
Figure 59:
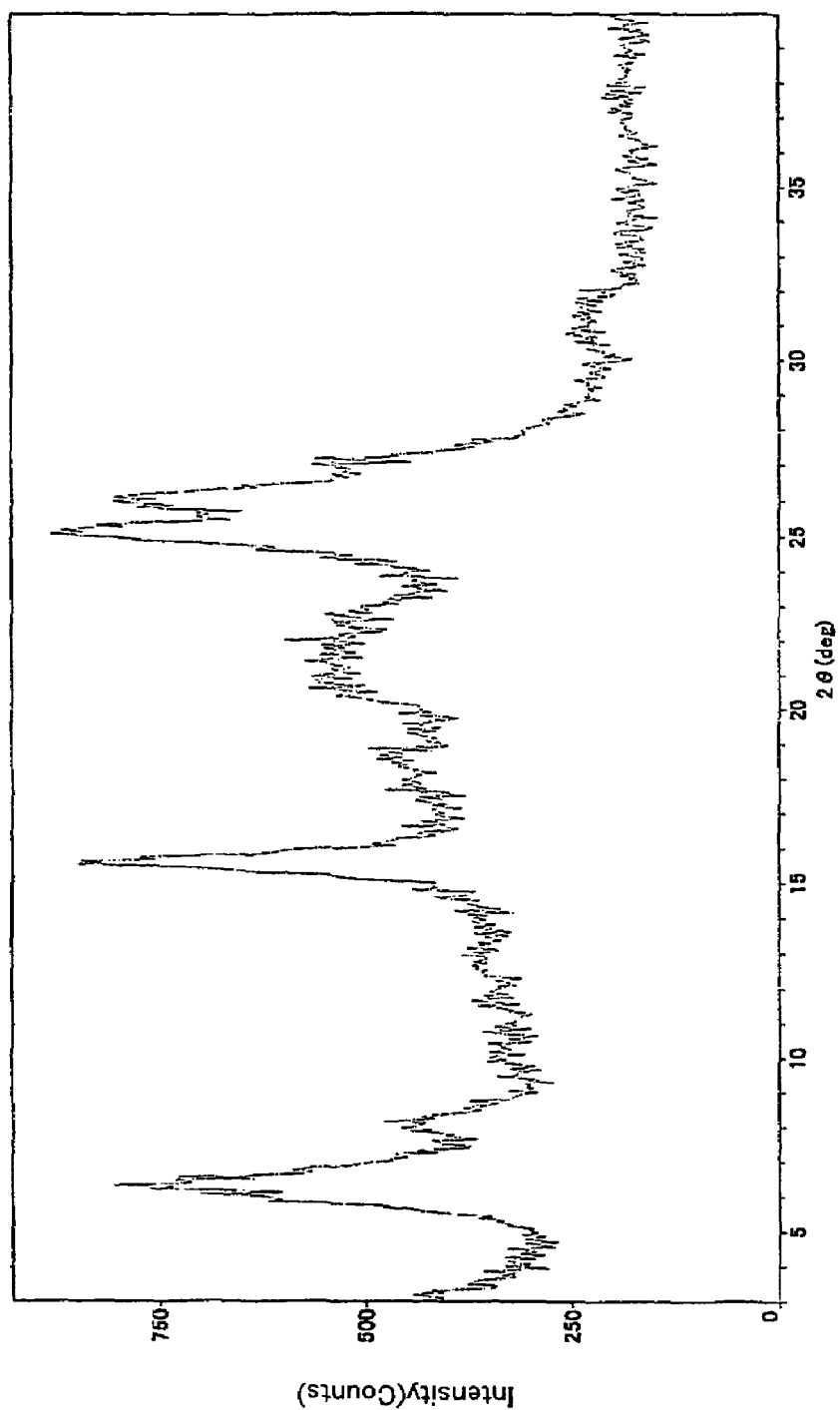
FIG. 59 is a powder X-ray diffraction pattern of the phthalocyanine composite produced in Comparative Example 5.
Figure 60:
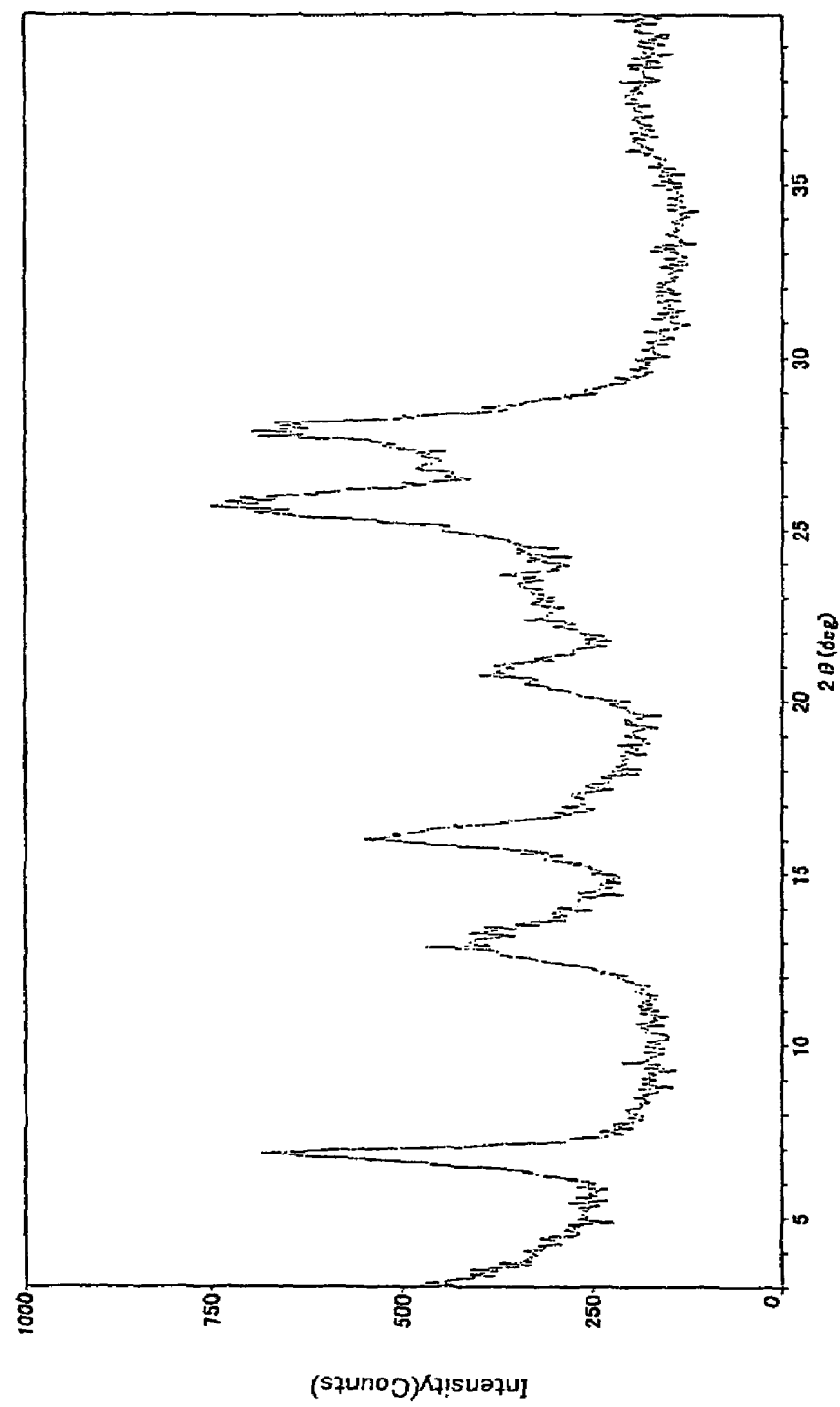
FIG. 60 is a powder X-ray diffraction pattern of the phthalocyanine composite produced in Comparative Example 6.
Figure 61:
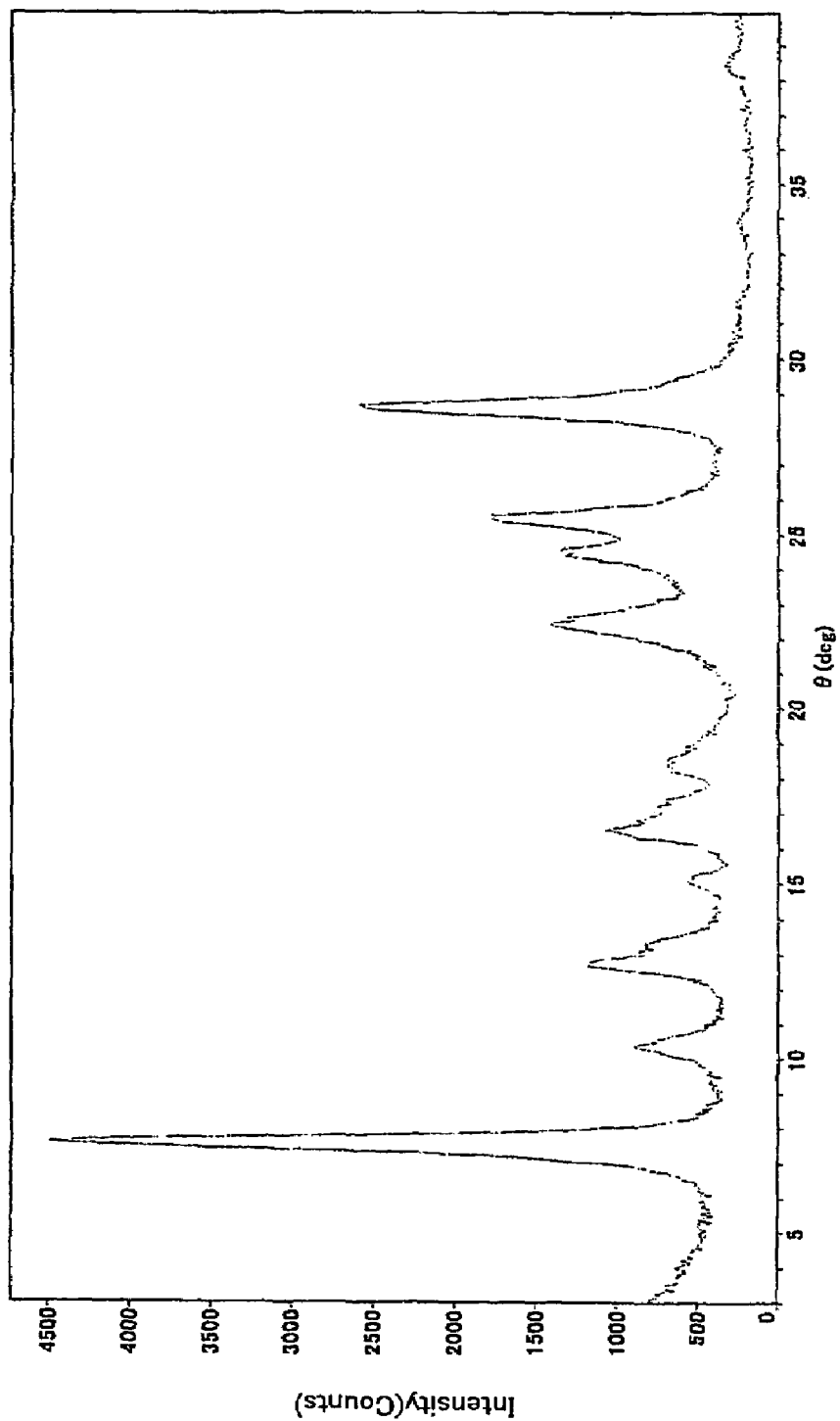
FIG. 61 is a powder X-ray diffraction pattern of the phthalocyanine composite produced in Comparative Example 7.
Figure 62:
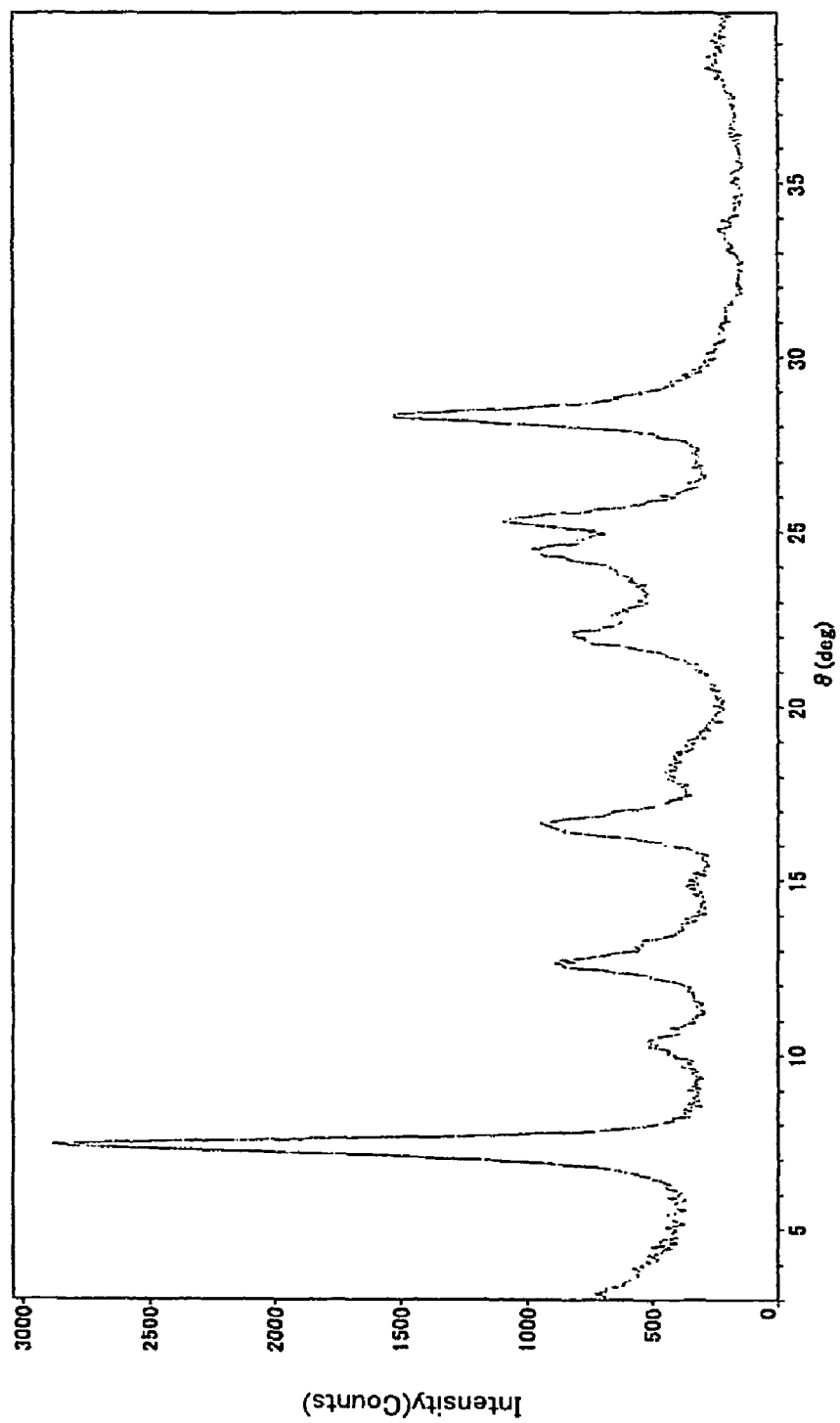
FIG. 62 is a powder X-ray diffraction pattern of the phthalocyanine composite produced in Comparative Example 8.
Figure 63:
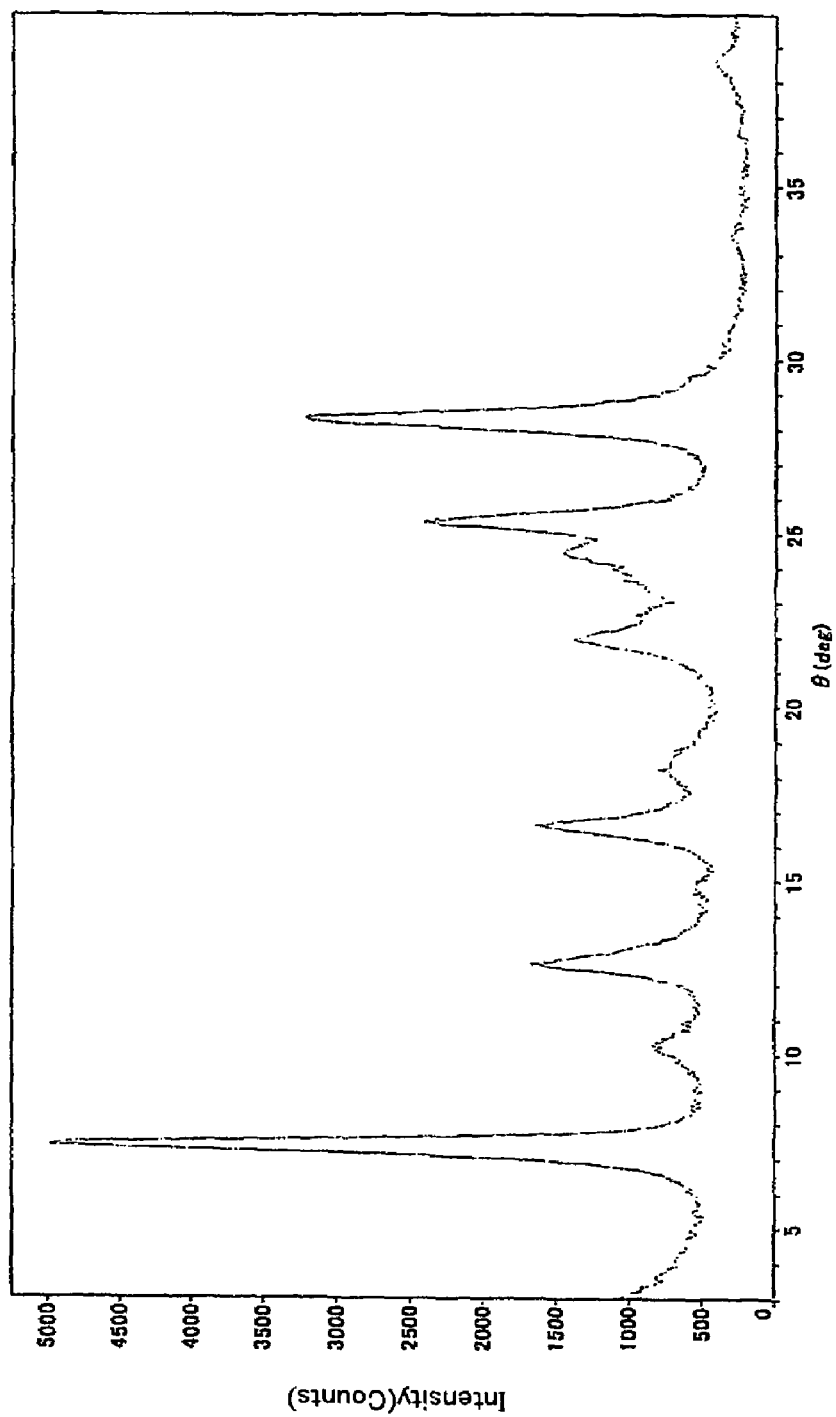
FIG. 63 is a powder X-ray diffraction pattern of the phthalocyanine composite produced in Comparative Example 9.
Figure 64:
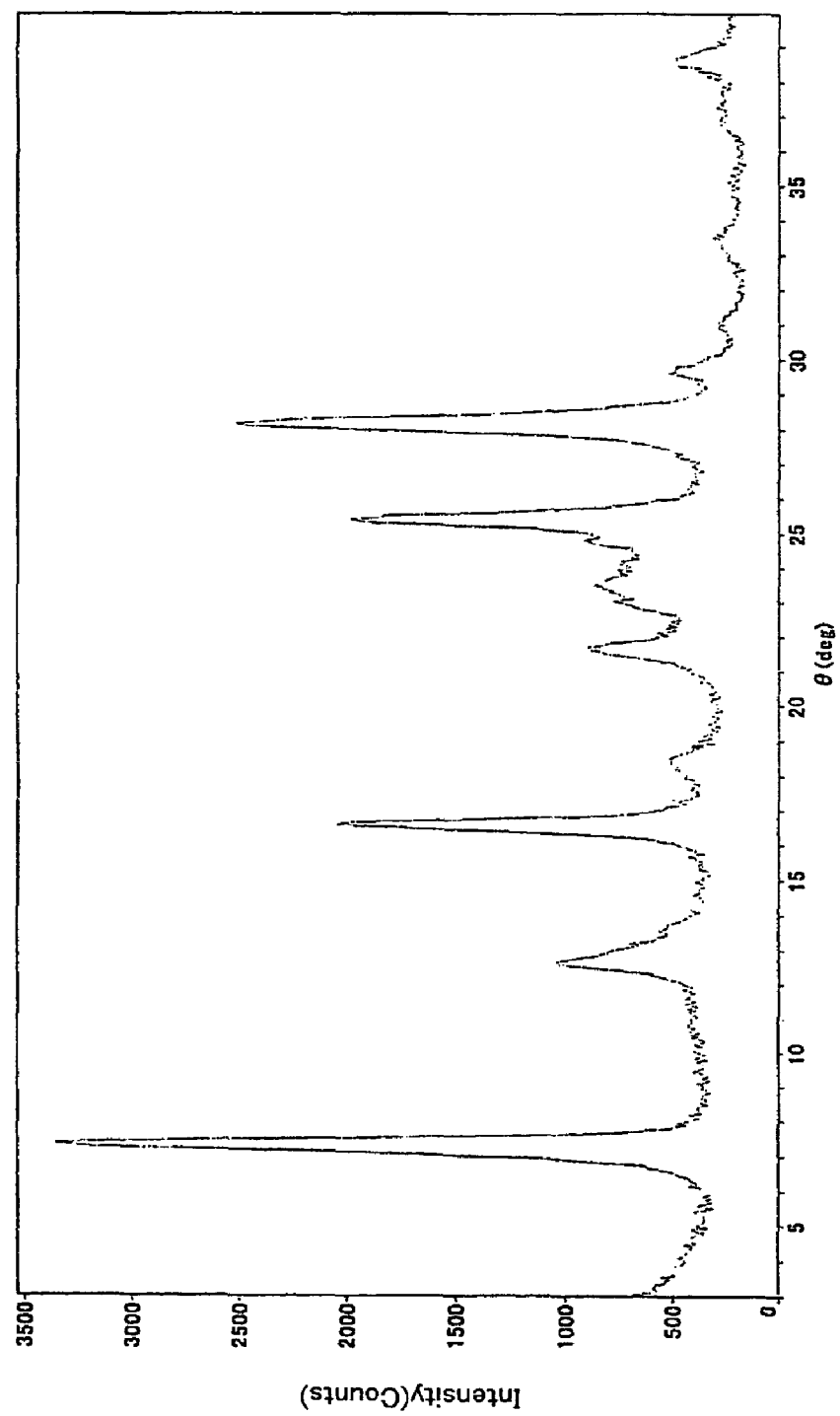
FIG. 64 is a powder X-ray diffraction pattern of the phthalocyanine composite produced in Comparative Example 10.
Figure 65:
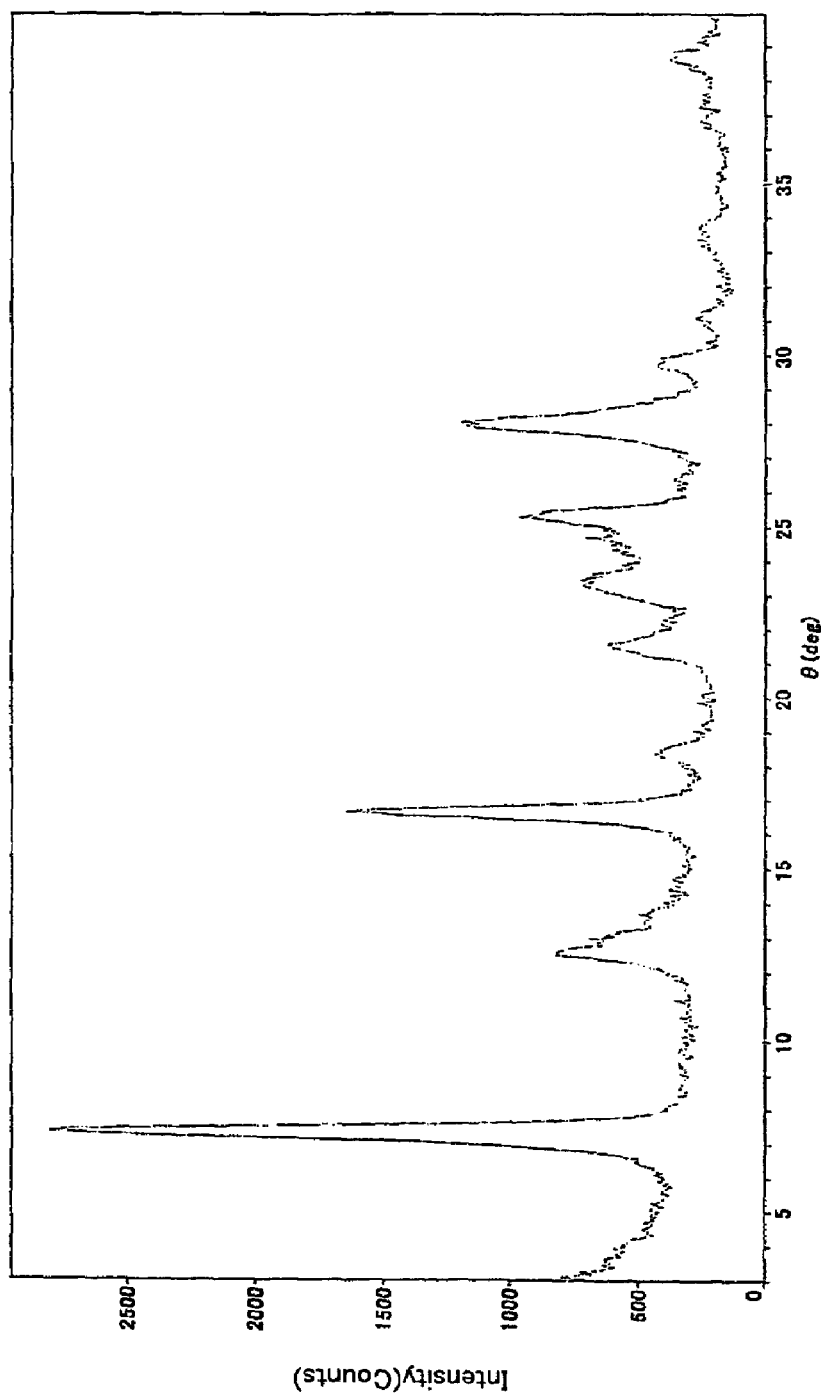
FIG. 65 is a powder X-ray diffraction pattern of the phthalocyanine composite produced in Comparative Example 11.

W parts of the phthalocyanine crystal obtained in Preparation Example A (for Production Examples 1-46, the nonsubstituted phthalocyanine crystals) and X parts of the phthalocyanine crystal obtained in Preparation Example B (for Production Examples 1-46, the substituted phthalocyanine crystals) were filled in a polymer bottle together with Y parts of glass beads having diameters of 0.4-0.6 mm, and then subjected to dyes trituration treatment (mechanical micrifying process) using a dispersion test machine (paint shaker) for L hours. The obtained mixture of glass beads and phthalocyanine composite was agitated at room temperature in a solvent C (Z mL) together with glass beads having diameters of 0.4-0.6 mm for M hours. Subsequently to the agitation, the resultant composite was separated from the glass beads and agitated in an organic solvent for N hours, followed by filtration and drying, whereby the object phthalocyanine composite was obtained. The resultant phthalocyanine composite was subjected to the measurement of an X-ray diffraction spectrum (refer to FIGS. 9-65). Measurement conditions for the X-ray diffraction spectrum are as follows.

Powder X-ray diffraction apparatus: PANalytical PW1700

X-ray tube: Cu

Scan axis: θ/2θ

Measurement range: 3.0-40.0°

Scanning rate: 3.0°/minute

[Table 3]

TABLE 3

| Number of Production Example | Nonsubstituted Phthalocyanine Number of Preparation Example A | Used Amount W (parts) | Substituted Phthalocyanine Number of Preparation Example B | Used Amount X (parts) | Used Solvent Name of Solvent C | Used Amount Z (ml) | Glass Beads Used Amount Y (parts) | Processing Time L (hours) | Agitating Time M (hours) | Agitating Time N (hours) | X-Ray Diffraction Chart |
|---|---|---|---|---|---|---|---|---|---|---|---|
| 1 | Preparation Example 1 | 1.5 | Preparation Example 5 | 1.5 | THF | 200 | 170 | 20 | 1 | 2 | 9 |
| 2 | Preparation Example 1 | 2.4 | Preparation Example 5 | 1.6 | THF | 200 | 170 | 20 | 1 | 2 | 10 |
| 3 | Preparation Example 1 | 3.75 | Preparation Example 5 | 1.25 | water | 300 | 170 | 20 | 2 | 0 | 11 |
| 4 | Preparation Example 1 | 3.75 | Preparation Example 5 | 1.25 | water | 300 | 170 | 40 | 2 | 0 | 12 |
| 5 | Preparation Example 1 | 3.75 | Preparation Example 5 | 1.25 | water | 300 | 170 | 60 | 2 | 0 | 13 |
| 6 | Preparation Example 1 | 7.5 | Preparation Example 5 | 2.5 | toluene | 300 | 170 | 20 | 2 | 3 | 14 |
| 7 | Preparation Example 1 | 7.5 | Preparation Example 5 | 2.5 | THF | 300 | 170 | 20 | 2 | 3 | 15 |
| 8 | Preparation Example 1 | 7.5 | Preparation Example 5 | 2.5 | heptane | 300 | 170 | 20 | 2 | 3 | 16 |
| 9 | Preparation Example 1 | 7.5 | Preparation Example 5 | 2.5 | water/THF | 100/200 | 170 | 20 | 1 | 2 | 17 |
| 10 | Preparation Example 7 | 3 | Preparation Example 5 | 1 | THF | 100 | 34 | 20 | 1 | 3 | 18 |
| 11 | Preparation Example 8 | 3 | Preparation Example 5 | 1 | NMP | 100 | 34 | 20 | 1 | 3 | 19 |
| 12 | Preparation Example 1 | 8.75 | Preparation Example 5 | 1.25 | toluene | 300 | 170 | 20 | 2 | 3 | 20 |
| 13 | Preparation Example 1 | 8.75 | Preparation Example 5 | 1.25 | THF | 300 | 170 | 20 | 2 | 3 | 21 |
| 14 | Preparation Example 1 | 8.75 | Preparation Example 5 | 1.25 | heptane | 300 | 170 | 20 | 2 | 3 | 22 |
| 15 | Preparation Example 1 | 8.75 | Preparation Example 5 | 1.25 | water/toluene | 90/300 | 170 | 20 | 0.25 | 2.5 | 23 |
| 16 | Preparation Example 1 | 9.5 | Preparation Example 5 | 0.5 | toluene | 300 | 170 | 20 | 2 | 3 | 24 |
| 17 | Preparation Example 1 | 9.5 | Preparation Example 5 | 0.5 | THF | 300 | 170 | 20 | 2 | 3 | 25 |
| 18 | Preparation Example 1 | 9.5 | Preparation Example 5 | 0.5 | heptane | 300 | 170 | 20 | 2 | 3 | 26 |
| 19 | Preparation Example 1 | 9.5 | Preparation Example 5 | 0.5 | water/toluene | 90/300 | 170 | 20 | 0.25 | 2.5 | 27 |
| 20 | Preparation Example 1 | 7.5 | Preparation Example 6 | 2.5 | methylene chloride | 300 | 170 | 20 | 1 | 3 | 28 |
| 21 | Preparation Example 1 | 7.5 | Preparation Example 6 | 2.5 | toluene | 300 | 170 | 20 | 1 | 3 | 29 |
| 22 | Preparation Example 1 | 7.5 | Preparation Example 6 | 2.5 | MEK | 300 | 170 | 20 | 1 | 3 | 30 |
| 23 | Preparation Example 1 | 7.5 | Preparation Example 6 | 2.5 | THF | 300 | 170 | 20 | 1 | 3 | 31 |
| 24 | Preparation Example 1 | 7.5 | Preparation Example 6 | 2.5 | DMF | 300 | 170 | 20 | 1 | 3 | 32 |
| 25 | Preparation Example 1 | 7.5 | Preparation Example 6 | 2.5 | methanol | 300 | 170 | 20 | 1 | 3 | 33 |

[Table 4]

TABLE 4

| Number of Production Example | Nonsubstituted Phthalocyanine Number of Preparation Example A | Used Amount W (parts) | Substituted Phthalocyanine Number of Preparation Example B | Used Amount X (parts) | Used Solvent Name of Solvent C | Used Amount Z (ml) | Glass Beads Used Amount Y (parts) | Processing Time L (hours) | Agitating Time M (hours) | Agitating Time N (hours) | X-Ray Diffraction Chart |
|---|---|---|---|---|---|---|---|---|---|---|---|
| 26 | Preparation Example 1 | 8.75 | Preparation Example 6 | 1.25 | methylene chloride | 300 | 170 | 20 | 1 | 3 | 34 |
| 27 | Preparation Example 1 | 8.75 | Preparation Example 6 | 1.25 | toluene | 300 | 170 | 20 | 1 | 3 | 35 |

TABLE 4-continued

| Number of Production Example | Nonsubstituted Phthalocyanine Number of Preparation Example A | Used Amount W (parts) | Substituted Phthalocyanine Number of Preparation Example B | Used Amount X (parts) | Used Solvent Name of Solvent C | Used Amount Z (ml) | Glass Beads Used Amount Y (parts) | Processing Time L (hours) | Agitating Time M (hours) | Agitating Time N (hours) | X-Ray Diffraction Chart |
|---|---|---|---|---|---|---|---|---|---|---|---|
| 28 | Preparation Example 1 | 8.75 | Preparation Example 6 | 1.25 | MEK | 300 | 170 | 20 | 1 | 3 | 36 |
| 29 | Preparation Example 1 | 8.75 | Preparation Example 6 | 1.25 | THF | 300 | 170 | 20 | 1 | 3 | 37 |
| 30 | Preparation Example 1 | 8.75 | Preparation Example 6 | 1.25 | DMF | 300 | 170 | 20 | 1 | 3 | 38 |
| 31 | Preparation Example 1 | 8.75 | Preparation Example 6 | 1.25 | methanol | 300 | 170 | 20 | 1 | 3 | 39 |
| 32 | Preparation Example 1 | 9.5 | Preparation Example 6 | 0.5 | methylene chloride | 300 | 170 | 20 | 1 | 3 | 40 |
| 33 | Preparation Example 1 | 9.5 | Preparation Example 6 | 0.5 | MEK | 300 | 170 | 20 | 1 | 3 | 41 |
| 34 | Preparation Example 1 | 9.5 | Preparation Example 6 | 0.5 | THF | 300 | 170 | 20 | 1 | 3 | 42 |
| 35 | Preparation Example 1 | 9.5 | Preparation Example 6 | 0.5 | DMF | 300 | 170 | 20 | 1 | 3 | 43 |
| 36 | Preparation Example 1 | 9.5 | Preparation Example 6 | 0.5 | methanol | 300 | 170 | 20 | 1 | 3 | 44 |
| 37 | Preparation Example 2 | 3 | Preparation Example 4 | 1 | THF | 300 | 170 | 20 | 1 | 6 | 45 |
| 38 | Preparation Example 2 | 3 | Preparation Example 4 | 1 | MEK | 300 | 170 | 20 | 1 | 5 | 46 |
| 39 | Preparation Example 2 | 3 | Preparation Example 6 | 1 | THF | 300 | 170 | 20 | 1 | 4 | 47 |
| 40 | Preparation Example 2 | 3 | Preparation Example 6 | 1 | MEK | 300 | 170 | 20 | 1 | 4 | 48 |
| 41 | Preparation Example 3 | 2.25 | Preparation Example 4 | 0.75 | toluene | 200 | 34 | 20 | 2 | 1 | 49 |
| 42 | Preparation Example 3 | 2.25 | Preparation Example 4 | 0.75 | MEK | 200 | 34 | 20 | 2 | 1 | 50 |
| 43 | Preparation Example 2 | 3 | Preparation Example 5 | 1 | THF | 300 | 170 | 20 | 1 | 6 | 51 |
| 44 | Preparation Example 2 | 3 | Preparation Example 5 | 1 | toluene | 300 | 170 | 20 | 1 | 6 | 52 |
| 45 | Preparation Example 3 | 3 | Preparation Example 6 | 1 | THF | 250 | 170 | 20 | 1 | 2 | 53 |
| 46 | Preparation Example 3 | 3 | Preparation Example 6 | 1 | toluene | 250 | 170 | 20 | 1 | 2 | 54 |

[Table 5]

TABLE 5

| Number of Comparative Production Example | Phthalocyanine Crystal Number of Preparation Example A | Used Amount W (parts) | Phthalocyanine Crystal Number of Preparation Example B | Used Amount X (parts) | Used Solvent Name of Solvent C | Used Amount Z (ml) | glass beads Used Amount Y (parts) | Processing Time L (hours) | Agitating Time M (hours) | Agitating Time N (hours) | X-Ray Diffraction Chart |
|---|---|---|---|---|---|---|---|---|---|---|---|
| 1 | Preparation Example 7 | 5 | — | — | NMP | 300 | 170 | 20 | 1 | 2 | 55 |
| 2 | Preparation Example 1 | 5 | — | — | n-butanol | 300 | 170 | 20 | 1 | 2 | 56 |
| 3 | Preparation Example 2 | 10 | — | — | MEK | 500 | 170 | 20 | 1.5 | 6 | 57 |
| 4 | Preparation Example 3 | 3 | — | — | toluene | 150 | 34 | 20 | 2 | 1 | 58 |
| 5 | — | — | Preparation Example 4 | 2 | THF | 200 | 34 | 20 | 2 | 1 | 59 |
| 6 | — | — | Preparation Example 6 | 3 | toluene | 200 | 170 | 20 | 1.5 | 1 | 60 |
| 7 | Preparation Example 1 | 3 | Preparation Example 2 | 1 | THF | 300 | 170 | 20 | 4 | 0 | 61 |
| 8 | Preparation Example 1 | 3 | Preparation Example 3 | 1 | THF | 300 | 170 | 20 | 4 | 0 | 62 |
| 9 | Preparation Example 2 | 3 | Preparation Example 1 | 1 | THF | 300 | 170 | 20 | 4 | 0 | 63 |

TABLE 5-continued

| Number of Comparative Production Example | Phthalocyanine Crystal Number of Preparation Example A | Phthalocyanine Crystal Used Amount W (parts) | Phthalocyanine Crystal Number of Preparation Example B | Phthalocyanine Crystal Used Amount X (parts) | Used Solvent Name of Solvent C | Used Solvent Used Amount Z (ml) | glass beads Used Amount Y (parts) | Processing Time L (hours) | Agitating Time M (hours) | Agitating Time N (hours) | X-Ray Diffraction Chart |
|---|---|---|---|---|---|---|---|---|---|---|---|
| 10 | Preparation Example 2 | 3 | Preparation Example 3 | 1 | THF | 300 | 170 | 20 | 4 | 0 | 64 |
| 11 | Preparation Example 3 | 3 | Preparation Example 1 | 1 | THF | 300 | 170 | 20 | 4 | 0 | 65 |

III. Characteristics Evaluation of Electrophotographic Photoreceptor

Example 1

A biaxially oriented polyethylene terephthalate resin film (75 μm in thickness) on whose surface an aluminum layer (70 nm in thickness) was vapor-deposited was used as an electroconductive substrate. Onto the vapor-deposited layer of the substrate, a dispersion liquid for undercoat layer was applied using a bar coater and dried in such a manner that the film thickness after drying be 1.25 μm, whereby an undercoat layer was formed.

Rutile-form titanium oxide having the average primary-particle diameter of 40 nm ("TTO55N" manufactured by Ishihara Sangyo Co.), together with 3 weight % of methyl dimethoxy silane ("TSL8117" manufactured by Toshiba Silicones Co.) with respect to the titanium oxide, was charged into a high-speed fluid-type stirring mixer ("SMG300" manufactured by Kawata Co. Ltd.) and high-speed mixed at the rotation peripheral speed of 34.5 m/second. The obtained surface-treated titanium oxide was dispersed in the mixture solvent of methanol/1-propanol using ball mill and made into dispersion slurry of the hydrophobized titanium oxide. The disperse slurry and the mixture solvent of methanol/1-propanol/toluene were added to a pellet of polyamide copolymer of ε-caprolactam [the compound expressed by the following formula (A)]/bis(4-amino-3-methyl cyclohexyl)methane [the compound expressed by the following formula (B)]/hexamethylene diamine [the compound expressed by the following formula (C)]/decamethylene dicarboxilic acid [the compound expressed by the following formula (D)]/octadecamethylene dicarboxilic acid [the compound expressed by the following formula (E)] with the composition molar ratio of 75%/9.5%/3%/9.5%/3%. The mixture was heated with agitation until the polyamide pellet was dissolved, and subjected to ultrasonic dispersion treatment to thereby produce dispersion liquid for undercoat layer, in which liquid the weight ratio of methanol/1-propanol/toluene was 7/1/2, the weight ratio of hydrophobized titanium oxide/polyamide copolymer was 3/1, and the solid content was 18.0%.

[Chemical Formula 23]

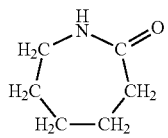
(A)

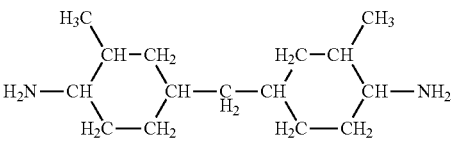
(B)

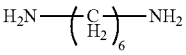
(C)

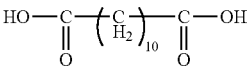
(D)

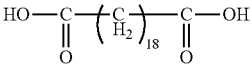
(E)

Besides, 4 parts of the phthalocyanine composite obtained in Production Example 1, used as a charge generation substance, was added to 30 parts of 4-methyl-4-methoxy-pentanol-2 and 270 parts of 1,2-dimethoxyethane and grinded using a sand grind mill for 2 hours, whereby microparticulation treatment was carried out. Subsequently, 1 part of polyvinyl butyral ("Denka Butyral #6000C" manufactured by Denki Kagaku Kogyo Co.) and 1 part of phenoxy resin ("PKHH" manufactured by Union Carbide Corp.), used as binder resin, were added to the product and then grinded for another hour with a sand grind mill, whereby a coating solution for charge generation layer was prepared. The coating solution for charge generation layer was applied onto the undercoat layer on the electroconductive substrate with a bar coater and dried in such a manner that the film thickness after drying be 0.4 μm, whereby a charge generation layer was formed.

In addition, the charge transport substance used was 50 weight parts of the compound expressed by the following structural formula (13), synthesized according to Example 1 of the Japanese Patent Laid-Open Publication No. 2002-80432. The binder resin used was 100 weight parts of the polycarbonate that contains: 51 molar % of the repetition unit whose aromatic diol component is 2,2-bis(4-hydroxy-3-methylphenyl) propane, expressed by the following structural formula (14); and 49 molar % of the repetition unit whose aromatic diol component is 1,1-bis(4-hydroxyphenyl)-1-phenylethane, expressed by the structural formula (15); and has terminal structures derived from p-t-butyl phenol. The leveling agent used was 0.03 weight part of silicone oil. These charge transport substance, binder resin and leveling agent were dissolved in 640 weight parts of mixture solvent of tetrahydrofuran/toluene (weight ratio is 8/2) to thereby prepare coating solution for charge transport layer. The coating solution for charge transport layer was applied onto the charge generation layer using a film applicator in such a manner that the film thickness after drying was 25 μm, and then dried to form charge transport layer, whereby a multi-layer-type electrophotographic photoreceptor was produced.

[Chemical Formula 24]

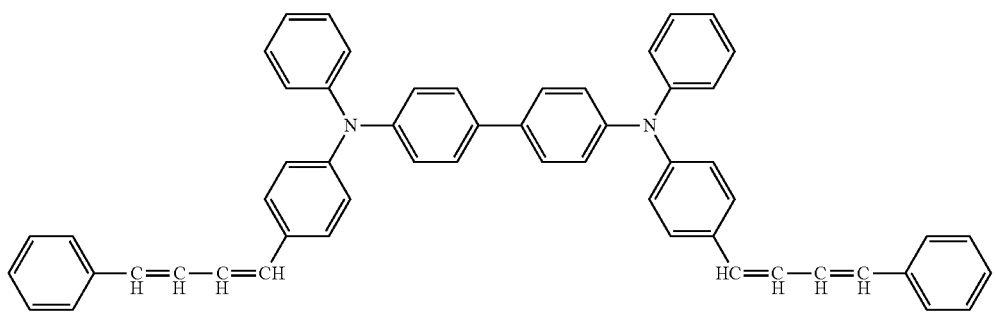

(13)

[Chemical Formula 25]

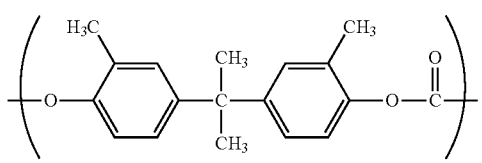

(14)

[Chemical Formula 26]

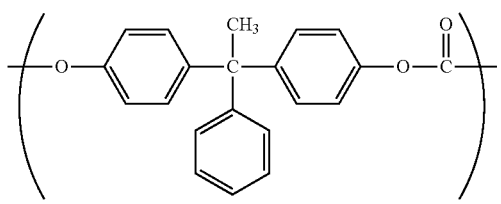

(15)

The characteristics of the obtained electrophotographic photoreceptor were measured by an photoreceptor evaluator (Cynthia 55, manufactured by Gentec Co.) in a static mode.

First, the electrophotographic photoreceptor was electrically charged in a dark place by being passed under a scorotron charging device, which is electrically discharging, at a constant speed (125 mm/sec) in such a manner that the surface potential of the electrophotographic photoreceptor was adjusted to be about −700 V, and the charged voltage was measured as an initially-charged voltage V0 (−V). Subsequently it was let aside for 2.5 seconds and the decay in electric potential DD (V) was measured as dark decay. Next, it was irradiated with monochromatic light of 780 nm in the strength of 0.1 μW/cm$^2$, and the exposure energy spent while the potential of the photoreceptor's surface decreases from −550 V to −275 V was obtained as half-decay exposure energy $E_{1/2}$ (μJ/cm$^2$), and the potential after 10 seconds of irradiation was obtained as residual potential $V_r$ (−V). The results are shown in Table 6.

Examples 2-46

An electrophotographic photoreceptor was produced in the same manner as that of Example 1, except that instead of the phthalocyanine composite obtained in Production Example 1, the phthalocyanine composite obtained in each of Production Examples 2-46 was used as the charge generation substance. The obtained photoreceptor was subjected to the measurements of the initially-charged voltage V0 (−V), the decay in electric potential DD (V), the half decay in exposure energy $E_{1/2}$ (μJ/cm$^2$), and the residual potential $V_r$ (−V). The results are shown in Tables 6-12.

Comparative Example 1-11

An electrophotographic photoreceptor was produced in the same manner as that of Example 1, except that instead of the phthalocyanine composite obtained in Production Example 1, the phthalocyanine composite obtained in each of Comparative Production Examples 1-11 was used as the charge generation substance. The obtained photoreceptor was subjected to the measurements of the initially-charged voltage V0 (−V), the decay in electric potential DD (V), the half decay in exposure energy $E_{1/2}$ (μJ/cm$^2$), and the residual potential $V_r$ (−V). The results are shown in Tables 6-12.

Table 6 shows the results of the Examples in which the obtained electrophotographic photoreceptor contains α-form or β-form titanyl phthalocyanine (Preparation Example 1, 7) and tetrafluorochlorogallium phthalocyanine (Preparation Example 5) together with the results of associated Comparative Examples.

[Table 6]

TABLE 6

| | Related Production Example of Phthalocyanine Composite | Initially-Charged Voltage V0(−V) | Decay in Electric Potential DD(V) | Half Decay in Exposure Energy $E_{1/2}(\mu J/cm^2)$ | Residual Potential Vr(−V) |
|---|---|---|---|---|---|
| Example 1 | Production Example 1 | 727 | 60 | 0.151 | 13 |
| Example 2 | Production Example 2 | 690 | 85 | 0.117 | 10 |
| Example 3 | Production Example 3 | 678 | 96 | 0.138 | 17 |
| Example 4 | Production Example 4 | 672 | 93 | 0.151 | 15 |
| Example 5 | Production Example 5 | 672 | 93 | 0.184 | 9 |
| Example 6 | Production Example 6 | 683 | 100 | 0.132 | 11 |
| Example 7 | Production Example 7 | 690 | 95 | 0.135 | 9 |
| Example 8 | Production Example 8 | 686 | 101 | 0.138 | 9 |
| Example 9 | Production Example 9 | 665 | 107 | 0.117 | 10 |
| Example 10 | Production Example 10 | 642 | 75 | 0.147 | 11 |
| Example 11 | Production Example 11 | 706 | 100 | 0.161 | 22 |
| Example 12 | Production Example 12 | 669 | 98 | 0.172 | 8 |
| Example 13 | Production Example 13 | 701 | 83 | 0.2 | 4 |
| Example 14 | Production Example 14 | 688 | 93 | 0.185 | 9 |
| Example 15 | Production Example 15 | 682 | 93 | 0.171 | 6 |
| Example 16 | Production Example 16 | 679 | 94 | 0.238 | 8 |
| Example 17 | Production Example 17 | 680 | 91 | 0.226 | 7 |
| Example 18 | Production Example 18 | 676 | 99 | 0.178 | 9 |
| Example 19 | Production Example 19 | 675 | 91 | 0.203 | 6 |
| Comparative Example 1 | Comparative Production Example 1 | 676 | 98 | 0.286 | 12 |
| Comparative Example 2 | Comparative Production Example 2 | 684 | 96 | 0.287 | 15 |
| Comparative Example 3 | Comparative Production Example 3 | 675 | 99 | 0.293 | 3 |
| Comparative Example 7 | Comparative Production Example 7 | 727 | 121 | 0.247 | 9 |

Table 7 shows the results of the Examples in which the obtained electrophotographic photoreceptor contains α-form titanyl phthalocyanine (Preparation Example 1) and tetrafluorochloroindium phthalocyanine (Preparation Example 6) together with the results of associated Comparative Examples.

[Table 7]

TABLE 7

|  | Related Production Example of Phthalocyanine Composite | Initially-Charged Voltage V0(−V) | Decay in Electric Potential DD(V) | Half Decay in Exposure Energy $E_{1/2}(\mu J/cm^2)$ | Residual Potential Vr(−V) |
|---|---|---|---|---|---|
| Example 20 | Production Example 20 | 692 | 104 | 0.111 | 11 |
| Example 21 | Production Example 21 | 699 | 105 | 0.122 | 13 |
| Example 22 | Production Example 22 | 726 | 138 | 0.11 | 16 |
| Example 23 | Production Example 23 | 706 | 112 | 0.122 | 9 |
| Example 24 | Production Example 24 | 655 | 190 | 0.102 | 16 |
| Example 25 | Production Example 25 | 695 | 167 | 0.113 | 21 |
| Example 26 | Production Example 26 | 694 | 105 | 0.126 | 15 |
| Example 27 | Production Example 27 | 648 | 79 | 0.144 | 13 |
| Example 28 | Production Example 28 | 708 | 150 | 0.118 | 11 |
| Example 29 | Production Example 29 | 708 | 102 | 0.132 | 14 |
| Example 30 | Production Example 30 | 634 | 189 | 0.108 | 15 |
| Example 31 | Production Example 31 | 674 | 178 | 0.113 | 17 |
| Example 32 | Production Example 32 | 714 | 118 | 0.157 | 13 |
| Example 33 | Production Example 33 | 702 | 96 | 0.146 | 9 |
| Example 34 | Production Example 34 | 696 | 85 | 0.16 | 11 |
| Example 35 | Production Example 35 | 702 | 96 | 0.146 | 9 |
| Example 36 | Production Example 36 | 674 | 178 | 0.113 | 17 |
| Comparative Example 1 | Comparative Production Example 1 | 676 | 98 | 0.286 | 12 |
| Comparative Example 2 | Comparative Production Example 2 | 684 | 96 | 0.287 | 15 |
| Comparative Example 4 | Comparative Production Example 4 | 704 | 140 | 0.347 | 20 |
| Comparative Example 6 | Comparative Production Example 6 | 697 | 98 | 0.362 | 3 |
| Comparative Example 8 | Comparative Production Example 8 | 636 | 74 | 0.293 | 9 |

Table 8 shows the results of the Examples in which the obtained electrophotographic photoreceptor contains chlorogallium phthalocyanine (Preparation Example 2) and tetrafluorooxytitanyl phthalocyanine (Preparation Example 4) together with the results of associated Comparative Examples.

[Table 8]

TABLE 8

| | Related Production Example of Phthalocyanine Composite | Initially-Charged Voltage V0(−V) | Decay in Electric Potential DD(V) | Half Decay in Exposure Energy $E_{1/2}(\mu J/cm^2)$ | Residual Potential Vr(−V) |
|---|---|---|---|---|---|
| Example 37 | Production Example 37 | 677 | 106 | 0.155 | 3 |
| Example 38 | Production Example 38 | 716 | 142 | 0.178 | 5 |
| Comparative Example 2 | Comparative Production Example 2 | 684 | 96 | 0.287 | 15 |
| Comparative Example 3 | Comparative Production Example 3 | 675 | 99 | 0.293 | 3 |
| Comparative Example 5 | Comparative Production Example 5 | 686 | 92 | 0.435 | 7 |
| Comparative Example 9 | Comparative Production Example 9 | 672 | 162 | 0.27 | 13 |

Table 9 shows the results of the Examples in which the obtained electrophotographic photoreceptor contains chlorogallium phthalocyanine (Preparation Example 2) and tetrafluorochloroindium phthalocyanine (Preparation Example 6) together with the results of associated Comparative Examples.

[Table 9]

TABLE 9

| | Related Production Example of Phthalocyanine Composite | Initially-Charged Voltage V0(−V) | Decay in Electric Potential DD(V) | Half Decay in Exposure Energy $E_{1/2}(\mu J/cm^2)$ | Residual Potential Vr(−V) |
|---|---|---|---|---|---|
| Example 39 | Production Example 39 | 702 | 89 | 0.195 | 7 |
| Example 40 | Production Example 40 | 689 | 94 | 0.181 | 7 |
| Comparative Example 3 | Comparative Production Example 3 | 675 | 99 | 0.293 | 3 |
| Comparative Example 4 | Comparative Production Example 4 | 704 | 140 | 0.347 | 20 |
| Comparative Example 6 | Comparative Production Example 6 | 697 | 98 | 0.362 | 3 |
| Comparative Example 10 | Comparative Production Example 10 | 684 | 96 | 0.275 | 7 |

Table 10 shows the results of the Examples in which the obtained electrophotographic photoreceptor contains chloroindium phthalocyanine (Preparation Example 3) and tetrafluorooxytitanyl phthalocyanine (Preparation Example 4) together with the results of associated Comparative Examples.

[Table 10]

TABLE 10

|  | Related Production Example of Phthalocyanine Composite | Initially-Charged Voltage V0(−V) | Decay in Electric Potential DD(V) | Half Decay in Exposure Energy $E_{1/2}(\mu J/cm^2)$ | Residual Potential Vr(−V) |
|---|---|---|---|---|---|
| Example 41 | Production Example 41 | 737 | 127 | 0.285 | 11 |
| Example 42 | Production Example 42 | 708 | 132 | 0.253 | 14 |
| Comparative Example 2 | Comparative Production Example 2 | 684 | 96 | 0.287 | 15 |
| Comparative Example 4 | Comparative Production Example 4 | 704 | 140 | 0.347 | 20 |
| Comparative Example 5 | Comparative Production Example 5 | 686 | 92 | 0.435 | 7 |
| Comparative Example 11 | Comparative Production Example 11 | 668 | 108 | 0.352 | 14 |

Table 11 shows the results of the Examples in which the obtained electrophotographic photoreceptor contains chlorogallium phthalocyanine (Preparation Example 2) and tetrafluorochlorogallium phthalocyanine (Preparation Example 5) together with the results of associated Comparative Examples.

[Table 11]

TABLE 11

|  | Related Production Example of Phthalocyanine Composite | Initially-Charged Voltage V0(−V) | Decay in Electric Potential DD(V) | Half Decay in Exposure Energy $E_{1/2}(\mu J/cm^2)$ | Residual Potential Vr(−V) |
|---|---|---|---|---|---|
| Example 43 | Production Example 43 | 673 | 95 | 0.132 | 6 |
| Example 44 | Production Example 44 | 691 | 86 | 0.154 | 2 |
| Comparative Example 3 | Comparative Production Example 3 | 675 | 99 | 0.293 | 3 |

Table 12 shows the results of the Examples in which the obtained electrophotographic photoreceptor contains chloroindium phthalocyanine (Preparation Example 3) and tetrafluorochloroindium phthalocyanine (Preparation Example 6) together with the results of associated Comparative Examples.

[Table 12]

TABLE 12

|  | Related Production Example of Phthalocyanine Composite | Initially-Charged Voltage V0(−V) | Decay in Electric Potential DD(V) | Half Decay in Exposure Energy $E_{1/2}(\mu J/cm^2)$ | Residual Potential Vr(−V) |
|---|---|---|---|---|---|
| Example 45 | Production Example 45 | 677 | 89 | 0.25 | 4 |
| Example 46 | Production Example 46 | 680 | 91 | 0.286 | 7 |
| Comparative Example 4 | Comparative Production Example 4 | 704 | 140 | 0.347 | 20 |
| Comparative Example 6 | Comparative Production Example 6 | 697 | 98 | 0.362 | 3 |

As is evident from the results shown in Tables 6-12, it has been determined that the phthalocyanine composites of Examples 1-46 has superior photo-induced discharging property compared to the phthalocyanine crystals and the phthalocyanine composites of Comparative Examples 1-11. Consequently, it has been affirmed that when used as charge generation substance of an electrophotographic photoreceptor, the phthalocyanine composite of the present invention offers excellent electrophotographic photoreceptor characteristics.

IV. Evaluation of Environmental Dependence

Example 47

Under the environmental condition at the temperature 25° C. and the humidity of 50%, the electrophotographic photoreceptor obtained in Example 2 was mounted to an electrophotographic-properties evaluator, which was manufactured according to the standard of the Society of Electrophotography {"More Bases and Applications of Electrophotography technology", edited by the Society of Electrophotography, issued by Corona Publishing Co. Ltd, pp. 404-405}, and electrically charged until its initial surface potential became −700 V, and then subjected to electric-characteristics evaluation using monochromatic light of 780 nm, which originates from halogen lamp's light passing through an interference filter, as exposure light and LED light of 660 nm as neutralization light, by carrying out the cycle composed of charging, exposure, electric potential measurement, and neutralization. During the evaluation, the irradiation energy of the exposure light required for the surface potential to reach −350 V ($\mu J/cm^2$) was measured as sensitivity (25° C./50%).

Subsequently, after the environmental condition was changed to the temperature of 5° C. and the humidity 10%, the measurement according to the aforementioned measurement method was carried out and the sensitivity after the environmental condition change (5° C./10%) was obtained. The rate of sensitivity fluctuation (%) under a photoreceptor usage environment was calculated according to the following numerical formula (8). The values of the sensitivity (25° C./50%), the sensitivity after the environmental condition change (5° C./10%), and the rate of sensitivity fluctuation (%) are shown in Table 13.

Rate of Sensitivity Fluctuation (%)=Sensitivity (25° C./50%)/Sensitivity (5° C./10%)×100   Numerical Formula (8)

Examples 48-58

Following the same manner as that of Example 47 except for that instead of the electrophotographic photoreceptor obtained in Example 2, the electrophotographic photoreceptor obtained in each of Examples 6, 10, 11, 12, 16, 23, 37, 40, 41, 43 and 45 was used, the values of the sensitivity (25° C./50%), the sensitivity after the environmental condition change (5° C./10%), and the rate of sensitivity fluctuation (%) were measured. The results are shown in Tables 13-20.

Comparative Examples 12-18>

Following the same manner as that of Example 47 except for that instead of the electrophotographic photoreceptor obtained in Example 2, the electrophotographic photoreceptor obtained in each of Comparative Examples 3, 4, 7, 8, 9, 10, and 11 was used, the values of the sensitivity (25° C./50%) the sensitivity after the environmental condition change (5° C./10%), and the rate of sensitivity fluctuation (%) were measured. The results are shown in Tables 13-20.

Table 13 shows the results of the Examples and the associated Comparative Examples in each of which an electrophotographic photoreceptor containing the α-form titanyl phthalocyanine (Preparation Example 1) and the tetrafluorochlorogallium phthalocyanine (Preparation Example 5) was produced.

[Table 13]

TABLE 13

|  | Example corresponding to Used Photoreceptor | Sensitivity (25° C./50%) ($\mu J/cm^2$) | Sensitivity (5° C./10%) ($\mu J/cm^2$) | Rate of Sensitivity Fluctuation (%) |
|---|---|---|---|---|
| Example 47 | Example 2 | 0.174 | 0.201 | 86.6 |
| Example 48 | Example 6 | 0.177 | 0.19 | 93.2 |
| Example 49 | Example 12 | 0.26 | 0.288 | 90.3 |
| Example 50 | Example 16 | 0.265 | 0.301 | 88 |

Table 14 shows the results of the Examples in which an electrophotographic photoreceptor containing the β-form titanyl phthalocyanine (Preparation Example 7) and the tetrafluorochlorogallium phthalocyanine (Preparation Example 5) was produced.
[Table 14]

TABLE 13-continued

| Example corresponding to Used Photoreceptor | | Sensitivity (25° C./50%) (μJ/cm²) | Sensitivity (5° C./10%) (μJ/cm²) | Rate of Sensitivity Fluctuation (%) |
|---|---|---|---|---|
| Comparative Example 12 | Comparative Example 7 | 0.368 | 0.441 | 83.4 |

TABLE 14

| Example corresponding to Used Photoreceptor | | Sensitivity (25° C./50%) (μJ/cm²) | Sensitivity (5° C./10%) (μJ/cm²) | Rate of Sensitivity Fluctuation (%) |
|---|---|---|---|---|
| Example 51 | Example 10 | 0.209 | 0.238 | 87.8 |
| Example 52 | Example 11 | 0.212 | 0.266 | 79.7 |

Table 15 shows the results of the Examples and the associated Comparative Examples in which an electrophotographic photoreceptor containing the α-form titanyl phthalocyanine (Preparation Example 1) and the tetrafluorochloroindium phthalocyanine (Preparation Example 6) was produced.
[Table 15]

TABLE 15

| Example corresponding to Used Photoreceptor | | Sensitivity (25° C./50%) (μJ/cm²) | Sensitivity (5° C./10%) (μJ/cm²) | Rate of Sensitivity Fluctuation (%) |
|---|---|---|---|---|
| Example 53 | Example 23 | 0.162 | 0.18 | 90 |
| Comparative Example 13 | Comparative Example 8 | 0.507 | 0.597 | 84.9 |

Table 16 shows the results of the Examples and the associated Comparative Examples in which an electrophotographic photoreceptor containing the chlorogallium phthalocyanine (Preparation Example 2) and the tetrafluorooxytitanyl phthalocyanine (Preparation Example 4) was produced.
[Table 16]

TABLE 16

| Example corresponding to Used Photoreceptor | | Sensitivity (25° C./50%) (μJ/cm²) | Sensitivity (5° C./10%) (μJ/cm²) | Rate of Sensitivity Fluctuation (%) |
|---|---|---|---|---|
| Example 54 | Example 37 | 0.191 | 0.217 | 88 |
| Comparative Example 14 | Comparative Example 9 | 0.382 | 0.446 | 85.7 |

Table 17 shows the results of the Examples and the associated Comparative Examples in which an electrophotographic photoreceptor containing the chlorogallium phthalocyanine (Preparation Example 2) and the tetrafluorochloroindium phthalocyanine (Preparation Example 6) was produced.
[Table 17]

TABLE 17

| Example corresponding to Used Photoreceptor | | Sensitivity (25° C./50%) (μJ/cm²) | Sensitivity (5° C./10%) (μJ/cm²) | Rate of Sensitivity Fluctuation (%) |
|---|---|---|---|---|
| Example 55 | Example 40 | 0.195 | 0.219 | 89 |
| Comparative Example 15 | Comparative Example 10 | 0.444 | 0.508 | 87.4 |

Table 18 shows the results of the Examples and the associated Comparative Examples in which an electrophotographic photoreceptor containing the chloroindium phthalocyanine (Preparation Example 3) and the tetrafluorooxytitanyl phthalocyanine (Preparation Example 4) was produced.
[Table 18]

TABLE 18

| Example corresponding to Used Photoreceptor | | Sensitivity (25° C./50%) (μJ/cm²) | Sensitivity (5° C./10%) (μJ/cm²) | Rate of Sensitivity Fluctuation (%) |
|---|---|---|---|---|
| Example 56 | Example 41 | 0.339 | 0.402 | 84.3 |
| Comparative Example 16 | Comparative Example 11 | 0.52 | 0.627 | 82.9 |

Table 19 shows the results of the Examples and the associated Comparative Examples in which an electrophotographic photoreceptor containing the chlorogallium phthalocyanine (Preparation Example 2) and the tetrafluorochlorogallium phthalocyanine (Preparation Example 5) was produced.
[Table 19]

TABLE 19

| Example corresponding to Used Photoreceptor | | Sensitivity (25° C./50%) (μJ/cm²) | Sensitivity (5° C./10%) (μJ/cm²) | Rate of Sensitivity Fluctuation (%) |
|---|---|---|---|---|
| Example 57 | Example 43 | 0.186 | 0.208 | 89.4 |
| Comparative Example 17 | Comparative Example 3 | 0.383 | 0.457 | 83.8 |

Table 20 shows the results of the Examples and the associated Comparative Examples in which an electrophotographic photoreceptor containing the chloroindium phthalocyanine (Preparation Example 3) and the tetrafluorochloroindium phthalocyanine (Preparation Example 6) was produced.

[Table 20]

TABLE 20

| Example corresponding to Used Photoreceptor | | Sensitivity (25° C./50%) (μJ/cm²) | Sensitivity (5° C./10%) (μJ/cm²) | Rate of Sensitivity Fluctuation (%) |
|---|---|---|---|---|
| Example 58 | Example 45 | 0.269 | 0.316 | 85.1 |
| Comparative Example 18 | Comparative Example 4 | 0.476 | 0.577 | 82.5 |

From the results shown in Tables 13-20, it has been determined that the electrophotographic photoreceptors produced in Examples 2, 6, 10, 11, 12, 16, 23, 37, 40, 41, 43 and 45 exhibit quite stable sensitivity irrespective of usage environmental changes, compared to the electrophotographic photoreceptors produced in Comparative Examples 4, 7, 8, 9, 10 and 11. Consequently, it has been affirmed that the phthalocyanine composite of the present invention shows lower environmental dependence than the conventional phthalocyanine composite.

Based on the results of the aforementioned Examples, it is apparent that the phthalocyanine composites of the present invention have excellent photo-induced discharging properties, and that the electrophotographic photoreceptors using these phthalocyanine composites are superior in environmental dependence properties.

The phthalocyanine composite of the present invention also offers the advantage that it can be prepared without imposing loads on environment.

V. Image Evaluation

Example 59

The coating solution for charge generation layer obtained in Example 7 was dip-coated on the surface of an aluminum cylinder which has the diameter of 3.0 cm, the length of 28.5 cm, and the wall thickness of 1.0 mm and whose surface had undergone anodic oxidation and sealing treatment, in such a manner that the film thickness after drying corresponded to 0.4 g/m² (approximately 0.4 μm) to thereby form a charge generation layer was formed. Subsequently, the coating solution for charge transport layer obtained in Example 1 was dip-coated on the charge generation layer in such a manner that the film thickness after drying was 26 μm to thereby form a charge transport layer, whereby a drum-shaped electrophotographic photoreceptor was produced.

Comparative Example 19

Figure 66:
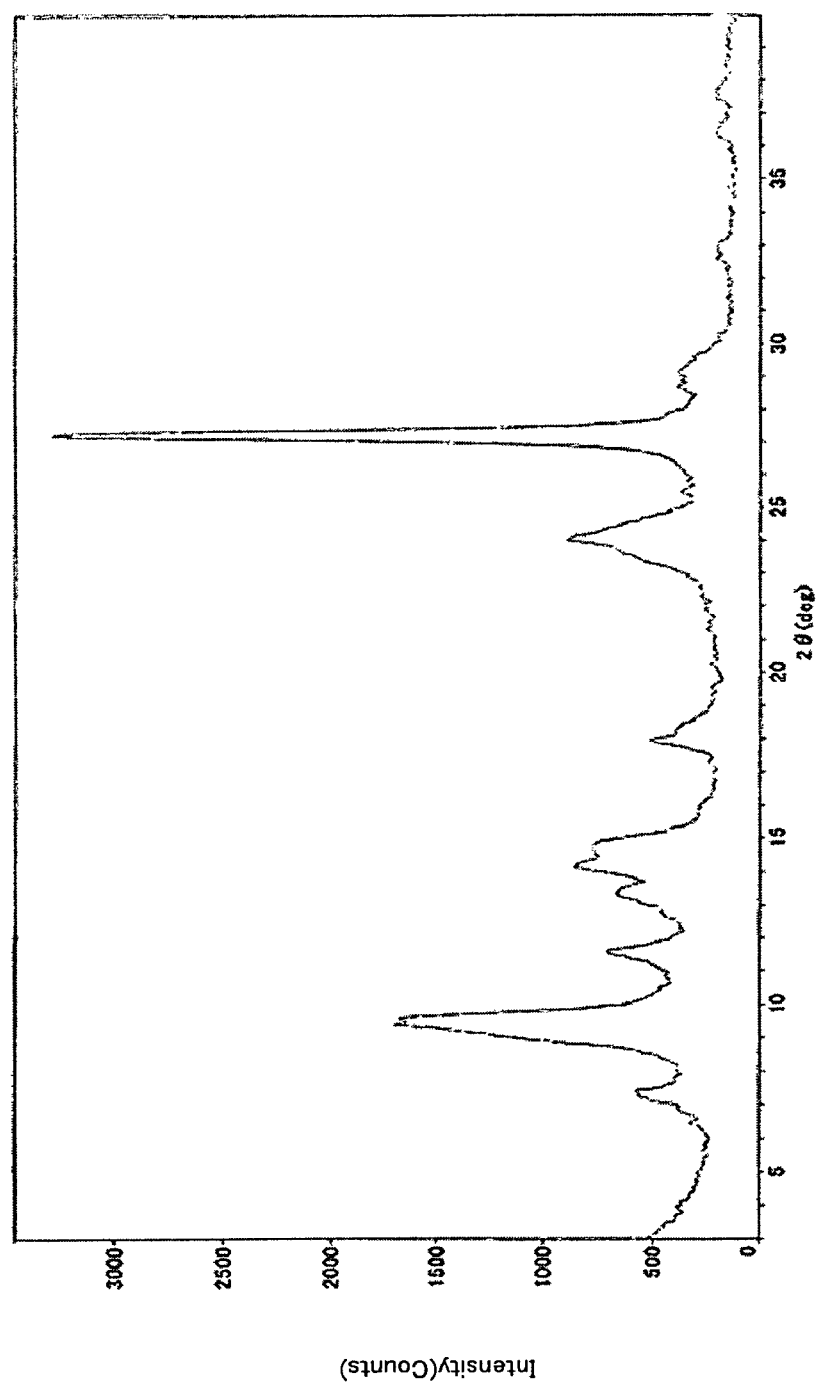
FIG. 66 is a powder X-ray diffraction pattern of the oxytitanyl phthalocyanine produced in Comparative Example 19.

Instead of the phthalocyanine composite in Example 1, the oxytitanyl phthalocyanine that exhibits a main diffraction peak at a Bragg angle (2θ±0.2°) of 27.2° with respect to CuKα characteristic X-ray (wavelength 1.541 Å), as shown in FIG. 66. Following the same procedure as the production method of a coating solution for charge generation layer explained in Example 1, a coating solution for charge generation layer was obtained. This coating solution was mixed with the coating solution for charge generation layer obtained in Comparative Example 1 in equal volumes, and the mixture was dip-coated on the surface of an aluminum cylinder which has the diameter of 3.0 cm, the length of 28.5 cm, and the wall thickness of 1.0 mm and whose surface had undergone anodic oxidation and sealing treatment, in such a manner that the film thickness after drying corresponded to 0.4 g/m² (approximately 0.4 μm) to thereby form a charge generation layer. Subsequently, the coating solution for charge transport layer obtained in Example 1 was dip-coated on the charge generation layer in such a manner that the film thickness after drying was 26 μm to thereby form a charge transport layer, whereby a drum-shaped electrophotographic photoreceptor was produced.

<Drum Evaluation>

The electrophotographic photoreceptor produced in each of Example 59 and Comparative Example 20 was mounted to an electrophotographic-properties evaluator produced according to the standard of the Society of Electrophotography {"More Bases and Applications of Electrophotography technology", edited by the Society of Electrophotography, issued by Corona Publishing Co. Ltd, pp. 404-405}. Its electric properties were evaluated by carrying out the cycle composed of charging, exposure, electric potential measurement, and neutralization according to the following procedure.

In a laboratory whose environment is 25° C. in temperature and 50% in humidity, the photoreceptor was electrically charged in such a manner that its initial surface potential of became −700 V, and irradiated with monochromatic light of 780 nm, which originates from halogen lamp's light passing through an interference filter. The irradiation energy (half decay exposure energy) required until its surface potential reached −350 V was measured as sensitivity ($E_{1/2}$; in units of "μJ/cm²"). In addition, after exposed to 1.2 μJ/cm² for 100 milliseconds, its surface potential after exposure (Vl; in units of "−V") was measured.

The measurement results were shown in Table 21.

[Table 21]

TABLE 21

| | $E_{1/2}$ (μJ/cm²) | Vl (−V) |
|---|---|---|
| Example 59 | 0.161 | 55 |
| Comparative Example 19 | 0.163 | 30 |

From the evaluation results shown in Table 21, it has become apparent that Example 59 and Comparative Example 19 are equivalent in their electrophotographic photoreceptor characteristics.

<Image Evaluation the Results>

The electrophotographic photoreceptor obtained in each of Example 59 and Comparative Example 29 was mounted on the drum cartridge of a commercially-available 4 cycle color laser printer (LP2000C, manufactured by Seiko Epson Corp.), and subjected to image evaluation using magenta toner, in which evaluation the first cycle of the electrophotographic photoreceptor was assigned to a character pattern and the second and subsequent cycles of the electrophotographic photoreceptor were assigned to a halftone so as to form an image for ghost evaluation.

As the results, when the electrophotographic photoreceptor produced in Example 59 was used, favorable images without ghosts are obtained while when the electrophotographic photoreceptor produced in Comparative Example 19 was used, positive ghosts appeared as image defects.

From the image evaluation results, it has become apparent that the use of the phthalocyanine composite of the present invention can provide a cartridge and an image forming apparatus that is capable of forming favorable images without the occurrence of ghost phenomenon.

[Examples for the Fluorinated Gallium Phthalocyanine Compound of the Present Invention]

Production Example 47

Figure 67:
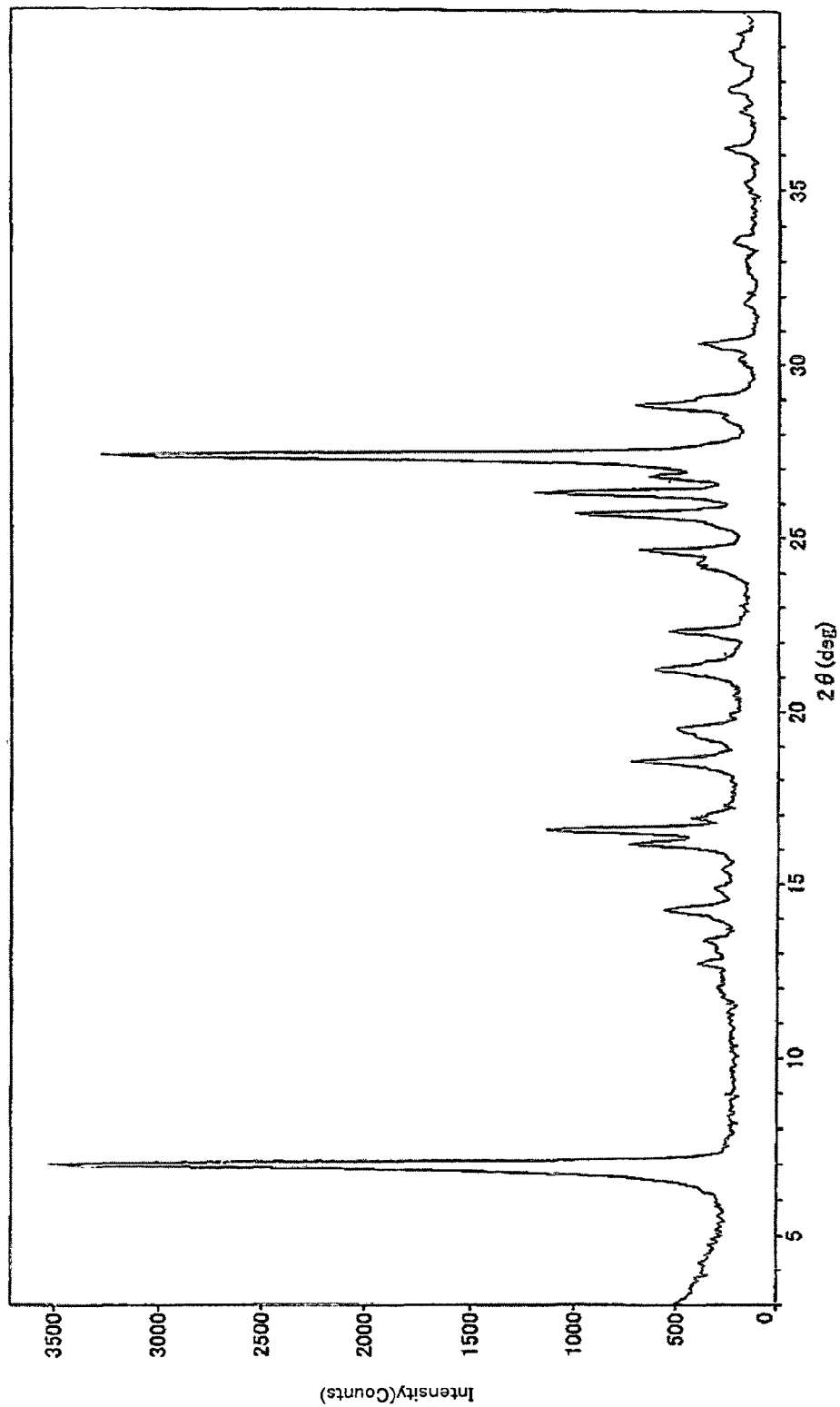
FIG. 67 is a powder X-ray diffraction pattern of the tetrafluorochlorogallium phthalocyanine produced in Production Example 47.

16 parts of 4-fluorophthalonitrile, 5 parts of gallium trichloride, and 95.5 parts of α-chloronaphthalene were mixed and made reacted in an atmosphere of nitrogen at 200° C. for 15 hours. After the reaction, washing process was carried out twice under room temperature condition, in which process the precipitated solid was filtered and the obtained solid was mixed with 46.5 parts of N-methyl pyrrolidone and subjected to filtration. Subsequently, similar washing process was repeated with using, in turn, 35.6 parts of methanol, 45 parts of water, and 35.6 parts of methanol as the solvent, and followed by drying, whereby a compound that exhibited powder X-ray spectrum is shown in FIG. 67 was obtained.

Figure 68:
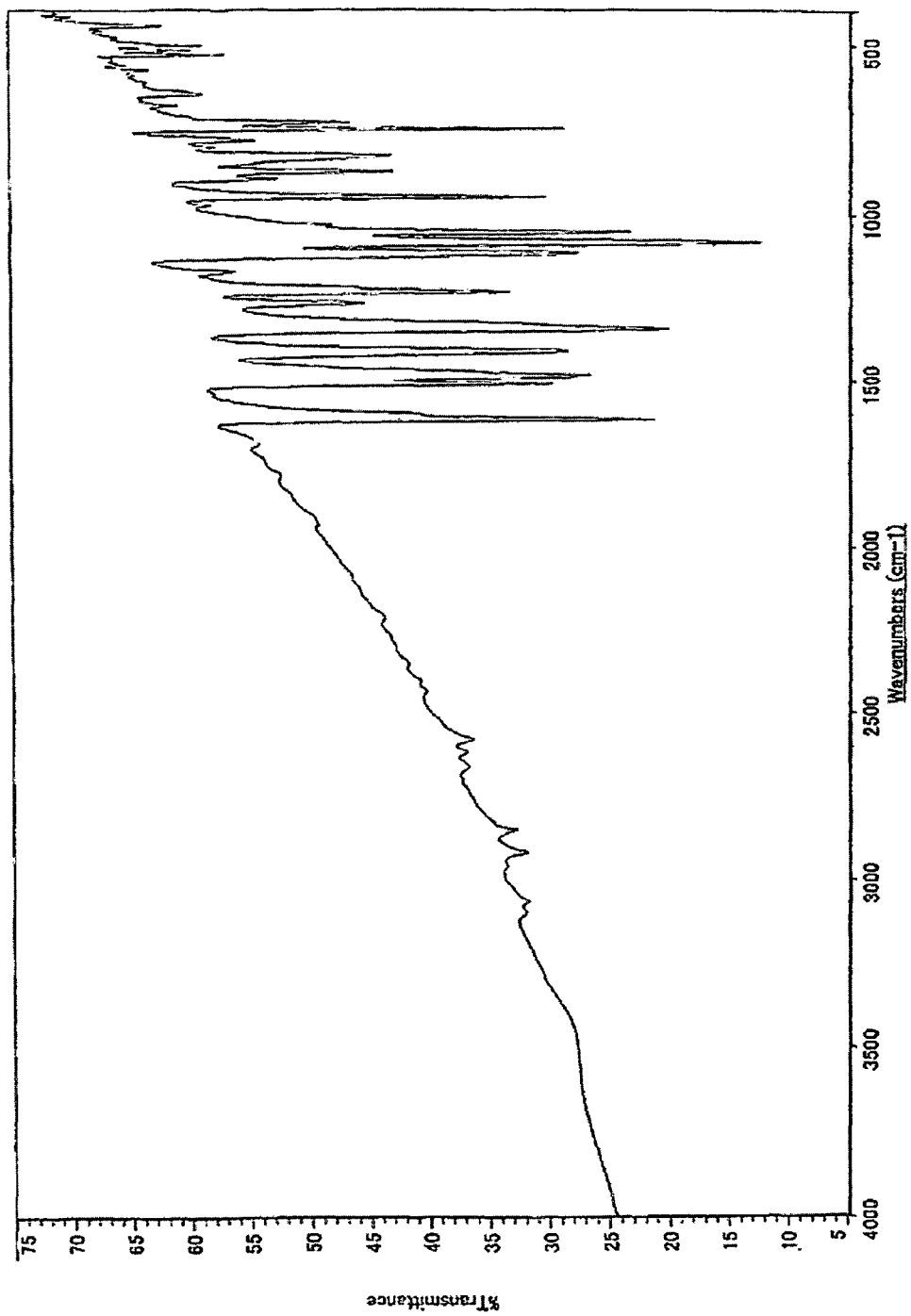
FIG. 68 is an infrared absorption spectrum of the tetrafluorochlorogallium phthalocyanine produced in Production Example 47.

The powder X-ray diffraction was carried out under the following condition.
 powder X-ray diffraction apparatus: PANalytical PW1700
 X-ray tube: Cu
 Tube voltage: 40 kV
 Tube current: 30 mA
 Scan axis: θ/2θ
 Measurement range (2θ): 3.0-40.0°
 Measurement mode: Continuous
 Read-in range: 0.05°
 Scan rate: 3.0°/min
 DS: 1°
 SS: 1°
 RS: 0.20 mm As the results of mass spectrometry (DCI method) on the obtained compound, molecular ion peaks (minus ion) were detected at 688 and 690. The pattern of Ga isotopes also clearly indicated that the obtained compound was tetrafluorochlorogallium phthalocyanine. The mass spectrum measurement was carried out under the following condition.
 Measurement method: MALDI-TOF-MS measurement
 Measurement apparatus: Voyger Elite-DE manufactured by Applied Biosystems Co.
 Measurement condition
 Detected ion: Negative
 Measurement mode: Reflector mode
 Applied voltage: 20 kV
 Matrix: None An IR spectrum of the obtained compound is shown in FIG. 68.

Production Example 48

Figure 69:
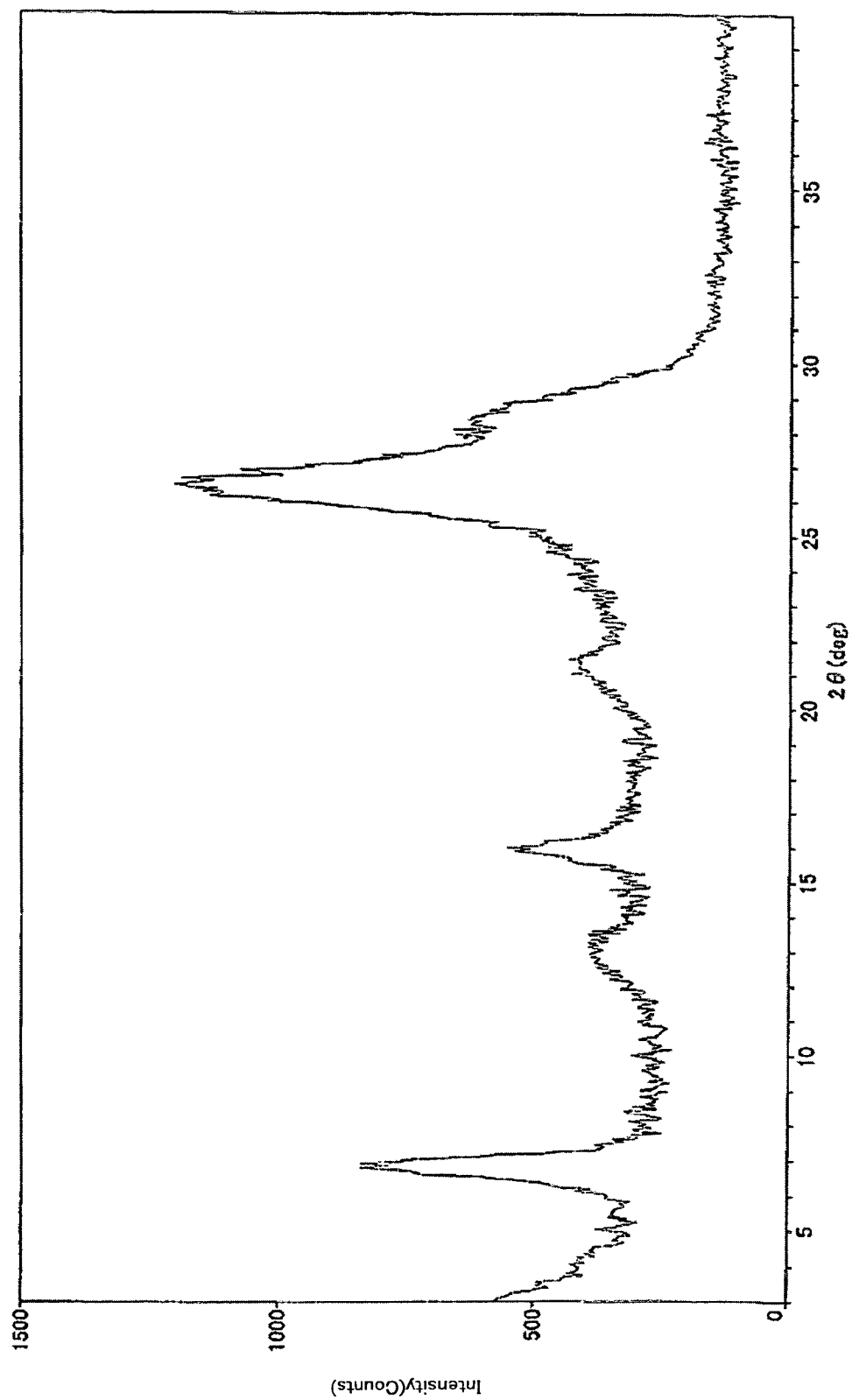
FIG. 69 is a powder X-ray diffraction pattern of the tetrafluorochlorogallium phthalocyanine produced in Production Example 48.

The mixture of 5 parts of tetrafluorochlorogallium phthalocyanine obtained in Production Example 47 and 150 parts of spherical glass beads with diameters of about 1 mm was filled in a polyethylene bottle with the capacity of 250 ml in such a manner that about half the space was remained vacant, and subjected to shaking treatment using a paint dispersion tester (paint shaker) for 20 hours to be made into amorphous state. After the treatment, the beads were separated from the solid, which was subjected to agitation in methanol for 30 minutes followed by filtration and drying, whereby a tetrafluorochlorogallium phthalocyanine that exhibited a powder X-ray spectrum shown in FIG. 69 was obtained.

Production Example 49

Figure 70:
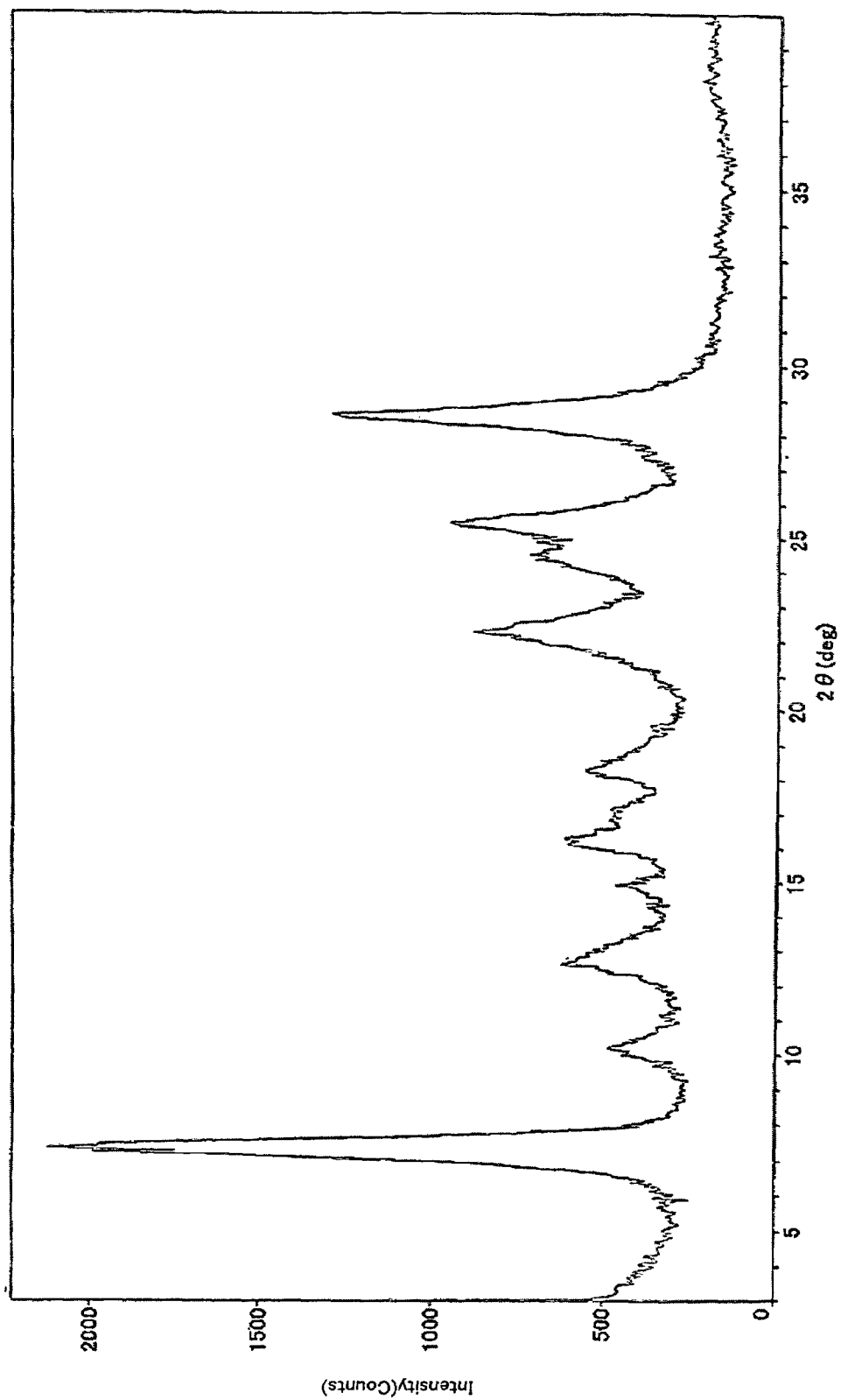
FIG. 70 is a powder X-ray diffraction pattern of the phthalocyanine-containing mixed crystal produced in Production Example 49.

The mixture of 8 parts of the α-form oxytitanium phthalocyanine produced according to the method described in the section [I. Production of Titanyl Phthalocyanine] in Example 1 of Japanese Patent Laid-Open Publication No. Hei 2-308863, 2 parts of the tetrafluorochlorogallium phthalocyanine obtained in Production Example 47, and 400 parts of glass beads having diameters of about 1 mm was filled in a polyethylene bottle with the capacity of 250 ml in such a manner that about half the space was remained vacant, and subjected to shaking treatment using a paint dispersion tester (paint shaker) for 20 hours to be made into amorphous state. After the treatment, 10 parts of the obtained phthalocyanine composite was mixed with 80.5 parts of methyl ethyl ketone and agitated for 4 hours, after which the beads were removed and the phthalocyanine composite was subjected to filtration and drying, whereby a phthalocyanine composite that exhibited a powder X-ray spectrum shown in FIG. 70 was obtained.

Production Example 50

Figure 71:
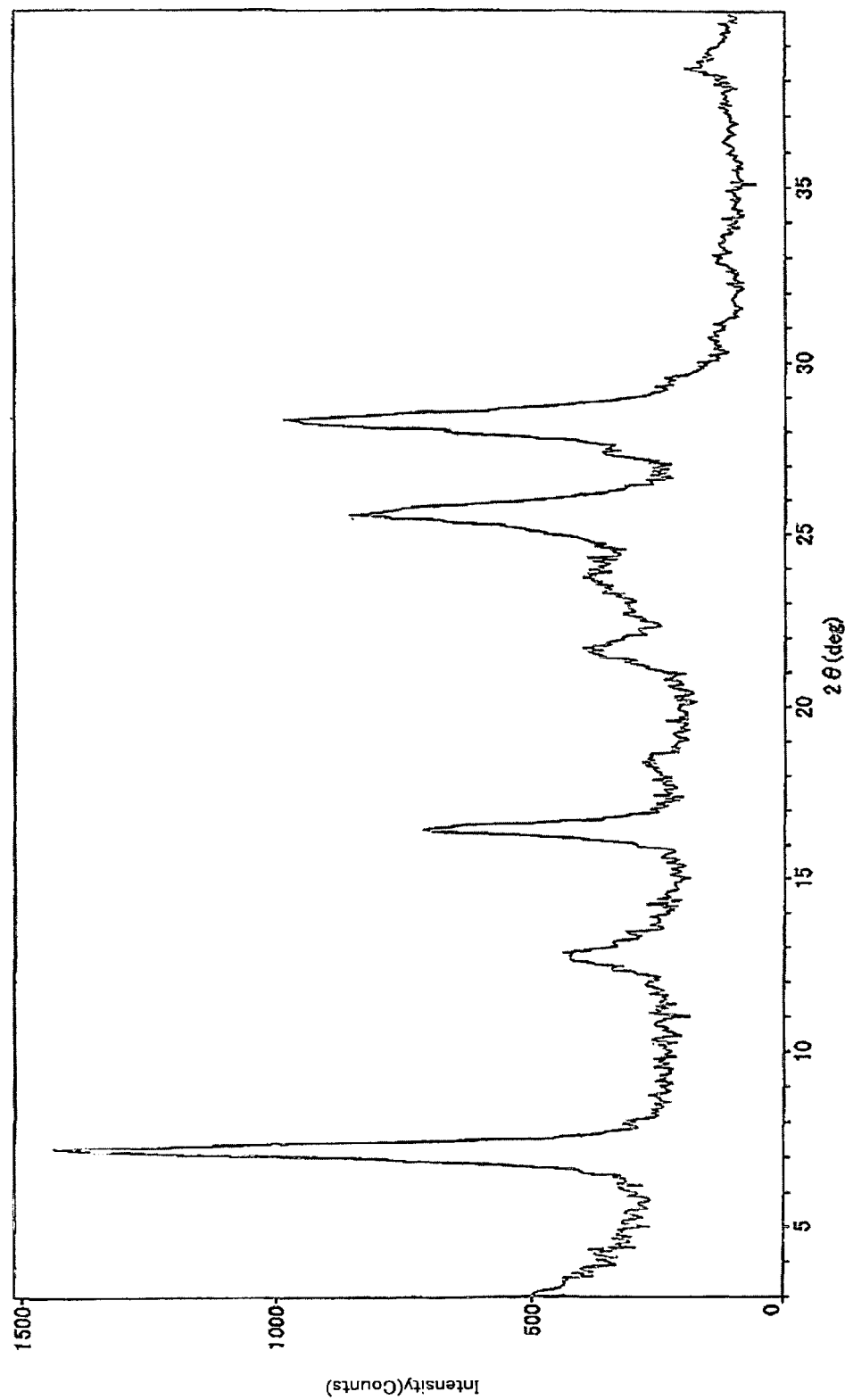
FIG. 71 is a powder X-ray diffraction pattern of the phthalocyanine-containing mixed crystal produced in Production Example 50.

The same procedure as Production Example 49 was carried out, except for that instead of 8 parts of the α-form oxytitanium phthalocyanine used in Production Example 49, 8 parts of the chlorogallium phthalocyanine produced according to the methods described in Preparation Example of Japanese Patent Laid-Open Publication No. Hei 5-098181 and Example 1 of the same publication was used (with the exception that 1-chloronaphthalene was used as the solvent for synthesis) and that after the treatment using the paint dispersion tester (paint shaker), 89 parts of tetrahydrofuran was substituted for methyl ethyl ketone, a phthalocyanine composite that exhibited a powder X-ray spectrum shown in FIG. 71 was obtained.

Comparative Production Example 12

Figure 72:
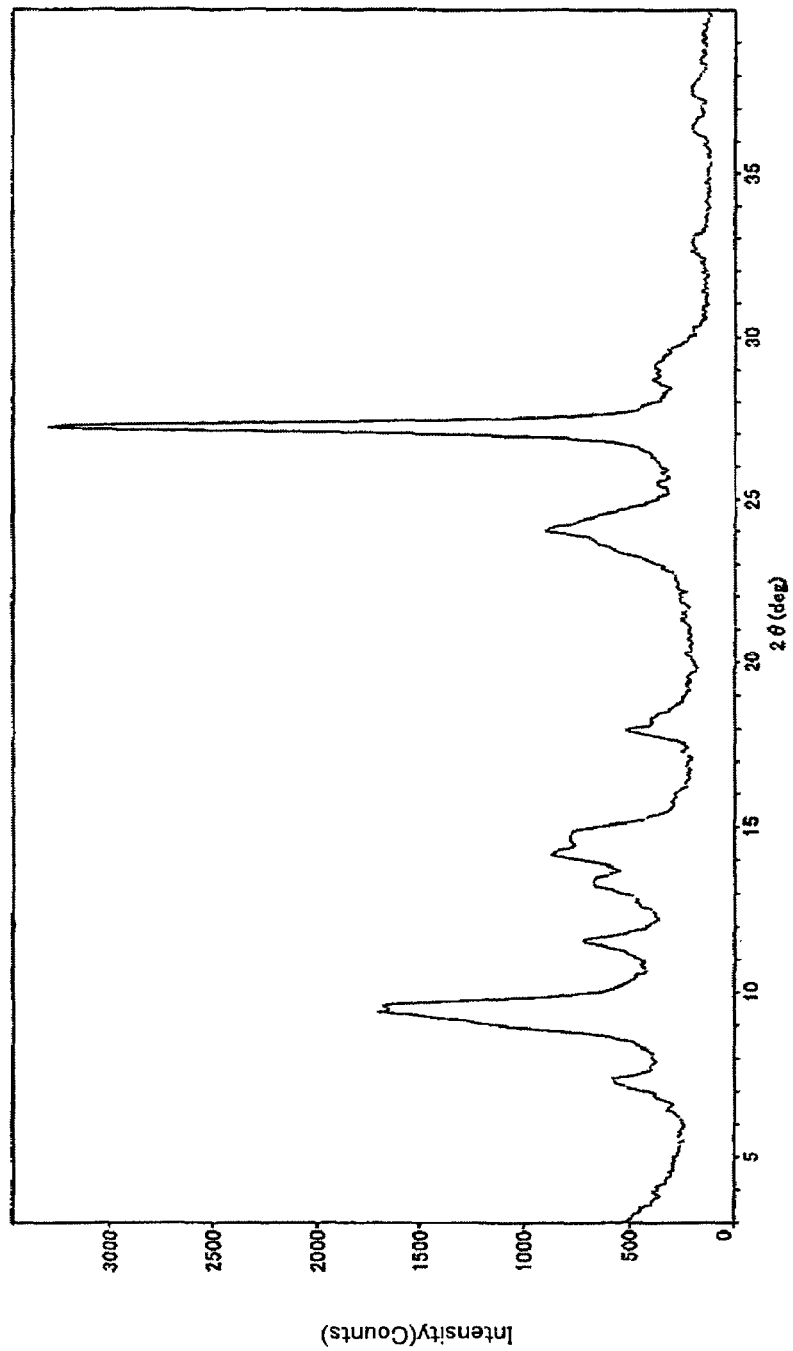
FIG. 72 is a powder X-ray diffraction pattern of the oxytitanium phthalocyanine of Comparative Production Example 12.

The α-form oxytitanium phthalocyanine produced in Comparative Production Example 1 was treated according to the method described in Example 2 of Japanese Patent Laid-Open Publication No. Hei 2-289658, whereby a D-form oxytitanium phthalocyanine having a powder X-ray spectrum shown in FIG. 72 was obtained.

Example 60

4 parts of tetrafluorochlorogallium phthalocyanine produced in Production Example 47, 30 parts of 4-methyl-4-methoxy-2-pentanone, and 270 parts of 1,2-dimethoxyethane were mixed and subjected to dispersion treatment using a sand grinder for 2 hours, and the obtained dispersion liquid was added with 1 part of polyvinyl butyral and 1 part of phenoxy resin (PKHH, manufactured by Union Carbide Co.), and then subjected to dispersion treatment using a sand grinder for 1 hour further, whereby pigment dispersion liquid was obtained.

Onto an electroconductive substrate prepared by forming a vapor-deposited aluminum layer having the thickness of 70 nm on the surface of a biaxially stretched polyethylene terephthalate film having the film thickness of 75 μm, the dispersion liquid was applied with a wirebar in such a manner that the film thickness after drying was 0.4 μm, and then dried to form a charge generation layer.

On the charge generation layer, the mixture solution of 50 parts of the charge transport material shown below, which was produced according to the method described in Example 1 of Japanese Patent Laid-Open Publication No. 2002-80432, 100 parts of the polycarbonate resin shown below, 400 parts of tetrahydrofuran, and 100 parts of toluene was applied in such a manner that the film thickness after drying was 20 μm to form a charge transport layer, whereby an electrophotographic photoreceptor A1 was produced.

[Chemical Formula 27]

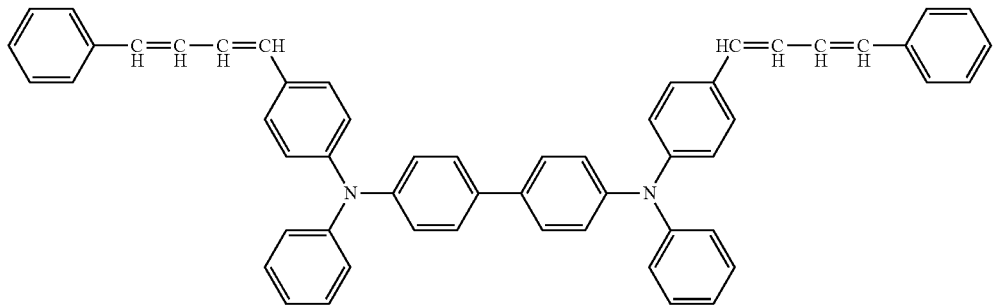

Charge Transport Material

[Chemical Formula 28]

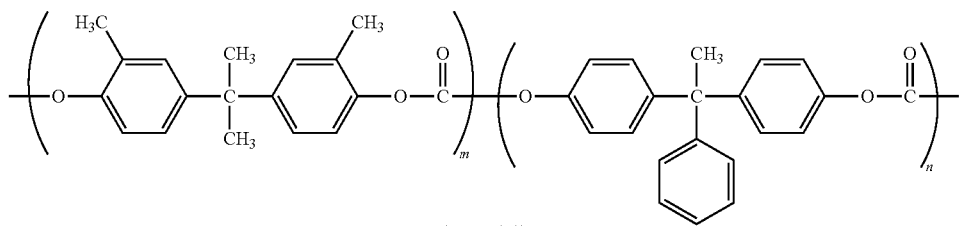

(m:n = 1:1)
Polycarbonate Resin

Example 61

The same procedure was carried out as Example 60, except for that the tetrafluorochlorogallium phthalocyanine obtained in Production Example 48 was substituted for the tetrafluorochlorogallium phthalocyanine used in Example 60, whereby an electrophotographic photoreceptor A2 was produced.

Example 62

The same procedure was carried out as Example 60, except for that the phthalocyanine composite obtained in Production Example 49 was substituted for the tetrafluorochlorogallium phthalocyanine used in Example 60, whereby an electrophotographic photoreceptor A3 was produced.

Example 63

The same procedure was carried out as Example 60, except for that the phthalocyanine composite obtained in Production Example 50 was substituted for the tetrafluorochlorogallium phthalocyanine used in Example 60, whereby an electrophotographic photoreceptor A4 was produced.

Comparative Example 20

The same procedure was carried out as Example 60, except for that the oxytitanium phthalocyanine obtained in Comparative Production Example 12 was substituted for the tetrafluorochlorogallium phthalocyanine used in Example 60, whereby a comparative photoreceptor B1 was produced.

[Photoreceptor Evaluation]

The photoreceptors produced in Examples and Comparative Examples were subjected to measurement of electric properties with respect to fluctuations in usage environment. An electrophotographic-properties evaluator manufactured according to the standard of the Society of Electrophotography {"More Bases and Applications of Electrophotography Technology", edited by the Society of Electrophotography, issued by Corona Publishing Co. Ltd, pp. 404-405} was used. The individual photoreceptor was pasted over an aluminum drum and made into a cylindrical shape, and the conductivity between the aluminum drum and the photoreceptor's aluminum substrate was secured. The drum was rotated with a constant number of rotations while an electric-characteristics evaluation test was carried out according to the cycle of charging, exposure, electric-potential measurement, and neutralization. The initial surface potential was adjusted at −700 V, and monochromatic lights of 780 nm and 660 nm were used for the exposure and the neutralization, respectively. After the exposure, as indicators of the dependence of the photoreceptor's surface potential on the amount of exposure light, the exposure amount (hereinafter also called half-decay exposure amount or $E_{1/2}$) required until the surface potential reached −350 V and the exposure amount (hereinafter also called $E_{1/5}$) required until the surface potential reached −140 V (⅕ of the initially-charged electric potential) were measured, and the evaluation was made based on the coefficient of fluctuation indicating the extent to which these values fluctuated depending on environments. The time elapsed after the exposure until the electric-potential measurement was 100 ms.

The measurement was carried out in both the environment of 25° C. in temperature and 50% in relative humidity (hereinafter also called N environment) and the environment of 5° C. in temperature and 10% in relative humidity (hereinafter also called L environment). Table 22 shows the fluctuation rate of the sensitivity (half-decay exposure amount) in L environment with respect to the sensitivity in N environment as $\Delta E_{1/2}$ (%) and the fluctuation rate of the $E_{1/5}$ mL environment with respect to the $E_{1/5}$ in N environment as $\Delta E_{1/5}$ (%).

It can be said that as the fluctuation rate takes smaller value, the photoreceptor is less prone to be affected by the environment and exhibits more stable characteristics. The values of $\Delta E_{1/2}$ and $\Delta E_{1/5}$ can be calculated according to the following formulae.

$\Delta E_{1/2}$: the absolute value of $100\times[1-\{(E_{1/2}$ in $L$ environment$)/(E_{1/2}$ in $N$ environment$)\}]$ $\Delta E_{1/5}$: the absolute value of $100\times[1-\{(E_{1/5}$ in $L$ environment$)/(E_{1/5}$ in $N$ environment$)\}]$

[Table 22]

TABLE 22

| Electrophotographic Photoreceptor | $\Delta E_{1/2}$ (%) | $\Delta E_{1/5}$ (%) |
|---|---|---|
| A1 | 16.1 | 17.8 |
| A2 | 15.5 | 21.9 |
| A3 | 11.7 | 18.7 |
| A4 | 13.6 | 23.9 |
| B1 | 33.3 | 42.0 |

As is clear from the results shown in Table 22, the electrophotographic photoreceptors of the present invention exhibited small fluctuations in their electric properties irrespective of changes in usage environment, and are well-balanced in their electric properties. Consequently, even when the surrounding temperature or humidity may fluctuate during repetitive use, they exhibit only small fluctuations in photoreceptor characteristics, and can be suitably used for an electrophotographic photoreceptor.

INDUSTRIAL APPLICABILITY

The present invention can be applied to any areas requiring electrophotographic photoreceptors, and is suitably used for various electrophotographic devices such as copying machines, printers, fax machines, printing machines, etc.

The invention claimed is:

1. A phthalocyanine composite comprising both at least one phthalocyanine compound expressed by general formula (1) and at least one phthalocyanine compound expressed by general formula (2), and having a eutectic-crystalline structure:

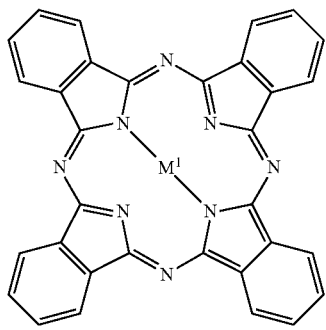

(1)

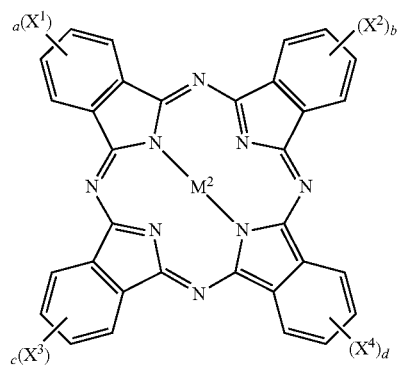

(2)

where, in the general formulae (1) and (2), $M^1$ and $M^2$ represent, independently of and differently from each other, at least one atom or atomic group selected from the group consisting of gallium, indium and titanium, that are capable of binding to a phthalocyanine, $X^1$-$X^4$ represent, independently of one another, a halogen atom, and a, b, c, and d represent, independently of each other, an integer between 0 and 4 and satisfy $a+b+c+d \geq 1$.

2. A phthalocyanine composite according to claim 1, wherein said phthalocyanine composite is produced through a mechanical process for making amorphous state.

3. The phthalocyanine composite according to claim 1, wherein $a+b+c+d=1$.

4. A phthalocyanine composite comprising both at least one phthalocyanine compound expressed by general formula (3) and at least one phthalocyanine compound expressed by general formula (4), and having a eutectic-crystalline structure:

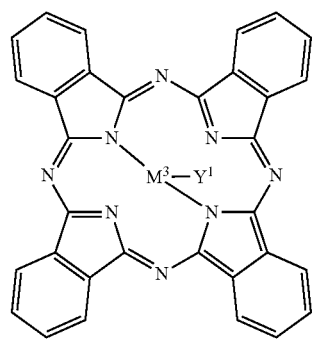

(3)

-continued

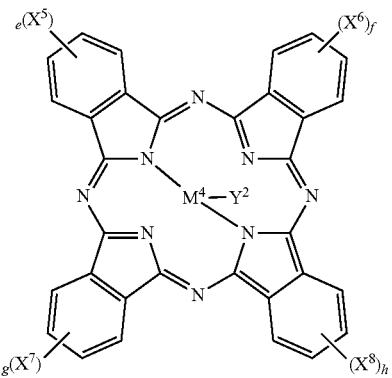

(4)

where, in the general formulae (3) and (4), $M^3$ and $M^4$ each represent an atom selected from the 13th group of the long-form periodic table, $M^3$ and $M^4$ being atoms of the same kind, $X^5$-$X^8$ represent, independently of one another, a halogen atom, $Y^1$ represents a monovalent bonding group capable of binding to $M^3$, $Y^2$ represents a monovalent bonding group capable of binding to $M^4$, at least either $Y^1$ or $Y^2$ being a halogen atom, and e, f, g, and h represent, independently of one another, an integer between 0 and 4 and satisfy $e+f+g+h \geq 1$.

5. The phthalocyanine composite according to claim 4, wherein e+f+g+h=1.

6. A phthalocyanine composite according to claim 4, wherein said phthalocyanine composite is produced through a mechanical process for making amorphous state.

7. A photoconductive material comprising a phthalocyanine composite according to any one of claim 1, 2-4 or 6.

8. An electrophotographic photoreceptor comprising an electroconductive substrate and a photosensitive layer formed on said substrate, wherein said photosensitive layer contains a phthalocyanine composite according to any one of claim 1, 2-4 or 6.

9. An electrophotographic photoreceptor cartridge comprising:
    an electrophotographic photoreceptor according to claim 8; and
    at least one of
    a charge unit for charging said electrophotographic photoreceptor,
    an exposure unit for exposing the charged electrophotographic photoreceptor to form an electrostatic latent image thereon, and
    a development unit for developing the electrostatic latent image formed on the electrophotographic photoreceptor.

10. An image forming apparatus comprising:
    an electrophotographic photoreceptor according to claim 8;
    a charge unit for charging said electrophotographic photoreceptor;
    an exposure unit for exposing the charged electrophotographic photoreceptor to form an electrostatic latent image thereon; and
    a development unit for developing the electrostatic latent image formed on the electrophotographic photoreceptor.

* * * * *